(12) United States Patent
Dade et al.

(10) Patent No.: US 10,883,754 B2
(45) Date of Patent: Jan. 5, 2021

(54) LOCKER SYSTEM

(71) Applicant: ILLINOIS TOOL WORKS INC., Glenview, IL (US)

(72) Inventors: Nigel Dade, Spalding (GB); Gareth Hunt, King's Lynn (GB); Hoi Kan Chung, London (GB); Nashim Imam, London (GB)

(73) Assignee: ILLINOIS TOOL WORKS INC., Glenview, IL (US)

(*) Notice: Subject to any disclaimer, the term of this patent is extended or adjusted under 35 U.S.C. 154(b) by 127 days.

(21) Appl. No.: 15/609,906

(22) Filed: May 31, 2017

(65) Prior Publication Data

US 2017/0292760 A1 Oct. 12, 2017

Related U.S. Application Data

(62) Division of application No. 15/111,698, filed as application No. PCT/GB2015/050198 on Jan. 28, 2015.

(30) Foreign Application Priority Data

Jan. 29, 2014 (GB) .................................. 1401539.0
Feb. 4, 2014 (GB) .................................. 1401910.3
(Continued)

(51) Int. Cl.
*F25D 13/04* (2006.01)
*A47B 88/90* (2017.01)
(Continued)

(52) U.S. Cl.
CPC ................ *F25D 13/04* (2013.01); *A23B 4/06* (2013.01); *A47B 88/90* (2017.01); *A47G 29/141* (2013.01);
(Continued)

(58) Field of Classification Search
CPC .......... F25D 13/04; F25D 13/02; F24F 11/84
See application file for complete search history.

(56) References Cited

U.S. PATENT DOCUMENTS 2,198,239 A 4/1940 Baird
2,807,837 A 10/1957 Kesling
(Continued)

FOREIGN PATENT DOCUMENTS

AU 2007240193 12/2007
AU 2013203916 5/2014
(Continued)

OTHER PUBLICATIONS

JPS62162834 English Translation.*
(Continued)

*Primary Examiner* — Marc E Norman
*Assistant Examiner* — Schyler S Sanks
(74) *Attorney, Agent, or Firm* — Thompson Hine LLP

(57) ABSTRACT

A temperature controlled storage apparatus includes a plurality of lockable storage spaces. Each of the plurality of lockable storage spaces includes one or more compartments. The temperature of each of the one or more compartments is independently controllable to provide any one of a chilled temperature or a frozen temperature. Access to the storage space is remotely programmable.

12 Claims, 43 Drawing Sheets

(30) Foreign Application Priority Data

| | | |
|---|---|---|
| Mar. 27, 2014 | (GB) | 1405566.9 |
| Jun. 18, 2014 | (GB) | 1411043.1 |
| Sep. 19, 2014 | (GB) | 1416641.7 |
| Sep. 22, 2014 | (GB) | 1416742.3 |
| Dec. 23, 2014 | (GB) | 1423158.3 |

(51) Int. Cl.

| | |
|---|---|
| G07F 11/62 | (2006.01) |
| G07F 9/10 | (2006.01) |
| F25B 5/02 | (2006.01) |
| F25B 29/00 | (2006.01) |
| G07F 17/12 | (2006.01) |
| G07C 9/23 | (2020.01) |
| A47G 29/14 | (2006.01) |
| F25D 29/00 | (2006.01) |
| A47G 29/30 | (2006.01) |
| F25D 13/02 | (2006.01) |
| F25D 25/02 | (2006.01) |
| A23B 4/06 | (2006.01) |
| F25D 17/00 | (2006.01) |
| F25D 25/00 | (2006.01) |
| F25D 13/00 | (2006.01) |

(52) U.S. Cl.
CPC ............... *A47G 29/30* (2013.01); *F25B 5/02* (2013.01); *F25B 29/003* (2013.01); *F25D 13/02* (2013.01); *F25D 17/00* (2013.01); *F25D 25/02* (2013.01); *F25D 29/00* (2013.01); *G07C 9/23* (2020.01); *G07F 9/105* (2013.01); *G07F 11/62* (2013.01); *G07F 17/12* (2013.01); *A47G 2029/147* (2013.01); *A47G 2029/149* (2013.01); *A47G 2200/166* (2013.01); *A47G 2200/186* (2013.01); *F25D 13/00* (2013.01); *F25D 25/00* (2013.01); *F25D 2600/02* (2013.01)

(56) References Cited

U.S. PATENT DOCUMENTS

| | | | |
|---|---|---|---|
| 4,024,620 | A | 5/1977 | Torcomian |
| 4,174,486 | A | 11/1979 | Winkler |
| 4,683,725 | A | 8/1987 | Sugiura |
| 4,842,289 | A | 6/1989 | Samuels |
| 5,046,324 | A | 9/1991 | Otoh |
| 5,207,070 | A | 5/1993 | Miyazaki |
| 5,544,495 | A | 8/1996 | Anderson et al. |
| 5,620,137 | A | 4/1997 | Coelho |
| 5,979,750 | A | 11/1999 | Kindell |
| 7,051,549 | B2 | 5/2006 | Kim et al. |
| 2002/0035515 | A1 | 3/2002 | Moreno |
| 2003/0132850 | A1* | 7/2003 | Ozawa ............... F25D 17/02 340/686.1 |
| 2004/0035142 | A1 | 2/2004 | Yoon et al. |
| 2004/0174247 | A1* | 9/2004 | Rodenbeck ........ G07C 9/00309 340/5.64 |
| 2004/0190554 | A1 | 9/2004 | Galloway |
| 2005/0132718 | A1 | 6/2005 | Lilke |
| 2007/0084238 | A1* | 4/2007 | Son ................... F16K 11/074 62/527 |
| 2007/0125100 | A1 | 6/2007 | Shoenfeld |
| 2007/0130971 | A1 | 6/2007 | Thybo et al. |
| 2007/0227204 | A1 | 10/2007 | Shoenfeld |
| 2008/0066506 | A1 | 3/2008 | Carbajal et al. |
| 2008/0155993 | A1* | 7/2008 | Kuehl ................ F25B 25/00 62/3.6 |
| 2008/0289354 | A1 | 11/2008 | Dudley |
| 2008/0302049 | A1 | 12/2008 | Stoneburner |
| 2009/0030555 | A1 | 1/2009 | Gray |
| 2009/0095006 | A1 | 4/2009 | Smith |
| 2010/0287963 | A1* | 11/2010 | Billen ................. A01N 1/0252 62/126 |
| 2010/0293977 | A1 | 11/2010 | Tanaka |
| 2011/0252428 | A1 | 10/2011 | Maruyama |
| 2012/0000222 | A1* | 1/2012 | Fink .................... F25D 29/003 62/115 |
| 2012/0079840 | A1 | 4/2012 | Lukasse |
| 2012/0125028 | A1 | 5/2012 | Keisling et al. |
| 2012/0206029 | A1 | 8/2012 | Zabbatino |
| 2012/0209763 | A1 | 8/2012 | Zabbatino |
| 2013/0055740 | A1 | 3/2013 | Funder-Kristensen |
| 2013/0167582 | A1 | 7/2013 | Jones |
| 2013/0213067 | A1 | 8/2013 | Wajima |
| 2015/0048927 | A1 | 2/2015 | Simmons |
| 2015/0330674 | A1 | 11/2015 | Yamashita |

FOREIGN PATENT DOCUMENTS

| | | |
|---|---|---|
| CA | 2298217 | 2/2000 |
| CA | 2298217 A1 | 8/2001 |
| CA | 2453651 | 12/2003 |
| CN | 1159561 | 9/1997 |
| CN | 1162731 A | 10/1997 |
| CN | 2472165 Y | 1/2002 |
| CN | 1782573 | 6/2006 |
| CN | 2861060 | 1/2007 |
| CN | 101124039 | 2/2008 |
| CN | 101360959 | 2/2009 |
| CN | 201297076 Y * | 8/2009 |
| CN | 102308165 A | 1/2012 |
| CN | 102313414 | 1/2012 |
| CN | 202582000 U | 12/2012 |
| CN | 103061536 | 4/2013 |
| DE | 2521863 | 1/1976 |
| DE | 19958683 | 6/2001 |
| DE | 10164574 | 4/2004 |
| DE | 102009000851 | 8/2010 |
| EP | 1271079 | 2/2002 |
| EP | 2075516 | 12/2008 |
| EP | 2256446 | 12/2010 |
| EP | 2845802 | 9/2014 |
| FR | 1581985 | 9/1969 |
| FR | 2738056 | 8/1996 |
| FR | 2937069 | 10/2008 |
| FR | 2941441 | 1/2009 |
| GB | 615167 | 7/1946 |
| GB | 1348466 | 5/1972 |
| GB | 2333095 | 1/1999 |
| GB | 2353068 | 2/2001 |
| GB | 2474118 | 9/2010 |
| JP | S62162834 * | 7/1987 |
| JP | H024146 | 1/1990 |
| JP | H 07101492 | 10/1993 |
| JP | H10339546 A | 12/1998 |
| JP | 2003010034 | 6/2001 |
| KR | 1020090102314 | 3/2008 |
| WO | WO 01/00069 A2 | 1/2001 |
| WO | WO 01/17406 A2 | 3/2001 |
| WO | WO 01/43091 A1 | 6/2001 |
| WO | WO 01/78022 A1 | 10/2001 |
| WO | WO 2007/084138 | 7/2007 |
| WO | WO 2007077095 A2 | 7/2007 |
| WO | WO 2013004685 A2 | 1/2013 |

OTHER PUBLICATIONS

Translation of CN201297076Y (Year: 2009).*
PCT, International Search Report and Written Opinion of the International Searching Authority, International Application No. PCT/GB2015/050198; dated Jul. 7, 2015, 19 pages.
PCT, International Searching Authority, Invitation to Pay Additional Fees, International Application No. PCT/GB2015/050198; dated May 4, 2015, 6 pages.
PCT, International Preliminary Search Report on Patentability, International Application No. PCT/GB2015/050198; dated Aug. 11, 2016, 13 pages.

(56) References Cited

OTHER PUBLICATIONS

Beverage Factory, Compact Refrigerators, https://www.beveragefactory.com/refrigeration/ff281.shtml , Mar. 13, 2006, 2 pgs.

* cited by examiner

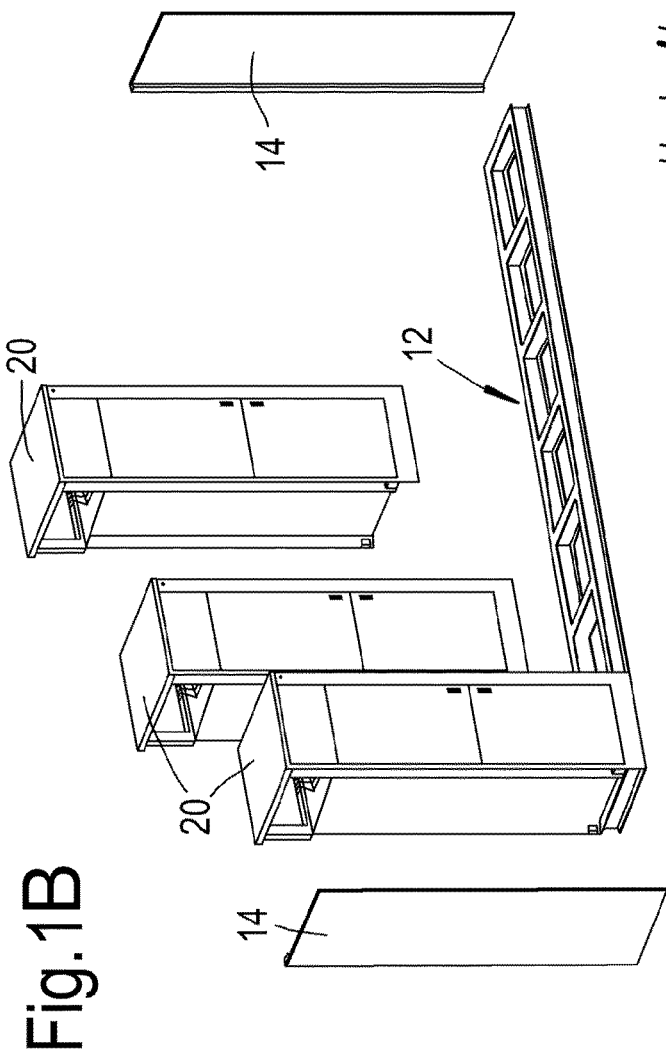
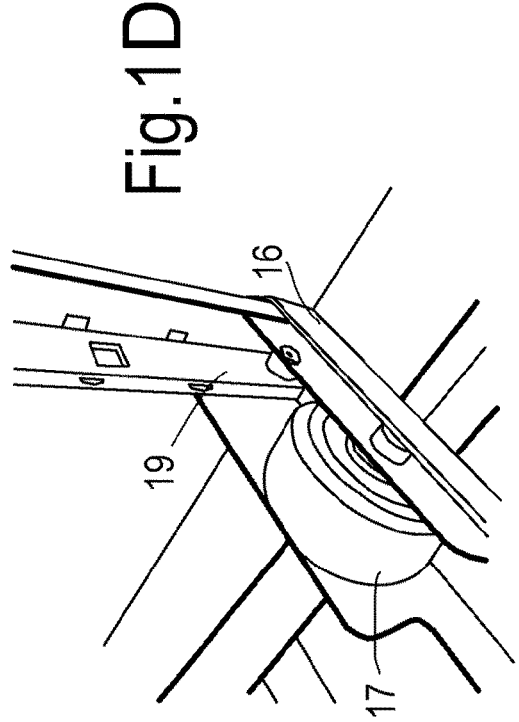
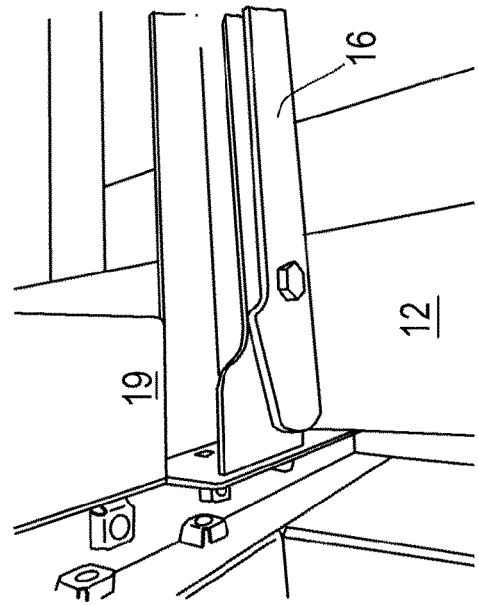

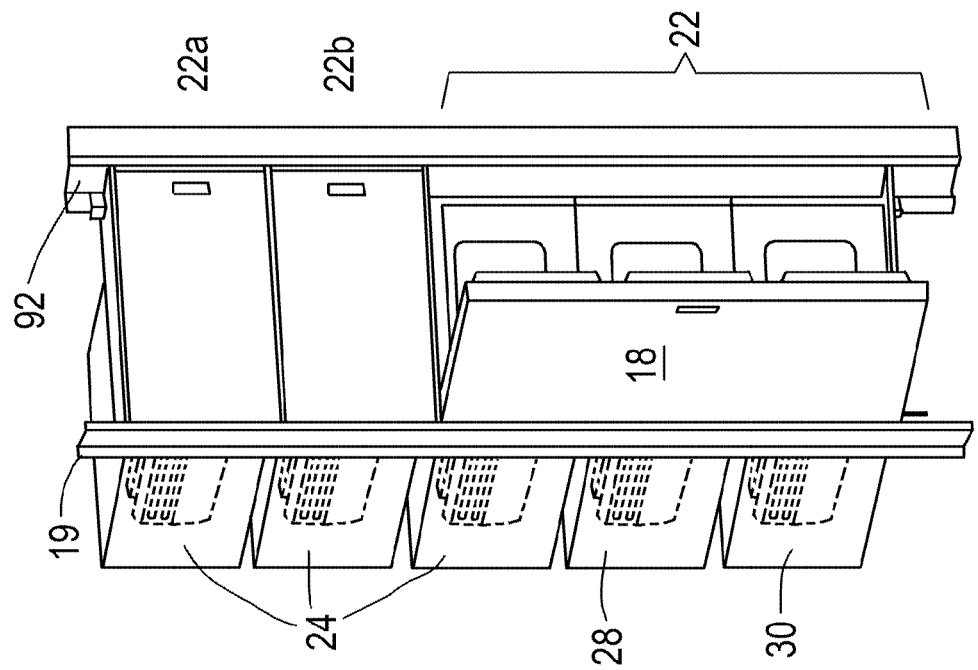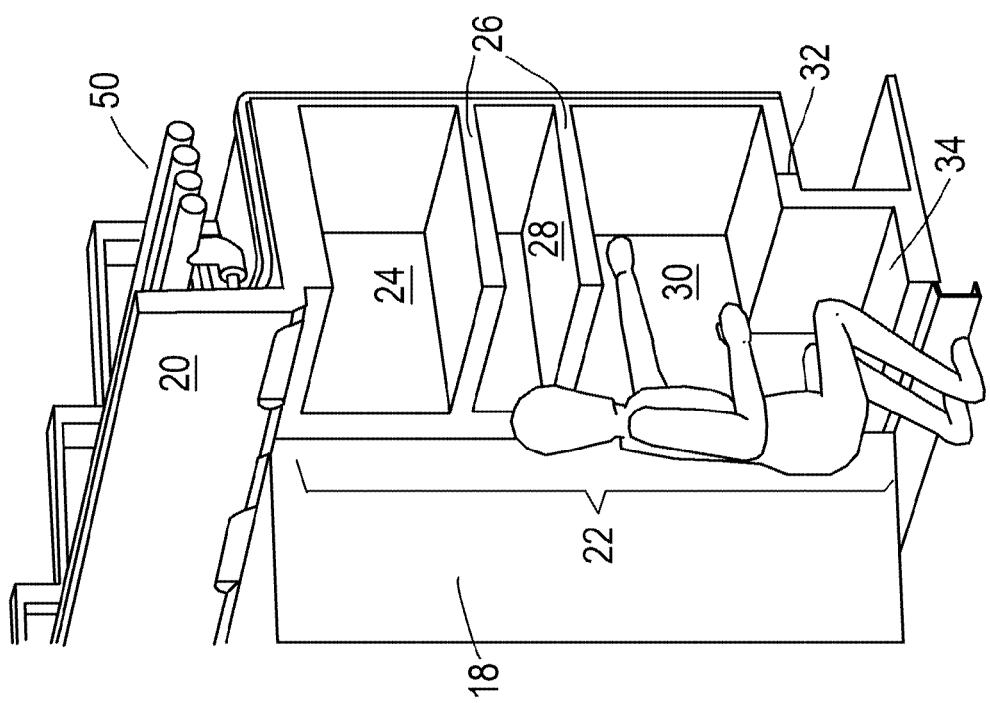

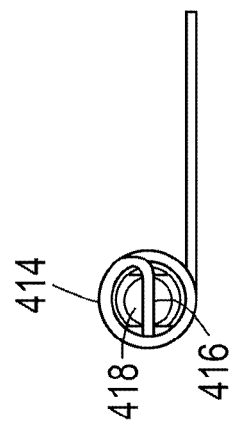
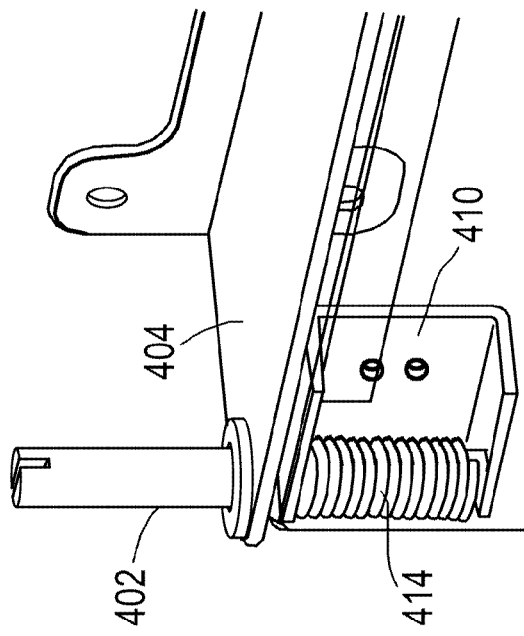
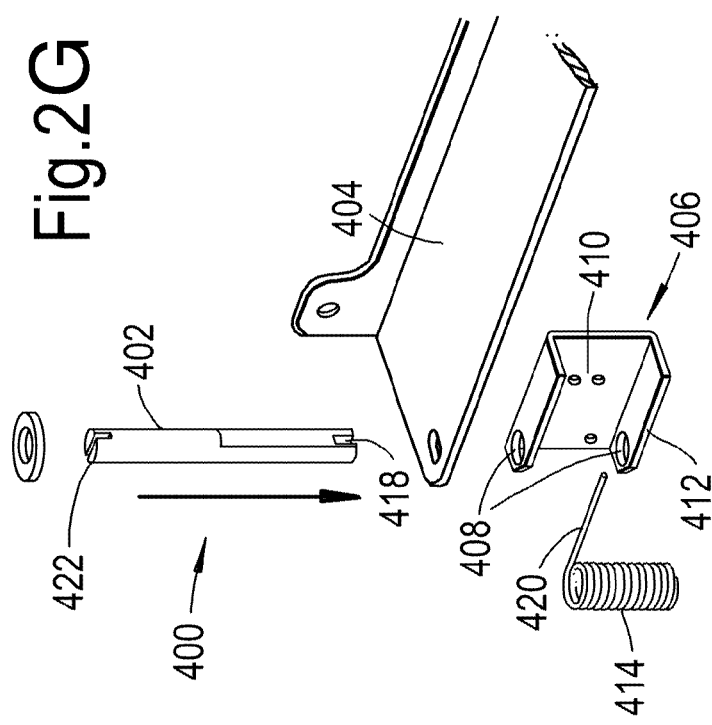

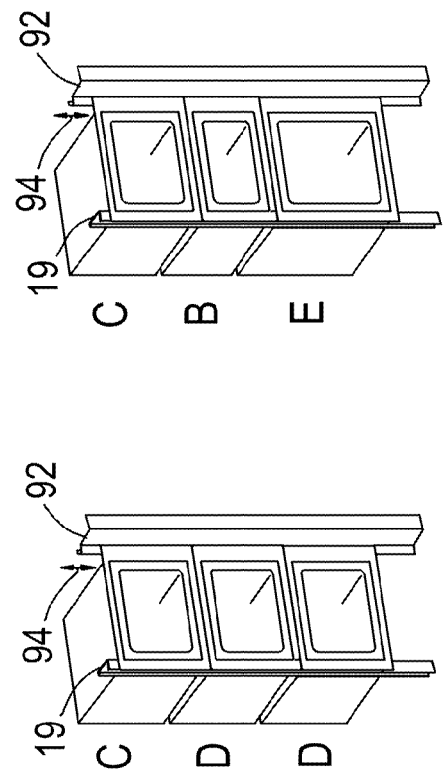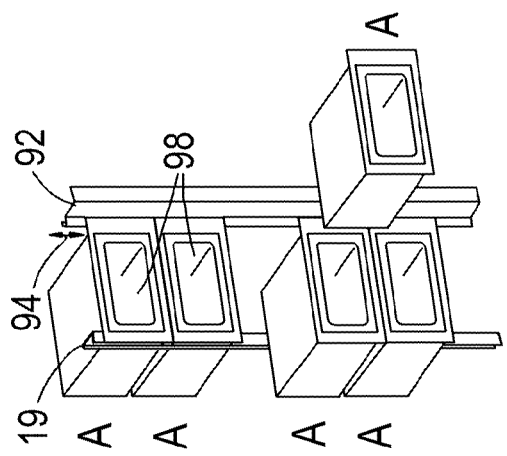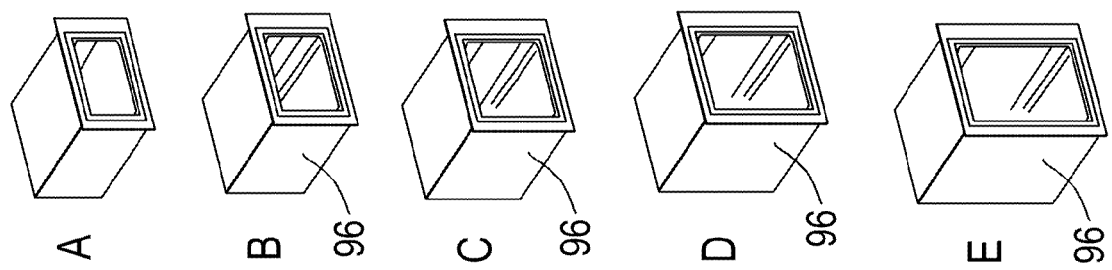

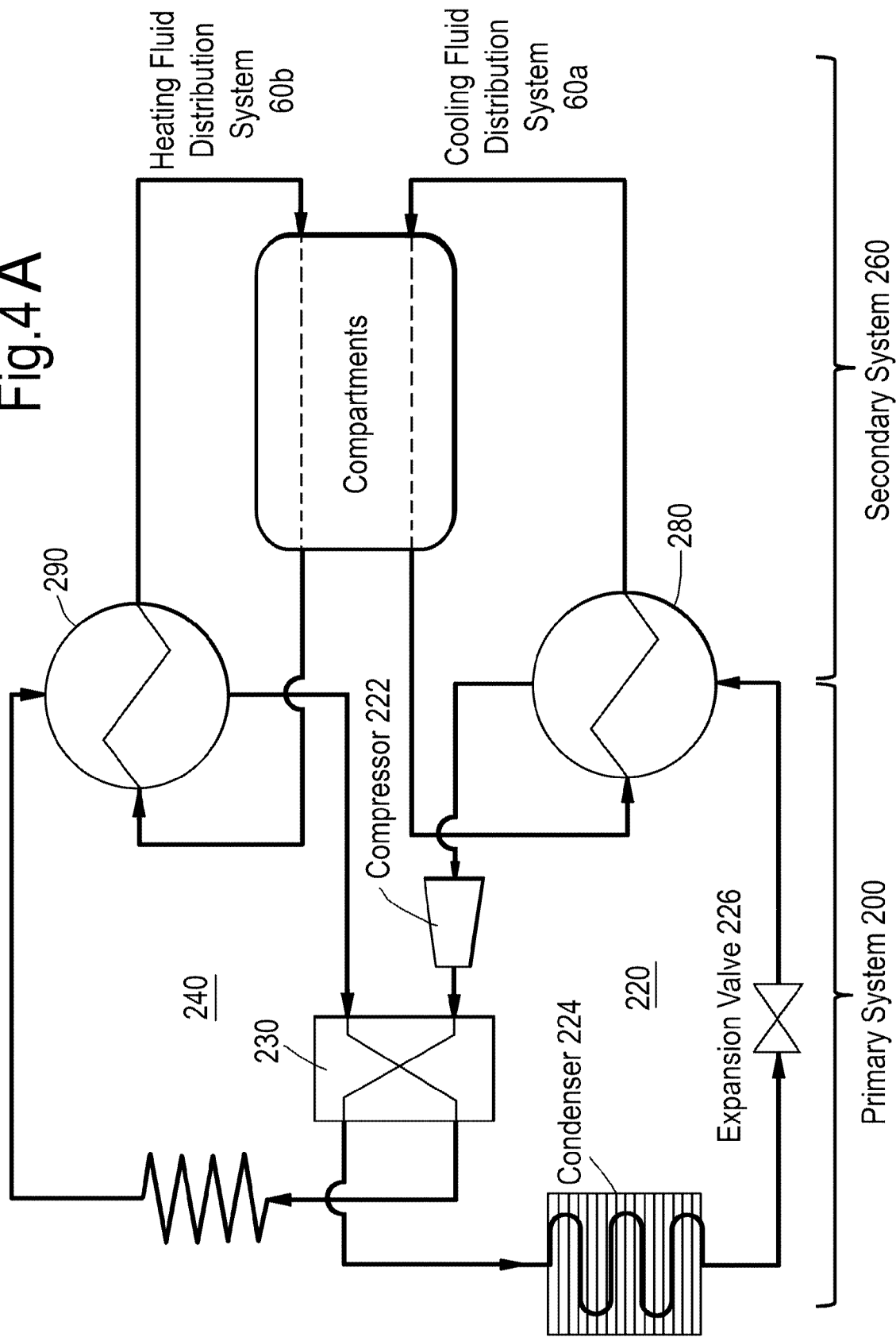

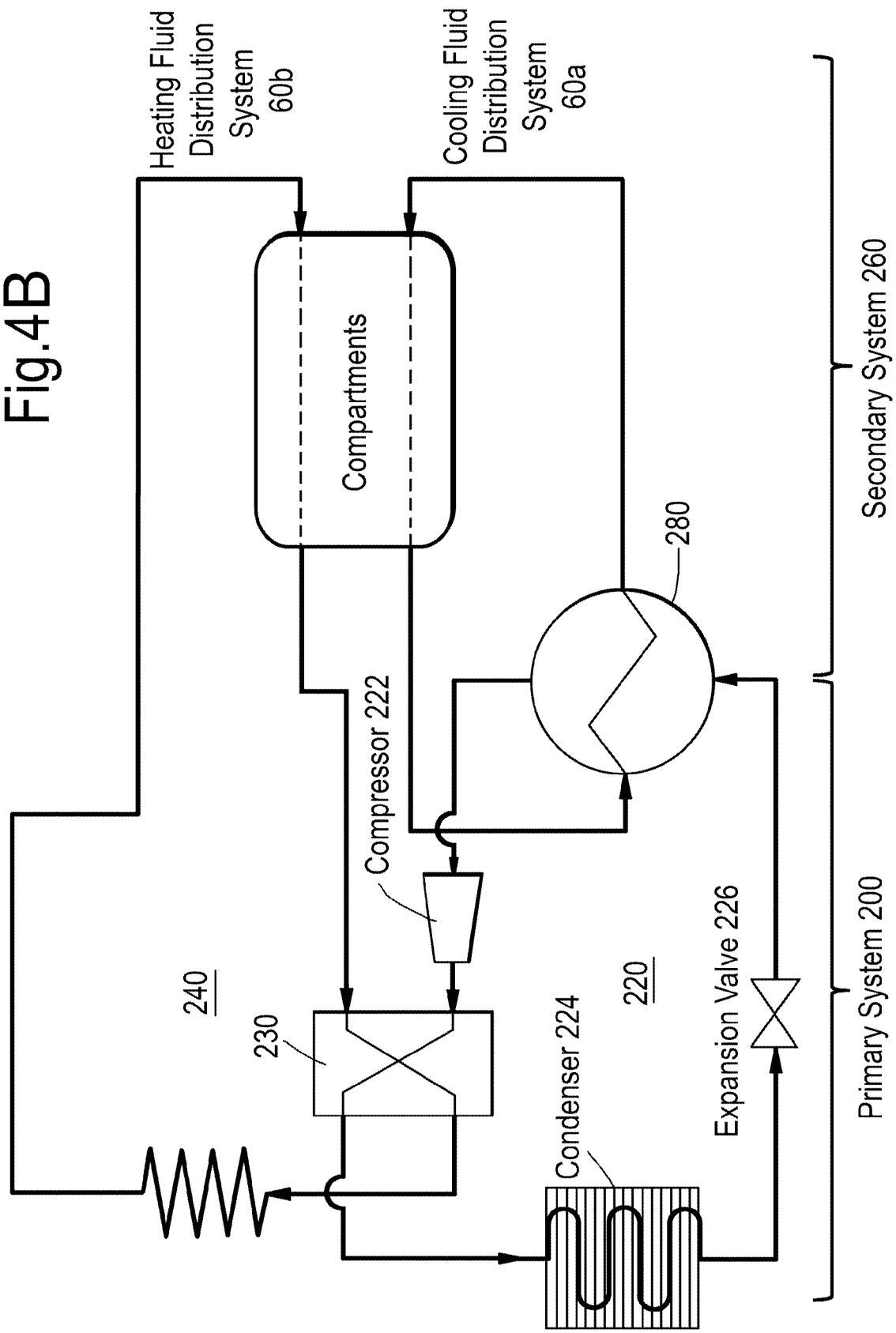

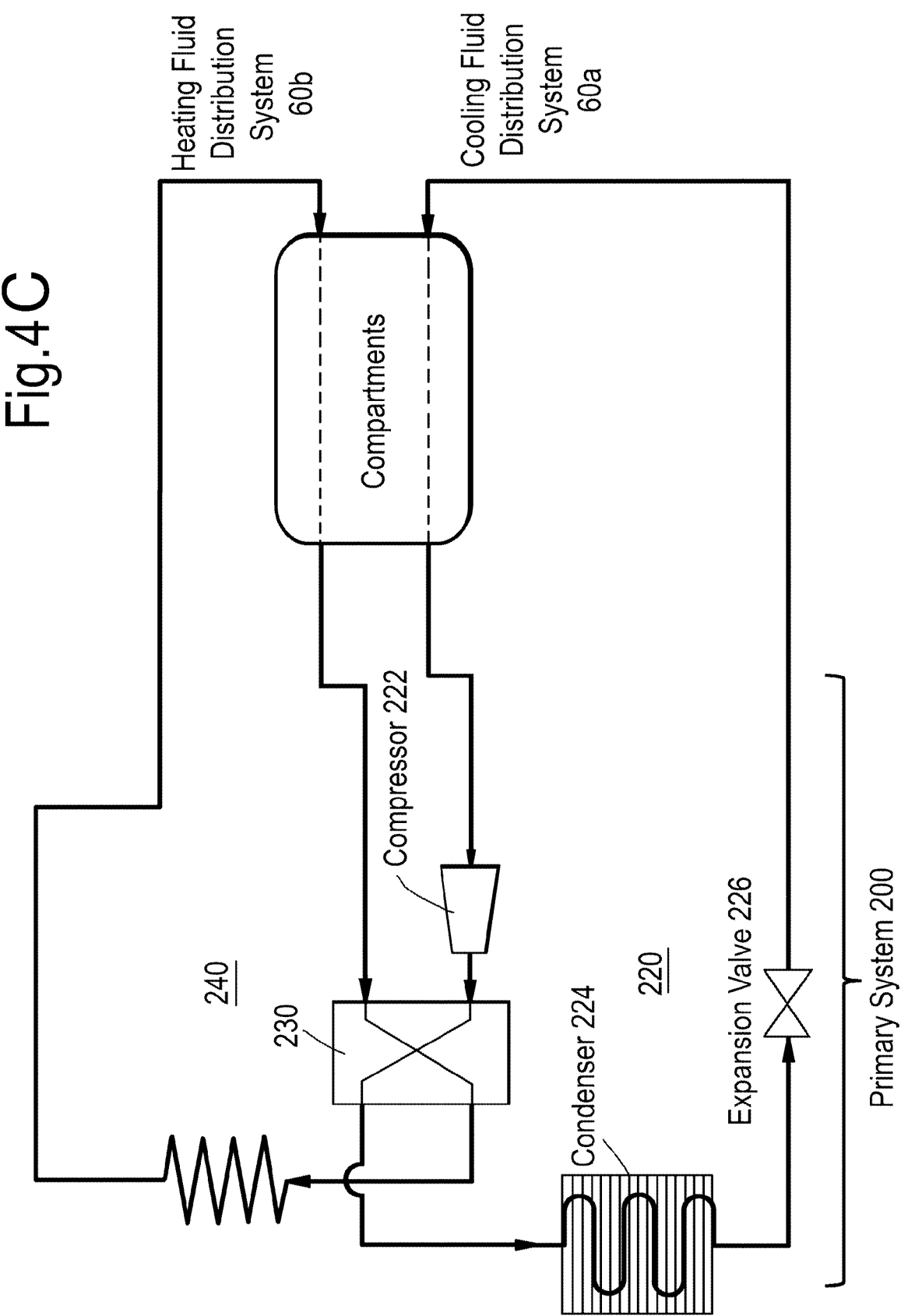

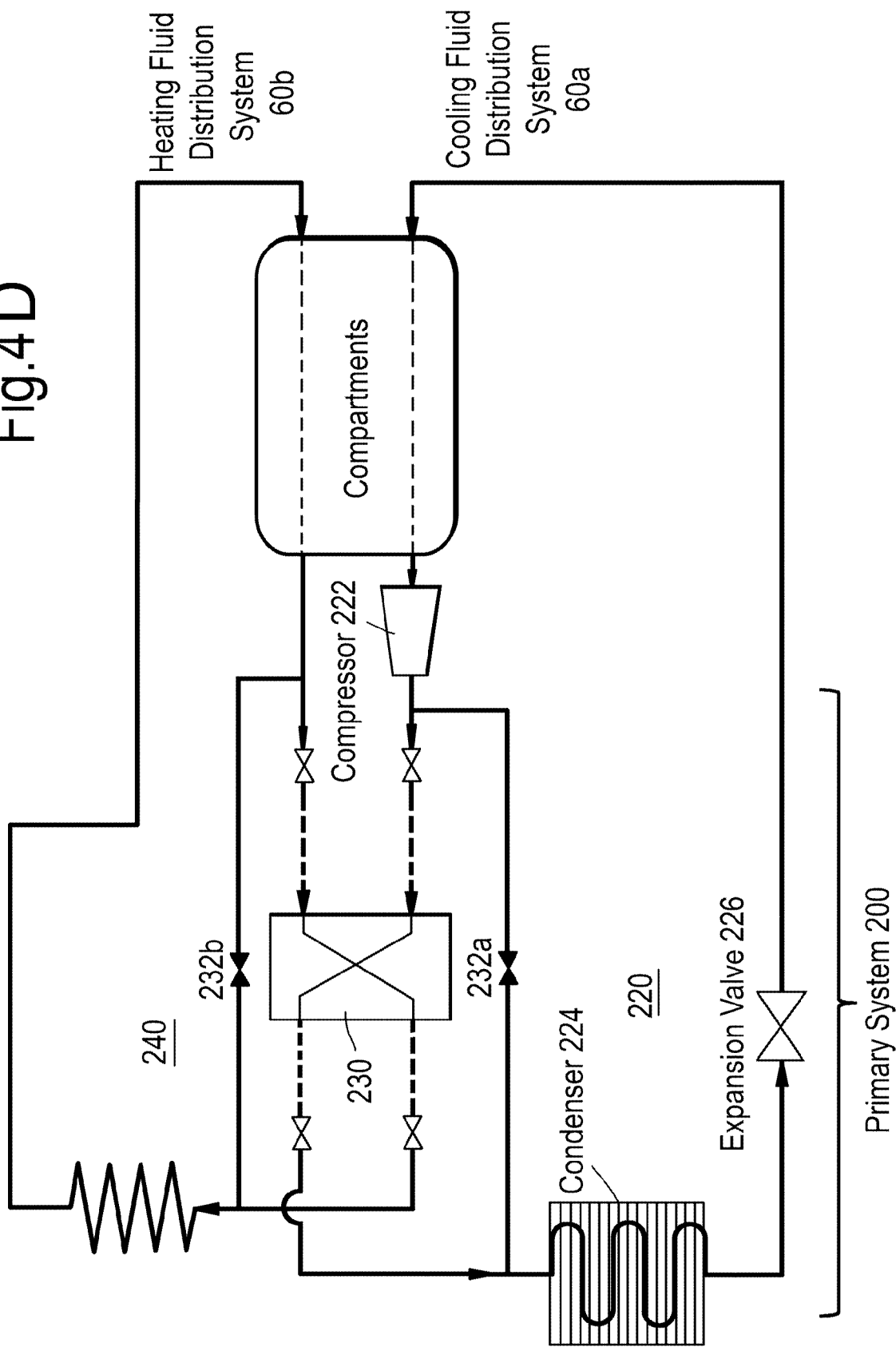

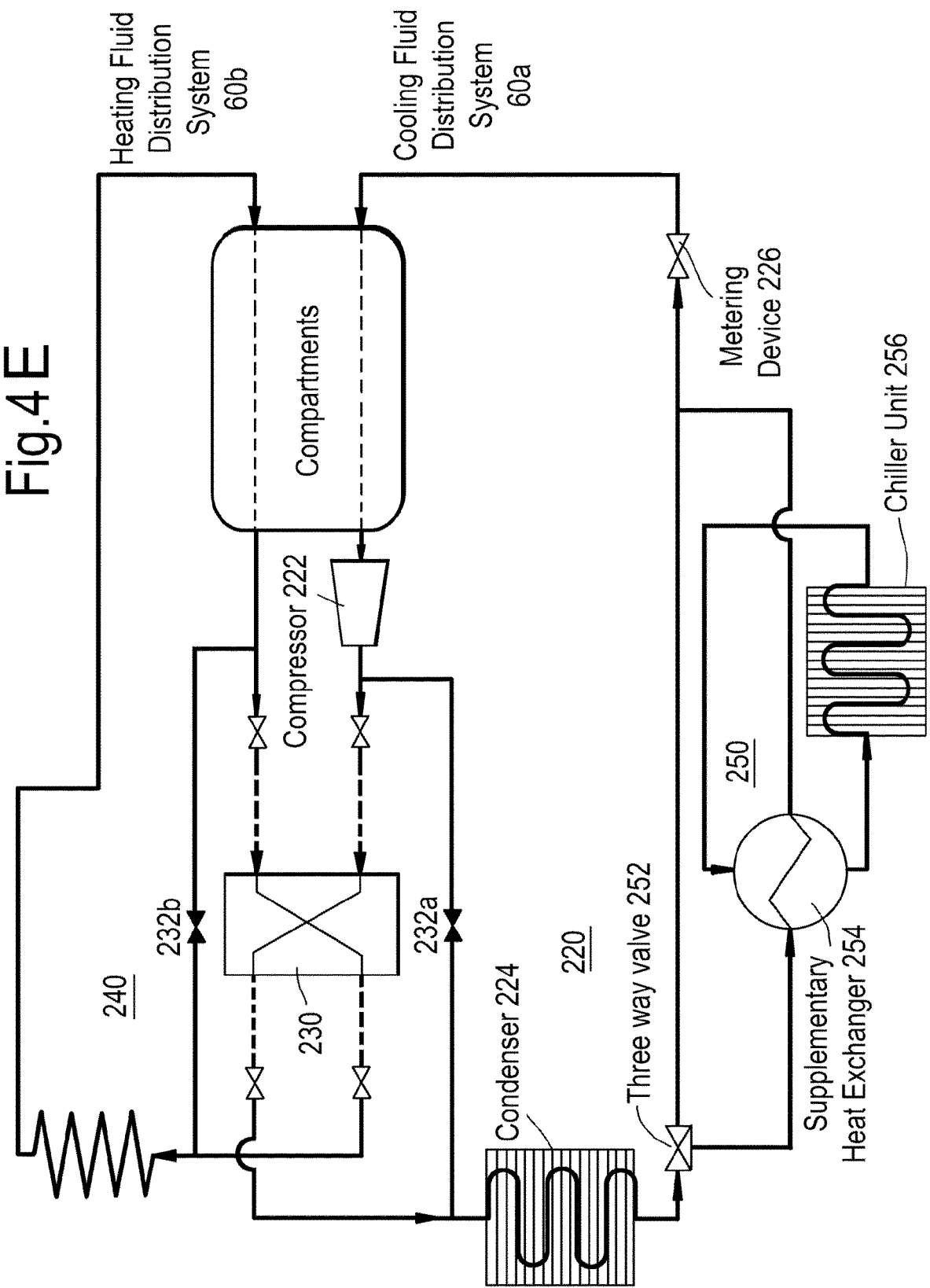

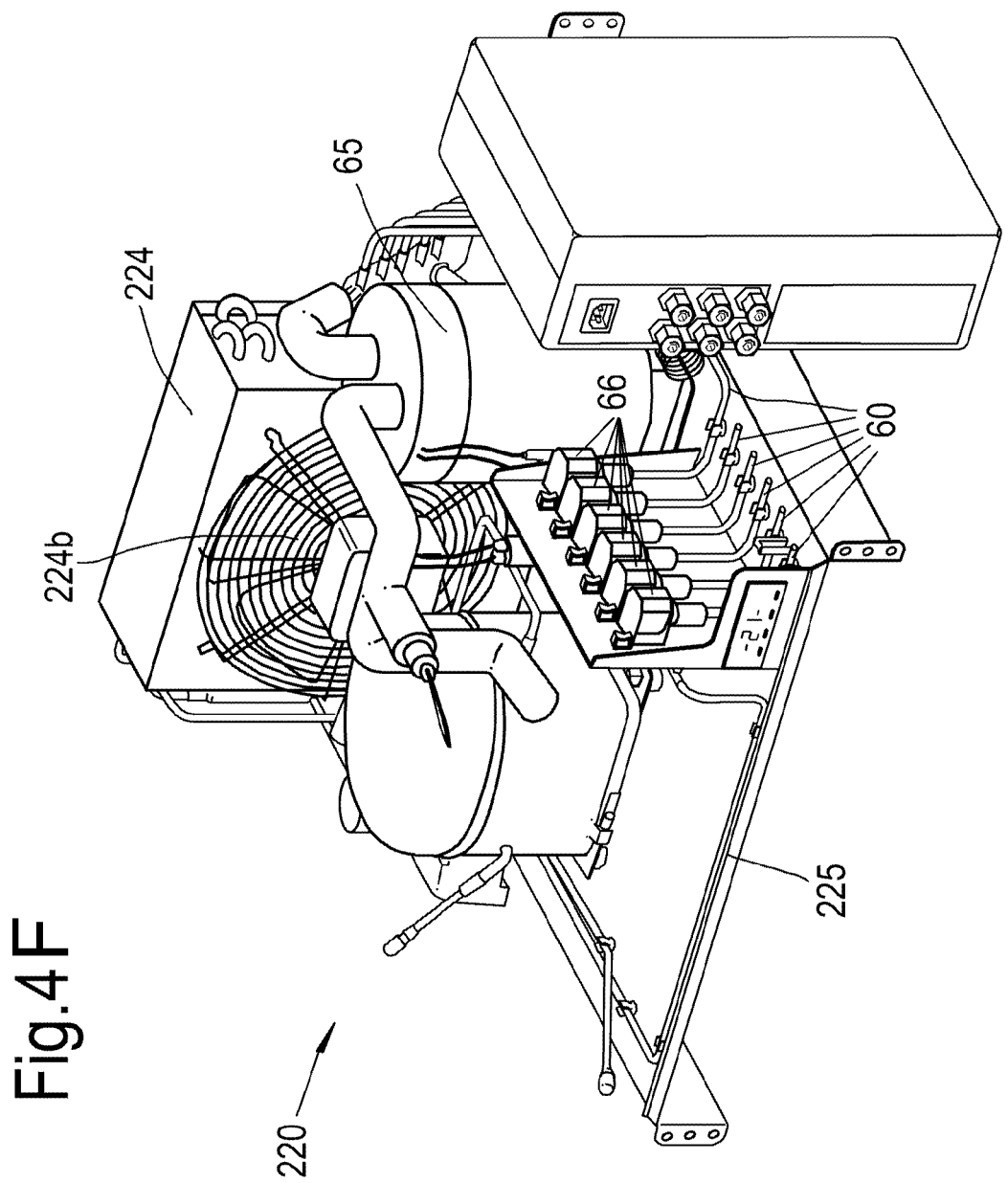

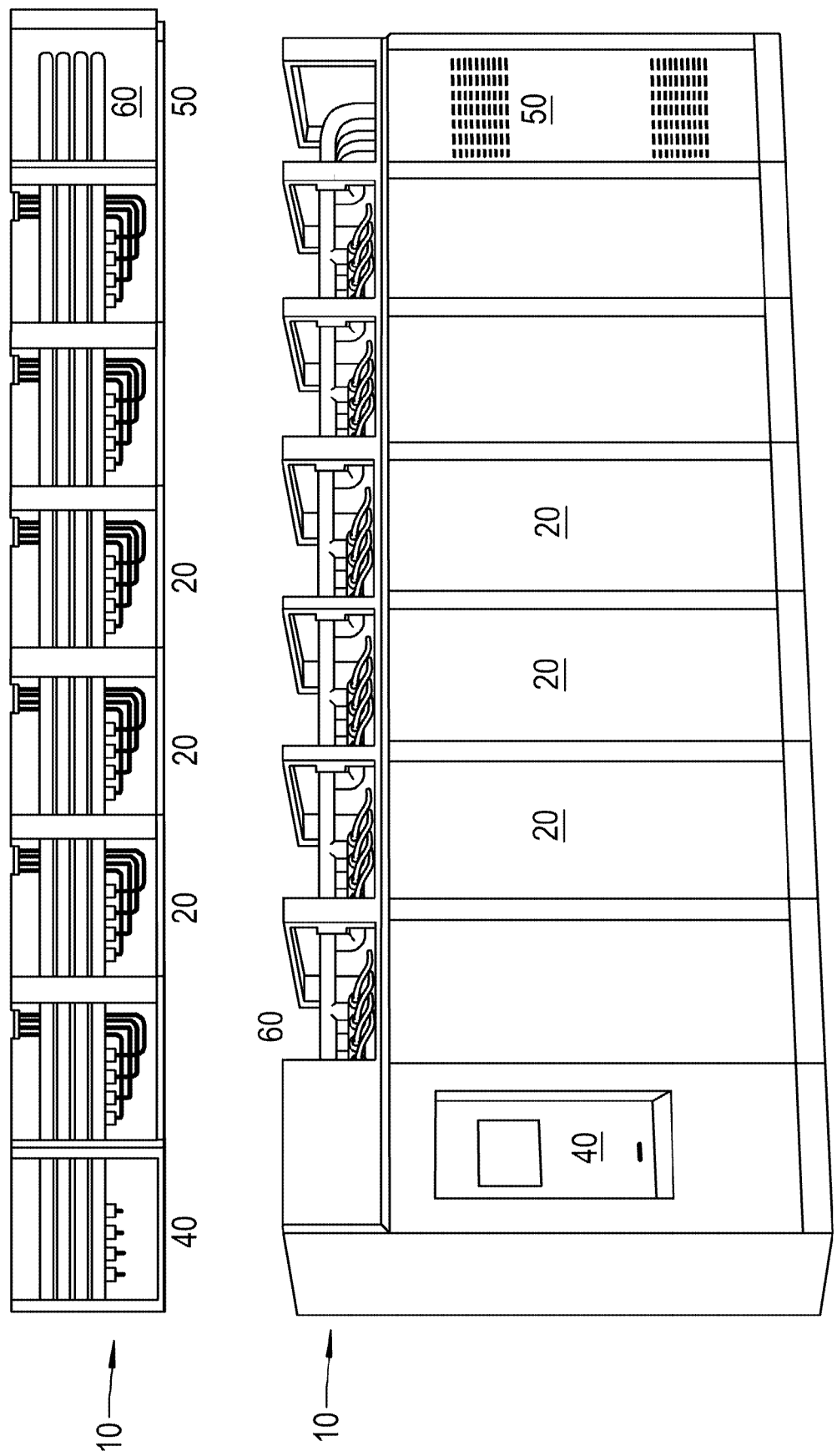

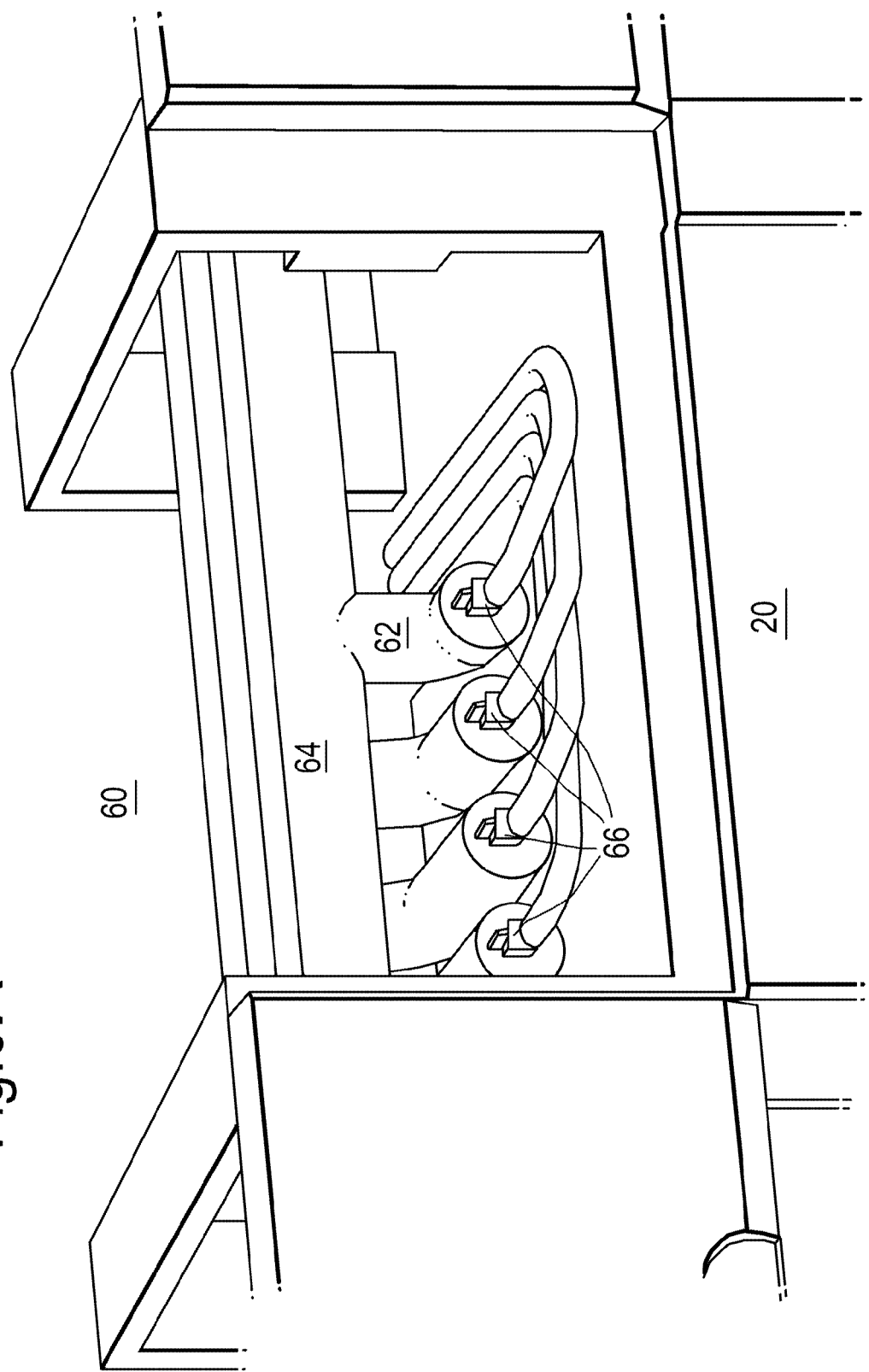

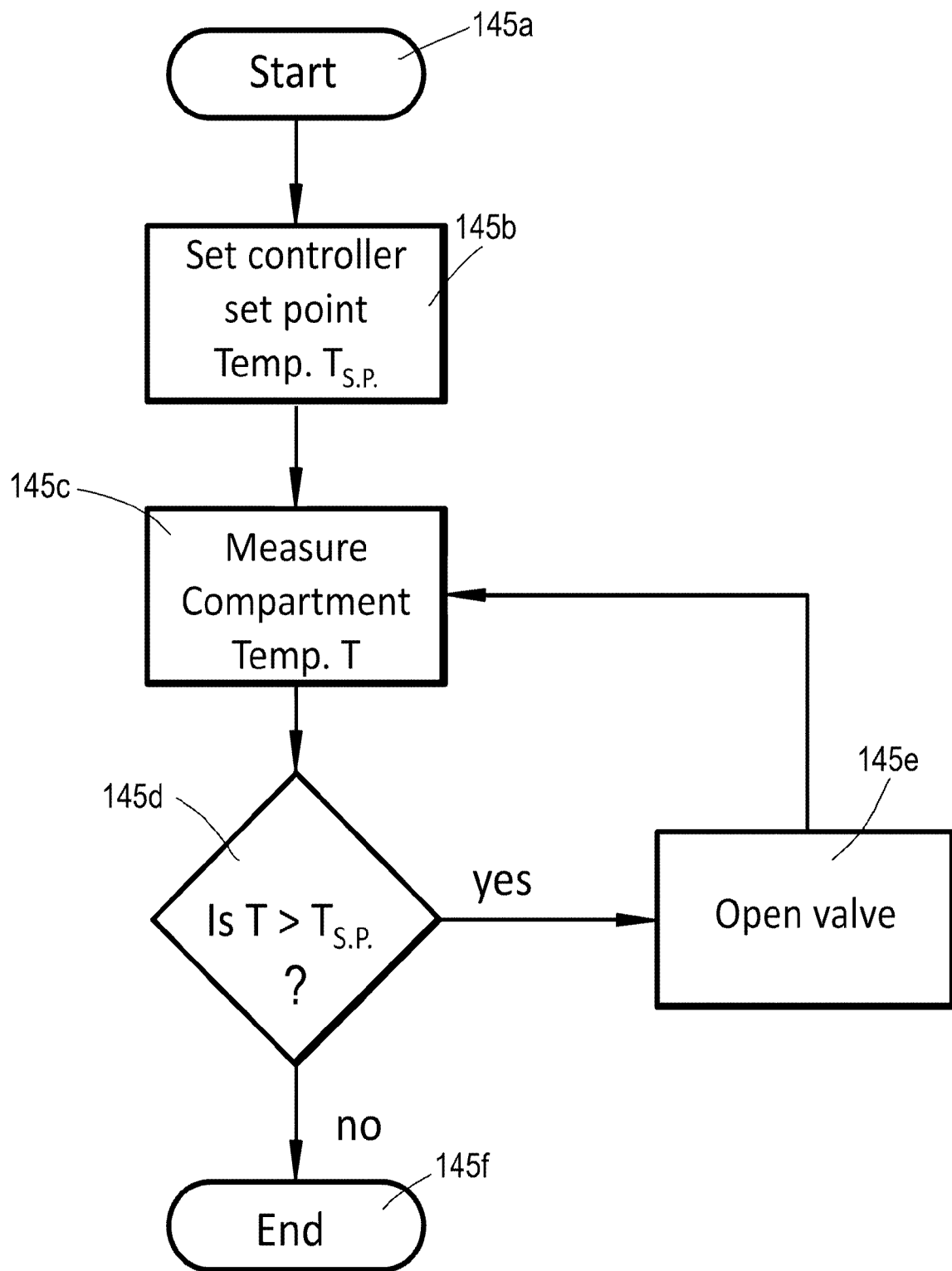

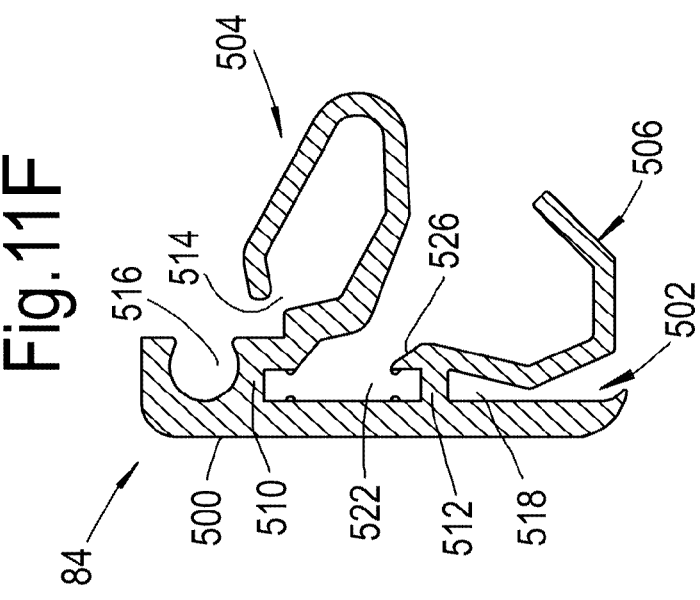
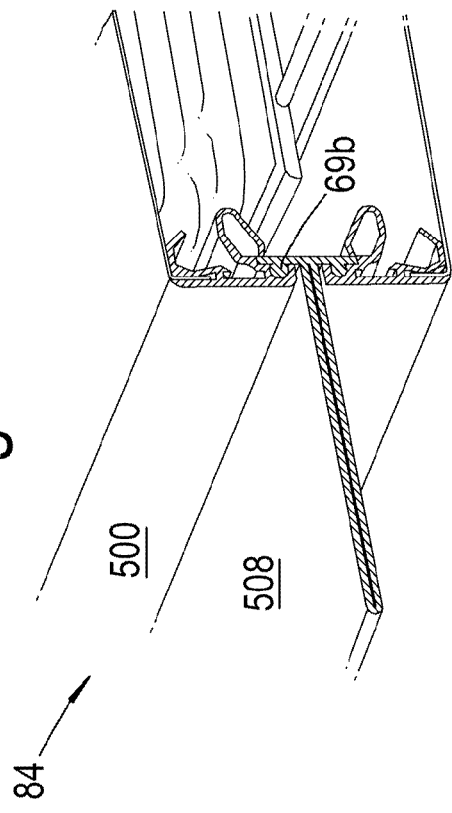
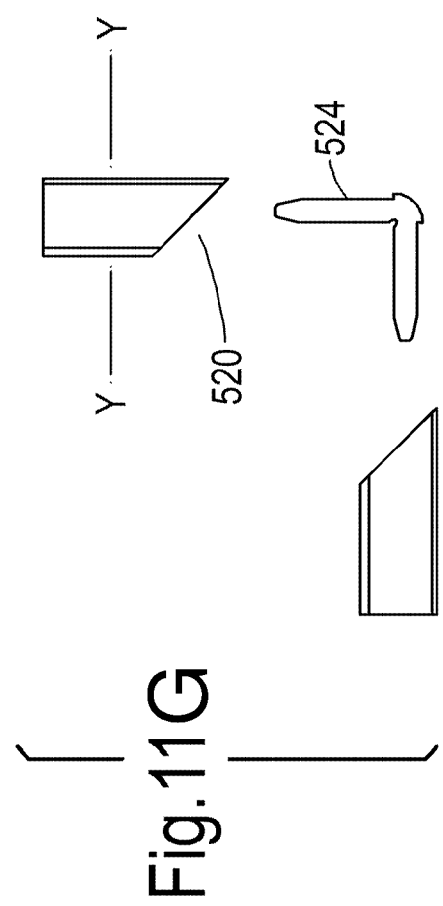

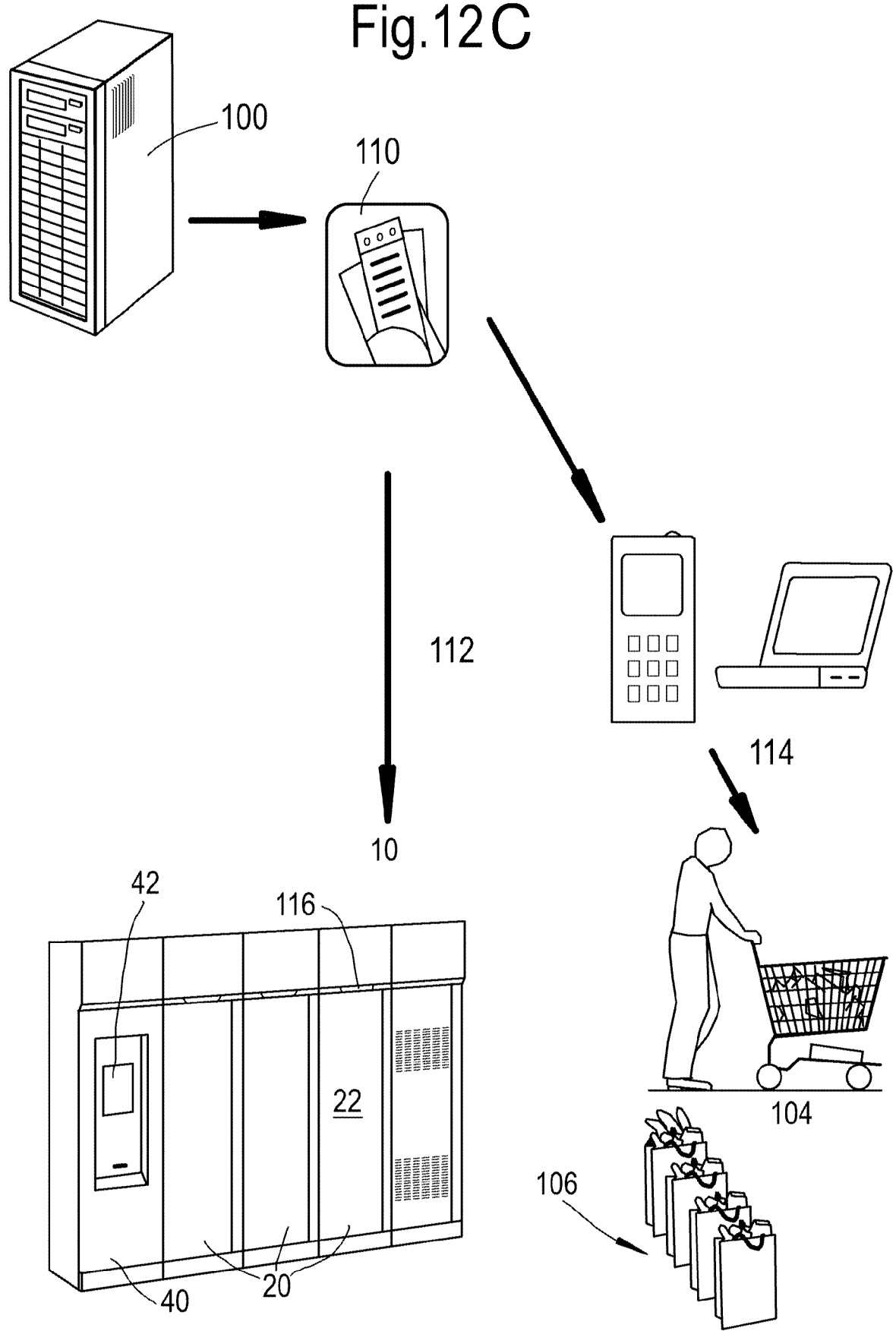

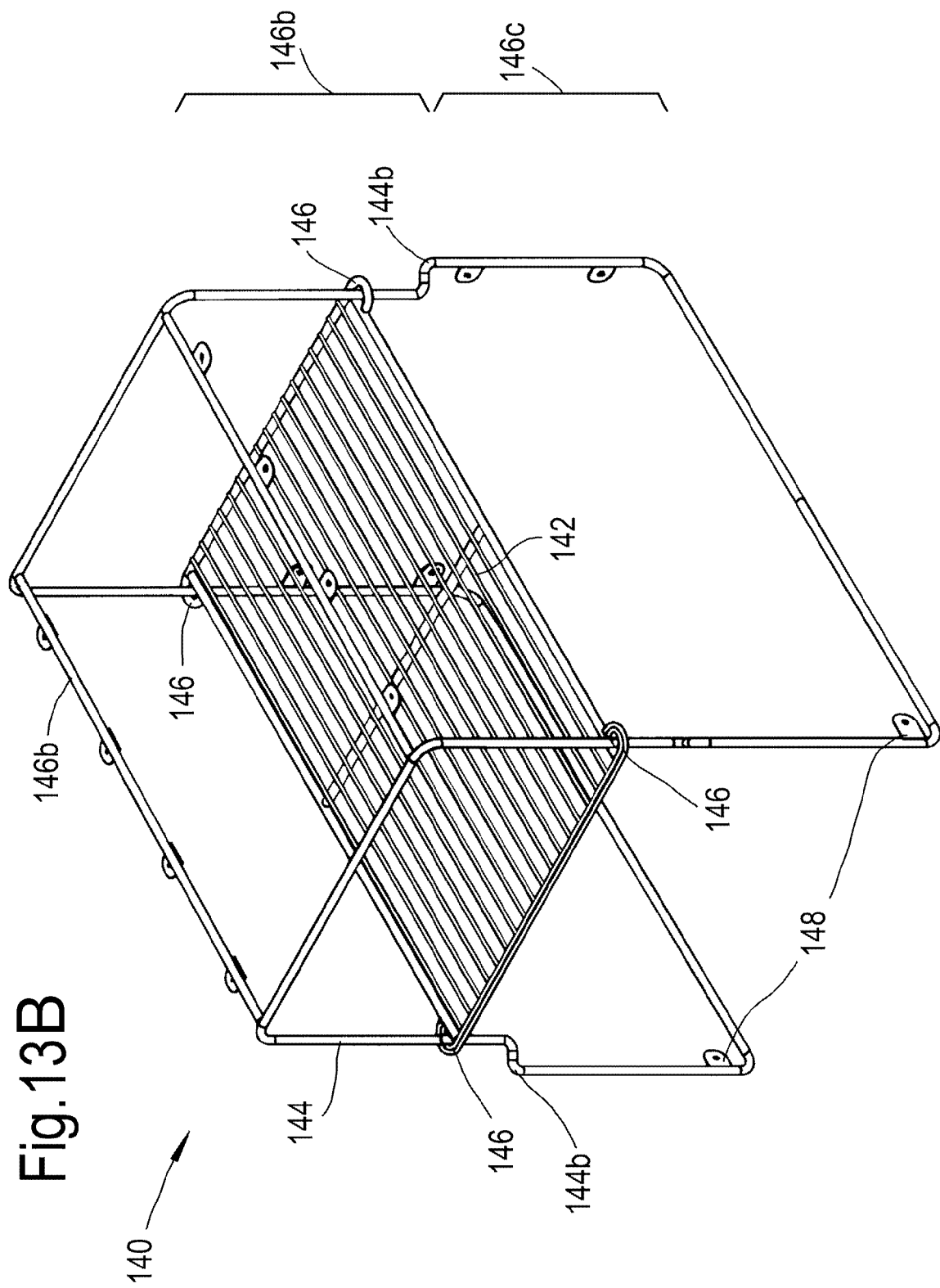

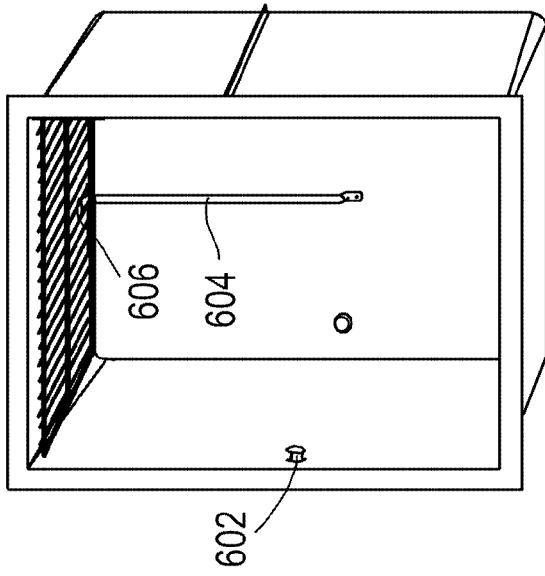
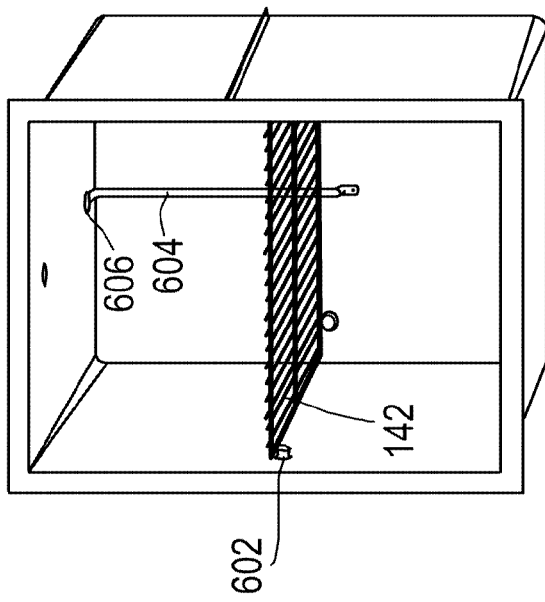
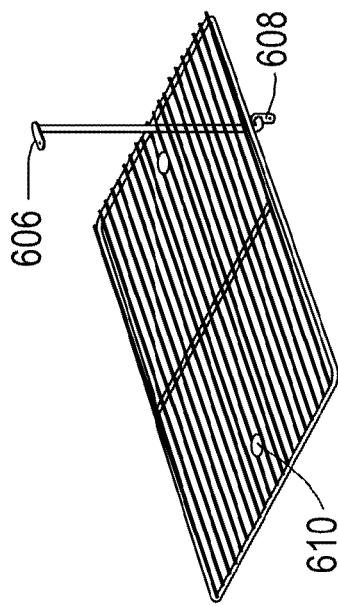

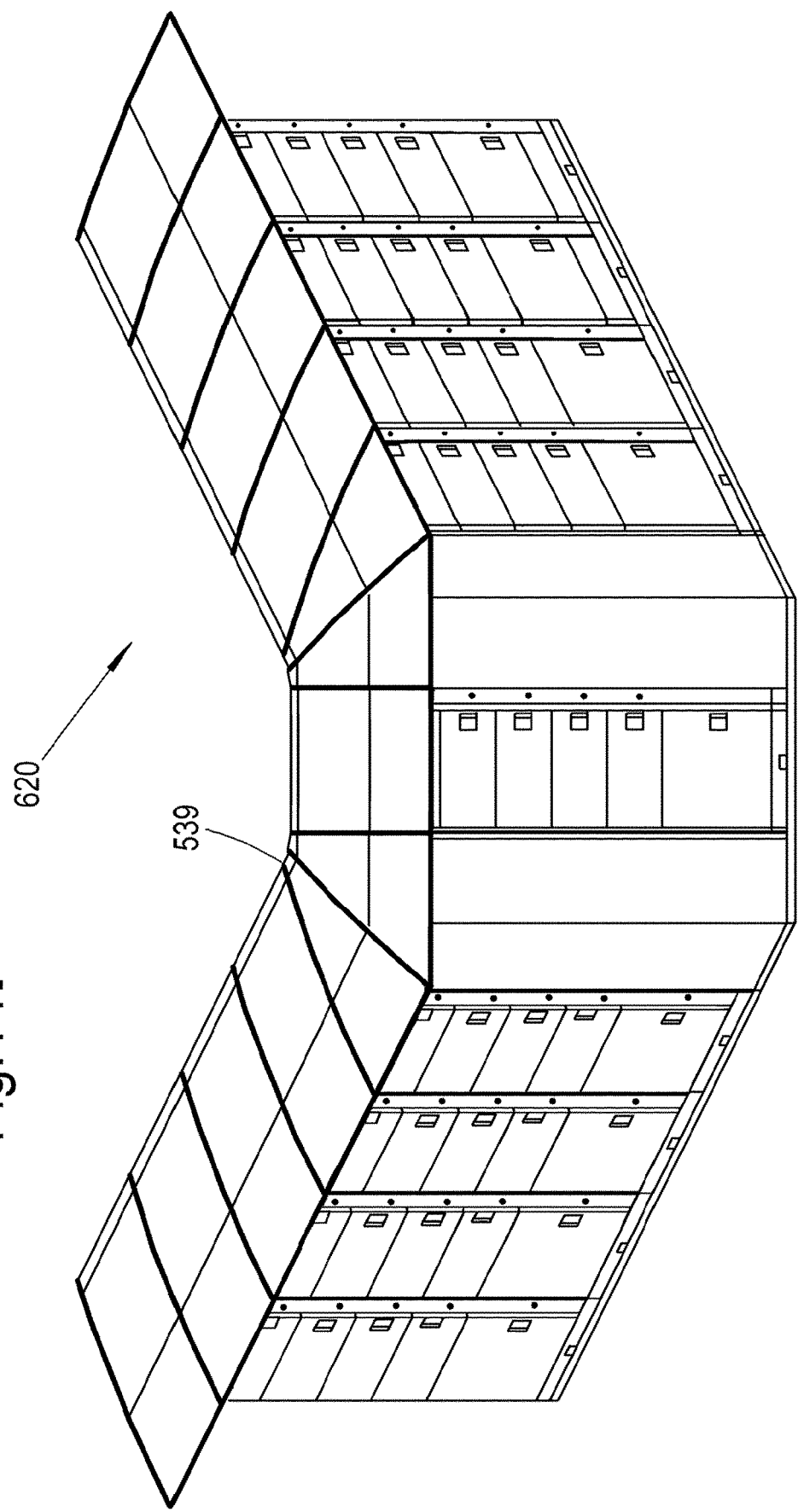

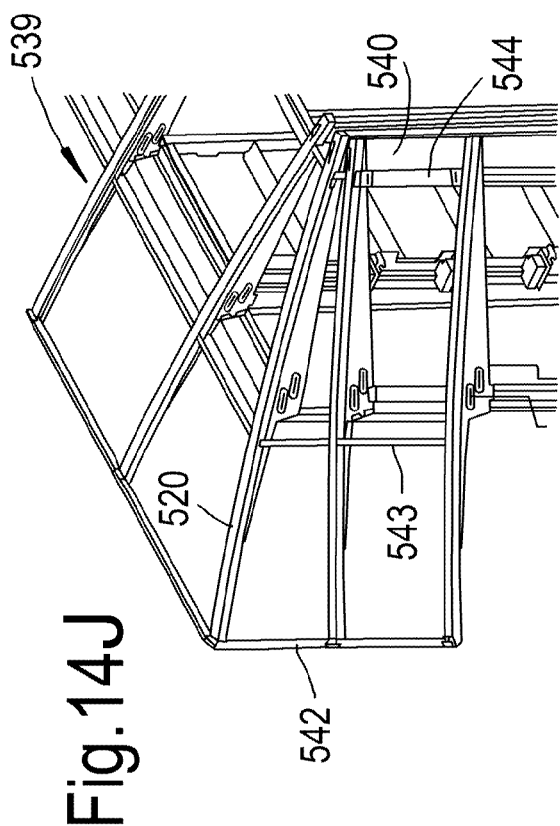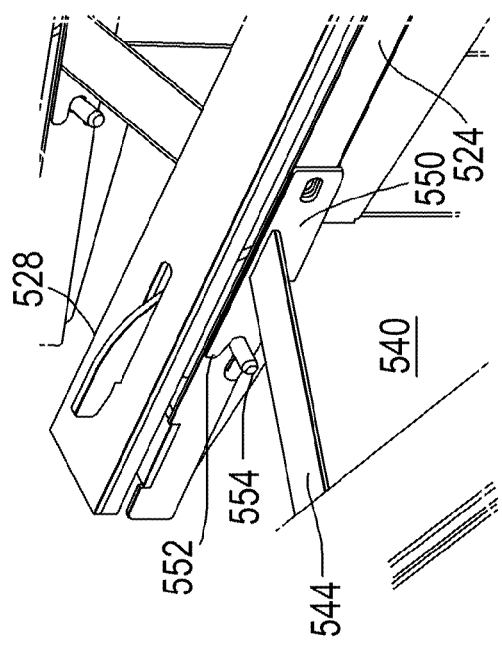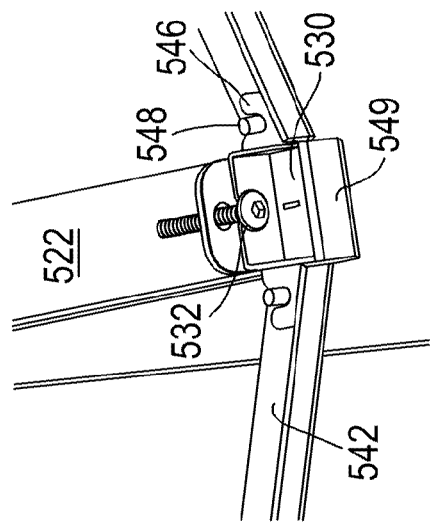

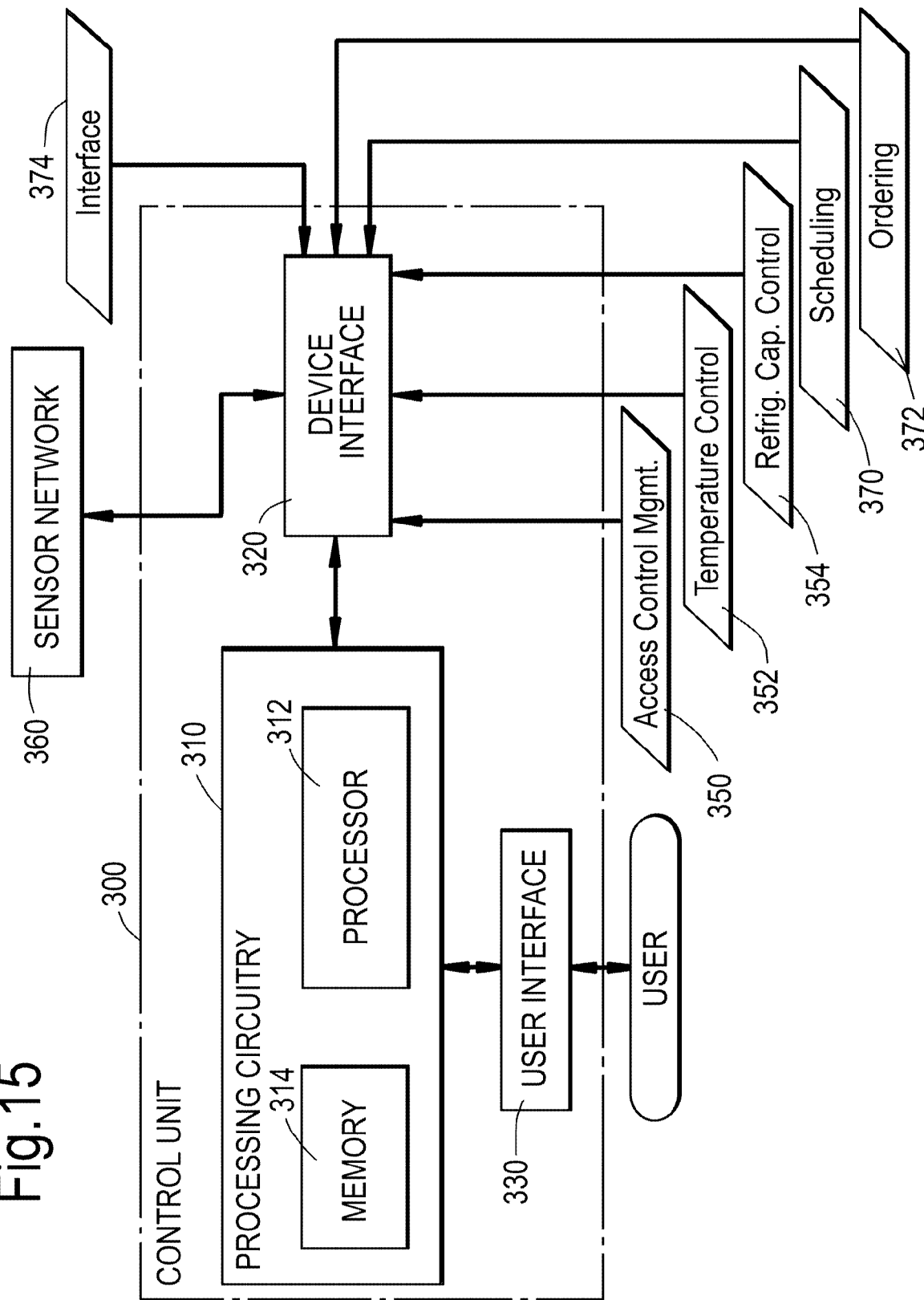

LOCKER SYSTEM

CROSS REFERENCE TO RELATED APPLICATION

This application is related to and claims priority benefits from the following GB Patent Applications: 1) Application Number GB1401539.0, filed on 29 Jan. 2014, entitled Refrigeration System; 2) Application Number GB1401910.3, filed on 4 Feb. 2014, entitled A Locker System; 3) Application Number GB1405566.9, filed on 27 Mar. 2014, entitled A Locker System; 4) Application Number GB1411043.1, filed on 18 Jun. 2014, entitled A Locker System; 5) Application Number GB1416641.7, filed on 19 Sep. 2014, entitled A Locker System; 6) Application Number GB1416742.3, filed on 22 Sep. 2014, entitled A Locker System; 7) Application Number GB1423158.3, filed on 23 Dec. 2014, entitled A Locker System. The aforementioned patent applications are hereby incorporated in their entirety by these references.

FIELD OF INVENTION

The present invention relates to a locker system, more preferably to a refrigerated/heated locker system for the storage of perishable goods.

INTRODUCTION

Advances in online security coupled with ever increasing internet coverage and computer proficiency among the general public has prompted a shift in consumer shopping habits; there have never been more transactions made online. Shopping online has many advantages over conventional high street shopping. For example the time and effort saved by avoiding the queue at peak times; the convenience of having the goods delivered. Also, with the use of price comparison websites, purchases made online are often cheaper.

Generally purchasing transactions are processed online and goods are subsequently delivered either by a postal service or dedicated team of couriers. The latter is often adopted by supermarket chains, making full use of their transportation hubs and distribution network to deliver grocery shopping. However due to fierce competition, supermarkets and the general grocery trade often operates with a comparatively small profit margin, and the additional cost associated with greater coverage in rural areas has made door-to-door delivery services unsustainable. Even though supermarkets do charge their customers for the convenience door-to-door delivery brings, they often need to subsidise the service to keep the loyalty of their customers.

Perishable goods account for a big proportion of grocery shopping. However the necessity of using refrigerated vehicles to preserve these perishable goods also adds substantially to the cost of delivery.

Some couriers are not equipped with refrigerated vehicles, and they avoid spoiling the perishable goods by scheduling with short turnaround times. However, this requires more frequent reloading at a refrigerated depot. In consequence, they are not utilising their full capacity and deliveries are limited to close vicinity to the depot.

There are alternative delivery mechanisms to lower the cost of delivery. The system disclosed in GB2474118 (By-Box Holdings Limited) enables the deposit of grocery shopping in an automated collection point (ACP) for later collection by the addressee. An ACP typically comprises a plurality of lockable storage spaces and is in communication with a remote computer. Upon receiving a deposit confirmed by a barcode or RFID tags on the package, the remote computer sends a message to notify the addressee for collection. The addressee then inputs a unique code into a user interface to unlock the corresponding locker. ACPs are often conveniently placed at locations such as transportation hubs and office clusters so customers are able to pick up their online shopping on their way home. However the floor space at these convenient locations is often limited and comes with a premium mark up. Moreover these ACPs do not have provision for storing chilled and frozen goods and their applications are currently limited to electronics, multimedia discs, books and other non-perishable goods that do not require any degree of specialized storage facilities.

The concept of refrigerated locker systems is known and has been used in a wide range of applications. For example U.S. Pat. No. 2,198,239 (William McKinley Baird), GB615167 (William McKinley Baird) and US2012/0206029 (Joseph Zabbatino) disclose locker systems for various purposes ranging from storing agriculture produce in rural communities to personal lunch and snack storage at the workplace. These prior art documents require a supply of air cooled by a central refrigeration unit, the cooled air being circulated around or through the plurality of lockers via suitable conduits, cooling the locker volume and its content in the process. The partition walls in some of these prior art documents allow air to pass through so to aid circulation of cold air, for example multiple orifices punched in the partition walls, or the partition walls are in the form of a mesh. Since the chilled air in these locker systems is supplied from the same source there exists no temperature control for each individual locker, and thus all goods are stored at roughly the same temperature. A temperature gradient may tend to develop across the locker system, whereby the lockers closest to the refrigeration unit and/or less exposed to ambient temperature will be at a lower temperature than others. In order to accommodate the three types of goods, i.e. ambient, chilled and frozen goods normally found in a typical grocery shopping, it would require three distinct sets of lockers, each locker set possibly comprising their own refrigeration plant. In addition it is inconvenient for the customer to traverse between different locker sets and to repeatedly input security codes to unlock the locker space. Furthermore, since the customers are likely to pick up their purchases from the lockers during their designated time slots during the day, the majority of lockers are left vacant overnight. But due to the occupation in some of the lockers, it is impossible to conserve energy by stopping cooling. To provide additional storage space, one has to provide additional lockers. Considering the limited floor space available particularly in areas that experience heavy commuter traffic such as railway stations, such expansion of storage space becomes untenable or even uneconomical.

JP7101492 (Hokoku Kogyo) teaches a locker system that allows individual temperature control in each locker. A thermoelectric cooling device operates by the Peltier effect and removes heat across the walls of the locker whilst a fan placed within each locker enhances air circulation to aid heat removal. The heat flux of thermoelectric cooling devices is often low and thus not very effective.

Another approach to providing a refrigerated locker system is to install a number of pre-assembled refrigerated units into lockable storage spaces in a locker assembly with each lockable storage space in the locker assembly having its own dedicated pre-assembled refrigerated unit. Examples of such locker assemblies are that provided by ByBox Holdings Ltd.

(GB2474118B). This approach suffers from the problem that each storage space has to provide enough ventilation to prevent build-up of heat. As a result, it is necessary that each storage space containing the refrigerated unit has its own dedicated fan leading to increased energy consumption as well as increased likelihood of breakdowns. Running multiple refrigerated units, with each refrigerated unit having its own compressor, is very inefficient. In addition, the need to provide ventilation to the individual storage spaces for accommodating the refrigerated goods would create a warm harbour for vermin such as rats, particularly during the winter months.

AU 2013203916 (Coles Supermarkets Australia Pty Ltd) teaches a refrigerator unit comprising a plurality of compartments that each have a first section that is cooled to a first temperature range, and a second section that is cooled to a second temperature range that is lower than the first temperature range, and a plurality of lockable doors that each close onto both an opening to the first section and an opening to the second section of one of the compartments. The refrigerator unit includes a canopy that extends over the top of the fridge and projects so that it covers at least the doors when open. The first section is maintained in "chilled" conditions in the temperature range approximately 0° Celsius to 6° Celsius and the second section is maintained in "freezer" conditions in the temperature range approximately −16° Celsius to −20° Celsius. The fridge section has a first chamber and a first set of dividers that divide the first chamber into the first sections for each of the compartments. Similarly, the fridge has a second chamber and a second set of dividers that divide the second chamber into the second sections for each of the compartments. The dividers have apertures (e.g. wire grille or mesh) that allow air flow between the sections within the respective chamber. Thus, the dividers isolate goods stowed in one compartment from goods stowed in an adjacent compartment. As the system is dependent upon air flow between adjacent lockers, goods in each locker may impede the flow of air through the walls of adjacent lockers and therefore, affect the cooling performance in each of the compartments. Secondly, goods in each compartment are not completely isolated from each other and may lead to cross contamination between goods in adjacent lockers. This could be problematic for storing goods that cater for customers that have particular religious beliefs, e.g. Kosher and/or Halal meats. For example, it would be inconvenient to store a joint of pork next to a compartment containing Kosher meats etc.

However, there still requires a need to provide a refrigerated locker system that is easy to assemble and can be easily serviced or repaired in event of a breakdown or servicing.

SUMMARY OF INVENTION

The present applicant has mitigated the above problems by providing a temperature controlled storage apparatus, comprising;

a) a plurality of lockable storage spaces, each of the plurality of lockable storage spaces comprising one or more compartments;

in which the temperature of each of the one or more compartments is independently controllable to provide either one of:—
chilled temperature; or
frozen temperature;
and wherein access to the storage space is remotely programmable.

For the purpose of this invention and all the prior applications, the term "remotely programmable" and "remotely lockable" is where the operation of locking mechanism are controlled or programmed remotely to the lockable storage spaces. For example the said locking mechanism may be controlled or programmed by an access control module placed in the vicinity of the lockable storage space, or from a central control system located offsite though telecommunication means, i.e. the access to the storage space is programmable from a physical distance. Further detail for the access control and remotely programmable locking mechanism is discussed below.

Optionally, the temperature controlled storage apparatus of claim 1, in which the temperature of each of the one or more compartments is independently controllable to provide any one of:
controlled ambient temperature; or
chilled temperature; or
frozen temperature.

Independently controlling the temperature of each of the one or more compartments within the range of substantially −21° C. to substantially +50° C. removes the need to provide respective dedicated compartments for goods requiring storage at different temperatures, e.g. ambient temperature, chilled temperature and/or frozen temperature and/or hot foods, significantly improves flexibility and maximizes locker utilization. The temperature of each of the one or more compartments may be adjusted remotely prior to delivery in order to match the storage temperature of grocery goods. The ability to pre-set compartment temperature aids mapping the locker's load against a variable demand for the storage spaces. The temperature in the one or more compartments is controlled to provide storage for goods requiring different storage temperatures, e.g. chilled temperature and/or frozen temperature. For the purpose of the present invention, chilled temperature represents the temperature range for storage of groceries such as milk and yogurt, etc. covers a range between substantially 1° C. to substantially 4° C. The frozen temperature represents the temperature range for storage of frozen groceries such as ice cream and frozen food. For the purpose of the present invention, the frozen temperature covers a range between substantially −25° C. to substantially 0° C., more preferably between substantially −21° C. to substantially −18° C. Preferably, the temperature of each of the one or more compartments is independently controllable to provide any one of ambient or chilled or frozen temperature. The ambient temperature represents the temperature range for storage of typical groceries such as chocolate or dry goods. For the purpose of the present invention, ambient temperature covers a range between substantially 4° C. to substantially 21° C. For the purpose of this invention and all the prior applications, the term "ambient temperature" is construed to mean "room temperature" or more appropriately "controlled ambient temperature". It does not refer to the actual air temperature of the surrounding environment, for example the sub-zero temperature experienced during the winter months; rather "ambient temperature" means a temperature range suitable for storing goods that does not require refrigerated storage to remain stable.

Optionally, each of the plurality of lockable storage spaces comprises a programmable lockable door. Preferably, the programmable lockable door is closable to seal the one or more compartments from each other. The locking and/or unlocking of the programmable lockable door is remotely programmable to enable controlled access to the interior of the one or more compartments. The said programmable door is insulated to reduce heat transfer with the environment. The elimination of a physical key for locking and unlocking the storage space means the locker can be used by many different users consecutively without compromising security. The locking mechanism can be any devices known to those skilled in the art, for example solenoid operated deadbolts or electromagnetic locks.

Optionally, the temperature controlled storage apparatus comprises at least one common distribution system that is arranged to be in cooperation with a refrigeration system, said at least one common distribution system distributing a heat transfer fluid to exchange heat with the one or more compartments in each of the plurality of storage spaces. The refrigeration system is preferably a vapour compression refrigeration unit comprising a compressor, a condenser, an expansion valve and an evaporator (metering device). The vapour compression refrigeration unit is commonly described as a heat pump served to extract and convey heat from the evaporator to the atmosphere, with the use of a refrigerant. The refrigerant is conveyed directly to the compartments with the use of at least one common distribution system. The benefit of utilising one common distribution system for distributing the heat transfer fluid to exchange heat with the one or more compartments in each of the plurality of lockable storage spaces is greatly improved energy efficiency and reduced maintenance cost. This enables the use of only one refrigeration system to provide cooling for multiple storage spaces, significantly reducing the footprint required. In a prior art system where a separate vapour compression refrigeration unit is installed into each of the storage spaces, localised ventilation is needed for heat dissipation. In the case of the present aspect of the invention, the localised ventilation can be omitted. Thus, there need be substantially no free spaces between adjacent compartments, or between compartments and an outer housing of the assembly, so as to offer greater weather protection, as well as enhanced security against theft, vandalism and rodent/pest infestation. In addition, the use of a common distribution system allows the refrigeration system to be positioned remotely from the lockable storage spaces. For example, instead of the refrigeration system being integrated into each of the lockable storage spaces, the refrigeration system can be physically separate to the lockable storage spaces. For example, the refrigeration system can be adjacent the lockable storage spaces but integrated into a locker module comprising an assembly of the lockable storage spaces, e.g. at the top of the locker modules. Alternatively, the refrigeration system can be physically separate to the locker modules. Thus enables inspections and maintenance of the refrigeration system to be carried out without the need of access into each of the lockable storage spaces. It also allows the storage spaces to be fabricated as a fully sealed, closed unit independent of the refrigeration system. This limits or prevents any cross contamination between food stuff stored in adjacent compartments or lockable storage spaces.

Optionally, the temperature of each of the one or more compartments is independently controllable by separately varying the quantity of heat transferred to said one or more compartments. Optionally, the quantity of heat transferred is varied by varying the duration of time the heat transfer fluid passes to the one or more compartments. The quantity of heat transferred is varied to each of the one or more compartments by varying the temperature difference between the heat transfer fluid to the each of the one or more compartments and the temperature of their corresponding compartments. Having a steeper temperature gradient between heat transfer fluid and the compartment increases the rate of heat transfer. Therefore to promote rapid cooling in the compartments the heat transfer fluid may be supplied to the compartments at a lower temperature. Optionally, the temperature controlled storage comprises at least one valve for varying the quantity of heat transfer fluid to the one or more compartments. For example the quantity of heat transferred to the compartments can be controlled by varying the flow rate and/or the flow duration of heat transfer fluid. In some cases combined use of on/off valves and throttling valves gives a more precise control of the flow rate of the heat transfer fluid.

Optionally. the heat transfer fluid is a liquid or a gas. Optionally, the heat transfer fluid is a refrigerant, and optionally the refrigerant is type R290 refrigerant.

Optionally, the common distribution system comprises a first distribution system for distributing a first heat transfer fluid to exchange heat with a second distribution system; said second distribution system distributes a second heat transfer fluid to exchange heat with each of the one or more compartments independent control of the first and second heat transfer fluid permits the temperature within each compartment to be controlled more precisely. This facilitates rapid switchover between the different storage temperatures.

Optionally, the first heat transfer fluid is a refrigerant and the second heat transfer fluid is a liquid, preferably, the liquid experiences no phase transition over the entire working range of temperature. Optionally, the second heat transfer fluid comprises glycol. Optionally, the second heat transfer fluid can be any one of ethylene glycol, silicone oil, water etc., and compatible mixtures of such fluids, e.g. a mixture of water and glycol at a lower cost.

Optionally, the temperature controlled storage apparatus comprises a heating system for supplying heat to each of the one or more compartments and therefore, provides more flexibility in the control of the temperature of the compartment, e.g. during very cold spells where chilled or ambient temperatures are required or even defrosting of the compartments. Optionally, the heating system comprises an electric heating element. Optionally electric heating elements are installed to conduct heat to the at least one wall of the lockable storage space or at least one compartment such that the temperature thereof is raised by the operation of electric heating elements. Optionally, the heating system comprises a separate heat transfer fluid in cooperation with the refrigeration system. For increased energy efficiency and to recuperate the heat energy dissipated from the refrigeration system, e.g. condenser, the heating system can utilise the dissipated heat energy to provide heat to a separate heat transfer fluid so as to exchange heat with the compartments.

Optionally, each of the one or more compartments comprises a heat exchanger and a fan for circulating air from the heat exchanger into the at least one of each of the one or more compartments. The utilization of air circulation improves the heat transfer from the heat transfer fluid to the air within the at least one of each of the one or more compartments and thus the switchover between different storage temperatures can be carried out much promptly. Indeed the improved efficiency means a smaller surface area for heat transfer is required, thus the heat exchanger design can be made simpler. Optionally, the temperature of the at least one of each of the one or more compartments is controlled by controlling the speed of the fan. The utilization of air circulation improves the heat transfer from the heat transfer fluid to the air within at least one compartment and thus the switchover between different storage temperatures can be carried out much more rapidly. By controlling the speed of the fan enables the temperature in each of the compartments to be more reactive to any fluctuation in temperature. For example, using PID based (Proportional, Integral, Derivative) controllers, the temperature in the lockable storage space or compartment can be more accurately tuned to the desired set point level.

Optionally, the temperature controlled storage apparatus comprises a chiller unit in cooperation with the refrigeration system so as to dissipate heat from the heat transfer fluid. The chiller unit serves as a heat sink to absorb excessive heat from the refrigerant, when the primary refrigeration system is unable dissipate all the heat from the refrigeration process to the atmosphere. This mechanism is particular important during summer months when an elevated ambient temperature impairs heat dissipation.

Optionally, the refrigeration system defines a primary refrigeration system and the chiller unit defines a secondary refrigeration system, said chiller unit is in cooperation with the primary refrigeration system by a separate distribution system distributing a chiller heat transfer fluid to exchange heat with the heat transfer fluid in the primary refrigeration system. Optionally, the separate distribution system distributes the chiller heat transfer fluid to a plurality of said primary refrigeration systems or units. Preferably, the secondary refrigeration system of the chiller unit cooperates with a separate common distribution system to exchange heat with the heat transfer fluid in the primary refrigeration system. The use of a separate common distribution system for the chiller unit is only necessary when the chiller unit is connected to more than one primary refrigeration systems. Optionally, the heat transfer fluid in the chiller refrigeration unit comprises glycol.

In a second aspect, the present invention provides a temperature controlled storage apparatus, wherein the refrigeration system has a defined maximum refrigeration capacity; and further comprising a controller to selectively allocate the available refrigeration capacity to all or a sub-group of compartments as appropriate on the basis of defined urgency criteria;

such that those compartments in most need are prioritised and so that the refrigeration system is not called upon to exceed its defined maximum refrigeration capacity.

Optionally, the controller is arranged to receive data indicating the temperature in the compartments and adapted to compare the temperature in each compartment with a defined desired range of temperature for that compartment; and in which the urgency criteria prioritise compartments having a temperature outside said defined desired range of temperature for that compartment.

Optionally, the comparison between the temperature in each compartment with a defined desired range of temperature for that compartment defines a differential temperature and in which the urgency criteria prioritise compartments having the greatest differential temperature. In the context of the present invention, prioritisation based on "differential temperature" is the temperature difference between the actual temperature of the compartment (more preferably the air temperature inside the compartment) and the desired set point temperature. For example, if an available compartment is at temperature, T, and the compartment is waiting in the queue to be cooled to frozen temperature at a desired set point temperature of, $T_{S.P.}$, then the differential temperature is $T-T_{S.P.}$. The controller prioritises the refrigeration capacity to those compartments having the greatest differential temperature.

In the context of the present invention, the term "capacity" relates to the ability of the refrigeration system to provide cooling to a given number of compartments without affecting cooling to each of these compartments. For example, in the case where the refrigeration system is a vapour compression refrigeration unit comprising a heat transfer fluid, e.g. a refrigerant, the capacity of the refrigeration system is the limit where the amount of refrigerant evaporated to each of the compartments becomes inadequate. Optionally, the controller determines for each compartment a required refrigeration capacity to maintain or return the compartment to said defined desired range of temperature and the urgency criteria include said required refrigeration capacity. The term "refrigeration capacity" is equivalent to "cooling capacity" or "refrigerant capacity" given elsewhere in the referenced prior patent applications. Optionally, the controller continuously makes the temperature comparison and adapts the selective allocation of available refrigeration capacity; or alternatively, the controller periodically makes the temperature comparison and adapts the selective allocation of available refrigeration capacity.

Optionally, the controller ranks the compartments in an order of urgency and allocates refrigeration capacity to a group of compartments having a total required refrigeration capacity at or below the defined maximum refrigeration capacity. Optionally, the defined desired range for each compartment is remotely programmable. For example, remote temperature control can be carried out via the data communication module. For example, the temperature in the at least one compartment or each of the compartments is controlled remotely to cater for the storage requirement of a particular grocery order. Advantageously, the lockable storage space or compartment can be regulated remotely to the required temperature before the groceries are delivered, e.g. changed from ambient or unregulated, to the desired temperature, on a "just in time" basis, to minimise energy consumption of the apparatus.

Optionally, the controller is arranged to place one or more compartments having a temperature outside said defined desired range of temperature for that compartment in a queue. Optionally, the controller is arranged to determine the waiting times of the one or more compartments in the queue and to prioritise available refrigeration capacity to those compartments in the queue based on their respective waiting times.

Optionally, the refrigeration system is adapted to cool a sub-group of two compartments. To conserve space and to conserve energy, the refrigeration system, in particular the compressor is sized to cool a sub-group of compartments in the temperature controlled apparatus at any one time. Thus, the refrigeration capacity can be defined as the number of compartments that is able to be cooled at any one time, e.g. two compartments. Thus, for example, cooling in excess of three compartments runs the risk that the capacity of the refrigeration system has been exceeded resulting in inadequate cooling to each of the three compartments as a result of an inadequate supply of heat transfer fluid to each of the three compartments.

Preferably, the controller determines the required refrigeration capacity by determining the number of compartments in a group that are calling for cooling and if the number of compartments calling for cooling is less than the predetermined number of compartments then this is indicative of refrigeration capacity being available. In the context of the present invention, the term "calling for cooling", represents operational status of the compartment.

For example, when the compartment calls for cooling the operational status of the compartment becomes active as it attempts to draw heat transfer fluid to effect cooling of the compartment.

In an event where only a limited number of compartments calling for cooling, this would result in surplus refrigeration capacity resulting in an imbalance in the refrigerant pressure and thereby, causing a premature shut down of the refrigeration system, i.e. the compressor. To mitigate this imbalance in the refrigerant pressure, optionally the controller is arranged to relief any surplus refrigeration capacity, e.g. the surplus refrigeration capacity bypasses the compartments, so as to maintain or balance the refrigerant pressure within the system and allow the limited number of compartments to be cooled to their respective set point temperature. Optionally, the controller controls/signals a bypass valve to relieve any surplus refrigeration capacity.

Optionally, the controller is arranged to determine the available refrigeration capacity by determining the status of at least one said valve, e.g. by determining whether one or more valves have been actuated or not, since the actuation of the valves is an indication that its corresponding compartment is calling for cooling. Optionally, the controller is arranged to determine whether one or more said valves have been actuated.

During a cooling cycle there is a temperature difference between the air temperature inside the compartment and the wall temperature adjacent the evaporator or heat exchanger of the compartment. This is due to the thermal lag between the air temperature of the compartment and the wall of the compartment. Due to thermal lag between the temperature of the air in the compartment and the temperature of the heat exchanger which is driving the lowering of the temperature of the air in the compartment, this temperature differential can vary significantly particularly when the compartment calls from more cooling during the initial preparation phase of the compartment or when the door is opened. It is paramount to keep this temperature differential as small as possible as this leads to "surface freezing", where the wall of the compartment is at a much lower temperature than the air temperature inside the compartment and causes surface freezing of perishable goods such as vegetables, e.g. lettuce, resting on the wall of the compartment which are destined to be stored under chilled conditions. Other problems include, the wall temperature of the compartment "running way" from the air temperature causing excessive cooling of the walls when the slave PCB is trying to maintain the air temperature at a steady state. To mitigate this problem, the present inventions "pulses" the cooling over a predetermined temperature range of the evaporator or heat exchanger, i.e. the heat transfer fluid exchanges heat with the compartment in predetermined steps. This "pulsing" is repeated until the air temperature inside the compartment has reached its desired set point temperature. The present invention provides a lockable temperature controlled storage apparatus comprising;

a) at least one compartment having at least one wall,
b) a refrigeration system adapted to exchange heat with the least one compartment; and
c) a controller adapted to receive a first temperature substantially indicative of the air temperature inside the compartment and a second temperature substantially indicative of the temperature of the at least one wall of the at least one compartment, wherein the controller is arranged to;
  i) interrupt the exchange of heat with the least one compartment when the second temperature reaches a substantially lower limit and re-establishes the exchange of heat with the at least one compartment when the second temperature reaches a substantially upper limit;
  ii) repeat step (i) until the first temperature substantially reaches a predetermined set point temperature.

The refrigeration system or unit can be any refrigeration system known to the person skilled in the art, for example thermoelectric and magnetoccaloric refrigerators, or preferably vapour compression refrigeration unit comprising a compressor, a condenser, an expansion valve and an evaporator (metering device). The vapour compression refrigeration unit is commonly described as a heat pump served to extract and convey heat from the evaporator to the atmosphere, with the use of a refrigerant. The evaporator serves to exchange latent heat between the refrigerant and the surrounding air or heat transfer fluid in contact with the evaporator.

Optionally, the temperature controlled storage apparatus comprises:

at least one common distribution system comprising a heat transfer fluid that is arranged to be in cooperation with the refrigeration system, said at least one common distribution system distributing the heat transfer fluid to exchange heat with the at least one compartment;
  wherein the controller is arranged to:—
  i) interrupt the flow of heat transfer fluid to the at least one compartment when the second temperature reaches the substantially lower limit and re-establish the flow of heat transfer fluid to exchange heat with said at least one compartment when the second temperature reaches the substantially upper limit;
  ii) repeat step (i) until the first temperature substantially reaches the predetermined set point temperature.

By interrupting and re-establishing the flow of heat transfer fluid to the evaporator or the heat exchanger, the cooling to the compartment can be "pulsed" in predetermined bursts. Optionally, the first temperature is measured by a first temperature sensing device and the second temperature is measured by a second temperature sensing device, and wherein the first temperature sensing device is adjacent to the at least one wall of the compartment. Preferably, the first temperature sensing device is fixed to at least one wall of the compartment, more preferably to a rear wall of the compartment opposite the lockable door. Optionally, at least one compartment comprises a heat exchanger or an evaporator in fluid communication with the heat transfer fluid and wherein the second temperature sensing device is located adjacent the heat exchanger or the evaporator. To get a close enough measurement of the temperature of the evaporator or the heat exchanger, the second temperature sensing device is placed adjacent the evaporator or heat exchanger. In this context, the heat exchanger can be termed an evaporator since cooling mainly occurs in the evaporator as the liquid refrigerant evaporates and thus, cools.

Optionally, the temperature controlled storage apparatus comprises at least one valve for varying the quantity of heat transfer fluid to the at least one compartment in each of the two or more storage spaces and wherein said controller is arranged to control the actuation of the valves for interrupting and re-establishing the flow of the heat transfer fluid between the lower limit and the upper limit of the temperature from the second temperature sensing device respectively to at least one compartment. Optionally, said upper limit is substantially −7° C. and said lower limit is substantially −10° C. The number of cooling "pulses" by interrupting and re-establishing the flow of the heat transfer fluid is dependent on whether the set point temperature measured from the first sensing device has been reached, i.e. whether the air temperature inside the compartment has reached its desired set point temperature. Once, the temperature from the first sensing device has been reached, this pulsing and thus, the flow of the heat transfer fluid to the evaporator is stopped. Optionally, the temperature controlled storage apparatus comprises two or more lockable storage spaces, each of the two or more lockable storage spaces comprises said at least one compartment.

Optionally, the present invention provides a method of preparing a temperature controlled storage apparatus for the storage of one or more temperature sensitive items, comprising a controller arranged to controlling each of the one or more compartments of the at least one of the plurality of lockable storage spaces to store goods at at least chilled or frozen temperature in anticipation or preparation of demand.

Optionally, the controller arranged to controlling each of the one or more compartments of the at least one of the plurality of lockable storage spaces to store goods at controlled ambient or chilled or frozen temperature in anticipation or preparation of demand.

Optionally, the method comprises the steps of:—
i) receiving an order for one or more temperature sensitive items;
ii) preparing the temperature of the one or more compartments of at least one of the plurality of lockable storage space for the order.

Optionally, the method comprises the steps of:
i) identifying the required storage temperature of each of the one or more temperature sensitive items in the order;
ii) allocating one or more compartments of the at least one of the plurality of lockable storage spaces to store the one or more temperature sensitive items based on their identified storage temperature.

Optionally, each of the plurality of lockable storage spaces comprises a programmable lockable door closable to seal the plurality of lockable storage spaces from each other and a local user interface associated with the programmable lockable door, the method further comprising the steps of:
i) generating a unique collection code to input into the local user interface to permit access to the allocated one or more compartments of the at least one of the plurality of lockable storage spaces;
ii) storing the one or more temperature sensitive items into the allocated one or more compartments of the at least one of the plurality of lockable storage spaces;
iii) communicating the unique collection code to a customer whereupon input of the unique collection code into the local user interface electronically unlocks the programmable lockable door of each of the plurality of lockable storage spaces allocated to the customer order.

Optionally, whereupon input of the unique collection code into the local user interface, the method further comprising the step of:
i) automatically opening the programmable door of the allocated lockable storage space comprising the stored one or more temperature sensitive items; and/or
ii) providing identification means of the allocated lockable storage space comprising the stored one or more temperature sensitive items.

Optionally, the present invention provides a method of preparing temperature sensitive items for delivery to a temperature controlled apparatus, the method comprising the steps of:—
i) receiving a user request for delivery of one or more temperature sensitive items;
ii) determining the required temperature of the one or more temperature sensitive items;
iii) placing the one or more temperature sensitive items in one or more containers of selected size such that the items in any one container may be exposed to a common temperature range without adverse effect;
iv) before or after placing the one or more temperature sensitive items in one or more containers of selected size, determining availability at the temperature controlled apparatus of one or more of the compartments of the plurality of lockable storage spaces:—
a) at or controllable to a temperature or temperatures suitable to receive the containers
b) of suitable dimensions to receive the containers.

Optionally, the compartments are of different size and the containers are of selected size to closely fit the width and/or depth of the compartments.

Optionally, the containers are of selected size to closely fit the height of the compartments.

Optionally, the containers are of a selected size to closely fit side by side to each other in the compartment.

Optionally, the containers are stackable such that two or more containers adapted to fit in a small compartment can be stacked to fit in a larger compartment while protecting the goods from crushing.

BRIEF DESCRIPTION OF THE DRAWINGS

Further features and aspects of the present invention will be apparent from the following detailed description of an illustrative embodiment made with reference to the drawings, in which:

FIGS. 1B-1D are perspective views showing the installation of the refrigerated locker modules onto a platform according to an embodiment the present invention.

FIGS. 2A and 2B are perspective views showing the arrangement of the compartments within a lockable storage space of the locker module according to an embodiment the present invention.

FIG. 2G is an expanded view of the hinge mechanism according to one embodiment of the present invention;

FIG. 2H is a perspective view of the diametrical formation at the end of the helical spring received at the end of the hinge pin;

FIG. 2I is a perspective view of the hinge mechanism according to one embodiment of the present invention;

FIGS. 3A and 3B are perspective views showing some possible different sizes and arrangements of the stack of modular compartments according to an embodiment of the present invention.

FIGS. 4A-4C are process flow diagrams showing the primary system and/or secondary system for refrigerating, heating and distributing the heat transfer fluid to the each of the compartments of the locker module according to an embodiment of the present invention.

FIG. 4D is a process flow diagram showing a set of isolation valves for diverting the heat transfer fluid or refrigerant away from the economiser heat exchanger.

FIG. 4E is a process flow diagram showing a supplementary cooling circuit to provide addition cooling when required.

FIG. 4F is a perspective view showing a refrigeration unit mounted on top of a locker module according to an embodiment of the present invention.

FIG. 5 is a perspective view showing the distribution system for distributing the heat transfer fluid to each of the storage spaces of the locker module according to an embodiment of the present invention.

FIG. 6A is a perspective view showing a magnified view of the manifold of the distribution system according to an embodiment of the present invention.

FIG. 6I is a flowchart showing the steps in setting the temperature of each of the compartments to a desired set point temperature.

FIG. 11E shows a cross-sectional view of the thermal break assembled onto the edge of the compartment according to one embodiment of the present invention;

FIG. 11F is a cross sectional view of the thermal break showing the extrusion profile of the sealing and engaging portions;

FIG. 11G showing an exploded view of the connection of mitred ends of strips of the thermal break by a connector according to one embodiment of the present invention;

FIGS. 12A, 12B and 12C are perspective views showing the arrangement of the network components according to an embodiment of the present invention.

FIG. 13B is a perspective view of a shelving unit according to an embodiment of the present invention.

FIG. 13C is a perspective view of a compartment shelf according to a second embodiment of the present invention;

FIG. 13D shows the compartment shelf of FIG. 13C when stowed away to the top wall of the compartment according to the second embodiment of the present invention;

FIG. 13E is a perspective view of the support rod extending through the compartment shelf according to the second embodiment of the present invention

FIG. 15 shows an example of a control unit that may be employed in an embodiment of the present invention.

DETAILED DESCRIPTION OF THE INVENTION

Figure 11A:
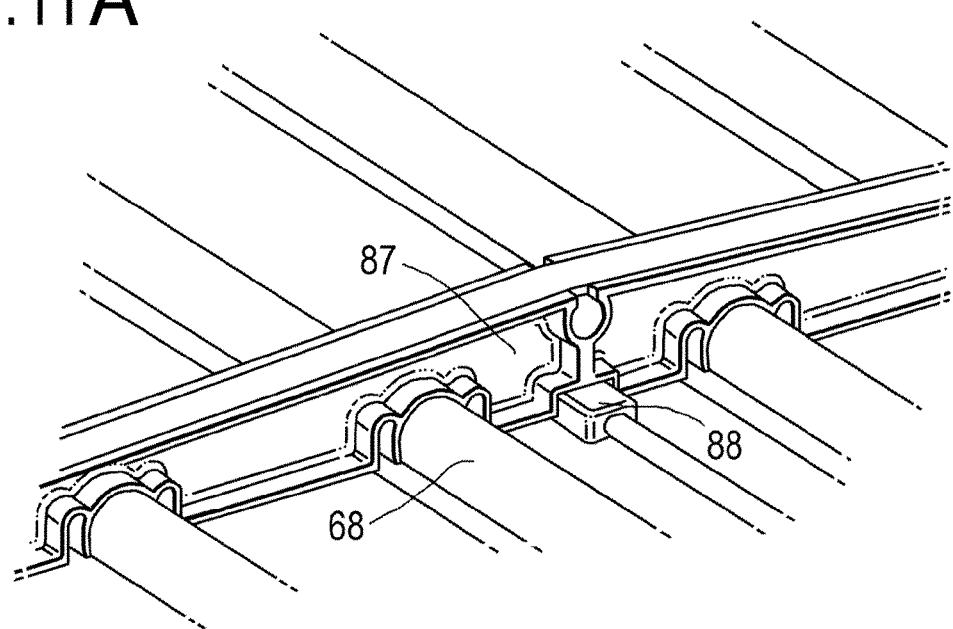
FIGS. 11A-11C are perspective views showing (a) a retainer for retaining the channels of the secondary heat exchanger and temperature sensing device in contact with the exterior wall of the cavity, (b) a slave PCB installed adjacent to a compartment for localised temperature control, and (c) an enclosure for the protection of the slave PCB.
Figure 11B:
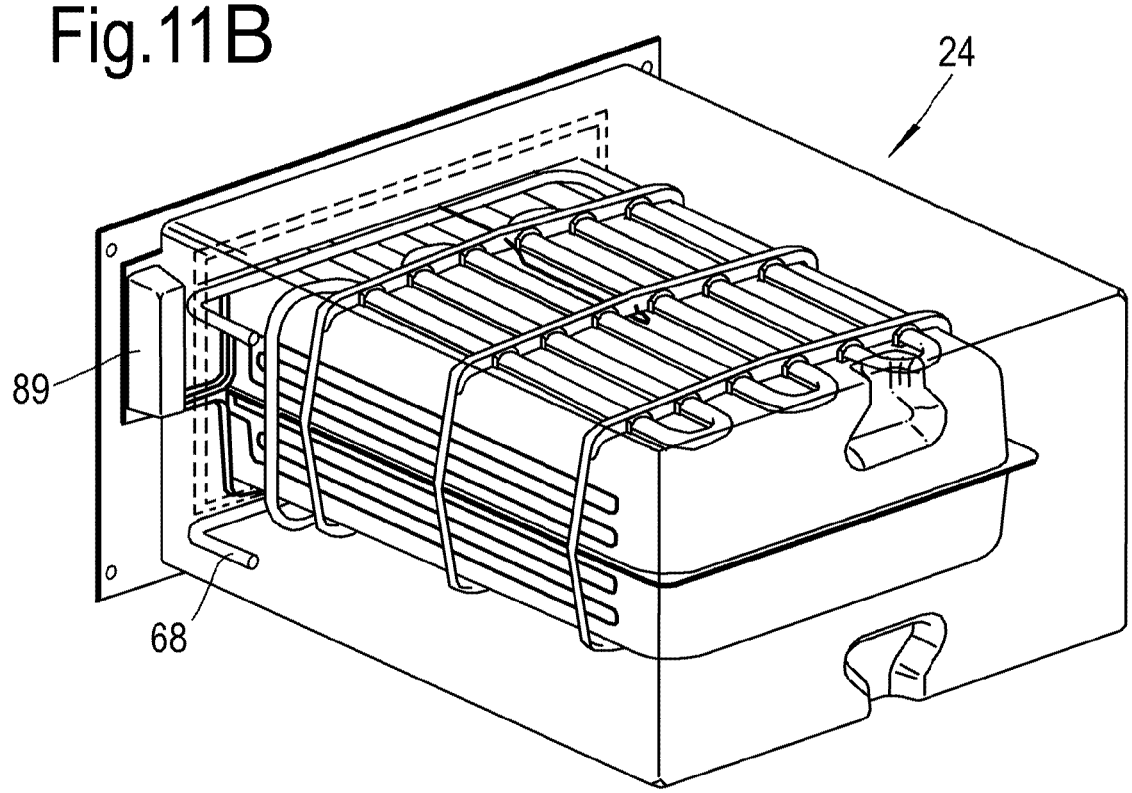
Figure 11C:
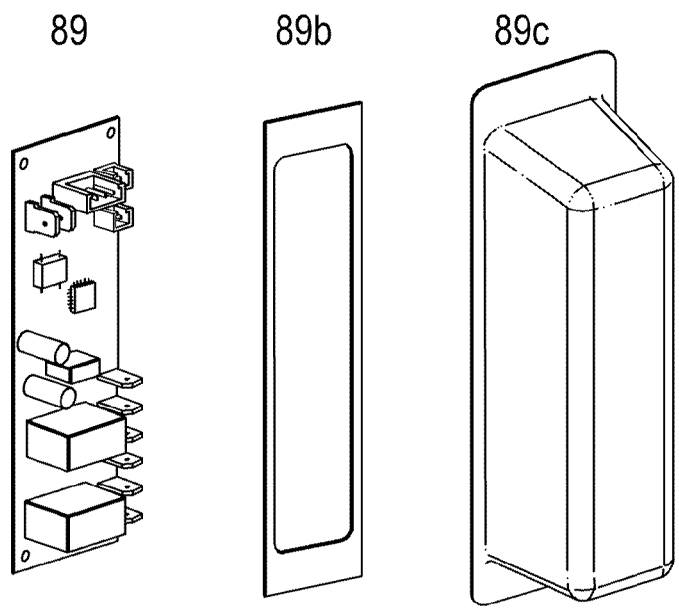
Figures 1, 11D:
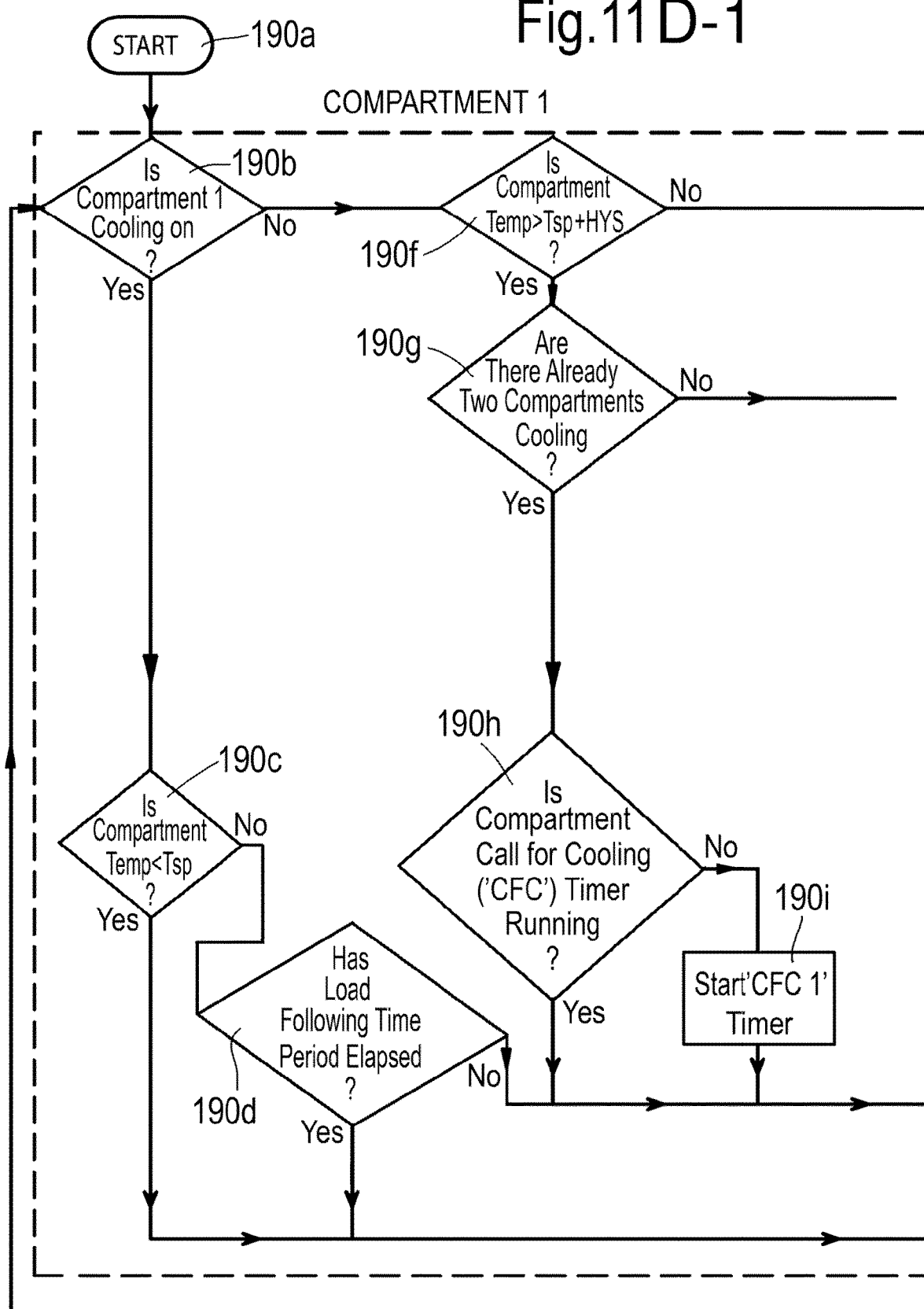
FIGS. 11D-1, 11D-2, 11D-3 and 11D-4 show a flow diagram showing the sequence of steps in prioritising the supply of refrigerant to each of the compartments in a locker module according to one embodiment of the present invention.
Figures 2, 11D:
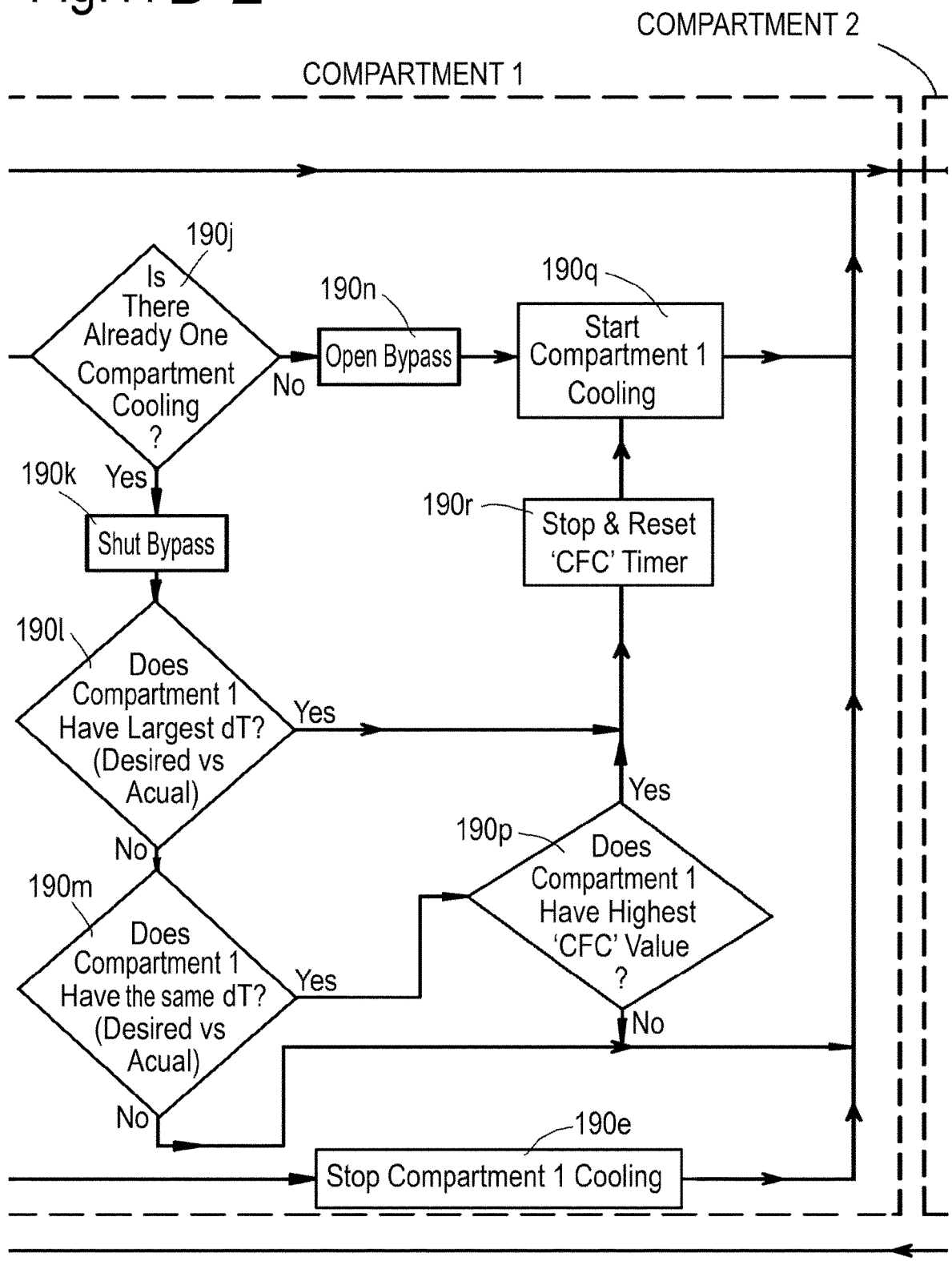

The apparatus 10 according to an embodiment of the present invention shown in FIG. 1 comprises a plurality of units representing refrigerated locker modules 20, an access control module 40 for controlling access to and monitoring the status of the locker modules and a refrigeration plant module 50 coupled to a distribution system 60. The distribution system 60 is shown running along the top of the apparatus 10, to circulate and distribute heat transfer fluid from the refrigeration plant module 50 to the rest of the apparatus 10. In the particular embodiment shown in FIG.

1A, the plurality of locker modules 20, the access control module 40 and the refrigeration plant modules 50 are arranged side-by-side to conserve floor space. However, other arrangements of the units are permissible such as a vertically stacked arrangement. Each of the units representing the plurality of locker modules 20, access control module 40 and the refrigerated plant module 50 are arranged in modular form so as to permit the system 10 to be easily expandable by simply adding more locker modules 20.

Figure 1A:
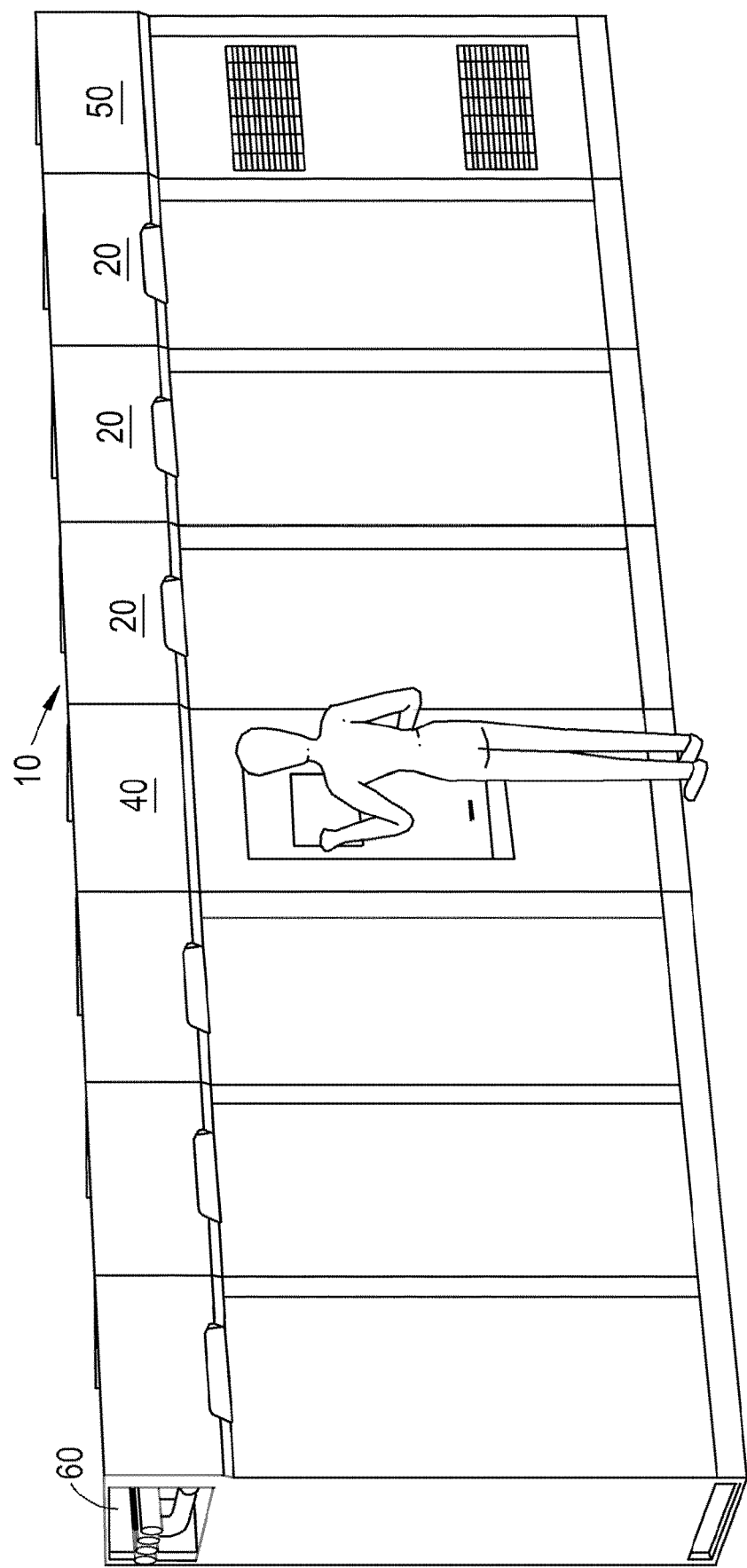
FIG. 1A is a perspective view showing the arrangement of refrigerated locker modules according to an embodiment the present invention.

As illustrated in FIG. 1B, each of the locker modules 20 are mounted onto a platform 12 to form the apparatus 10. The mounting mechanism and method described here applies to other modular units, i.e., access control module 40 and the refrigeration plant module 50. The platform 12 comprises a levelling mechanism to ensure that each of the locker modules are level and in alignment with each other. The levelling mechanism can be any means known to the person skilled in the art, for example differential screws, mechanical or hydraulic jacks. The base of the locker modules 20 comprises one or more wheels 17 for mounting onto tracks 16 that extend perpendicular to the length of the platform 12. This enables the locker modules to be easily mounted or dis-mounted from the platform simply by rolling the locker modules in a direction perpendicular to the length of the platform. In the particular embodiment shown in FIG. 1C and FIG. 1D, the base of the locker modules comprises at least a pair of wheels 17, preferably located at the rear of the locker modules, which are spaced apart so as to mount onto a pair of tracks fixed to the platform. To mount the locker module onto the platform, the user tilts the locker module forward so that the front of the locker module pivots on its front end and the opposite end comprising the wheels 17 are lifted clear from the ground. This allows the wheels 17 to be mounted onto the tracks. When mounted on the tracks, the locker module is then pivoted about the rear opposite end containing the wheels 17 so that the front end is lifted clear off the ground, so enabling the user to slide the refrigerator unit onto the platform using the rear wheels 17 to help manoeuvre the locker module onto the tracks. The rails are preferably installed onto the base during the manufacturing process to allow quick and precise positioning during module assembly on site. Once all the modular units are securely mounted onto the platform 12, cover panels 14 are installed to side of the modular unit assembly. This modular arrangement permits easy replacement of units in the event of a breakdown or a faulty unit, in particular with respect to the refrigerated plant module 50. However, it is not necessary that the units are arranged in modular form for the working of the present invention.

In the particular embodiment shown in FIG. 2A, the locker module 20 comprises a door 18 and a lockable storage space 22. The lockable storage space 22 is divided into three vertically stacked compartments 24, 28, 30 separated by a partition 26. In FIG. 2A the interior volume and thus the storage capacity of the each of the compartments 24, 28, 30, is adjustable to cater for sets of groceries of different sizes. For example, frozen goods, which usually account for the smallest portion of grocery shopping are assigned to the smallest compartment 28, whilst ambient goods are stored in the largest compartment 30. In the particular embodiment shown in FIG. 2A, the partition 26 separating the compartments 24, 28, 30 is able to be vertically adjustable to allow redistribution of storage capacity within a lockable storage space 22. For example, the partitions 26 may run along runners or rails mounted to the side walls of the lockable storage space 22 allowing easy movement of the partition 26 to their desired height. Equally or in addition to the movement of the partitions 26, at least one of the partitions 26 can be removed so merging at least two compartments. Movable partitions warrant a greater degree of flexibility to store oversized consignments and in some cases it is necessary that the compartments in the same storage space can be merged. The removable wall can for example be slotted into or onto a selected one of a number of horizontal grooves or ridges (not shown) provided at intervals throughout the height of the side and/or rear walls of the lockable storage space 22 and preferably making a seal with these walls when slotted into position. The removable wall may carry a seal at its front edge for sealing against the door 18 when closed. Sensors (e.g. optical sensors or mechanical limit switches) may be provided to determine which grooves or ridges are occupied and hence the configuration of the partitions and the associated refrigeration or heating requirements. Thus, if an individual item or the whole grocery consignment to be kept at a given temperature exceeds the dimension of the largest compartment 30, the courier can opt to merge two adjacent compartments at the point of deposit, e.g. the two partitions 26 may be stacked to eliminate the middle compartment 28 and create more storage capacity in the other two compartments 24 and 30.

Another example of a locker module arrangement is illustrated in FIG. 2B. Here a locker module comprises individual lockable storage spaces 22a and 22b. As shown in FIG. 2B, each of the top two lockable storage spaces 22a consists of only one compartment 24 and associated door. For example, the lockable storage space 22a provides storage for a consignment of goods requiring the same storage temperature. Similarly lockable storage space 22b provides storage for another consignment of goods all to be kept at the same temperature, which may be the same as or different from the temperature of space 22a. The temperature of space 22a may be varied for successive consignments of goods; and likewise the temperatures of lockable storage space 22b and/or compartments 24, 28 and 30. For an order of grocery goods requiring multiple storage temperatures, the locker module of FIG. 2B is provided with a single lockable storage space 22 comprising a plurality of separate individual compartments sharing a single access door 18. In the particular case, three individually separated compartments 24, 28, 30 are shown to cater for goods requiring ambient, chilled and frozen temperature respectively.

Each of the lockable doors 18 securing a storage space 22 is rotatably attached to a frame or support structure 19 using any connecting means known to the person skilled in the art, for example pivots, barrel hinges and flexible living hinges. The lockable doors 18 may open sideway as shown in FIG. 2A and FIG. 2B. Alternatively the lockable doors can be arranged to open downwardly or upwardly. This is particular useful if the doors cannot fully opened in a confined location where one side of the locker is backed against a wall.

In comparison to the locker module 20 shown in FIG. 2A where storage spaces are divided into compartments by partitions, the compartments 24, 28, 30 illustrated in FIG. 2B are housed within the storage space 22 as individual units. Also shown in FIG. 2B, is that the individual compartments are vertically stacked and held within the frame or support structure 19, which may be one bay in a larger framework comprising a plurality of such bays arranged side by side. For example, a 3-tier storage space may consist of ambient, chilled and frozen compartments, vertically stacked, to cater for different types of grocery goods so as to enable customers to benefit retrieving their entire grocery shopping within one lockable storage space. This permits different combinations of lockable storage spaces to be stacked, each lockable storage space behind a given door housing one or more compartments.

Figures 3, 11D:
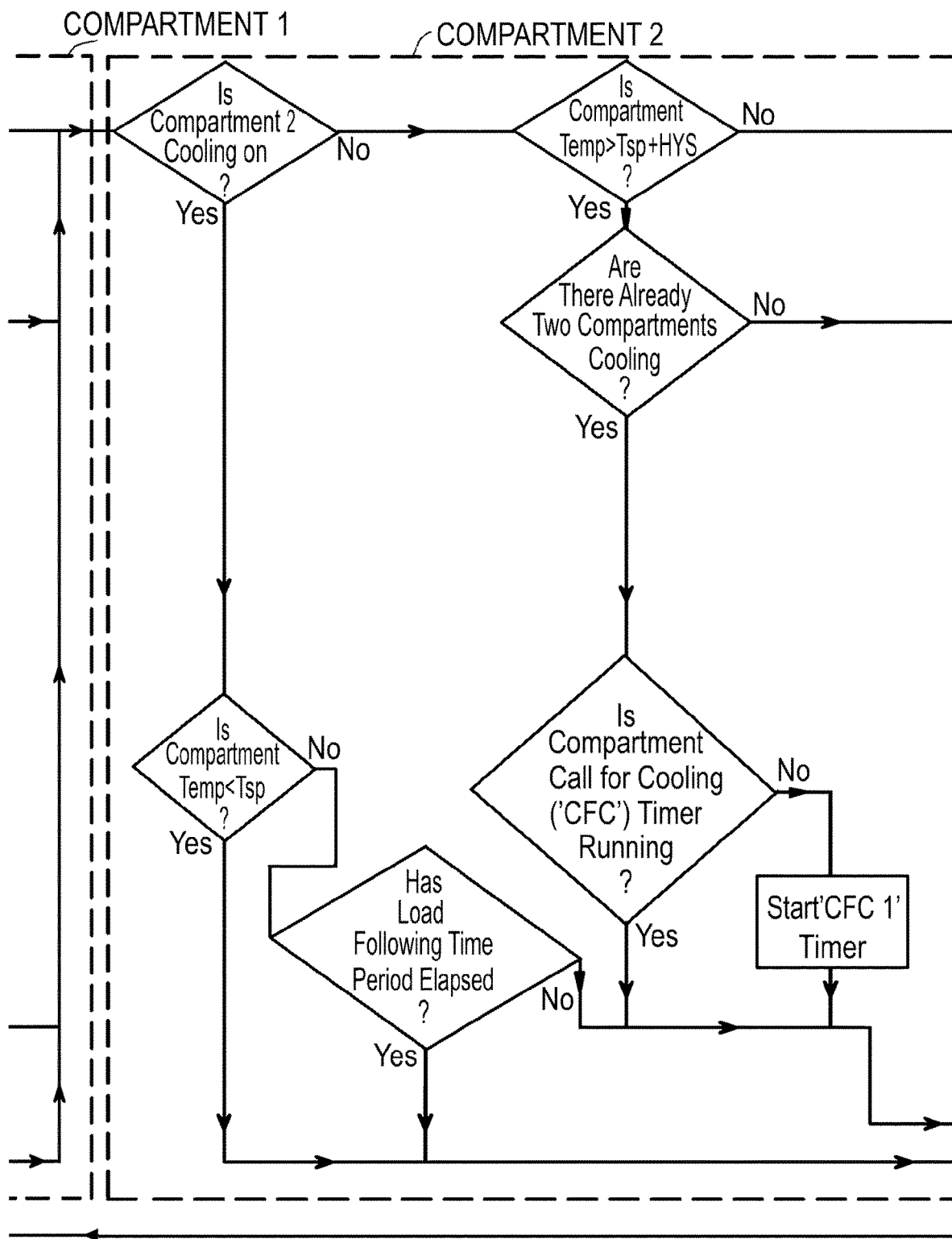

FIGS. 3A and 3B show examples of the different sizes and arrangements of compartments that can be stacked to offer different sized storage. In the particular embodiment shown in FIG. 3A, the height of the compartments can be varied whilst keeping their width fixed so as to offer compartments of differing interior volume. The fixed width enables the compartments to be mounted into a housing having a cavity (housing cavity). In the particular embodiment of the present invention as shown in FIG. 3B, the housing is provided by a frame 19 such that the compartments are mounted onto the frame 19. Five examples of compartments (A, B, C, D, E) with different heights are shown in FIG. 3A and represent heights of 250 mm, 350 mm, 400 mm, 450 mm and 550 mm respectively. The heights of the compartments are not restricted to those shown in FIG. 3A and other examples of heights offering different interior volumes are permissible in the present invention. Each compartment has an open end or compartment cavity to receive goods for storage. Optionally, the cavity has an internal volume of substantially 65 litres or 145 litres or 226 litres. And optionally, the cavity has an internal length of substantially 620 mm and a width of substantially 420 mm and wherein the height of the cavity is substantially 250 mm or 560 mm or 870 mm. A cavity with the specified capacity and dimensions permits a single or a stack of standard sized tote containers to be closely fitted into the said cavity in order to maximise storage capacity.

A lockable door 18 is mounted to the frame for closing the open end 98 of the compartment. As shown in FIG. 2B, a single door 18 may be used to close multiple compartments or alternatively, each compartment has its own dedicated door. To allow interchangeability of the compartments and to provide different combinations of variously sized compartments, the compartments can be mounted to rails 92 so as to allow each compartment to be easily slid out of the frame. FIG. 3B shows three different combinations of the compartments mounted to the frame of a fixed height and indicated as AAAAA or CDD or CBE, where A has the smallest interior volume and E has the largest interior volume. The greater the height of each compartment, the smaller the number of compartments that can be mounted to the frame and vice versa. In the case where the total height of the stack of compartments does not extend the full height of the frame, a spacer can be inserted into the gap 94 created between the uppermost compartment and the top of the frame.

Alternatively the compartments 24 are installed as stacked modular units and the combined height of the stack of compartments equals to the full height of the frame 19. Optionally, each of the compartments are removable. The modular design allows the compartments to be replaced easily, for example with a compartment of a different size or combination of sizes is required, or to replace faulty compartments. Equally, each of the lockable storage spaces containing at least one compartment can be modular. The compartments 24 have external dimensions in substantially integral ratios, such that different combinations of compartments can be incorporated to equate to the full height of the frame. Since the combined height of the compartments is substantially equal to the full height of the frame, the spacer described in the previous embodiment is no longer required. For example, numerous combinations can be built into a 1.5 m tall frame using 250 mm, 500 mm, 750 mm, 1000 mm and 1250 mm tall compartments having a corresponding ratio of 1:2:3:4:5, e.g. to achieve a total height of 1500 mm a combination can be any of the 250 mm/500 mm/750 mm (1:2:3), two of the larger sizes 500 mm/1000 mm (2:4), three of the 500 mm tall compartment (2:2:2) or six of the 250 mm tall compartments (1:1:1:1:1:1). In addition, the height of each of the lockable doors securing a storage space will be manufactured to the same integral ratio to the compartments. For example the doors are manufactured to a height multiple of 250 mm, to accommodate any compartment combinations.

In addition to the vertically stacked configuration, compartments 24 can be arranged side by side to occupy the full width of the frame 19. The widths of compartments 24 in this case have integral ratios of 1:2:3:4:5. This serves to incorporate compartments 24 with different storage temperature at the same level within a given bay or frame 19, to create smaller storage spaces. For example, it is particularly useful for storage of smaller grocery orders. When a storage space is divided horizontally, some compartments may have a height greater than their width, thus providing upright storage for "ready to drink" cold beverages, for example soft drinks, champagne and white wine. In addition, the compartments 24 can also be arranged back to front to occupy the full depth of the frame 19. The integral ratios of the width, height and/or depth of the compartment can be represented by x:y:z. The substantially integral ratios of the height and/or the width and/or the depth of the two or more storage compartments ensure various combinations of storage compartments can be fully incorporated into the cavity. In addition it gives the flexibility for adopting any new combination of the storage compartments when required, to be fully incorporated into the cavity. The integral ratio also reduces the variation of compartments supplied by the manufacturer, and thus reduces the number of spare parts and manufacturing cost.

Figure 2E:
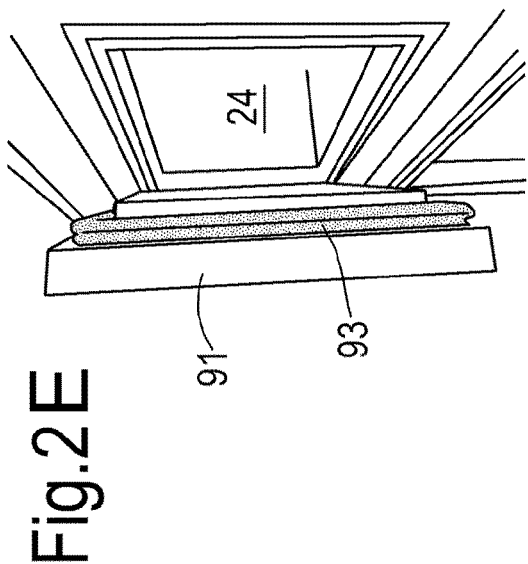
FIGS. 2C-2E are perspective views showing detachable insulating panels being mounted on a door.

Instead of each compartment having its own dedicated door as shown in FIG. 2B, a single master door serving all of the compartments in a storage space would be ideal irrespective of the size of the compartment contained therein. To accommodate for the different compartmental sizes in a storage space, detachable insulating panels 91 of varying sizes depending on the size of the compartment are removably attached to the master door 18 using any fastening means known to the person skilled in the art, e.g. snap-on fixings and/or magnetic fasteners. The use of insulating panels separately detachable from a master door allows any damaged insulating panels to be replaced easily without the need to replace the entire door. In the embodiment shown in FIGS. 2C-2E, the insulating panels are detachably fixed to the master door by means of a snap-on fixture and are sized so that each insulating panel substantially covers and seals the mouth of the compartment with sealing members 93 as shown in FIG. 2E. Such sealing members 93 optionally have primary magnets lined underneath, so that when the door is in the closed position the magnets are attracted onto the mouth of compartment 24 to provide a water tight seal. For the purpose of this invention, the term "sealing" is construed to mean sealing the compartment to substantially prevent the ingress of moisture, more preferably, to provide an air seal as is commonly found in refrigeration units. In some embodiments, the insulating panels 91 are only detachable using specialised tools. The insulating panels 91 comprise insulating material (i.e. polystyrene) encapsulated in a stainless steel cover to ensure the surface of insulation panels 91 are easily cleanable so as to inhibit bacterial growth.

Having a door comprising a master door and at least one insulating panels is transferable to other temperature controlled apparatus such as for closing an oven or a refrigerator where through wear and tear, the door particularly the seal and/or insulating capability is lost over time. By just replacing the insulating panel forming part of the door removes the needs to replace the entire door which in a majority of cases would necessitate detaching the door from its mounting hinges.

Figure 2F:
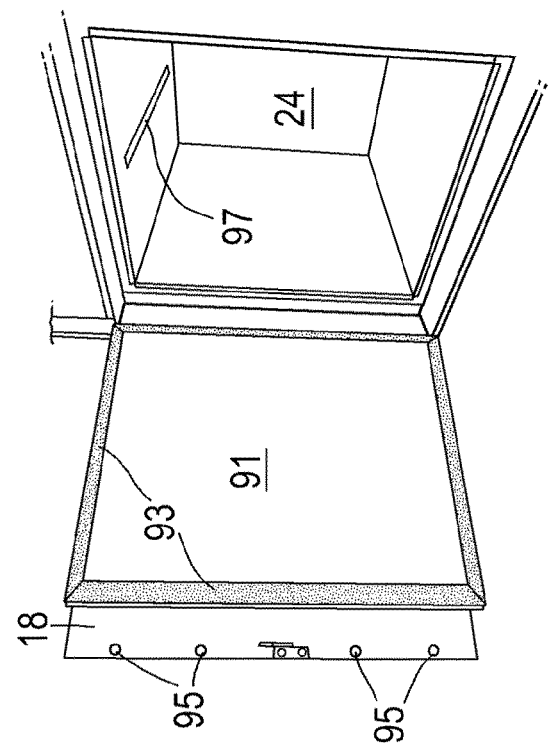
FIG. 2F is a perspective view showing secondary magnets installed or located at the free end of the locker door and LED strip installed internally of the compartment.

FIG. 2F shows an example of a locker door 18 with a closure mechanism to bias the locker door from an open configuration to a closing configuration. The closure mechanism may be any mechanisms known the person skilled in the art, for example closing hinges and concealed chain spring closures. To prevent the locker door bouncing back to an open configuration and to stabilise the door when in a closed configuration, secondary magnets 95 are installed or located at the free end of the locker door opposite the hinged end for maintaining the door in in a closed configuration. The magnetic pull of the secondary magnetic is able to engage the door in the final locking configuration. Thus, the remotely programmable insulated lockable door comprises a first magnetic to effect sealing of the compartments from atmosphere and a second magnetic to aid and/or maintain the remotely programmable insulated lockable door in a closed configuration.

The door is rotatably mounted to a door frame of the compartment by a hinge mechanism 400 comprising a shaft or pin 402 receivable in the compartment door frame 404 (see FIG. 2G). Since the exterior shell of the locker module is fabricated from pressed sheet metal, e.g. steel, the door frame 404 at the mouth of the compartment offers very little support to maintain the door in a substantially vertical orientation. Without any support there is a tendency for the sheet metal of the door frame in the vicinity of the hinge mechanism 400 to buckle or bend through either the weight of the door and/or opening the door beyond its limit. The hinge mechanism 400 of the present invention comprises a support bracket 406 having one or more apertures or through holes 408 to allow the hinge pin or shaft 402 to extend axially in a vertical direction through the door frame 404 and into the one or more apertures 408 of the support bracket 406. The double support of the hinge pin 402 offers additional structural support with limited play when the door is mounted to the hinge mechanism. In the particular embodiment shown in FIG. 2G, the support bracket 406 is substantially "U" shaped having an attachment face 410 for securing the support bracket 406 onto a wall of the compartment and opposing pin or shaft receiving portions 412 (see FIG. 2I). The support bracket 406 is orientated so that the through holes 408 in the opposing pin or shaft receiving portions 412 is in alignment with the pin or shaft 402 extending from the door frame at the mouth of the compartment.

To urge the door in a closed configuration every time the door is opened and thereby, reduce the escape of cold air or ingress of warm air into the compartment, the hinge mechanism 400 further comprises a torsion biasing mechanism 414. The torsion biasing mechanism 414 as shown in FIGS. 2G and 2I comprises a helical spring, which is fitted onto the shaft. Its spring legs on both sides of the helical spring are respectively locked to the rotating shaft and the support bracket in a state in which a resilient force is reserved in the spring legs when the door is opened. As shown in FIG. 2H, one leg of the spring comprises a bent portion 416 in a diametrical formation that is received in a diametrical slot or recess 418 at the end of the shaft allowing this end to rotate when the shaft rotates. The other leg at the other end 420 of the spring is locked or butts up against a wall of the support bracket 406 and therefore, is prevented from rotating. The other end 422 of the shaft is fixed to the door so as to rotate when the door is opened or closed. Thus, opening of the door from a closed configuration causes the shaft to rotate which in turn exerts a torque on the spring that tends to return the door to the original closed configuration. To prevent the torque exerted on the spring closing the door too fast with the potential to trap a user's fingers, viscous material such as grease can be charged between the shaft and a shaft inserting portion. For example the door frame at the bottom wall of the compartment can be adapted to receive the shaft to also include a shaft insertion portion which can be fabricated as a shaft receiving tube for receiving the hinge pin. Such a viscous material resists against the relative turn between the shaft and the shaft inserting portion when the shaft is turned within the shaft inserting portion, so that the door is slowly closed at a supressed speed by the spring. Internal lightings are provided in some embodiments of present invention, more preferably each of the compartments comprises at least one internal light for illuminating the interior of the compartment. As shown in FIG. 2F a LED strip is installed internally to the compartment to provide illumination. However the internal lighting can be any lighting known to the person skilled in the art, for example incandescent bulbs and fluorescence tubes. However, LED lighting or solid state lighting is more preferable due to their efficiency and minimum heat dissipation to the surroundings. The lights are controlled by proximity or tactile switches so that they only operate when the locker doors are opened.

Figure 2C:
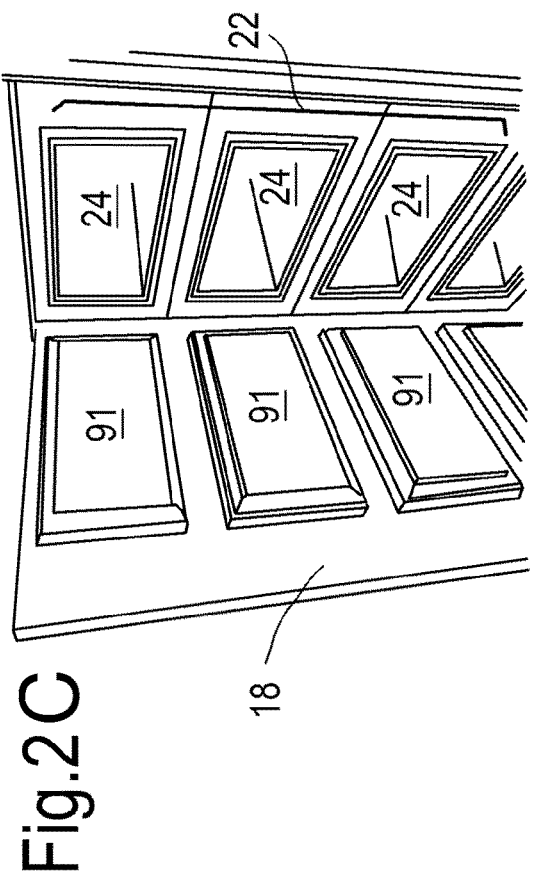
Figure 2D:
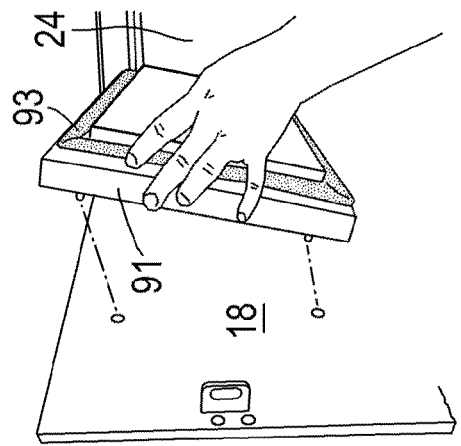

When replacing a compartment of one size (preferably height, e.g. 250 mm) by a compartment of another size (e.g. 500 mm), the previously mounted insulating panel is replaced by another insulating panel of a different size sufficient to close the mouth of the replacement compartment. In some embodiments as shown in FIG. 2C, where a single door 18 seals multiple compartments 22, each mouth of the compartment maybe substantially covered and sealed by a single insulating panel 91 such that each compartment in the storage space shares the same insulating panel. Alternatively, there may be multiple insulating panels 91 sharing the same master door such that the mouths or openings of the compartments in the storage space 22 is closed by separately mounted insulating panels. The benefit of using detachable insulating panels 91 is that any damaged panels are easily replaceable without the need to replace a new door 18, which in a majority of cases necessitates detaching the door from its hinges.

To prevent inadvertent tampering with the door to gain access to the contents of the compartments, the master door 18 securing a temperature controlled storage space 22 is sufficiently resilient to stop thieves from prying the locker doors open or breaking the doors with blunt force. These master doors 22 are typically manufactured from a single piece of metal slab with considerable thickness to guarantee their structural integrity. Thus, the typical insulating technique where insulating materials are sandwiched between metal claddings need not be applied here.

The apparatus may further comprise containers (not shown) to facilitate a more efficient delivery and collection process. The containers are preferably rigid and stackable for temporary storage of grocery goods at appropriate storage temperatures. The containers are of selected size to closely fit the width and or depth (front to rear dimension) of the compartments so as to enable easy removal of the containers. The close fit may be achieved with a single container or by several containers placed beside one another. Such method ensures a more efficient delivery process, for example instead of stocking the compartment with individual items, the courier can simply load the whole container into the compartment.

For example multiple containers can be stacked in a single compartment. During delivery, a courier can slide a single or a stack of multiple pre-packed container containing an order of grocery goods directly into a compartment, instead of stocking up with individual items. Preloading the container also ensures the groceries can fit into a chosen compartment even before they are delivered. Similarly the consignee or end customer also has the option to collect the containers, as opposed to loading each individual grocery item into his/her own carrier bags. Optionally, the container comprises an outer container (otherwise known in the field of the present invention as a "bale arm") and an inner container or a tote, said inner container or tote is removable from the outer container. The outer container facilitates carrying one or more inner containers. Preferably, the inner container or tote is disposable. One or more of the disposable inner container or tote carriers that fit and line the rigid outer containers are provided to facilitate easy removal of grocery goods. As such during collection the consignee or end customer may collect one or more of the disposable tote carriers or inner containers containing the order of grocery goods. The use of containers significantly cuts down this delivery and collection time. As the locker systems are often located at busy commuter hubs, e.g. train stations with limited parking provisions, an efficient delivery and collection process is particularly beneficial. For example a faster turnaround time means the courier can deliver to more locker systems in a given time and there will be less crowding by customers collecting their orders at peak times. Alternatively, a single container can be used to deliver the grocery goods without the need to have a separate outer container or an inner container.

The exterior dimensions of the outer container or single container (if there are no outer and inner containers) are preferably substantially identical to the interior dimensions of a corresponding cavity so as to provide a substantially close sliding fit with little wasted space. For example, in order to store one or more standard sized containers (otherwise known in the field of the present invention as a "bale arm") with a 600 mm by 400 mm footprint, the length and width of the cavity may be fixed at 620 mm and 420 mm, whilst the height of the cavity can vary between 250 mm, 560 mm and 870 mm to provide storage for a stack of one, two and/or three containers. Alternatively the containers are manufactured to different sizes so that they can be placed within the any of the corresponding compartments described earlier. Another distinct advantage of using a container is that by prepacking an order of grocery goods into a container, the supermarket supplier can confirm that the entire grocery order can fit into a compartment, since the dimensions of a container are substantially identical to the size of its corresponding compartment. The containers are preferably equipped with identification mechanisms to aid and ensure the containers are placed into the correct compartment. Such identification mechanisms can be any means known to the person skilled in the art, for example colour coded containers, RFID tags, markings and temperature sensitive labels.

The container is made from any (preferably) rigid and durable material known to the person skilled in the art, for example plastic (e.g., HDPE, PP) or metal (e.g., stainless steel), or readily recyclable materials such as corrugated cardboard/fibreboard or paper. Whilst the plastic and metal containers are reusable, the corrugated cardboard containers are disposable as it is an alternative to plastic bags. The container should allow sufficient heat transfer between the grocery goods and the surrounding environment to ensure the goods are kept at the correct temperature within the storage compartments of the apparatus and within the other temperature controlled parts of the distribution chain. For example even though plastic is a thermal insulator, by including a plurality of ventilation holes on the container's walls, it allows convective heat transfer between the grocery goods and the surrounding air. While a low level of thermal insulation/thermal mass of the container allows temperature equilibrium to be quickly attained in the temperature controlled parts of the delivery chain, there may be some merit in providing containers having somewhat higher thermal mass and/or thermal insulation properties, so as to keep the groceries at an acceptable temperature when the container is exposed to ambient temperatures, e.g. during the final collection leg by the customer. The container may be put into a separate insulating bag, wrapper or the like for this stage.

Container collection facilities may be made available locally at the locker apparatus for customers to return empty containers. To prevent damage to or theft of these containers the container collection facility may comprise any security mechanism known to the person skilled in the art, such as non-return flaps. The empty containers may be nestable or collapsible for compact storage in the return facility, but stackable when full, with the weight of a container above resting on a container below, so that several containers may be stacked within a storage compartment without crushing goods in the container(s) below. The heights, widths and/or depths of the containers may be chosen relative to the corresponding dimensions of the storage compartments of the locker apparatus, such that the containers can be stacked one upon another, one beside another, and/or one in front of another, in the storage compartments, with little wasted space. In hard to reach places which require excessive bending of the user's back or for wheel chair bound users, a compartment, preferably the bottom compartment 30, may include a step 32 so as to offer an elevated shelf to the user. This minimizes the user's reach needed to access the furthermost parts of the compartment.

To prevent unauthorized access to the lockable storage space 22, the door of the lockable storage space 22 is fitted with a digital locking mechanism. Further explanation of the working of the digital locking mechanism to permit access to the lockable storage space 22 is discussed below.

Referring to FIGS. 4A and 4B, the apparatus preferably comprises a primary system 200 for refrigeration and heating and a secondary system 260 in cooperation with the primary system 200 for distributing or transferring heat or cooling in the primary system 200 to the individual compartments of the lockable storage space (see FIG. 4A). The primary system 200 is a closed loop system and schematically represents the refrigeration/heating plant module 50 as well as the temperature controlled compartments (see FIG. 4A). In the particular arrangement shown in FIG. 4A, the primary system 200 comprises a separate refrigeration system 220 and a heating system 240, both configured as a separate closed loop system. The refrigeration system 220 may comprise a conventional vapour compression refrigeration unit and acts as the primary heat pump for heat extraction, however it can be any other heat pumps known to the person skilled in the art, for example thermoelectric or magnetocaloric refrigerators. Magnetocaloric refrigeration is based on applying a series of magnetization and demagnetization cycles to a magnetocaloric material such as gadolinium alloy; as such the magnetocaloric material may be heated during magnetization and then offloads excess energy towards a heat sink, before it is cooled during demagnetization and takes energy from a liquid refrigerant, as such lowering the temperature of the said liquid refrigerant. The benefit of adopting a magnetocaloric refrigerator is that the inefficiency associated with vapour compression, i.e. frictional loss in a compressor, pressure drop in the gas phase refrigerant.

The refrigeration system 220 is a vapour compression unit and can be based on a conventional refrigerant such as R290 but other conventional and/or natural refrigerants known in the art are permissible in the present invention. In comparison to the refrigeration system 220, the closed loop representing the heating system 240 carries a heat transfer fluid to absorb heat from the primary system. A separate heating system 240 is optional and functions to provide heat to the secondary system 260 via a heat transfer fluid in order to facilitate a temperature change of each of the compartments from a compartment for storing frozen goods to a compartment for storing goods that require a chilled or ambient temperature or to maintain a compartment at a set temperature or within a temperature range, or even at elevated temperatures. The heating system 240 can be any system known to the person skilled in the art. For example, the heating system 240 can be provided by electric heating elements or by gas heating. However, in hot climate regions such as the Middle East, it may not be necessary to use a separate heating system since the system can extract the heat from the surrounding environment and this has the beneficial effect of conserving energy. The heating system may also be arranged to extract heat from the condenser of the refrigeration system 220.

In cooperation with the primary system 200, the secondary system 260 distributes and circulates the heat or cooling from the primary system 200 to the individual compartments.

In the particular embodiment shown in FIG. 4A, heat/cooling is transferred from the primary system 200 to the secondary system 260 by virtue of a primary heat exchanger 280 and/or 290. The primary heat exchangers 280/290 can be any devices known to those skilled in the art, for example plate heat exchangers or shell and tube heat exchangers. Distribution systems 60a,60b in the secondary system 260 are configured as closed loops respectively conveying the cooling and heating via separately distributed heat transfer fluid flows to the individual compartments of the lockable storage spaces 22. The heat transfer fluid in the heating fluid distribution system 60b can be the same heat transfer fluid used for the heating system 240 discussed above, i.e. there is no secondary system for heating. Instead the heating fluid distribution system 60b contains an electrical heater or a heat exchanger directly exposed to the combustion gases in a gas boiler or the like. Hence the primary heat exchanger 290 for the heating system may be eliminated, whereby the entire heating fluid distribution system for heating becomes a primary system as shown in FIG. 4B. Alternatively, as shown in FIG. 4A, respective primary heat transfer fluids separated from the heat transfer fluids in both the cooling fluid distribution system and heating fluid distribution system 60a, 60b in the secondary system can be used for both the refrigeration system 220 and the heating system 240. The distribution systems 60a, 60b can be used to convey the heat transfer fluids at the different temperatures in the secondary system, each distribution system 60a, 60b having its own dedicated pipe network. For example, the distribution system can comprise a cooling fluid distribution system 60a for distributing the heat transfer fluid for the refrigeration system 220 and a separate heating fluid distribution system 60b for distributing the heat transfer fluid for the heating system 240. Examples of heat transfer fluid include but are not limited to ethylene glycol, silicone oil, water etc., and compatible mixtures of such fluids. The use of a (preferably single phase) heat transfer fluid in the secondary system 260 for cooling duties, as opposed to a pressurized refrigerant subject to multiphase flow, simplifies process control and reduces the level of maintenance required, i.e. leak detection is limited to the primary system 200. It also allows additional lockable storage spaces to be retrofitted to existing lockable storage spaces with relative ease. For example, the piping network in the distribution system 60a, 60b can be extended simply by using conventional union type connectors (e.g. compression fittings of push fit or nut- and olive type, or lead free soldered connections instead of welded or brazed connections). As already noted, in the case of the heating system 240, heat exchanger 290 is not essential. However, if a primary heat exchanger 290 is used for transferring heat from the heating system 240, as shown in the particular example in FIG. 4A, it is advantageous to isolate the heat transfer fluid in the primary system 200 from the heat transfer fluid in the second (heating) distribution system 60b, whereby the heating fluid distribution system becomes a secondary system so as to minimize fouling of the heat transfer fluid/compartment heating elements in the heating system 240. Separating the heat transfer fluid in the heating system 240 into primary and secondary circuits also allows a different type of heat transfer fluid to be used in each circuit. For example, the primary heating circuit 240 can utilize silicone oil to operate at a higher temperature, whilst the secondary system 260 can adopt a mixture of water and glycol at a lower cost.

The storage apparatus may comprise only a primary system 200 as shown in FIG. 4C, which schematically represents the refrigeration/heating plant module 50 and the storage compartments. In this case the heat exchangers 280 and 290 are omitted, so that the heating fluid distribution system is also the primary circuit 240 and similarly the cooling fluid distribution system is also the primary circuit 220. The distribution system 60a, 60b distributes and circulates the heat or cooling from the primary system 200 directly to the individual compartments. For example the refrigerant becomes the heat transfer fluid and circulates in the cooling fluid distribution system 60a and the heated heat transfer fluid circulates in the heating fluid distribution system 60b. The omission of the heat exchangers 280, 290 and the elimination of secondary heat transfer fluid circuits reduces the manufacturing cost. Where heat is transferred to the interior of the compartments by conduction, the rate limiting step is the transfer of heat through at least one wall of the compartment. The use of a refrigerant as the heat transfer fluid to provide direct cooling at the compartments is advantageous, as the lower the temperature of the refrigerant results in a shorter turnaround time when preparing the compartments for receiving a new grocery order. For example, a distribution system carrying typical glycol/water mixture (a mix ratio of 50:50) can only attain a temperature close to the storage temperature in the frozen compartment, i.e. around −25° C. Further reduction in the glycol/water temperature runs a risk of freezing the heat transfer fluid in the distribution system. A lack of substantial temperature difference between the heat transfer fluid and the frozen compartment means that the rate of cooling tends to be very low, and could present problems during locker preparation, i.e. a significant amount of time may be needed when preparing an ambient compartment for receiving frozen goods. Arguably a more concentrated glycol/water mixture may help lower its freezing point, but this is conflicted by the resultant higher fluid viscosity of the mixture. This may lead to pumping difficulties, and potentially clogging the distribution system. In the case of the use of a refrigerant as the heat transfer fluid, it can be expanded and chilled to a much lower temperature (i.e. <−30° C.) without significantly changing its physical properties. Therefore by applying a refrigerant directly at the heat exchangers it is possible to induce a steeper temperature gradient to increase the rate of heat transfer across the wall of the compartment.

FIG. 4F shows an example of a refrigeration unit 220 for directly supplying each of the compartments via the heat exchangers in a locker module with a refrigerant. For example, the refrigerating unit (220) can be installed on top of each of the locker modules so as to service all of the compartments installed within the same locker module via a common distribution system. Alternatively and equally permissible in the present invention, is that the refrigeration unit in one locker module is not only shared amongst the plurality of compartments in a given locker module but also amongst compartments in multiple locker modules via a common distribution system. This allows the refrigeration units in each of the locker modules to be shared amongst multiple locker modules. Thus, in case the refrigeration unit in one locker module is faulty or is being serviced, those compartments that are still calling for cooling in the locker module can still be cooled by a refrigeration unit from one or more neighbouring locker modules. Linking the distribution system of the coolant (e.g. refrigerant) from multiple refrigeration units so providing a common distribution system amongst the compartments from multiple locker modules can be achieved using specialised pressure connectors.

The temperature of each of the compartments in a given locker module are independently controlled by one or more control valves (66). Further detail of the operation of the control valves 66 to control the temperature of each of the compartments is discussed below. This is distinctively different from a common refrigerator where the flow of refrigerant to different storage spaces is not controlled. Also shown in FIG. 4F is a suction line accumulator (65) to prevent liquid refrigerant from the compartments from returning to the compressor as is commonly known in the art. The benefit of spreading the cooling duties to a number of refrigeration units as opposed to a single refrigeration unit discussed above with respect to the primary system in FIG. 1A is that in an event of breakdown only a limited number of compartments serviced by the faulty refrigeration unit are affected instead of the whole locker assembly. In addition, placing the small refrigeration units on top of each of the locker modules reduces overall footprint that is otherwise necessary to accommodate a dedicated primary refrigeration locker module. Furthermore the cooling fins on the condenser (224), which are susceptible to fouling, are now relocated higher up from the ground and away from high concentration of dirt and grit. Further benefits include reducing the material cost, in particular the copper piping forming the distribution network for feeding the refrigerant to each of the compartments. In the case where the metering device is a capillary system only small diameter piping are necessary to feed the refrigerant from the refrigeration system to each of the compartments.

Figure 4G:
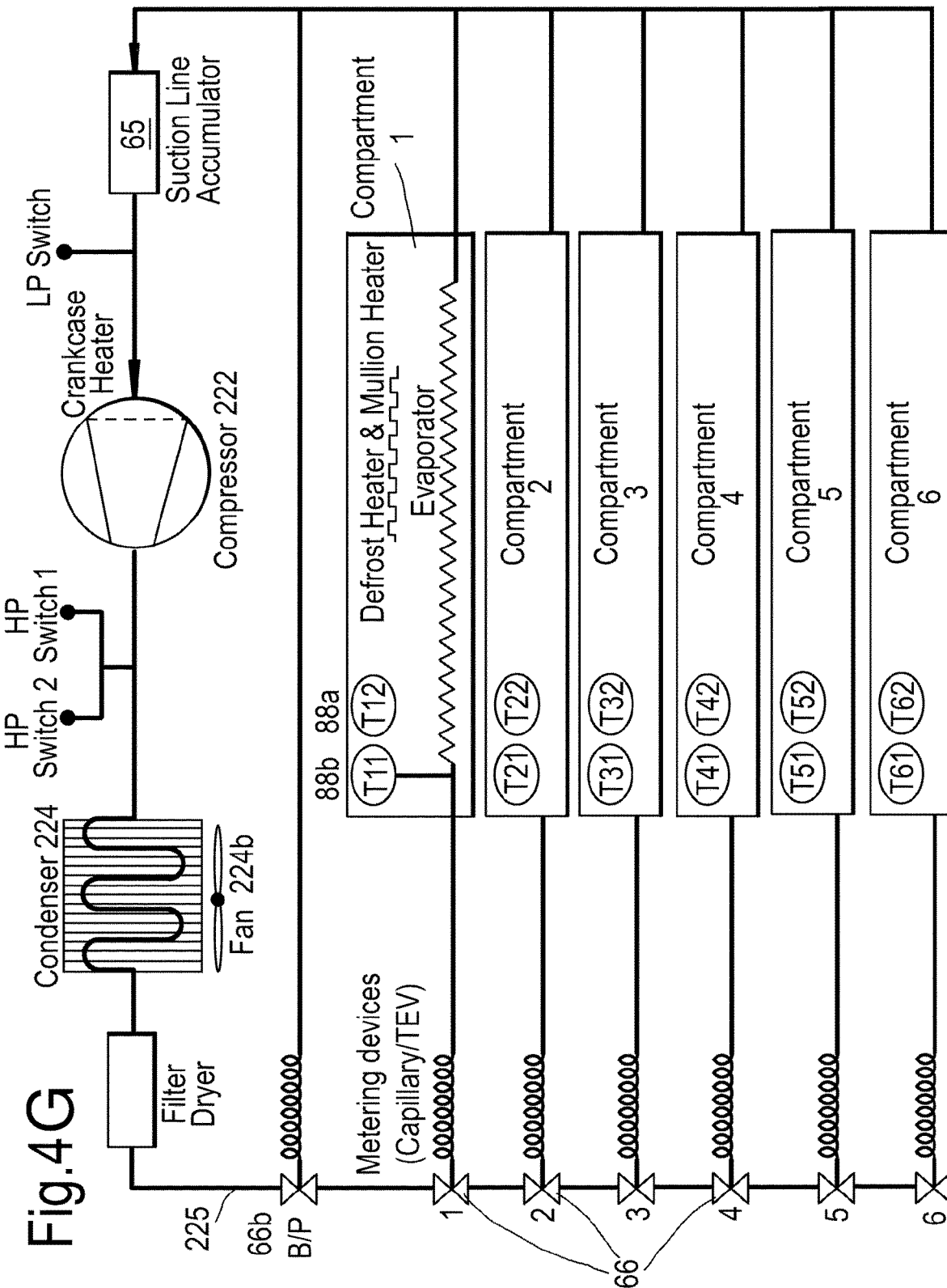
FIG. 4G is a process flow diagram showing the layout of the components of the refrigeration unit leading to the individual compartments of a locker module according to an embodiment of the present invention.

FIG. 4G is a process flow diagram showing the layout of the components of the refrigeration unit (220) leading to the individual compartments of a locker module apparatus according to an embodiment of the present invention. Following the condenser 224, the refrigerant is split amongst several compartments by the distribution network. A common distribution system comprising a network of conduits or copper piping distributes the refrigerant to each of the compartments in the locker module. To allow the temperature of each of the compartments to be controlled independently, the compartments are connected in parallel. One or more manifolds forming part of the common distribution system are used to distribute the refrigerant to and/or from each of the compartments. The manifolds branch out to form parallel circulation loops for the distribution of refrigerant to the compartments. The manifolds branch out from the at least one common distribution system, can form parallel circulation loops for the distribution of heat transfer fluid to the one or more compartments in each of the storage spaces. For example, a portion of the heat transfer fluid is diverted from the at least one common distribution system through the manifold and supplied to only one compartment before returning to the refrigeration system. The use of parallel circulation loops allows the temperature to be independently controllable in each of the compartments, i.e., the temperature of the heat transfer fluid supplied to each of the compartments are unaffected by the other compartments served by the same manifold. Furthermore, in case of a breakdown in an individual compartment, i.e. blockage or leakage, its corresponding part in the parallel loop can be isolated whilst all other compartments served by the same manifold remains functional.

Figure 6E:
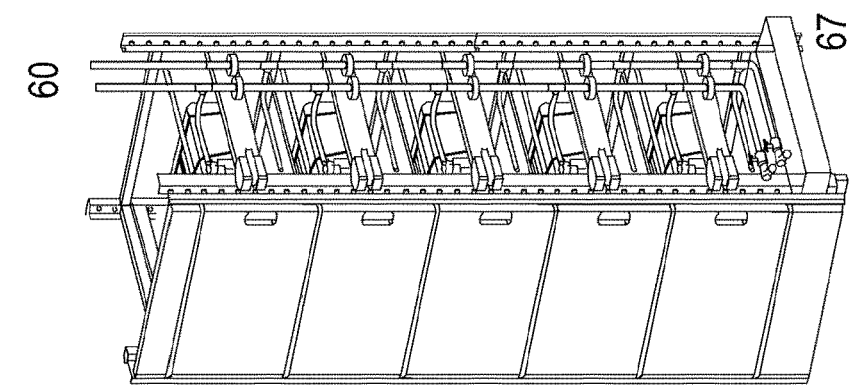
FIGS. 6B-6E are perspective views showing stages of installing the distribution system and the bund.
Figure 6D:
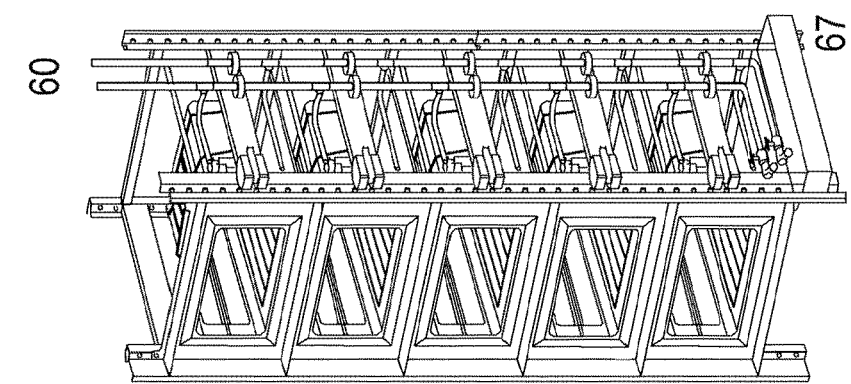
Figure 6C:
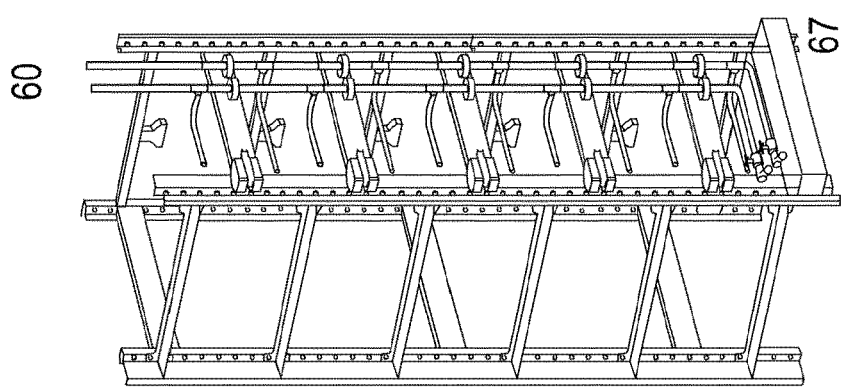
Figure 6B:
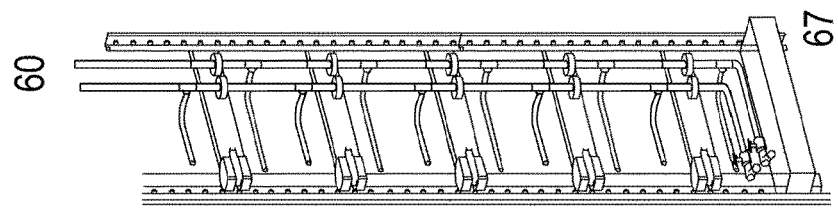
Figure 6H:
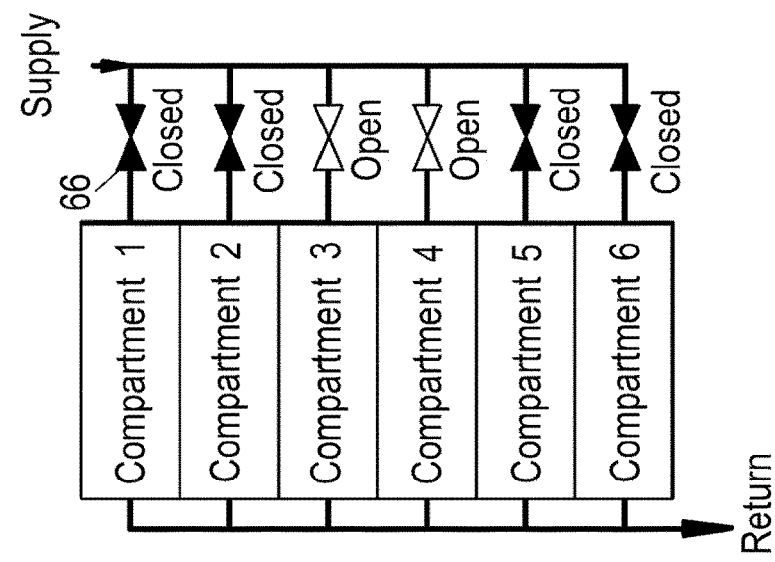
FIGS. 6F-6H are schematic representations showing distribution of heat transfer fluid to an array of compartments in a locker module.
Figure 6G:
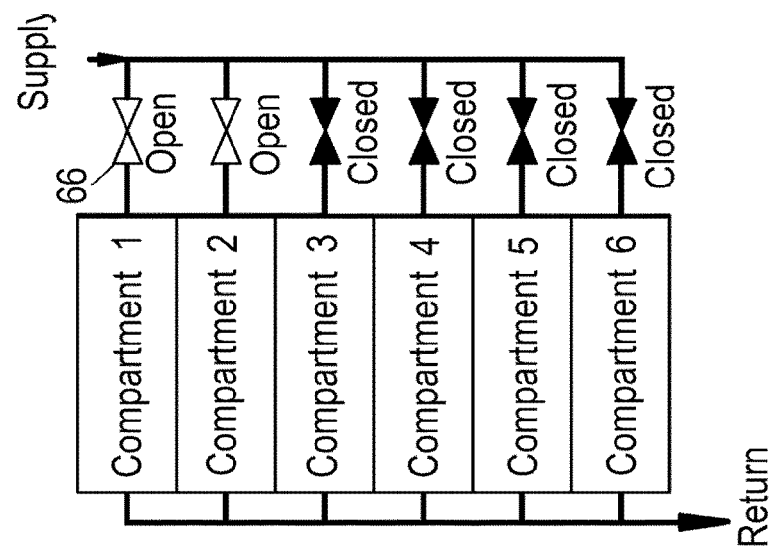
Figure 6F:
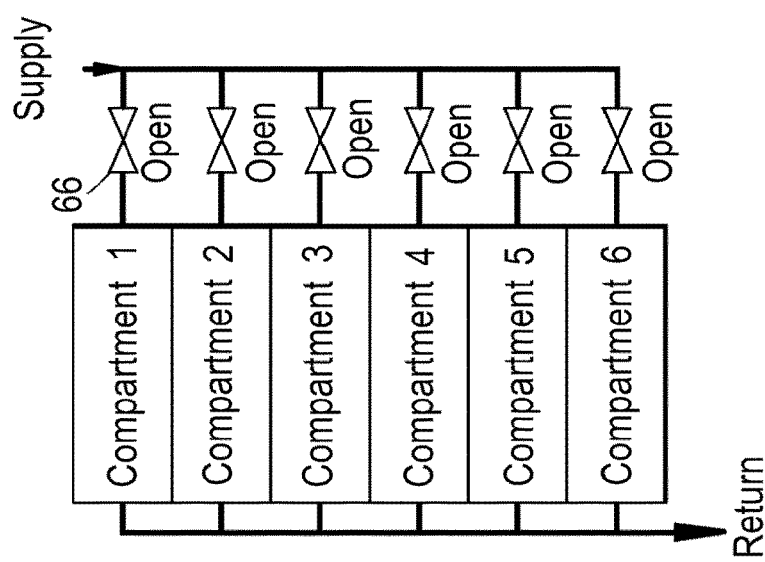
Figure 6J:
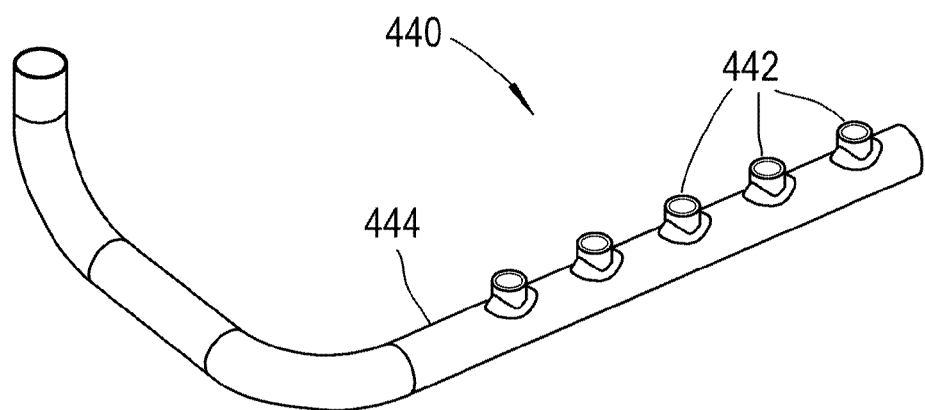
FIGS. 6J and 6K are perspective views of the inline manifold according to one embodiment of the present invention.
Figure 6K:
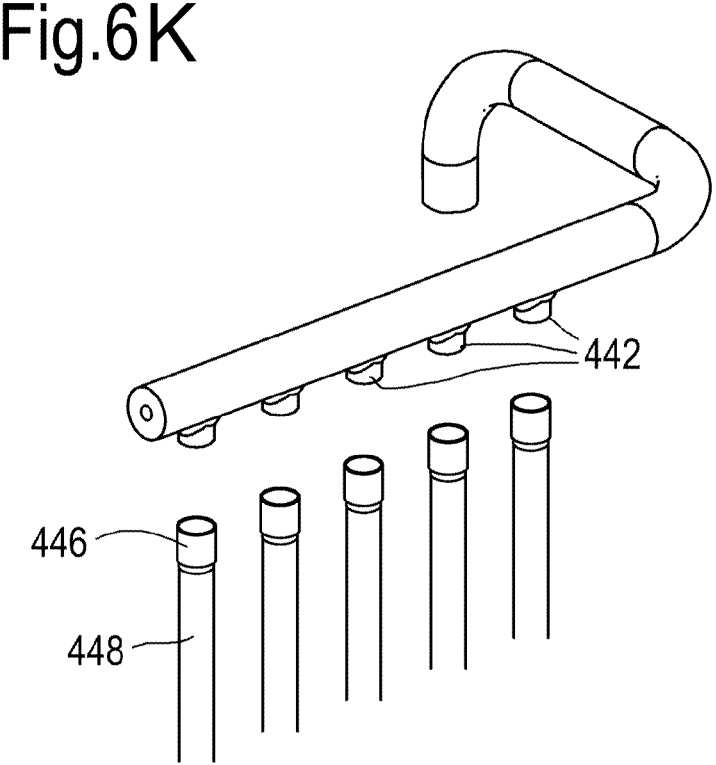

Multiple "T" joints can used to branch out the refrigerant from a single pipe to multiple pipes or vice versa. However, the use of multiple "T" joints, particularly in copper would necessitate a number of brazed or soldered joints increasing the risk of leakage if ever anyone of the joints would fail. To mitigate this risk, the manifold 440 in the present invention is integrally fabricated in line within the piping network as shown in FIG. 6J. The inline manifold 440 comprises a plurality of raised "nipples" or joints 442 that are integrally formed within the pipe 444 which are sized to accept a plurality of pipes or lines. In the particular embodiment shown in FIG. 6K, the nipples 442 can be sized to be inserted into the sleeves 446 formed at the end of piping 448. The piping 448 can be brazed or soldered onto the nipples 442. Equally, the joints can be formed as sleeves having a diameter that is slightly larger than the external diameter of the pipe in the piping network so as to permit a slip-fit mating relationship between the sleeve and the pipe. The inline manifold 440 can used to distribute the refrigerant from the condenser to each of the compartments and/or on the return suction line side of the distribution network for merging or bringing together the distributed flow of the refrigerant from each of the compartments into a single pipe to the compressor.

Control of the refrigerant to each of the compartments is provided by individual control valves. In the particular embodiment shown in FIG. 4G, there are six control valves controlling the flow of refrigerant to six compartments and an additional bypass valve 44*b* (see FIG. 4G). Downstream of each of the valves, the refrigerant which is largely in a liquid state is allowed to expand in the metering device to a gaseous state and thus, provide the cooling effect to the individual compartments via an evaporator or heat exchanger. Each compartment comprises an evaporator or a heat exchanger where the cold refrigerant vapour (and some liquid refrigerant which has not fully evaporated) is able to cool the air in the compartments via at least one wall of each compartment. Subsequent of the evaporator, the cold refrigerant vapour is drawn back into the compressor via the suction line side of the assembly commonly known in the art.

During a cooling cycle, the refrigerant cools significantly as it expands in the metering device and thus, any significant cooling of the piping in the distribution network mainly occurs around and downstream of the metering device to each of the compartments supplied with the refrigerant. To prevent condensation of water vapour on the piping network, the bulk of the piping network downstream of the metering device and including the metering device itself is embedded in insulation material, in particular foamed insulation material. In the particular embodiment, at least a portion of or the bulk of the piping network from the metering device and including the metering device is preferably embedded in foamed insulation in the side wall of the locker module as shown in FIGS. 6A-6E.

Also shown in the refrigerant unit (220), are two high pressure sensor switches (HP switch 1 and HP switch 2) located in the refrigerant line (225) between the compressor or the condenser and the control valves (66) (which represents the high pressure side of the evaporator) to provide an indication of the pressure of the refrigerant in the condenser prior to being fed to the control valves. One of the high pressure sensor switches has a higher pressure rating than the other high pressure sensor switch. The higher rated pressure sensor switch, as is commonly known in the art, is a safety pressure switch in case the pressure of the refrigerant in the piping or tubing in the condenser rises above a predetermined value. The piping or conduits of the distribution network feeding the individual compartments are rated to accommodate a certain level of pressure and exceeding this runs the risk that the piping may leak or burst. This is particularly the case, where the metering device is a capillary system feeding the individual compartments. If the pressure in the refrigerant line from the condenser exceeds a predetermined value, then the safety pressure switch closes to shut off the pressure to the compartments and therefore, prevents damage to the piping in the distribution network. In the particular embodiment and using a R290 type refrigerant, the high rated or safety pressure sensor switch is set to substantially 20 bar(g).

The other lower rated pressure sensor switch (LP switch) located between the compressor and the suction line accumulator represents the low pressure side of the evaporator and controls the temperature of the refrigerant in the condenser and therefore, ensures that the refrigerant fully condenses before it reaches the metering device. For a given refrigerant, the pressure of the refrigerant varies with its temperature according to Ideal Gas Law (PV=nRT, where P is the pressure, V is the volume, n is the number of moles, R is the ideal gas constant and T is the temperature). In the particular embodiment, a R290 type refrigerant is used. When the pressure of the refrigerant exceeds a predetermined value and based on the pressure-temperature relationship according to Ideal Gas Law, the temperature of the refrigerant in the condenser rises proportionally, and prevents the gaseous refrigerant in the condenser from fully condensing. When the pressure reaches a predetermined level, a cooling fan (224b) is actuated to aid cooling and thus, condensation of the refrigerant in the condenser. Conversely, if the pressure drops below a predetermined level, particularly during the winter months, the pressure of the refrigerant in the condenser drops so as to affect the flow of the refrigerant in the distribution network. A separate heater (not shown) is placed in the vicinity of the condenser to provide heat to the refrigerant in the condenser when the pressure of the refrigerant from the condenser drops below a predetermined level. In the particular embodiment and with the use of a R290 type refrigerant, the predetermined pressure level is set to substantially 10 bar(g) which represents a temperature of the refrigerant of approximately 30° C.

In addition to the lower rated pressure sensor switch (LP switch) controlling the temperature of the refrigerant in the condenser, the LP switch can also be an indication of the refrigeration capacity of the of the refrigeration unit (220). When there is over capacity in the refrigeration unit in that the refrigeration unit is capable of cooling more compartments, the compressor continually circulates the refrigerant from the low pressure suction side of the evaporator lowering the refrigerant pressure. Conversely, when too many compartments are cooling at the same time, there is little or no refrigeration capacity. As a result, the refrigerant pressure at the low pressure side of the evaporator increases since the refrigerant is distributed amongst a greater number of compartments and thus, evaporators. By measuring the refrigerant pressure from the LP switch, the refrigeration capacity can be determined. Further discussion of controlling the refrigeration capacity by measuring the refrigerant pressure at the low pressure side of the evaporator is discussed below.

Energy consumption accounts for a large proportion of the running cost of the apparatus and reducing energy use also contributes to corporate environmental responsibility. Heat integration can be implemented between the heating system 240 and the refrigeration system 220, i.e. allowing at least a proportion of the heat normally dissipated to the atmosphere from the condenser 224 in the refrigerated system 220 to be recovered and applied in the heating system 240. This is provided by an additional heat exchanger 230 installed between the heating system 240 and the refrigeration system 220 at a location experiencing the biggest temperature difference, i.e. in the region where the heat transfer fluid in the heating system 240 is at its coldest (see—FIGS. 4A-4E). For the purpose of explanation and to differentiate from the other heat exchangers, the heat exchanger 230 will be termed an economizer heat exchanger 230. In operation, cold heat transfer fluid in the heating system 240 is heated up by the warmest refrigerant in refrigeration system 220. Clearly this is only possible where the heat transfer fluid entering the economizer heat exchanger 230 from the heating circuit is at a lower temperature than the heat transfer fluid (refrigerant) entering the economizer heat exchanger 230 from the compressor 222 of the refrigeration system 220. Under some operating conditions, e.g. when rapid net (collective) heating of the compartments is required, this temperature difference may not exist. A solenoid operated bypass valve 232a or the like may be provided to divert refrigerant from the compressor 222 directly to the condenser 224, without passing through the economizer heat exchanger 230 under these conditions, as shown in FIG. 4D. Heat released to atmosphere from the condenser may be regarded as waste heat. Providing an economizer heat exchanger 230 may allow the use of a smaller condenser 224, emitting less waste heat. Refrigerant leaving the compressor is cooled in the economizer heat exchanger, with the extracted heat being transferred back to some of the compartments via the heating fluid distribution system. For practical purposes it is not possible to eliminate the condenser altogether, because the whole apparatus may sometimes have to operate as described above, with the refrigerant diverted from the compressor to the condenser so as to bypass the economizer heat exchanger. Even considering the ideal case where the compartments are perfectly insulated from the environment and are operating at a collective steady state, whereby the heating and cooling systems are serving simply to shunt portions of a fixed quantity of heat within the collection of compartments from some compartments to others, the refrigeration system has a finite coefficient of performance, such that it will generate waste heat which has to be dumped somewhere.

The use of economizer heat exchanger, as shown in FIG. 4D, takes away some of the cooling duties from the condenser 224. However in countries with warmer climates or during the summer months when the ambient temperature is elevated, the air-cooled condenser 224 may not be able to dissipate all the heat as required. This is particularly exacerbated as the exterior locker modules are made of metal which will act as a heat sink. As a result, a portion of refrigerant may be left uncondensed at the metering device 226 and thus reduces efficiency. To aid cooling of the refrigerant in the condenser and as discussed above in relation to FIGS. 4F and 4G, a cooling fan (224b) helps to ensure that the temperature of the refrigerant does not exceed a predetermined value, e.g. 30° C. and therefore, ensure that the refrigerant is fully condensed. In some embodiments, as shown in FIG. 4E, and in addition to the cooling fan or alternative to the cooling fan, a supplementary cooling circuit 250 may be installed to aid heat removal in these circumstances and to ensure the refrigerant is fully condensed prior to reaching the metering device 226.

The supplementary cooling circuit 250 comprises a supplementary heat exchanger 254 and a chiller unit 256. The supplementary cooling circuit 250 carries a heat transfer fluid to exchange heat with any uncondensed refrigerant at the supplementary heat exchanger 254, before dissipating the absorbed heat at the chiller unit 256. In the case of the supplementary cooling circuit, the heat transfer fluid can based on a glycol system since the heat transfer fluid does need to experience such low temperatures but merely to lower the temperature of the refrigerant in the primary refrigeration unit discussed above with reference to FIG. 4F. The supplementary heat exchanger can be any heat exchanger known to the person skilled in the art, for example jacketed tubes, plate heat exchangers, shell and tube heat exchangers. If the condenser 224 failed to fully condense the refrigerant, a three way valve 252 will divert the refrigerant flow towards the supplementary cooling circuit 250 for additional cooling. The three way valve 252 may be set to divert refrigerant flow automatically if the refrigerant rises above a particular temperature or pressure set point. Sensors can be installed to measure the temperature or pressure from the condenser and to sense when the refrigerant does not reach a fully condensed state. Since uncondensed refrigerant exhibits a higher in-line pressure than a single phase liquid refrigerant, the use of high pressure set point to activate the three way valve 252 ensures the supplementary cooling circuit 250 are only used to condense gaseous refrigerant. Alternatively, the three way valve 252 may be manually set to open permanently to divert all the refrigerant to the supplementary cooling circuit 250. The chiller unit 256 can be any cooling means known to the person skilled in the art, for example an air cooled heat exchangers or liquid/liquid heat exchangers connected to an external cooling source, e.g. a chilled water supply. Alternatively, the chiller unit can be based on a separate chiller refrigeration unit comprising a compressor and a condenser for ultimately dissipating heat from the refrigerant in the primary refrigeration unit. Like the primary refrigeration unit, the chiller refrigeration unit is in cooperation with the primary refrigeration unit by a separate common distribution system for distributing a heat transfer fluid to exchange heat with the refrigerant in the primary refrigeration unit. The heat transfer fluid in the chiller unit can be based on a much less demanding refrigerant such as glycol. In addition, the chiller unit may be installed remotely to the locker module. For example, air cooled heat exchangers may be positioned away from the sheltered locker assembly that can aid heat dissipation, e.g. in a cooler environment.

The use of supplementary cooling circuit 250 is ideal to provide additional cooling for the embodiment shown in FIG. 4F, where a refrigeration unit is provided for each of the locker modules. The condenser 224 is sized to provide sufficient cooling capacity to cool and condense the refrigerant locally during normal operation, i.e. winter months. In this case the supplementary cooling circuit is made redundant. During summer months where the condenser 224 can no longer condense all of the gaseous refrigerant and is optionally sensed by one or more sensors, e.g. temperature or pressure, the three way valve 252 can divert the refrigerant to the supplementary heat exchanger 224. Here the refrigerant is cooled and fully condensed by the heat transfer fluid supplied by a common chiller unit (not shown) serving all the smaller refrigeration units in the locker assembly. The benefit for adapting this system is that the amount of heat dissipated at the vicinity of locker modules during summer months are limited, and thus increasing local cooling performance at each locker module. FIG. 5 shows a plurality of automated refrigerated locker modules 20, each locker module 20 comprising a plurality of storage spaces, whereby the temperature of the compartments in the storage spaces is controlled based on the refrigeration/heating system and the primary/secondary system 200, 260 shown in FIG. 4F. In the particular embodiment shown in FIG. 5, the heat transfer fluids are conveyed in distribution systems comprising a plurality of conduits 60 which are positioned above the modular units. A top view of the system 10 shown in FIG. 5 shows the refrigeration/heating plant module 50 at one end of the apparatus and conduits 60, supplying the coldest and hottest heat transfer fluids for refrigeration and heating respectively.

A part of the distribution systems servicing an individual locker module 20 is best illustrated in FIG. 6A. The exemplified section of the conduits 60 comprises a network of conduits branching from one or more manifolds 62 to service the individual compartments in the locker modules. The temperature in each of the compartments is controlled by controlling the rate of flow of the heat transfer fluid in the conduits by means of one or more control valves 66. The number of control valves 66 depends upon the number of compartments that need to be serviced by the heat transfer fluid. In one example, each individual compartment in the locker modules may have their own dedicated control valve 66 to control the rate of flow of heat fluid to each of the compartments.

In another example, the compartments may be grouped together depending on their storage temperature requirements and thus, the heat transfer fluid is controlled to a group of compartments rather than each individual compartment. In the latter example, less control valves 66 are necessary. Different arrangements or groupings of the compartments e.g. depending upon the temperature of storage are permissible in the present invention. For ease of servicing or replacement of the valves in an event of breakdown, the valves 66 can be located for easy access by a service engineer. For example, the valves 66 may be located behind a removable front panel.

Expansion of the lockable storage space 20 by adding new locker modules 20 to the system 10 can be easily carried out simply by retrofitting new sections of insulated pipework 64, as well as its respective set of manifolds 62 and control valves 66, to the far end of the conduits 60. For example and as discussed above, union type connectors can be used to connect to the existing pipe network in the conduits 60.

Some commonly used heat transfer fluids are toxic, e.g. ethylene glycol, and they are harmful to the environment if they are discharged directly down the drain. Therefore a bund 67 is installed underneath the distribution system within each locker module 20, as shown in FIGS. 6B-6E, to collect any heat transfer fluid discharge in case of a leak or pipe burst. The distribution system may comprise a leak detection system (not shown). When the leak detection system senses a leak in the distribution system or any of secondary (compartment) heat exchangers 68, it serves to send a fault signal to a central control unit for emergency repair and in serious cases may shut down heat transfer fluid circulation to the affected compartments. The leak detection system can be any sensor known to the person skilled in the art, for example level sensors and flow pressure sensors.

During the operation of a vapour compression refrigeration system, the condenser dissipates a significant amount of heat to the atmosphere and so the condenser is often exposed to aid heat dissipation. However the combination of open access and warmth creates an attractive habitable environment for rodents and other pests, and so pest infestation is often a serious issue e.g. for outdoor chest freezers. By locating the refrigeration system remotely to the locker modules, i.e. in the separate modular unit of refrigeration/heating plant module, the locker modules no longer require local ventilation. Thus the refrigeration system is physically separate to any of the locker modules. For example, the refrigeration system may be located adjacent to but separate to the locker modules. In addition the refrigeration system and the locker modules may be mounted onto a common platform 12. As a result substantially no habitable gaps may be left in the locker modules, e.g. between or adjacent to storage spaces or compartments. For example the back of locker modules can be sealed to prevent rodent and other pest infestation. In addition sealing the back of locker modules also enhances weather protection and improves security, for example it minimises the risk of theft and of damage from vandalism. The refrigeration plant module that is susceptible to rodent/pest infestation can also comprise protection mechanisms to prevent such infestation. The protection mechanism can be any mechanisms known to the person skilled in the art, for example screens and traps.

Figure 7:
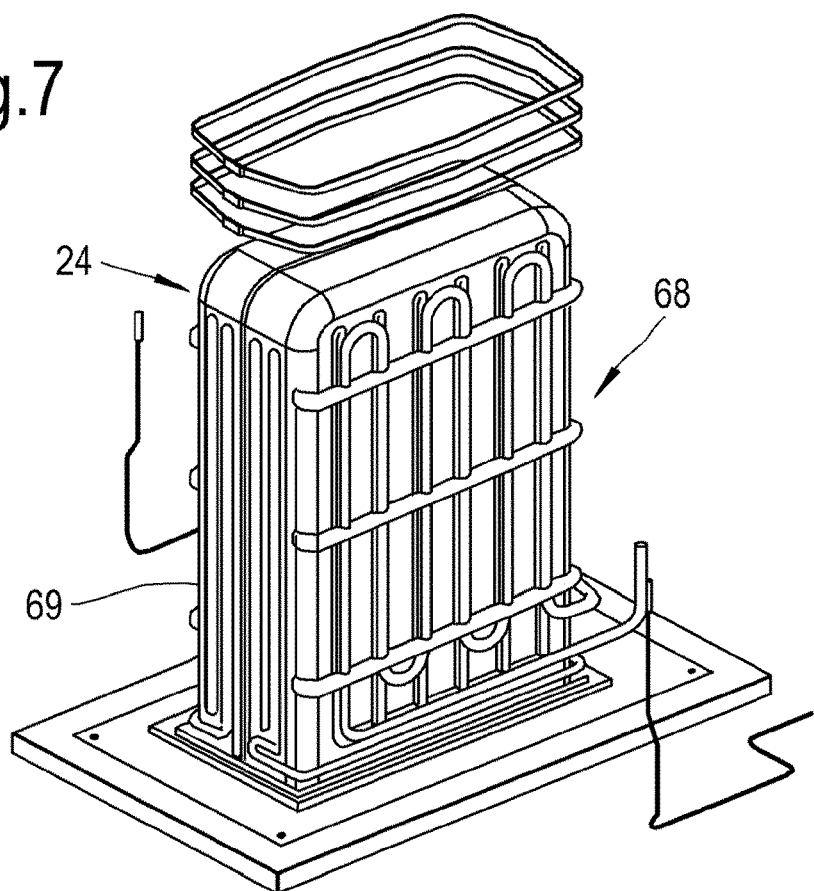
FIG. 7 is a perspective view showing a heat exchanger exterior to one of the compartments according to an embodiment of the present invention.

Heat exchange between the heat transfer fluids and the compartments 24 is by either transferring heat through the walls of the compartment 24 by means of conduction or by forced air circulation to a heat exchanger in or adjacent to the compartment to maintain the temperature in the compartment 24 by means of convection. As shown in FIG. 7, a secondary heat exchanger 68 in fluid communication with the heat transfer fluid from the distribution system 60a, 60b is attached or placed adjacent to the exterior of at least one wall of the compartment 24, for extracting heat from or supplying heat to the compartment via an appropriate heat transfer fluid. For example the secondary heat exchanger 68 may be connected to the cooling fluid distribution system 60a via the conduits 60. A second secondary heat exchanger (not shown in FIG. 7) may be attached to the same or a different wall of the compartment 24, similarly connected to the heating fluid distribution system via the conduits 60. In some cases, the secondary heat exchanger(s) may be placed adjacent to the interior of at least one wall of the compartment 24 to achieve a direct contact with the grocery goods placed within the compartment. This served to minimize the temperature difference across the walls of the compartment and prompts a more responsive temperature control. For the sake of simplicity, the heat exchanger 68 used in the arrangement without a secondary system is also referred to as the secondary heat exchanger 68, even when a secondary heat distribution system is not used.

The secondary heat exchanger 68 in the example shown in FIG. 7 is a heat exchanger coil commonly used in refrigerators. Heat is transferred through the walls of the compartments 24 via conduction and the amount of heat transfer is mainly governed by the quantity of heat transfer fluid circulating within the secondary heat exchanger 68. The temperature of grocery placed within the compartment 24 is mainly controlled by a combination of heat conduction through at least one wall of the compartment, and natural convection of air within the compartment 24. Temperature control is provided by controlling the rate of flow of the heat transfer fluid within the secondary heat exchanger 68 by one or more control valves 66. The control valves can be any flow regulating valves known to the person skilled in the art, for example globe valves, plug valves, gate valves, spool valves, needle valves, poppet valves, etc. In some cases temperature control is provided by the controlling the duration of the flow of heat transfer fluid, for example by manipulating the duration of opening/shutting of an on/off valve. The use of on/off valves in place of the flow regulating valves offers a lower capital cost and simpler control. The on/off valves can be any valves know the person skilled in the art, for example ball valves or poppet valves. The heat exchanger 68 is removably attached to the walls of the compartment 24 by any suitable fastening means known to the person skilled in the art, for example cable ties or brackets. This is advantageous for carrying out repairs, replacing a damaged heat exchanger or simply for cleaning purposes.

Alternatively or in combination with the heat exchanger 68 discussed above, FIG. 8 shows another example of a heat exchange mechanism. Rather than having a network of coils to conduct heat to at least one wall of the compartment 24, the heat exchanger in the alternative mechanism is based on a convective system whereby heated or cooled air is forced into the compartment 24 and the temperature of the air is regulated in the interior volume of the compartment by means of convention. A heat exchanger 74 in fluid communication with the relevant heat transfer fluid is housed in a duct 71 formed by partitioning off a rear portion of the compartment 24 within the surrounding insulation (not shown) so that heat is exchanged between the heat transfer fluid and the air in the housing 24. Also housed within the duct 71 is a fan 70 mounted to the partition wall above the heat exchanger so as to draw the cool or hot air from within the duct 71 into the interior volume of the compartment 24. An inlet slot is provided at the bottom of the partition wall so that the fan can draw air from the compartment 24 into the duct 71 and through the heat exchanger 74. As air flows past the heat exchanger 74 it cools or heats up, depending on the temperature of heat transfer fluid. A cyclic system is thus set up whereby heat is exchanged between the heat transfer fluid and the air in the compartment 24. Air that is warmed or cooled in the interior of the compartment 24 by heat loss/heat gain of the compartment and its grocery contents is then drawn out of the compartment 24 and passes over the heat exchanger 74 whereby it is respectively cooled or warmed as the case may be. The flow path of air is indicated by the arrows shown in FIG. 8, which transfers heat to or from the compartment 24 by forced convection. Both a "cold" and a "hot" heat exchanger respectively connected to the cooling fluid and heating fluid distribution systems may be mounted across the duct 71, e.g. in series. Alternatively, separate cold and hot flow paths may be integrated into the same secondary heat exchanger 74, which are connected to the cooling fluid distribution system 60a and the heating fluid distribution system 60b respectively. The fan rotation and hence the airflow may be reversed, depending upon whether heating or cooling is occurring, so as to maintain a more even temperature distribution on the compartment 24. The illustrated flow is for cooling, with cold air admitted to the top of the compartment, through which it sinks before being drawn into the bottom of the duct 71. Hot air would be admitted at the bottom of the compartment, for more uniform heating. Rather than a reversible fan, two separate fans may be provided, for moving the air in opposite directions through the partition. In some examples with a simpler design (not shown), the secondary heat exchanger(s) and fan(s) are enclosed within the compartment and thus the forced air circulation is kept within the compartment. To promote heat transfer a finned air/liquid secondary heat exchanger 74 may be used in place of the conduit 74 to increase the total heat transfer surface area. Storage temperature is primarily controlled by the regulation of the heat transfer fluid flowing through the heat exchanger 74 using the one or more control valves 66. Fan operation may be linked to opening of the control valves. In comparison to the heat exchanger system 68 described with reference to FIG. 7, heat transfer via forced air convection offers a more compact and rapid heating/cooling system. This is especially advantageous if there is rapid turnover (short intervals between re-stocking) of grocery shopping in the compartment 24 and/or large temperature changes required to attain the desired temperature at a re-stock (for example an "above ambient" order rapidly followed by a "frozen" order, or vice versa. The stock ordering and delivery system will ideally seek to minimise such scheduling, but it may not be possible to avoid this altogether. The valves 66 and fan 70 (where present) may be operated by the stock ordering and delivery system to regulate the temperature of the compartment 24 on a "just in time" basis, ready for reception of a new order. They may be set to an idle state upon access to the compartment by a customer.

Figure 8:
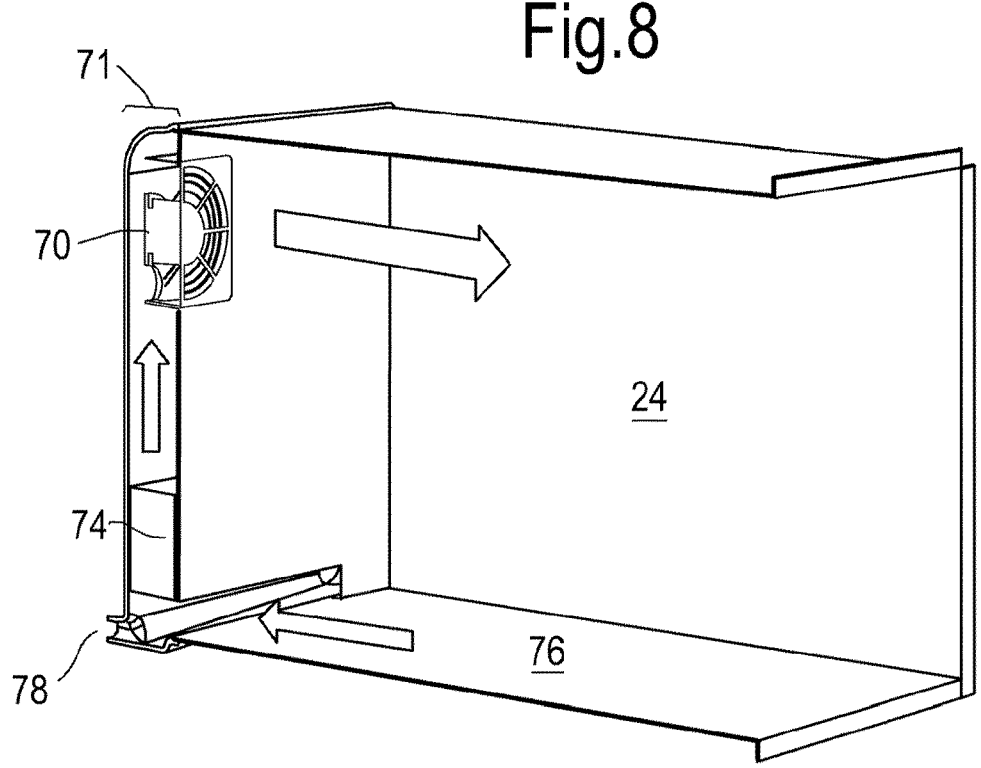
FIG. 8 is a perspective view showing a forced air circulation heat exchanger according to a second embodiment of the present invention.

The forced air circulation applied in FIG. 8 has another competitive advantage. It is also possible to carry out temperature control by adjusting the fan speed. By increasing the speed of the fan 70, more air is circulated around the compartment 24, thus increasing the rate of heat transfer. Ultimately the heat transfer coefficient is significantly improved. Whilst it is possible to control temperature by varying fan speed alone, more efficient temperature control can be achieved if this mechanism is used in tandem with controlling the rate of heat transfer fluid within the heat exchanger 74.

Alternatively the apparatus may maintain a set temperature in each of the compartments 24. In this case the temperature within each compartment is fixed at a set point to reduce the complexity of control system. For example the storage temperature in a compartment is dictated by the total surface area of the secondary heat exchanger installed on or in the said compartment, and thus the storage temperature is not switchable between frozen, chilled or ambient temperature. A "cold" secondary heat exchanger (and no "hot" heat exchanger) is installed in compartments for storage of chilled and frozen goods. Similarly, a "hot" secondary heat exchanger (and no "cold" heat exchanger) may only be installed for above-ambient compartments. In this case the secondary heat exchanger is omitted altogether in compartments providing ambient storage temperatures.

Additionally or alternatively the apparatus may be able to convert each of the compartments 24 for storing goods at a first temperature to a compartment 24 for storing goods at a second temperature: for example, for converting a compartment 24 that has been assigned for storing frozen goods to a compartment 24 for storing goods that requires a chilled or ambient or even elevated temperatures (such as for storing "hot" food). By the use of the heating system 240 discussed above, the heat transfer fluid is heated to provide a temperature in the compartment concerned, required for storing goods at a chilled or ambient temperature. In the case of storing goods at a chilled temperature, the heat transfer fluid is heated to a temperature in the range between substantially 1° C. to substantially 4° C. The time taken to convert a compartment 24 from a first temperature to a second temperature is dependent upon the temperature and rate of flow of the heat transfer fluid in the secondary system 260. For example, the higher the rate of flow and the higher the temperature of the heat transfer fluid in the secondary system 260, the shorter the time taken for the compartment 24 to be converted from a first, lower temperature to a second, higher temperature and vice versa. To enable faster heating, i.e. to prepare the compartment 24 for a new consignment requiring a higher storage temperature, electric heating elements 69 can be used instead of or in combination with the heat from the secondary heat exchanger 68, 74 (see FIGS. 7 and 8). Alternatively, electric heating elements can be used in place of the heating fluid distribution system 60b that distributes the heat transfer fluid from the heating system 240. A benefit of this approach is that the part of distribution system 60 (heating fluid distribution system 60b) carrying hot heat transfer fluid can be omitted altogether. Similarly, where compartments are not needed at above ambient temperatures and individual compartments are controlled to maintain a pre-set temperature across successive deliveries, both the heating system 240 and electric heaters may be omitted.

Figure 9D:
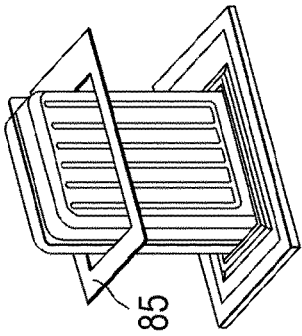
FIGS. 9A-9H are perspective views showing the stages of forming one of the compartments according to an embodiment of the present invention.
Figure 9C:
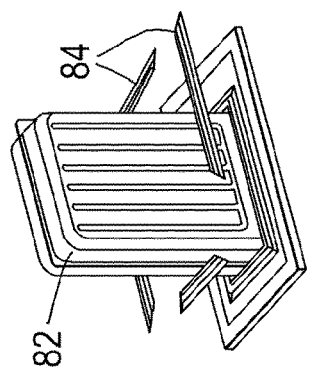
Figure 9B:
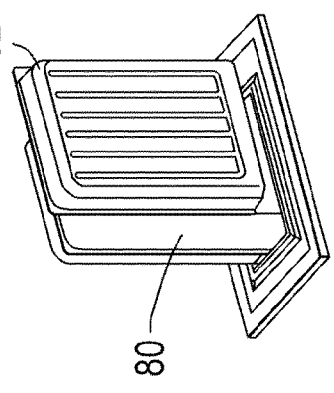
Figure 9A:
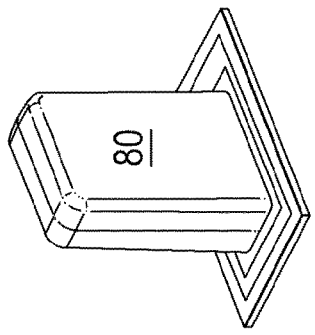

FIGS. 9A-9H show the stages in one illustrative method of forming the compartment. As shown in FIGS. 9A and 9B), two half shells of a liner material 82 are brought together around an inner former 80 (e.g. a wooden former) to form a compartment cavity. The edges of the two halves of the liner material 82 (along the medial plane of the compartment cavity) are sealed together e.g. by soldering or welding or by a suitable gasket or bead of adhesive or mastic applied between mating faces. The mating faces may be formed by a peripheral flange on each half shell as shown, between which the gasket etc. is applied. The co-operating flanges may be secured together by suitable fastenings such as clips, screws, rivets or straps. The secured half shells together form a cavity (compartment cavity) when the inner former 80 is subsequently removed. To fabricate the different sized compartments as demonstrated in FIG. 3A, different sized extensions 96 can be inserted between the two half shells of liner material 82 so that the height of the compartments is dictated by the height of the extension 96. The former maintains the structural integrity of the liner material 82 and any extension 96 during the assembly of the secondary heat exchanger 68 and/or heating element 69. Other methods of forming the pre-fabricated sheet metal cavity liner known in the art are permissible in the present invention. In the particular example, the liner halves are fabricated from a pressed sheet metal or other resilient and non-corrosive thermally conductive material known in the art, e.g. stainless steel or even various types of plastic material. Depending upon whether heat is transferred to each of the compartments through a secondary distribution system, the secondary heat exchanger(s) 68 is/are mounted to at least one exterior surface of the liner so that heat is conducted from/to the secondary heat exchanger through the liner material. In the case, where refrigerant from the refrigeration system is conveyed directly to the compartments by the at least one common distribution system, the secondary heat exchanger is the primary heat exchanger or evaporator and serves to exchange latent heat between the refrigerant and the compartment, i.e. each compartment in a locker module has a primary heat exchanger. In the particular embodiment shown in FIG. 9F, the secondary heat exchanger or evaporator 68 is mounted to one or more exterior surfaces of the liner. Preferably, the secondary heat exchanger or evaporator 68 substantially covers the surface area of one or more exterior walls having the greatest surface area. This is to maximise the heat transfer area of the compartment.

In an alternative embodiment of the present invention, the primary/secondary heat exchanger, more preferably, the evaporator is a plate evaporator 460 having an embossed surface whereby the refrigerant is contained between two plates of metal or plastic material to give a large cooling surface. Examples of metals include but are not limited to copper, aluminium (e.g. galvanized aluminium) or steel or a combination thereof or even plastic materials. Examples of construction of the plate evaporator involve using two sheets of plate material, a top plate and a bottom plate. Each or at least one of the plates has a relief or is embossed to form channels 462, e.g. in a series of "S" shapes, through which the refrigerant can flow. The plates of materials are welded or adhered together to create a sealed path for the flow of refrigerant. The channels 462 can also be formed by blow moulding whereby portions of the inner surface of the plates are prevented from being welded together to form a relief area prior to the plates being welded together. For example, a separating agent, e.g. graphite, as an image of the pattern of channels conveying the refrigerant in the evaporator plate is applied to the sheet metal plates which have been cut to size. Compressed air is forced between the plates causing the plate in the vicinity of the relief area to expand and thereby, creating raised channels for conveying the refrigerant around the plate. Another method of construction is sandwiching bare tubing between two conductive plates. The edges of the plates are welded together and the space between the plates evacuated allowing the pressure of the atmosphere to push tightly against the tubing so as to increase the contact between the surface of the tubing and the plates and thereby, providing a good thermal contact between the inner surface of the plates and the tubing carrying the refrigerant.

Figure 9E:
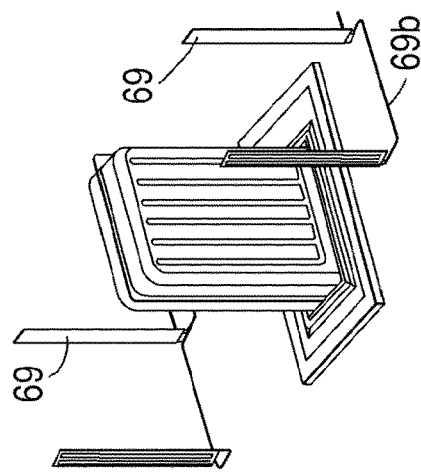
Figure 9F:
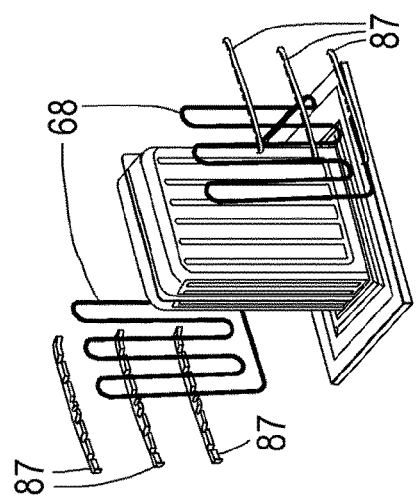
Figure 9G:
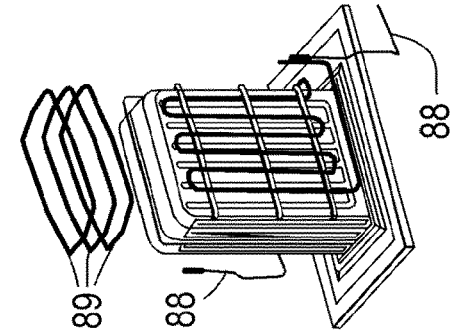
Figure 9H:
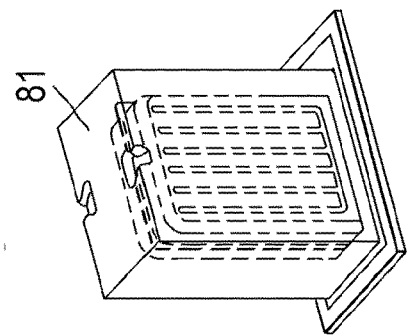
Figure 9I:
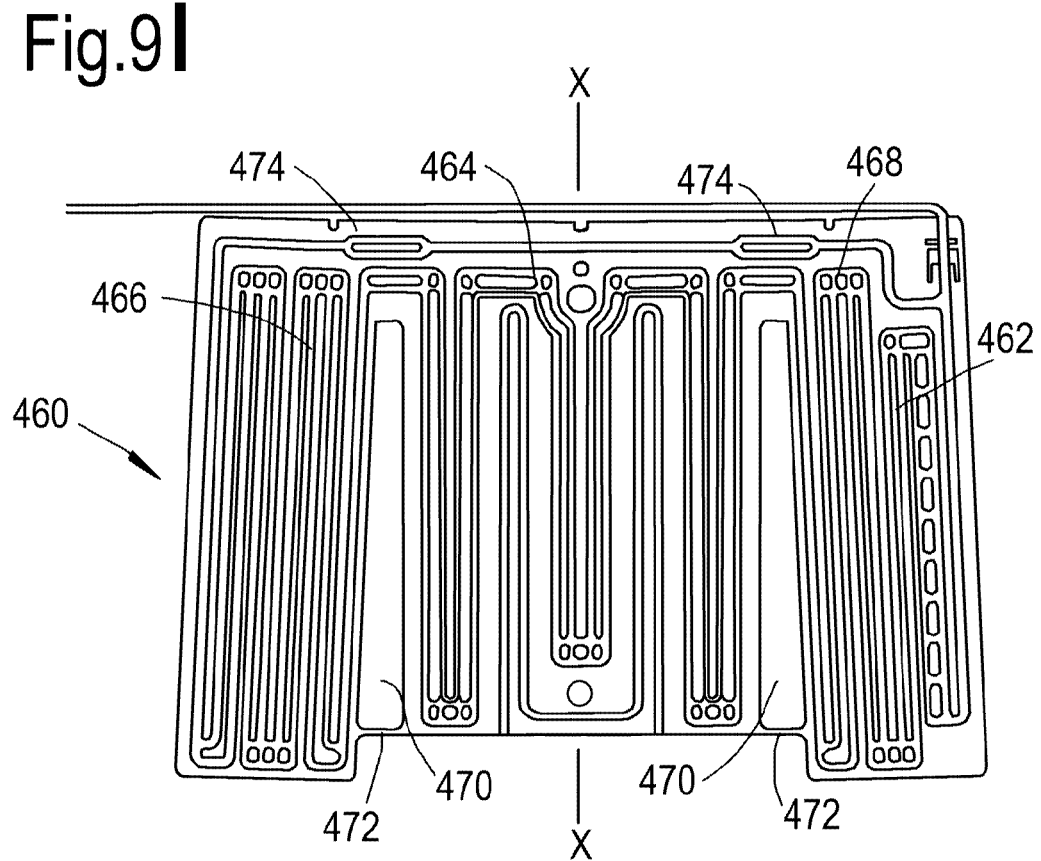
FIG. 9I is a top view of the evaporator plate in an unfolded configuration according to one embodiment of the present invention.
Figure 9J:
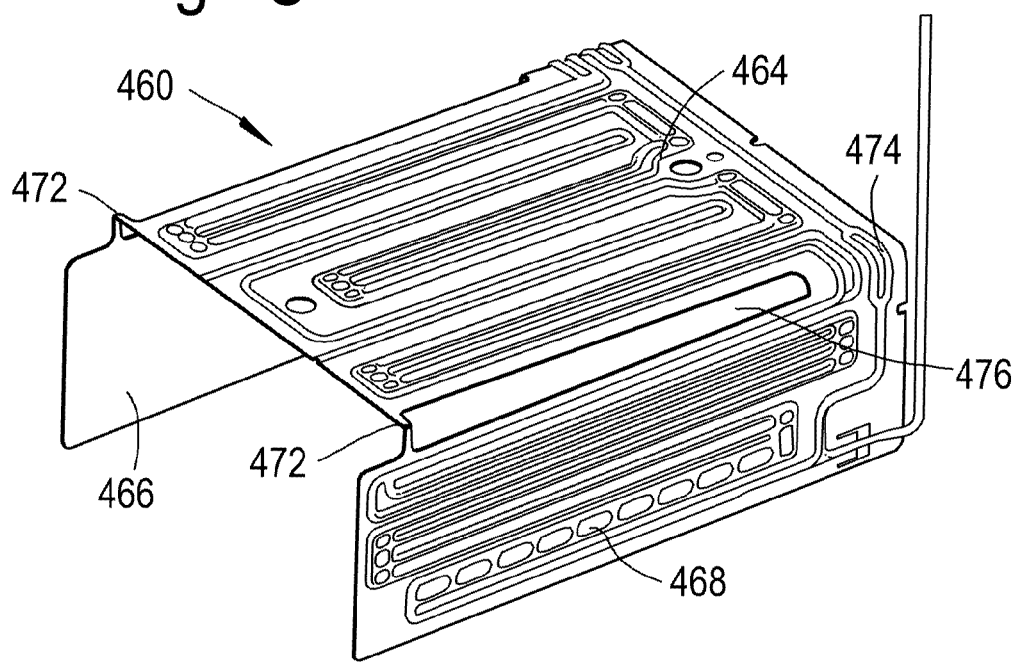
FIG. 9J is a perspective view of the evaporator plate of FIG. 9I in a folded configuration.

To enable the plate evaporator 460 to be mounted onto the liner of the compartment with minimum effort, the plate evaporator is designed to wrap around at least one exterior wall of the liner of the compartment. FIG. 9I shows a top plan view of the plate evaporator 460 in an unfolded state. In FIG. 9J, the evaporator comprises three portions, two foldable side portions 466, 468 either side of a middle portion 464, the middle 464 and each of the side portions 466, 468 comprises channels 462 for conveying refrigerant to and from the compressor. The foldable side portions 466, 468 are delineated from the middle portion 464 by a line of weakness 470. The line of weakness could be perforations or a weak point. In the particular embodiment, the line of weakness is cut out portions 470. The cut out portions 470 enables the side portions 466, 468 to be easily foldable relative to the middle portion 464 without excessive use of force or creasing of the plate. In forming the cut out portions, a substantial area of the plate at the junction between the middle portion 464 and the side portions 466, 468 are free of the channels. To prevent the side portions 466, 468 from twisting and to maintain its structural integrity whilst being folded, the junction between the middle portion 464 and the side portion 466, 468 is cut out to leave bridge portions 472, 474, preferably front 472 and back 474 bridge portions. In the particular embodiment shown in FIG. 9I, a portion is cut out at the junction between the middle portion and the side portion from the evaporator plate so as to leave bridge portions 472, 474 at the distal front and rear ends of the evaporator plate respectively. The front bridge portion 472 near or adjacent the mouth of the compartment maintains the structural integrity of the side portion when folded and the rear bridge portion 474 comprises channels so as to provide the necessary fluid communication between the channels in the middle portion 464 and the side portions 466, 468.

FIG. 9J shows the plate evaporator 460 in a folded configuration whereby the side portions 466, 468 are folded substantially perpendicular to the middle portion 464 for mounting onto the exterior surface of the liner of the compartment. In an unfolded configuration as shown in FIG. 9I, the evaporator plate 460 is not perfectly rectangular and the two side foldable portions 466, 468 slightly diverge away from the middle portion 464. This allows the bend 476 at the junction between the middle portion and the side portions to be tapered or fluted that runs from the rear end of the evaporator plate away from the mouth or open end of the compartment to the front end nearest the mouth of the compartment. The bend at the front 472 of the evaporator plate adjacent the mouth of the compartment is substantially 90°. The 90° bend enables the evaporator plate to accommodate insulation strips 84 described with reference to FIG. 9C below. As shown in FIG. 9C, the thermal insulation strips surrounding the mouth of the compartment are formed with mitre joints so that any two strips join together at a substantially 90° angle. The substantially 90° bend at the mouth of the compartment is able to accommodate the thermal insulation strips around the mouth of the compartment offering little gaps particularly at the junction between the middle portion and the side portion of the evaporator plate, i.e. it provides a perfect fit.

At the other (rear) end 474 of the evaporator plate away from the mouth of the compartment, the bend is more gentle or rounded so as to carry tubing or conduits linking the channels between the middle portion 464 and the side portions 466, 468 of the plate. The gentle bend prevents excessive creasing of the tubing in the vicinity of the bend. To mitigate creasing of the tubing, the channels at the bridge 474 between the side portion and the middle portion at the rear of the evaporator plate comprises a plurality of tubing or conduits so as to distribute or spread out the refrigerant across the bridge section 474 rather than just having a single larger pipe or tubing to accommodate the coolant (refrigerant) which is prone to creasing when bent.

In addition to integrating the evaporator channels 462 within the evaporator plate 460, the evaporator plate 460 also provides support for a heating system 478 to provide heat to the compartments for both defrosting purposes and/or to raise the temperature of the compartment during temperature control, e.g. from a compartment to storing frozen goods to storing goods at ambient or chilled temperature. In the particular embodiment, shown in FIG. 9K, at least one wall of the evaporator plate, e.g. the underside of the evaporator plate, is formed with heater tracks to accommodate and support the heater elements 478. The heater elements provide greater flexibility to control the air temperature inside the compartment rather than just cooling the compartment. The application of heat also reduces the time of waiting for the temperature inside the compartment to rise when a higher temperature is required, e.g., to convert a compartment for storing frozen goods to a compartment for storing goods at a chilled or even ambient temperature or even regulating the temperature of the compartment for storing goods at chilled temperature when the external temperature is below freezing temperature. In addition, the heater elements permit quick defrosting of ice built up around any of the inner walls of the compartment.

Figure 9L:
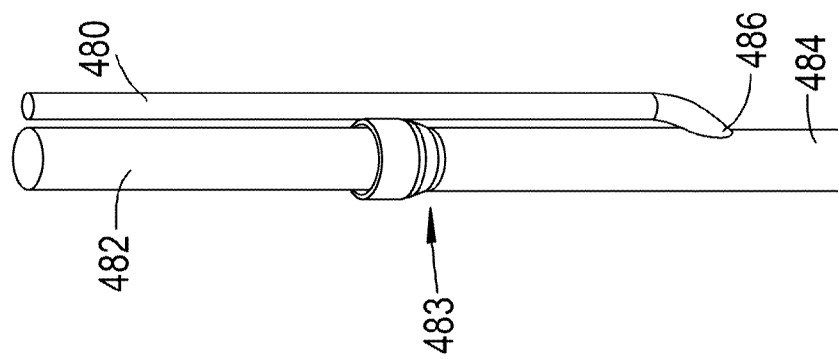
FIG. 9L is an exploded view of the suction line assembly of the refrigeration system, showing a suction line tube and opposed female keyed connector adapted to be joined to the end of the suction line and the capillary tube inside the connector.
Figure 9K:
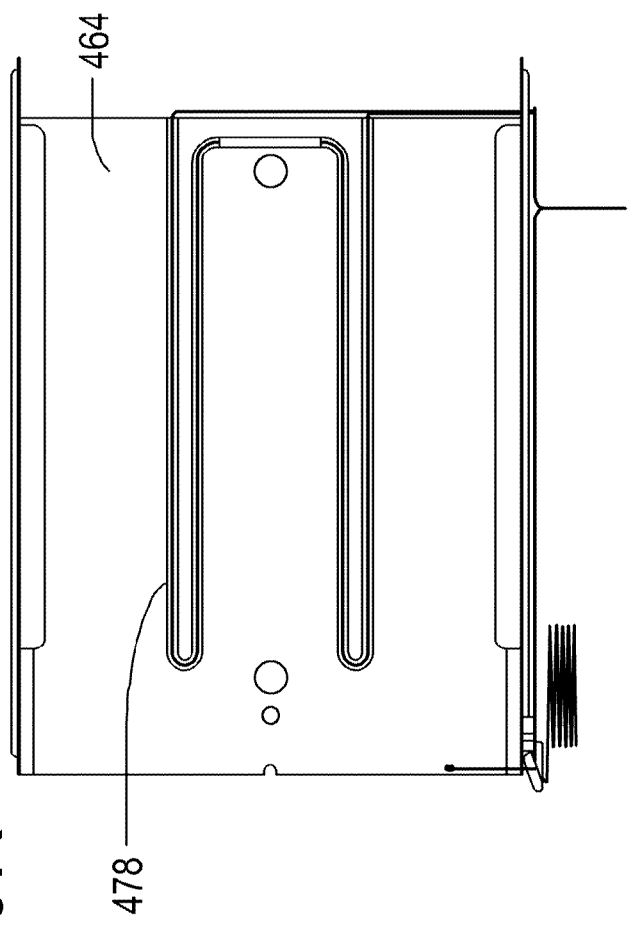
FIG. 9K is a bottom view of the evaporator plate showing the heater element.

Also shown in FIG. 9L are the inlet 480 and outlet 482 tubing from the condenser and to the compressor representing the refrigeration capillary tube 480 and the suction line 482 respectively merging into a single connector pipe 484 to form a suction line/capillary tube assembly 483. As shown in FIG. 9L the capillary tubing 480 enters inside the suction line/capillary tube assembly 483. By placing the capillary tube 480 inside the suction line assembly/capillary tube 483 will result in higher heat exchange between the relatively cool refrigerant vapour conveyed from the evaporator outlet through the suction line 482 to the compressor and the relatively warm liquid refrigerant conveyed from the condenser outlet through the capillary tube 480 to the evaporator inlet. Such heat exchange improves the thermodynamic efficiency of the refrigeration system by cooling the liquid refrigerant before it enters the evaporator. The greater the surface area with which the relatively warm liquid refrigerant in the capillary tube is in contact with the cool refrigerant vapour from the suction line assembly, the greater the heat exchange between the two noted mediums. Ideally, the suction line/capillary tube assembly are substantially coaxial or near enough substantially coaxial so as to permit heat transfer to occur across the complete capillary tube circumference. A typical material used for the suction line application is aluminium due to their low cost. However, aluminium, while suitable for the suction line application is generally unsuitable for the capillary tube application because the inside diameter of the capillary tube must be very small and controlled within tight tolerances. In the particular embodiment and in most cases, copper is used for this tight tolerance application.

Figure 9M:
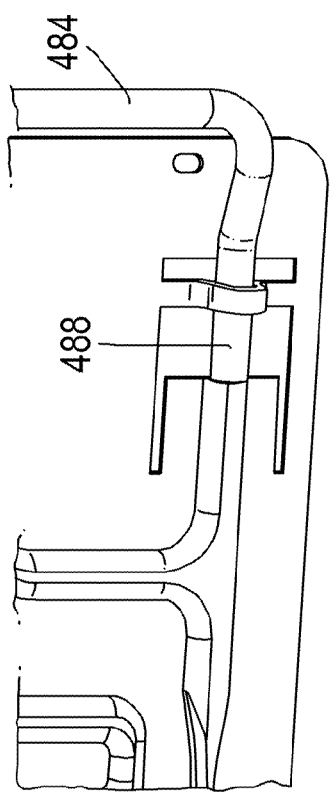
FIG. 9M is an exploded view of the suction line support of the brazed joint between the channels of the evaporator plate.

In particular embodiment shown in FIG. 9L, the suction line/capillary tube assembly is connected to the channels in the side portion of the evaporator plate via the single connector pipe 484. The connector pipe 484 comprises a main tubular portion and a larger diameter sleeve portion, having an inside diameter substantially similar to that of the suction line tube 482. Assembly of the connector pipe 484 to the suction line comprises the step of inserting an end of the suction line tube into the sleeve portion of the connector 484 until the end of the suction line tune butts up against the neck of the sleeve portion. Once the suction line tube is assembled onto the connector, they are joined together, preferably by brazing or soldering or even crimping to provide a hermetic fluid/pressure tight seal. The capillary tube 480 is inserted in a punched or drilled out aperture 486 in the connector tube and the capillary tube is brazed or welded in place at its point of entry. The other end of the connector tube 484 comprising the capillary tube/suction line assembly is brazed or soldered onto the outlet and inlet of the channels from the evaporator plate respectively (see FIG. 9M. A bracket or clamp 488 supports the brazed or soldered joint on the evaporator plate.

By integrating the cooling channels and optionally, the heating system into the evaporator plate allows quick and easy assembly of the evaporator plate onto at least one wall of the liner forming the compartment. To ensure a good heat exchange between the evaporator plate and the compartment, maximum contact between the surface area of the evaporator plate and the walls of the compartment liner is necessary. In the particular embodiment, the evaporator plate is adhered onto at least one wall of the compartment. The bottom face of the evaporator plate is covered with a layer of adhesive, e.g. a pressure sensitive adhesive, and the adhesive is protected from contamination by a release paper such as a silicone lined paper, e.g. Kraft paper. The process of application of the evaporator plate comprises the steps of removing the release paper so as to expose the underside adhesive and initially adhering the middle portion 464 of the plate onto a top or bottom wall of the compartment liner. Subsequent to adhering the middle portion of the evaporator plate onto the compartment wall, the side portions 266, 268 of the evaporator plate are then bent or folded around and adhered onto the adjacent side walls of the compartment liner. The advantage of this process is that it provides a one step and cost effective mounting process of the evaporator plate onto the compartment liner.

To prevent handling and thus, contamination of the pressure sensitive adhesive when coming into contact with the adhesive layer particularly when positioning the evaporator plate onto the compartment liner wall and thereby reducing its tackiness, a split line is made into the release paper so as to cause the release paper to split in two halves running across the length of the middle portion 464 along the axis X-X of the evaporator plate (see FIG. 9I). Thus, instead of removing the release paper as one piece to expose the entire adhesive surface, edges of the release paper is initially peeled from the centre of the evaporator plate along the split line X-X so as to create two opposing peeled edges. The two opposing edges are pulled apart so exposing the underlying adhesive covering of the middle portion whilst the adhesive on the side portions is still protected by the release paper. This allows handling of the side portions of the evaporator plate without contaminating the underlying adhesive. Subsequent to folding or bending the side portions of the evaporator plate onto the side of the compartment liner, the remaining portion of the release paper is pulled away from the side portions of the evaporator plate so exposing its underlying adhesive surface. At the same time the remaining portion of the release paper is removed from the side portions of the evaporator plate, the side portion of the evaporator plate is pressed onto the adjacent side wall of the compartment to activate the pressure sensitive adhesive.

Alternatively, the evaporator plate can be incorporated within the fabrication of the compartment liner 82, i.e. the evaporator plate is integrally formed within the compartment liner walls. This does away with the need to separately mount and fix the evaporator plate onto the compartment liner.

To prevent the build-up of condensation in the vicinity of the door 18, one or more thermal insulation strips 84 is mounted around the liner material 82 to offer a thermal break at the junction where the compartment is mounted to the frame 19, i.e. in the region where the open end of the cavity meets the door 18. A mounting bracket 85 or flange for mounting the compartment onto the frame 19 can then placed and secured over the insulation strips 84. The insulation strips 84 insulate the mounting bracket 85 from the cavity walls (liner material 82) used to transfer heat into the compartment and so prevents heat from the cold or hot areas of the compartment conducting to the other regions of the locker module such as the outer frame 19 or door 18 which, besides causing undesirable heat loss, could lead to icing up and seizing of the door 18 closed. As a further precaution to prevent the build of condensation or ice, a heating element 69b is placed into the insulation strip 84 to evaporate any moisture build-up. Actuation of the heating element 69b can be controlled by providing one or more temperature measuring devices for measuring the outside air temperature and correlating the outside air temperature to the dew point temperature at a given relative humidity. If the dew point temperature is above the temperature inside the compartment, particularly around the mouth of the compartment (in the vicinity of the thermal break or the thermal break itself), then this may be an indication that the conditions are ideal for the water vapour in the air to condense around and/or in the mouth of the compartment. To a first approximation, the relationship between the dewpoint temperature and the outside air temperature at a given relative humidity can be obtained from known psychrometric charts. The relative humidity will vary from season to season and from country to country. For example, the relative humidity in the United Kingdom approximately varies between 60% to 80%, and to a first approximation the average relative humidity can be taken to be 70%. Thus, taking the relationship between outside air temperature and dewpoint temperature at a relative humidity of 70%, at ambient temperature of 20° C., the dewpoint temperature at which water vapour will condense is about 15° C. Thus, by measuring the outside air temperature and correlating this temperature to the temperature inside of the compartment, the system can to a first approximation predict whether there will be a build-up of condensation in or around the mouth of the compartment. Take the example above, the heating element 69b will be actuated when the temperature in or around the mouth of the compartment drops below 15° C. Of course, as the outside temperature increases at a given humidity, the dewpoint temperature increases proportionally.

Each of the compartments within a storage space is preferably atmospherically sealed from the others at the door, with the use of sealing members. The sealing members are located on the door and/or adjacent the compartments, i.e. adjacent the mouth of the cavity. For a door securing multiple compartments, the sealing members can be formed from a single piece of material surrounding each of the compartments, or it can be formed by separate pieces of material for each sealing a compartment. The sealing members can be any seals known to the person skilled in the art, for example gaskets and hollow tubes made of foam or rubber, either magnetic or non-magnetic. A magnetic seal is not necessary, as the door will normally be held shut by the remotely programmable locking mechanism. The sealing members also prevent rain water ingress when the door is closed. Furthermore, a barrier may be installed at the mouth of cavity, in order to limit the amount of convection between the compartment and the atmosphere during opening and closing of doors. The barrier may be any devices known to the person skilled in the art, for example PVC strips and curtains.

In order to fabricate the locker modules on a large industrial scale and for economies of scale, one or more of the components of the locker modules are designed so as to enable the locker module, in particular the compartments to be easily assembled together with a minimum amount of procedural steps. In addition to mounting and fixing the evaporator plate to the compartment as discussed above, the present invention provides a thermal break 84 as discussed above that can be easily assembled onto the compartment, more particularly the door frame of the compartment. FIG. 11F shows a cross section of a strip of the thermal break 84 along the line Y-Y shown in FIG. 11G according to one embodiment of the present invention and FIG. 11E shows the thermal break 84 when assembled onto an edge of the compartment. The thermal break 84 is an extrusion profile comprising a front sealing face 500 that doubles up as a sealing member for cooperating with the door to seal the compartment from the external environment as well as to seal two or more compartments in a given locker module from each other. The back face 502 of the thermal break is profiled to comprise at least one engaging portion or limb to secure the thermal break onto an edge of the compartment. The back face 502 of the thermal break can be profiled to comprise one or more engaging portions. In the particular embodiment shown in FIG. 11E, the back face 502 of the thermal break is profiled to comprise two engaging portions or limbs 504, 506. Both engaging portions are profiled to flex so as to enable the thermal break to be assembled onto an edge of the compartment, in particular the edge of a door frame. In the particular embodiment, the first engaging portion 504 is profiled to engage with a door divider 508 separating two adjacent compartments in the locker module and the second engaging portion 506 is profiled to engage with the compartment edge. Both engaging portions are resiliently connected 510, 512 to the back face 502 of the thermal break.

The first engaging portion 504 comprises a resilient member having a curled cross-sectional profiled defining a resiliently openable slit 514 extending along the length of the thermal break strip. Both ends of the resiliently openable slit grips onto an edge of the door divider as shown in FIG. 11E. More specifically, the ends of the first engaging portion are spaced apart to form an open end 514 that is shaped to receive the edge of the door divider. The first engaging portion cooperates with back face of the sealing member to accommodate a heater, e.g. heater element. In the particular embodiment as shown in FIG. 11F, the first engaging portion cooperates with back face of the sealing member to provide a, depression 516, more preferably a substantially circular cross-sectional depression 516 for reception of a heating element/wire 69b.

The second engaging portion 506 of the thermal break is profiled to engage with the edge of the compartment. As shown in FIG. 11F, the second engaging has a substantially 'L' shaped cross-sectional profile that is pivotally connected to the rear face of the sealing member of the thermal break by a connection member 512. The connection between the substantially 'L' shaped cross-sectional profile and the rear face of the sealing member functions as a fulcrum allowing the second engaging portion to pivot about the fulcrum. The connection member 512 and the substantially "L" shaped member cooperate to define a resiliently openable slot 518 for reception of the edge of the compartment.

The ends 520 of the thermal break strips are mitred to enable the thermal break strips to be assembled around the circumferential mouth of the compartment. To lock the first engaging portion 504 and the second engaging portion 506 into engagement with the edge of the compartment/door divider, the profiles of the first and second engaging portions cooperate to receive 522 a connector 524 for joining any two thermal break strips together at a mitred joint. The connector 524 is inserted within the connector receiving portion 522 (see FIG. 11F) to prevent the first and second engaging portions from substantially pivoting about its connection 510, 512 at the rear face of the sealing member and therefore, locks the first and second engaging portions into engagement with the edge of the compartment. For example, the substantially "L" shaped profile comprises a tail end 526 that cooperates with the connector to prevent the substantially "L" shaped profile from pivoting about its fulcrum. Likewise, the connector once inserted into the connector receiving portion 522 also prevents the first engaging portion from pivoting about its connection 510 and thereby, providing additional locking of the first engaging portion into engagement with the edge of the door divider.

Assembling the thermal break strips around the circumference of the mouth of the compartment comprises the step of engaging the first and second engaging portions onto an edge of the compartment and the door divider. Subsequent to assembling the thermal break strip onto an edge of the compartment/door divider, the first and second engaging portions are locked into engagement with the edge of the door by inserting the connector into the connector receiving portion 522 at the mitred ends of the strip. This is repeated for the other thermal break strips around the circumferential mouth of the compartment. Prior to or subsequent to assembling the thermal break strips around the circumferential mouth of the compartment, the heater element 69b is secured to the rear face of the sealing member by inserting the heater element into the heater element receptacle 516 for accommodating the heater element. The edge of the compartment locks and prevents the heater element from escaping.

To further limit the heat transfer to atmosphere, the doors are insulated by an insulation layer. The insulation can be of any suitable type applied or installed by any suitable method known to the person skilled in the art, for example, mineral wools, polystyrene, foam insulation or a vacuum chamber. As an example, the insulation layer is sandwiched and sealed between metal claddings with a peripheral thermal break, and the insulation layer is sufficiently thick to ensure minimal heat conduction.

Figure 10:
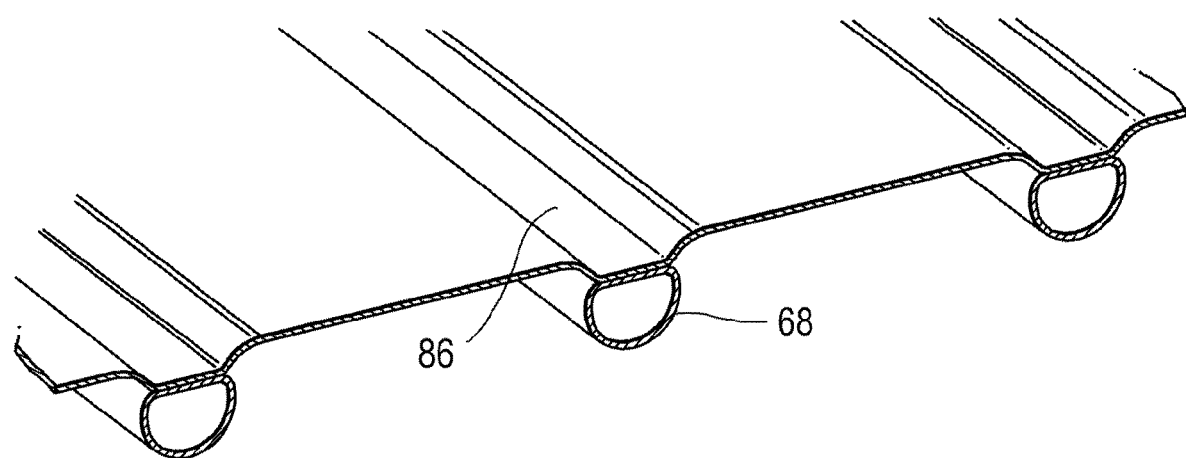
FIG. 10 is a perspective view showing a channel of the secondary heat exchanger with a D shaped cross-section substantially flat against the wall of the cavity, according to an embodiment of the present invention.

In order to maximise the surface area contact of the channels of the secondary heat exchanger 68 with the wall of the cavity and also to facilitate alignment of the channels, grooves can be formed in the cavity liner corresponding to the shape of the secondary heat exchanger 68, for placing the secondary heat exchanger into. An alternative method for maximising the surface area contact includes fabricating the channels with a D shaped cross-section as shown in FIG. 10 such that the straight or flat portion of the channels is able to lie substantially flat against the cavity liner. A recess 86 can also be formed into the cavity liner of the compartment adjacent and opposite each channel 68 to provide a localised region for ice build-up. In the absence of the recess ice would tend to extend across the surface of the cavity liner resulting in the build-up of a sheet of ice extending in a plane across the interior surface of the compartment cavity. This in turn results in a reduction in the efficiency of the secondary heat exchanger 68 to transfer heat through the cavity liner of the compartment.

In order to monitor the storage temperature in the cavity, at least one temperature sensing device 88 is attached onto the exterior surface on the liner of each cavity, as shown in the example given in FIG. 11A. The temperature sensing device is preferably a thermistor such as 10 k NTC sensors but it can be any type of sensor known to the person skilled in the art, for example thermocouples, RTDs, thermostats and infrared sensors. Ideally the temperature sensing device 88 is placed at an equal distance between two channels 68 to avoid measurement of the temperature of the heat transfer fluid if it is placed too close to any one particular channel resulting in a temperature measurement non-responsive to the temperature of the interior volume of the cavity. A retainer 87 is used to ensure proper alignment of the channels 68 and the temperature sensing device 88 and other cabling with respect to each other. In some other examples the at least one temperature sensing device 88 is attached to the interior surface of the cavity liner, in order to achieve a more accurate measurement of air temperature within the cavity. In this case, a retainer or other fastening means such as positioning clips (not shown) may be used for securing the temperature sensing device 88. A fastening band or strap is used to secure the secondary heat exchangers 68 around one or more exterior surfaces of the cavity liner by virtue of securing the retainer 87 to the exterior of the liner, as shown in FIG. 9G. Optionally and in addition to mounting the secondary heat exchanger 68 to the exterior surface of the liner, one or more electric heating elements 69 may be mounted to an exterior surface of the liner as shown in FIG. 9E. In some examples (not shown) the electric heating elements (e.g. trace heaters) may be mounted adjacent to the recess 86, a typical site for ice built-up, to reduce the time required for defrosting. Once the secondary heat exchanger 68 and/or the electric heating elements 69 are mounted to one or more exterior surfaces of the liner, the assembly is placed inside a larger mould 90 whilst ensuring that the open end of the cavity remains exposed and insulation material is injection moulded in the gap formed between the cavity liner and the interior surface of the mould so as to partially embed the secondary heat exchanger 68 and/or electric heating elements 69 and/or cabling within the insulation material whilst ensuring that the connection points to the secondary heat exchanger 68 and/or the electric heating elements 69 are left exposed. Finally as shown in FIG. 11B, when the insulation has cured, the former and mould are removed from the assembly so revealing the finished compartment.

Temperature Control

As shown in FIG. 11B, each compartment module comprises a slave PCB 89 for carrying out active temperature control in the associated compartment. For example the temperature sensing device 88 provides instantaneous temperature readout to the slave PCB 89. The slave PCB compares the difference between the instantaneous temperature measured by the temperature sensing device 88 and a set point specified by the temperature control module.

The slave PCB carries out temperature adjustment using any methods described earlier, e.g. controlling the heat transfer fluid flow and/or amount of air circulation. Alternatively the slave PCB 89 may communicate with the temperature control module, which directly operates the valves and/or the fans for temperature control. In the particular embodiment, the slave PCB controller carries out temperature adjustment by controlling the operation of the valves to control the flow of the heat transfer fluid, e.g. refrigerant to each of the compartments. In the particular embodiment, the valves are located in the refrigeration system on top of the locker module as shown in FIG. 4F. However, for ease of explanation the valves in FIGS. 6F to 6H are shown to the side of the locker module adjacent each respective compartment it serves. FIG. 6I is a flowchart showing the steps in setting the temperature of each of the compartments to a desired set point temperature, $T_{S.P.}$, by controlling the operation of the valves. Initially during the preparation phase of the compartment 145a, the controller is set to the desired set point temperature, $T_{S.P.}$. Once the set point temperature 145b has been set, the system measures the air temperature, T, inside the compartment 145c and correlates 145d the air temperature, T, with the desired set point temperature, $T_{S.P.}$. If the temperature, T, is greater than the set point temperature, the system "calls for more cooling" by operating the corresponding valve to that compartment, i.e. opening the valve 145e to allow the flow of the refrigerant to the heat exchanger or evaporator of the compartment. The system continues to call for more "cooling" until the air temperature inside the compartment has reached the desired set point temperature 145f. Optionally (not shown in FIG. 6I), if the air temperature, T, of the compartment is significantly less than the desired set point temperature, $T_{S.P.}$, for example in the event that the compartment is being prepped for storage of goods at ambient temperature from previously storing goods at frozen temperature or the external outside temperature is lower the desired set point temperature, then one or more heaters, (e.g. electric heaters or heat transfer fluid as discussed above) can be used to raise the compartment temperature to the desired set point temperature. The slave PCB 89 feeds the temperature data to a processor housed within the access control module 40 which monitors the status of the compartments and controls access to the compartments by controlling the operation of the remotely programmable locking mechanism. The processor can be any processor known in the art. In the particular embodiment, the processor is a personal computer.

To cater for the temperature differential between the temperature of the evaporator or the heat exchanger adjacent (evaporator) at least one wall of the compartment and the air temperature of the compartment, each compartment comprises at least two temperature sensing devices 88a and 88b (see FIG. 4G). In the particular embodiment, the two temperature sensing devices are fed to the PCB 89. Alternatively, it can be fed to the processor in the access control module 40. The first temperature sensing device 88a closely represents the air temperature inside the compartment and the second temperature sensing device 88b is placed adjacent the heat exchanger or evaporator of the compartment and substantially represents the temperature of the heat exchanger or evaporator. Due to thermal lag between the temperature of the air in the compartment and the temperature of the heat exchanger which is driving the lowering of the temperature of the air in the compartment, this temperature differential can vary significantly particularly when the compartment calls from more cooling during the initial preparation phase of the compartment or when the door is opened. The temperature differential reduces significantly when the air temperature inside the compartment has reached a steady equilibrium state. It is paramount to keep this temperature differential as small as possible as this leads to "surface freezing", where the wall of the compartment is at a much lower temperature than the air temperature inside the compartment and causes surface freezing of perishable goods such as vegetables, e.g. lettuce, resting on the wall of the compartment which are destined to be stored under chilled conditions. Other problems include, the wall temperature of the compartment "running way" from the air temperature causing excessive cooling of the walls when the slave PCB is trying to maintain the air temperature at a steady state.

To mitigate this problem, the system aims to keep this temperature differential between the air temperature inside the compartment and the wall temperature as small as possible by monitoring the temperature readings from both temperature sensing devices, 88a and 88b and controlling the rate at which the compartment cools so as to establish an equilibrium state or as close as possible during every cooling step between the inside air temperature and the wall, each time the system calls from more "cooling". In one embodiment of the present invention, the system via the slave PCB, calls for cooling by operating the valves to control the flow of the refrigerant to the compartment in small increments so as to allow the internal air temperature of the compartment to "catch up" with the wall temperature of the compartment, i.e. the system "pulses" the cooling in small steps.

In another embodiment of the present invention, the system calls for cooling to the evaporator in small "pulses" by opening and closing the valves to the evaporator in small predetermined steps. The closing of the valve interrupts the flow of the refrigerant to the evaporator and the opening of the valve re-establishes flow of the heat transfer fluid to the evaporator. This provides short "bursts" of cooling to the air inside the compartment and the cooling "bursts" are repeated until the air inside the compartment has reached its desired set point temperature. The "pulses" of cooling is set in the controller by having an upper differential temperature, $T_{up}$ by which the valves are opened to allow the flow of refrigerant and a lower differential temperature, $T_{lower}$ by which the valves are closed to interrupt the flow of the refrigerant. $T_{up}$ and $T_{lower}$ may be any temperature depending on the cooling condition required. For example when a chilled storage temperature (i.e., $T_{S.P.} \approx 4°$ C.) is required, the upper differential temperature, $T_{up}$, is set to substantially $-7°$ C. and the lower differential temperature, $T_{lower}$, is set to substantially $-10°$ C. Thus, when the system is calling for cooling in a particular compartment, the corresponding valve to that compartment is opened to allow the flow of refrigerant. When the temperature of the evaporator measured by the second temperature sensing device 88b reaches the lower differential temperature, $T_{lower}$, (e.g. $-10°$ C.) the valve closes so as to interrupt the flow of refrigerant to the evaporator and to allow the evaporator to absorb heat form the interior of the compartment and thus, cool the compartment. As soon as the evaporator warms up to the upper differential temperature, $T_{up}$, (e.g. $-7°$ C.), the valve opens again to re-establish the flow of refrigerant and thus, to allow the evaporator to cool again to the lower differential temperature. This "pulsing" of cooling is repeated until the air temperature inside the compartment has reached it desired set point temperature. During each pulsing step, there is an inherent delay to allow the evaporator temperature to warm up by absorbing heat from the air inside the compartment. The smaller the pulsing steps, the smaller the differential temperature and thus, the shorter the delay time and vice versa. In some cases such "pulsing" temperature control is not adopted in compartments for storage of frozen goods since the said frozen goods are not susceptible to surface freezing. On the other hand, in some embodiments the "pulsing" temperature control described may be applied to prevent excessive cooling of compartment walls. To prevent the first temperature sensing device 88a being influenced by the temperature of the refrigerant in the heat exchanger which is at a much lower temperature than the air temperature inside the compartment, particularly when the system is calling for "cooling" during the preparation phase of the compartment, the temperature sensing device 88a is placed as far away from the heat exchanger or evaporator as possible. In the particular embodiment, the first temperature sensing device 88a is placed on the rear wall of the compartment opposite the door of the corresponding lockable storage space and slightly protruding to provide a good representation of the air temperature inside the compartment and the second temperature sensing device 88b is placed adjacent the heat exchanger of the compartment.

The converse is equally applicable when warming the compartment, e.g. preparing a compartment at frozen temperature for a delivery of goods at ambient temperature or maintaining the compartment at a chilled temperature when the outside temperature is below freezing temperature. In the converse situation, one or more electric heaters are "pulsed"

so that the temperature of the air inside the compartment rises to its desired set point temperature. Again as discussed above and to keep consistency with the terminology with the cooling, there is an upper differential temperature, $T_{up}$, by which the electric heaters are switched off and a lower differential temperature, $T_{lower}$, by which the electric heaters are switched on. In this case, as the walls of the compartment heats up to the upper differential temperature, $T_{up}$, the electric heater(s) are switched off to wait for the air inside the compartment to absorb heat from the wall of the compartment and thus, cool down to the lower differential temperature, $T_{lower}$, before the electric heater(s) are switched on again. This cycle is repeated until the inside compartment air warms to the desired set point temperature (e.g. ambient temperature). As the walls of the compartment adjacent the electric heaters gradually heats up in comparison to the air inside the compartment, there is an inherent differential temperature between the wall temperature of the compartment and the inside air temperature. Thus, any delicate food products (e.g. fruit) would "scorch" when in contact with any excessive heated wall of the compartment. To mitigate this effect, very low power electric heaters are used to prevent excessive heating of the walls of the compartment. In the particular embodiment, 100 watts rated heaters are used to provide gentle heating to the compartment. The heat will conduct through the walls of the compartment and cause the internal air temperature to rise. When the air temperature is equal to the desired set point temperature, the heater element will be switched off.

Alternatively, the "pulsing" of the heaters may not be necessary if very low power rating heaters are used, e.g. 100 watts. One or more electric heaters can be switched on until the air temperature of the compartment rises to its desired set point temperature and then the electric heater is switched off.

The slave PCB 89 is protected from the environment by adhering a PCB cover 89C to the compartments (e.g. to the rear face of the mounting flange 85) with a self-adhesive gasket 89b.

In the event, that the temperature measurement inside the compartment is above the desired set point temperature for a significant period of time as a result of a fault in the temperature sensing device or the PCB controller or both or even the valves for controlling the flow of the refrigerant, any food stored in the compartment at a chilled or frozen temperature could perish and therefore, compromise food safety. In such an event, an alarm condition will be sent to the processor and the processor is programmed deny access to the food goods by preventing release of the remotely programmable locking mechanism of the door. The variation of the temperature of the compartment above or below the desired set point temperature and the duration of time by which food products should be kept at the wrong temperature before food safety is compromised is dictated by the Food Safety Standards. This applies to both inadvertent elevation in the temperature of the compartment, e.g. for storage of chilled or frozen goods, or reduction in temperature of the compartment, e.g. for storage of goods at ambient temperature. Thus, when the temperature of the compartment containing perishable goods is above or below the desired set point temperature by a predetermined amount and/or for a predetermined length of time, the controller will deny access to the affected compartment by remotely actuating the remotely programmable locking mechanism. In the particular embodiment and according to Food Safety Standards in the UK, an alarm condition will be generated when the air temperature inside the compartment is 8° C. above the desired set point temperature for a period of 90 minutes.

If the compartments 24 are kept at a frozen temperature for a prolonged period their walls are susceptible to frosting, which in severe cases can cease air circulation due to ice build-up. Thus defrosting is periodically carried out by heating the frozen compartments 24 for a short period of time. During defrosting the accumulated ice melts into liquid, and subsequently flows along a sloped base 76 towards a drain 78 situated at the back or front of the locker module 20, as shown in FIG. 8. The drain 78 also clears spillage and rain water ingress, and so prevents flooding and minimises damage or bacterial spoilage to the stored groceries. Locating the drain towards the front of the compartment permits regular clearing of any accumulated water by service personal every time the storage spaces are inspected or when deliveries made. Goods may be placed on a wire mesh or perforated shelf (not shown) suspended just above the base of the compartments, so to offer further protection against flood spoilage. The heating system 240 can also be used to set the temperature of at least one compartment 24 in the lockable storage space 22 above ambient and therefore, offers a lockable storage space 22 for hot food delivery. For example, hot meals, e.g. cooked foods or snacks can delivered to the compartment 24 and kept warm for a short period of time, before being picked up by the customer. For the purpose of the present invention, a substantially above ambient temperature is a temperature above substantially 21° C., more preferably above 50° C.

The difference in storage temperatures between adjacent compartments can be significant. For example the difference can be in excess of 40° C. between the above ambient 30 and frozen compartment 28. To minimise heat transfer among compartments 24, 28, 30 and also to prevent the interior temperature of each compartment being influenced by the temperature of the surrounding environment, the partitions 26 and at least one of the external wall of each of the compartments 24 are insulated.

Refrigeration Capacity Control

In operation, the cooling duty to each of the lockable storage spaces (22) in any given locker module may vary significantly throughout the different stages of operation. For example, while minimal cooling is required to maintain the compartments in the lockable storage space (22) at a steady temperature, the demand of heat transfer fluid reaches its peak during the preparation phase, i.e., cooling from an ambient to frozen temperature. In some cases, the refrigeration system are not sized to provide simultaneous cooling to all of the compartments, instead they are only designed to handle a fraction of the maximum load, so as to ensure the system remains efficient during normal operation, i.e. minor point adjustment and temperature holding. However, as the demand for cooling a number of compartments increases, this puts an increase burden on the refrigeration system to deliver the relevant cooling to each of the compartments. This is particularly the case where the primary system acts as a refrigeration system that feeds refrigerant directly to the compartments as described with reference to FIGS. 4C to 4G. In order to achieve adequate cooling to each of the compartments serviced by the refrigeration system, the pressure difference of the refrigerant in the conduit or piping of the distribution system supplying each of the compartments and the refrigerant in the condenser is critical. A metering device such as an expansion valve or a capillary system allows the refrigerant to lower its pressure so that the liquid refrigerant vapourises in the conduit or piping (evaporator) of the distribution system supplying each of the compartments. This change of state results in the cooling effect as is commonly known in the art.

Figure 4H:
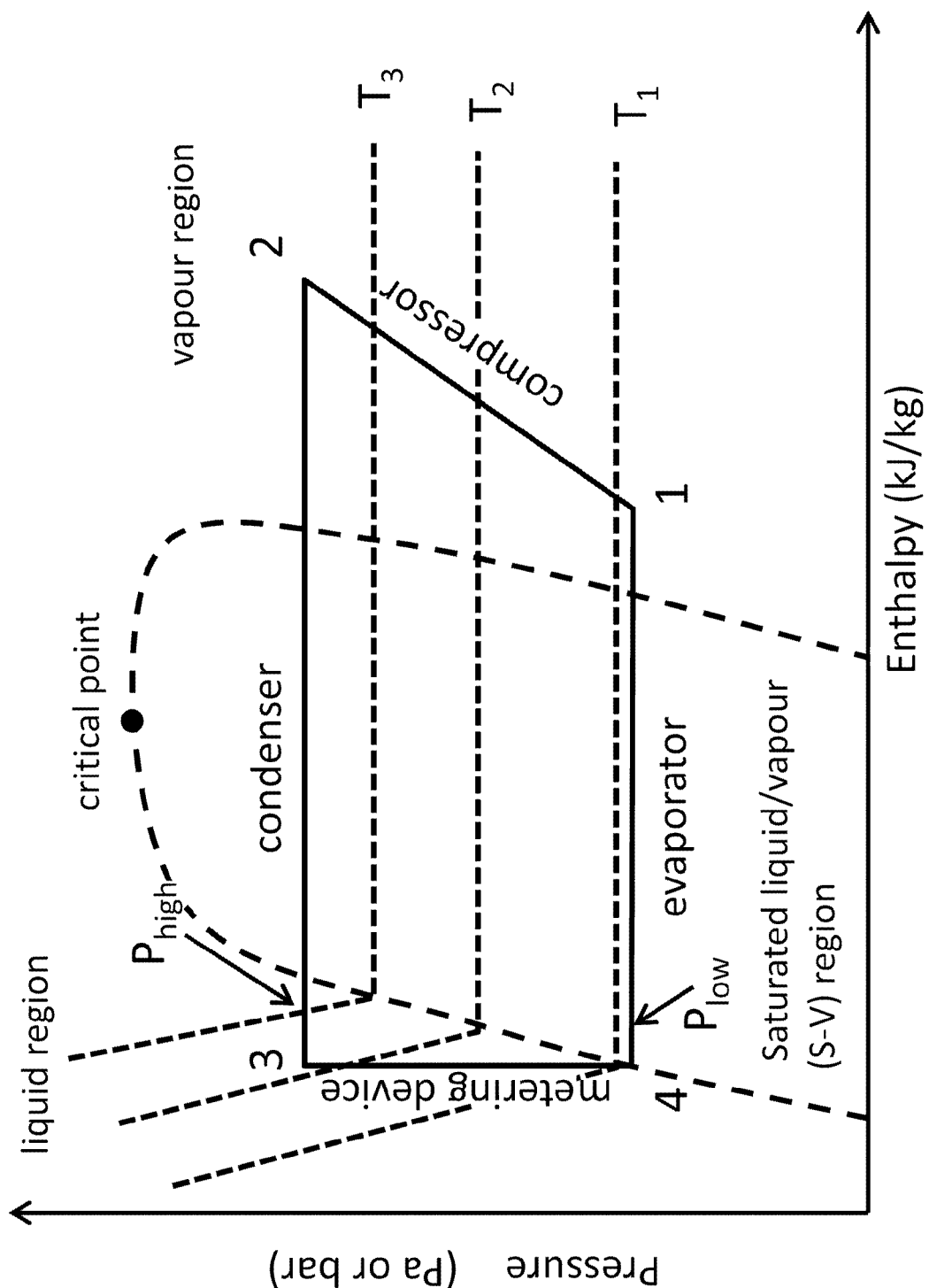
FIG. 4H is perspective view of a pressure-enthalpy diagram of a refrigeration cycle with a sub-cooled liquid region.

For the purposes of explanation consider the schematic diagram of a pressure enthalpy (p-H) diagram shown in FIG. 4H showing the main pressure and energy changes of the refrigerant during a typical refrigeration cycle. As is commonly known in the art, the refrigerant under the Saturated Liquid (S-V) line or dome exists as a mixture of vapour and liquid. To the left of the critical point and above the S-V line the refrigerant exists as a liquid. To the right of the critical point and above the S-V line the refrigerant exists as a superheated vapour. In FIG. 4H, the refrigeration cycle follow the path shown by the arrows represented by the lines 1 to 2 to 3 to 4.

Stage 1 to 2: represents the compressor stage and is where the refrigerant in gas form is compressed causing a rise in pressure and thus, enthalpy which equals the energy put into the refrigerant gas by the compressor.

Stage 2 to 3: the hot superheated refrigerant gas enters the condenser and is where the gas is condensed to a liquid. In reality the refrigerant exits in the condenser in liquid/vapour form.

Stage 3 to 4: Still at high pressure, the liquid/vapour passes through a metering device (e.g. capillary tube) causing the pressure of the liquid/vapour refrigerant to be reduced without any significant change in enthalpy. At stage 3, the refrigerant pressure is at the high pressure side, $P_{high}$ of the evaporator and once it has passed through the metering device, the pressure drops to the low pressure side, $P_{low}$.

Stage 4 to 1: the low pressure liquid refrigerant at $P_{low}$ evaporates to a gas and enthalpy (heat energy) is extracted from the compartments.

Also shown in FIG. 4H are lines of constant temperature, $T_1$, $T_2$ and $T_3$, which represents the temperature of the refrigerant. For example for a R290 type refrigerant at approximately 1 bar pressure the temperature, $T_1$, of the refrigerant would be around −30° C. and at 10 bar pressure, the temperature, $T_3$, of the refrigerant would be above ambient temperature. It is believed that the cooling capacity of a refrigeration system is dependent upon the pressure difference, $P_{high}-P_{low}$, across the metering device. The pressure difference across the metering device is also dependent upon the level of constriction provided by the metering device. Take the example, of a small diameter capillary tube as the metering device offering a significant constriction of the flow of refrigerant in the refrigeration circuit (see FIG. 4H), the pressure difference of the refrigerant across the metering device (between the higher pressure side indicated at point 3 and the low pressure side at point 4 in FIG. 4H) would be relatively higher than if the constriction offered by the capillary tube is reduced, i.e. opened up. This is reflected in the p-H diagram in FIG. 4H, by a drop in the refrigerant pressure at the high pressure side (stages 3 to 4) and an increase in the refrigerant pressure at the low pressure side (stages 4 to 1). The extent of the pressure difference between the high pressure side and the low pressure side of the metering device is thus dependent upon the degree of the constriction provided by the metering device whereby increasing this constriction offered by the metering device, increases the pressure difference across the capillary tube and vice versa. In some cases the size of constriction may be varied by a pressure regulating valve in place of the metering device; such pressure regulating valve known to the person in the art, for example needle valves or poppet valves. The degree of constriction will also affect the mass flow rate of the refrigerant through the metering device. By increasing the constriction offered by the capillary tube, reduces the mass flow rate of the refrigerant. This increase in the pressure difference is reflected in an increase in the energy (enthalpy) extracted from the compartment as reflected by the different lines of constant temperature in the p-H diagram in FIG. 4F. Likewise, a reduction in the pressure difference will result in a reduction in the energy extracted from the compartment. A reduction in the energy extracted from the compartment would inevitably result in a reduction in a drop in temperature of the compartment, i.e. a lesser cooling effect, as demonstrated by equation 1 below.

$$\Delta Q = UA\Delta T \qquad (1)$$

Where:

$\Delta Q$ is the heat energy extraction (kJ)

U is the overall heat transfer coefficient across the wall of evaporator (kJ/m²K)

A is the surface area of the evaporator (m²) in contact with the compartments $\Delta T$ is the temperature difference between the refrigerant and compartment (K)

The greater the temperature difference, i.e. the lower the refrigerant temperature, the more heat energy, $\Delta Q$, may be extracted from the compartment.

Cooling a group of large number of compartments will have a significant impact on the cooling performance since the manifold distributes refrigerant to each of the compartments in a parallel configuration. Thus, increasing the number of flow passages reduces the supplied refrigerant pressure distribution network and thus, the rate by which the amount of refrigerant is evaporated to each of the compartments. As a result, the attainable refrigerant temperature in each of the individual compartments is accordingly reduced, and so greatly affecting the heat transfer efficiency. As the number of compartments increases, the number of metering devices servicing each of the compartments also increases. The greater the number of metering devices has the effect of reducing total constriction offered by all of the combined metering devices. This is because the liquid refrigerant is distributed amongst a greater number of the metering devices (capillaries) resulting in a greater mass flow rate of the refrigerant to the compressor. As discussed above, a reduction in the constriction in the refrigeration circuit will result in a smaller pressure difference between the higher pressure side and the low pressure side across the metering device, which in turn results in a reduction in the extraction of heat energy from each of the compartments, i.e. each of the compartments would not be cooled as much. The greater the number of metering devices that the refrigerant flows through, the smaller the pressure drop of the refrigerant across each of the combined metering devices and therefore, the smaller the cooling capacity of the refrigeration system. Thus, a balance has to be taken between the number of metering devices in the refrigeration circuit (i.e. number of compartments in the group) and the size of the compressor so as to provide adequate cooling to each of the compartments serviced by the compressor.

In sizing up the compressor and thus, the cooling duty of the refrigeration system, a number of variables are taken into consideration namely:— a) required operating temperature of each of the compartments. In the embodiment of the present invention, each of the compartments can store goods at a controlled ambient temperature (substantially 4° C. to substantially 21° C.), chilled temperature (substantially 1° C. to substantially 4° C.) and/or frozen temperature (substantially −21° C. to substantially −18° C.).

b) the external environmental condition to take into account the different seasonal temperatures, e.g. summer and winter, and the location of the locker modules, e.g. in areas of hot climate versus areas of cold climate. To cover the different external environmental conditions, a temperature range is taken between the two extremes, −20° C. and +40° C.

c) usage or demand of each of the compartments in a given locker module. Since the locker module is destined to be used to deliver grocery to customers in anticipation of demand from a grocery store (e.g supermarket), the compressor is sized to cater for a relatively high demand.

d) Thermal mass of the grocery. For example cooling of meat as opposed to ice cream.

One way to meet the demand for cooling to each of the compartments is to reduce the number of compartments serviced by the refrigeration system or increase the number of refrigeration systems servicing the locker module. However, this may not be economically feasible and energy efficient since an increased number of refrigeration systems would need to be running to meet the cooling demand for all of the compartments in a locker module. As this represents only a small portion of the cooling duty for any particular compartment, once the desired set point temperature of the compartment has been reached, a number of the refrigeration systems would either remain idle or not operate at its full capacity leading to over capacity.

To mitigate the impact of increased cooling demand, dedicated control valves 66 are installed so that the cooling in individual compartments in a locker module can be carried out sequentially or in any sequence of compartments. For example, if a locker module comprises a total group of six compartments and they all require cooling from an ambient storage condition to a frozen storage condition, cooling them simultaneously in anticipation of demand from a delivery centre, as shown in FIG. 6F, is inefficient as the temperature difference between the evaporating refrigerant and the compartments are relatively small, i.e. the refrigerant is distributed very thinly or sparsely across the six compartments and therefore, no one compartment in the locker module has an adequate supply of evaporating refrigerant to cause any significant cooling effect, i.e. the mass flow rate of the refrigerant through the combined metering devices increases. In reality, the compartments nearest the compressor are initially supplied with the refrigerant leaving those compartments furthest away from the compressor being deprived of adequate refrigerant to cause any measureable change in temperature. By controlling the distribution of the refrigerant (via a controller), more particularly prioritising the distribution of the refrigerant to each of the compartments in a controlled sequence depending on their temperature requirements (e.g. frozen or chilled) removes the problem of distributing the refrigerant thinly across too many compartments at once. For a given refrigeration capacity and thus, size of compressor, a cooling sequence is implemented whereby the supply of refrigerant are limited to cool a predetermined number of compartments or sub-group of compartments, e.g. single compartment or a pair of compartments, at any given time by closing one or more valves, as shown in FIG. 6G. As a result, an adequate supply of refrigerant pressure may be maintained and thus, enable a much more effective heat transfer process. The selected compartments may be cooled until the temperature has reached its desired set point before the heat transfer fluid is distributed to the next set of compartments along the cooling sequence by closing its corresponding valves and opening the next set of valves in the sequence as shown in FIG. 6H.

Cooling each of the compartments individually until they reached their desired set point temperature before moving onto the next compartment in the sequence in the locker module would put a lot of strain on the compressor and therefore, shorten its lifespan since the compressor would have to work harder, repeatedly cooling each of the compartments to its desired set point temperature. Equally, the time that has elapsed cooling all of the compartments in the locker module in turn until the temperature of each of the compartments has reached its desired set point temperature in sequence (which could be six compartments) can be significant, e.g. approximately 20 minutes. This time delay may run the risk that the first cooled compartment in the sequence has been left waiting too long before seeing a repeat cooling activity which may result in its internal temperature to rise beyond its set point temperature and thus, any products in the compartments would be compromised.

To mitigate this effect, alternatively, the heat transfer fluid may be periodically supplied to each of the compartments through a switching sequence, i.e. supplied to a select number of compartments for a predetermined amount of time, e.g. 90 seconds or ten minutes, before it is sent (or switched) to the next set of one or more compartments in the cooling sequence, even though the temperature in the first set of selected compartments have not fully reached its set point. In this way, no single compartment in the locker module has been left without refrigeration for a long period of time and therefore, is prevented from heating up. The cycle of cooling to each of the compartments in the sub group is continued until one or all of the compartments in the sub group have reached its desired set point temperature. When one of the compartments, for example, has reached its desired set point temperature, this frees up refrigeration capacity for another compartment calling for cooling to join the sub group for cooling. This pattern of cooling is repeated until all of the compartments calling for cooling has reached its desired set point temperature. Subsequent to this the demand on the refrigeration capacity would reduce as the temperature of the compartments are regulated or maintained at their desired set point temperature. Alternatively, if the measured temperature in the first set (sub-group) of selected one or more compartments has reached its set point before expiry of the fixed period of time, the heat transfer fluid will then be diverted to the next set of one or more (sub-group) compartments instead by closing one or more of its corresponding valves and opening the next set of valves in the sequence.

The cooling sequence may be prioritised to favour compartments that has a higher priority and may be defined according to criteria such as the degree of cooling required, e.g. temperature difference between the desired set point temperature and the compartment temperature, as well as the delivery schedule, i.e. the occupancy of the compartments and the time remaining until the next delivery. The prioritising step allows the lockable temperature controlled apparatus to take advantage of the limited cooling capacity of the refrigeration system and therefore, is energy efficient particularly during the initial preparation phase of the compartment, i.e. when the compartment is calling for cooling. This is because the initial preparation phase of the compartments represents only a small portion of the cooling duty for any particular compartment. Once the desired set point temperature of the compartment has been reached, a number of the refrigeration systems would either remain idle or not operate at its full capacity leading to over capacity. As a result, multiple refrigeration systems are not required to provide cooling to all of the compartments in the lockable temperature controlled apparatus and the apparatus can be used with one refrigeration system, thus reducing the cost to manufacture the apparatus and size of the apparatus.

Initially, the system (via a processor in the access control module 40) monitors the status of the control valves and thus, the capacity of the refrigeration system to determine whether any of the valves are open or close. In the particular embodiment and based on the cooling duty and demand of the compartments discussed above, the size of the compressor and thus, the supply of refrigerant is limited to two compartments in a locker module to ensure that an adequate supply of refrigerant reaches those compartments and thus, maintain an adequate refrigerant pressure for cooling. The number of compartments in a cooling sequence is not just limited to two compartments but any number of compartments can be limited to the supply of refrigerant in a cooling cycle as long as there is enough refrigeration capacity to maintain an adequate refrigerant pressure to each of the serviced compartments for cooling purposes. For the purpose of explanation of the prioritising process in the particular embodiment of the present invention, the supply of refrigerant in a cooling cycle is limited two compartments in a locker module at any one time.

The compressor is conveniently sized so as to meet the increased cooling duty of the refrigeration system as discussed above but also limits overcapacity of the refrigeration system as a result of reduced demand if only one compartment (for example) is calling for cooling resulting in a significant pressure drop on the lower pressure side of the evaporator actuating the LP pressure switch to stop the compressor if the pressure drops below a predetermined value. To mitigate overcapacity of the refrigeration system as a result of reduced demand and to make sure that a limited number of compartments (in this example, one compartment) has reached is desired set point temperature, a bypass valve is used to bypass some of the refrigerant through a bypass circuit so as to maintain a balanced refrigerant pressure, i.e. a balanced mass flow rate of the refrigerant to the compressor. As the compressor is sized for a predetermined number of compartments or sub group of compartments in the locker module, in this example, two compartments, at any given time, and if there are only two compartments calling for cooling and thus, when one of the compartments has reached its desired set point temperature, the valve to that compressor is closed. There then becomes an overcapacity in the refrigerant system since the remaining one compartment is still calling for cooling. In this situation, the bypass valve is activated to bypass some of the refrigerant to the compressor so as to maintain a balanced refrigeration pressure until the only compartment calling for cooling has reached its desired set point temperature or an additional compartment begins to call for cooling. Each time there is an overcapacity in the refrigeration system, the bypass valve is activated to bypass some of the refrigerant so as to maintain a balanced refrigerant pressure. Further explanation of the operation of the bypass system is discussed below.

Since the refrigeration system has only sufficient "capacity" to cool a limited number of compartments at any one time in a locker module, further demand for cooling additional compartments would necessitate that the compartments be placed in a queueing system. By placing one or more of the available compartments which are "calling for cooling" in a queue (those compartments that want to be "calling for cooling"), then when capacity becomes available the system can direct the cooling to the additional available compartments in the queue. Thus, when an order is made to cool one or more compartments in the locker module, the system checks the capacity of the refrigeration system, i.e. monitors the status of the valves, and if, in this example, two of the valves are currently open, cooling of any additional compartments would need to be placed in a queue until a valve becomes available since only a predetermined number of compartments (and thus, valves open to allow the flow of refrigerant) can be cooled at any one time. When there is no capacity in the refrigeration system, the system places the available compartments in a queue and prioritises the supply of refrigerant to the compartments in the queue by controlling the operation of the valves to the corresponding compartments depending on their urgency criteria which can be either their temperature requirement and/or the length of time the compartment has been waiting in the queue.

In the case where the system prioritises the compartments based on waiting time, each time a compartment is placed in the queue to initialise a "call for cooling" the system starts a timer or counting clock to determine their respective waiting times until when refrigeration capacity becomes available (i.e. one of the open valves closes freeing up refrigeration capacity). Alternatively, the system notes the time each valve becomes operational. Take the example where the system requires that two additional compartments would need to be cooled for a delivery of chilled and frozen goods respectively at different times and the refrigeration capacity is at its limit since two compartments are already calling for cooling, the system places the compartments in a queue and starts a timer to measure their respective waiting times until capacity becomes available. The system monitors the internal temperature of the available compartments and if there is more than one compartment available, the system chooses the available compartment that closely matches the required set point temperature for storage of chilled or frozen goods. Choosing the availability of compartments also takes into account those compartments that are under an alarm condition and simply ignores those compartments.

Referring to the example above where there is a first available compartment having a first measured internal temperature of $T_1$ and a desired set point temperature $T_{S.P.1}$ for storage of chilled goods, the first available compartment is placed in a queuing system at $t_1$. If the system then calls for an additional second compartment to be cooled for a delivery of frozen goods, the system monitors the status of the valves to see if there is any capacity in the refrigerant (i.e. if any of the compartments in the locker module are available for cooling) and if not, the system places the second available compartment in the queue at time, $t_2$. Take the internal measured temperature of the second available compartment to be $T_2$ and the desired set point temperature to be $T_{S.P.2}$ (in this case for storing frozen goods). When capacity in the refrigerant becomes available at time, t, (i.e. one of the open valves closes freeing up refrigeration capacity), the system selects the next available compartment in the queue for cooling depending on either the length of their waiting times in the queue or their immediate temperature requirement.

In the case where the system prioritises the available compartments in the queue based on waiting time, the system chooses the available compartment that has been waiting the longest. In the above example, the first available compartment has been waiting for time, $t-t_1$, and the second available compartment has been waiting for time, $t-t_2$. Since the waiting time, $t-t_1$, for the first available compartment is greater than the waiting time, $t-t_2$, for the second available compartment, the valve to the first available compartment will open first to allow the flow of refrigerant to that compartment before the second available compartment is cooled.

Alternatively, the system can prioritise the available compartments in the queue based on the immediate temperature requirement whereby the available compartment having the greatest temperature difference (differential temperature) between the measured internal compartment temperature and the desired set point temperature takes priority. Referring to the above example, the first available compartment is destined to store chilled goods and thus, at time, t, when refrigeration capacity becomes available, the difference, $(T_1-T_{S.P.1})$, between the internal measured temperature, $T_1$ of the compartment and the desired set point temperature, $T_{S.P.1}$ is a measure of their immediate temperature requirement or differential temperature. Since the second available compartment is destined to store frozen goods, and subject to its internal measured air temperature, $T_2$, then its immediate temperature requirement, $(T_2-T_{S.P.2})$ would be greater than the immediate temperature requirement, $(T_1-T_{S.P.1})$, of the first available compartment. As a result, the system prioritises the second available compartment for cooling prior to the first available compartment by opening its corresponding valve to allow the flow of refrigerant.

Figures 4, 11D:
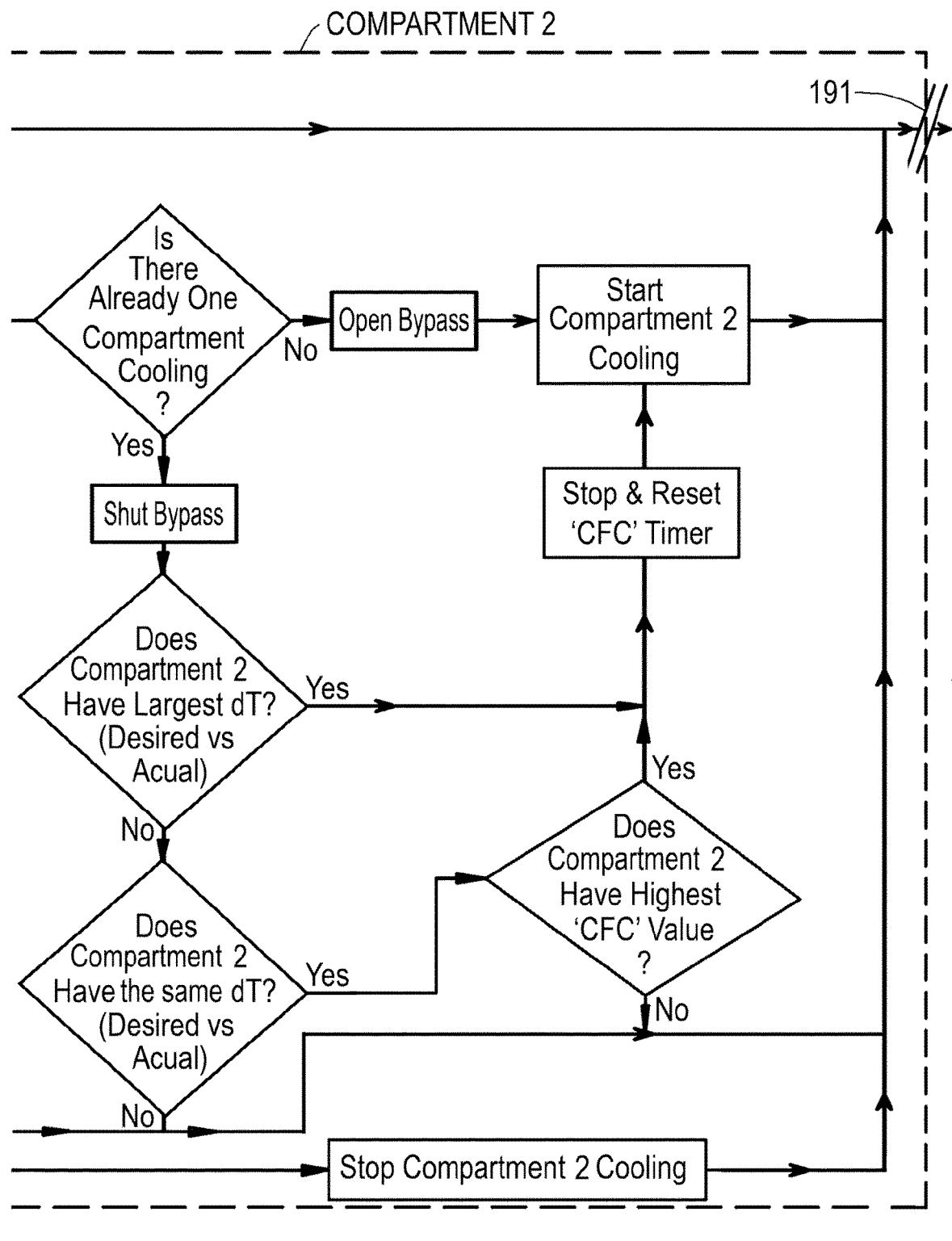

FIGS. 11D-1 through 11D-4 show a flow diagram showing the sequence of steps in prioritising the supply of refrigerant and thus, cooling to each of the compartments in a locker module according to one embodiment of the present invention. Although, FIGS. 11D-1 through 11D-4 show two compartments (C1 and C2), the same steps are used to check the availability of the other compartments in the locker module. As a result, the operational steps in all of the compartments in a locker module are identical as the system runs through all of the available compartments in a locker module and decides which one of them is available for cooling. For ease of explanation, only two or sub-group of compartments (C1 and C2) are shown in FIGS. 11D-1 through 11D-4. Identical procedural steps apply to successive compartments to the right of FIGS. 11D-1 through 11D-4 shown by the broken line 191. In FIGS. 11D-1 through 11D-4, the system decides 190a if Compartment 1 (C1) and/or Compartment 2 (C2) are available for cooling and so on. The system begins by checking whether Compartment 1 is currently operational 190a, i.e. it is under a cooling regime. If Compartment 1 is currently operational, the system then checks 190c whether the temperature of C1 has reached its desired set point temperature, $T_{S.P.}$. If the answer is "yes", then the cooling to C1 is stopped 190e by closing the corresponding valve to C1. If the answer is "no", then the system decides whether the set time period for cooling for C1 has elapsed 190d. In the particular embodiment, cooling is periodically shared between a predetermined number of compartments (in this example two compartments, C1 and C2) for a predetermined amount of time. This is in comparison to both compartments sharing the refrigeration capacity at the same time. By periodically sharing the cooling in a sequential manner between two compartments, each of the two compartments gets a "burst" of cooling for a predetermined amount of time before it switches to the next compartment even though neither of the compartments has reached its desired set point temperature. This sequential cycling of the call for cooling is repeated until one or both compartments (in this case, C1 and C2) reaches their desired set point temperature, i.e. the valve to the refrigerant for C1 opens for a predetermined amount of time before it closes and opens the valve to C2 for the same amount of time before it switches back again to C1. In the particular embodiment, the valves to two compartments are each periodically opened and closed for four minutes. If the set time period has elapsed ('yes), the system stops cooling C1 and switches to cooling C2 until the set time period has elapsed for C2 and so on. If the set time period has not lapsed (i.e. "no") for C1, then the system continues to call for cooling until either the temperature of C1 has reached the set point temperature or its set time period has elapsed. If one or both of the compartments (either C1 or C2) in the pair has reached its desired set point temperature, then the controller moves onto the next available compartment that has been waiting in the queue. In all cases, cooling is carried out to a predetermined number of compartments, e.g. pairs of compartments, at any one time.

To service all of the compartments in a locker module and to prioritise the cooling to those compartments based on the above criteria, the controller activates the corresponding valves to provide cooling to the first two compartments for a period of time. Once the period of time has lapsed, cooling is stopped. The controller then decides the next two compartments in greatest need of cooling based on the above criteria. The controller activates the next two valves to provide cooling to the next two corresponding compartments for a defined period of time. This cycle repeats until the cooling requirement in all but one compartment is satisfied, i.e. the desired temperature is reached in all other compartments so that a pair of compartments calling for cooling cannot be established, i.e. there is over capacity in the refrigeration system.

Referring back to the first step 190b, if C1 is not cooling (i.e. not calling for cooling), then the system checks 190f whether the temperature of C1 is above desired set point temperature. If the answer is "yes" (i.e. the temperature of C1 is above the desired set point temperature), then the system checks 190g whether there are already two compartments operational (i.e. cooling). If there are already two compartments operational, then the system places C1 in a queue until when refrigeration capacity becomes available and checks 190h whether the timer for determining the waiting time of C1 has been started. If the timer has not been started, then the system starts the timer 190i to determine the waiting time for C1. The system then repeats the checking process for the other compartments in the locker module.

If there are no two compartments cooling, i.e. the compartments in the locker module is immediately available, then the system checks 190j whether there is one compartment in the locker module operational (calling for cooling). This is to check whether or not all of the compartments in the locker module are available. If there is no one compartment under a cooling cycle or phase (all of the compartments are available for cooling), then there is excess capacity in the refrigeration system since the compressor continues to circulate (draw) refrigerant but if all of the valves to the compartments are closed, no refrigerant is able to be circulated into the compressor and an alarm condition will sound. In reality, the LP pressure will activate the compressor to stop.

As the compressor has been sized to cater for a fraction or sub group of the compartments in a locker module (e.g. a pair of compartments at any one time), in this particular embodiment two compartments, there will still be an occasion when there is overcapacity in the refrigeration system. Take the example, where the compressor is sized to provide cooling for two or more compartments as discussed above. If only one compartment is calling for cooling because one of the compartments in the pair has reached its desired set point temperature, then there is over capacity in the refrigeration system and the compressor will continually draw refrigerant at the same capacity if there are two or more compartments calling for cooling. The resultant effect is that the pressure at the low pressure side of the evaporator within the suction line 64 will drop significantly causing excessive cooling of the compartment. To prevent the pressure of the refrigerant within suction line 65 from dropping too low causing excessive cooling of the compartment, a low pressure sensor switch (LP sensor) is activated to cause the compressor to stop prematurely when the refrigerant pressure drops below a predetermined value and preventing the only one compartment reaching its desired set point temperature.

To mitigate this effect and to keep the refrigeration cycle continuous (i.e. to prevent the compressor continuously stopping and starting each time the refrigerant pressure drops too low as a result of only a limited number of compartments, e.g. one compartment, calling for cooling), a bypass valve 66b (see FIG. 4G) as discussed above is introduced amongst the series of valves 66 so as to bypass 190n the refrigerant past the compartments and keep the refrigeration cycle continuous. In the particular embodiment, the system is set up or programmed to supply refrigerant to two compartments at any one time in a periodic or sequential or cyclic manner as discussed above. Thus, when there is only one compartment calling for cooling and there is overcapacity in the refrigeration system, the bypass valve is activated to balance or maintain the refrigerant pressure in the refrigeration system. The cooling cycle is continued until the compartment calling for cooling has reached its desired set point temperature. At which point if there is no compartments calling for cooling, both the bypass valve and the valve to the compartment is closed so preventing further flow of refrigerant to the compartment. The compressor continues to run evacuating the suction line 65, lowering the refrigerant pressure to a point where the LP sensor switch is activated and stops the compressor until the temperature within a compartment rises above the desired set point temperature and therefore, calling for cooling. When any one compartment is calling for cooling, the suction line pressure increases due to the flow of refrigerant. This in turn causes the Low Pressure sensor switch to then be deactivated causing the compressor to re-start. Sizing the compressor to cool more than two compartments at any one time, would result in the need to bypass more refrigerant if only a limited number of compartments (e.g. one compartment) is calling for cooling resulting in an increase number of bypass valves.

For more sophistication to controlling the overcapacity of the refrigeration system, instead of the bypass valve being an open and close valve which opens when there is excess capacity in the refrigeration system, the bypass valve could be a stepper motor valve or a choke type valve having a range of valve settings which cooperates with a pressure transducer on the low pressure side of the evaporator via the controller to control the mass flow rate of the refrigerant. Ideally, the pressure valve is located close to or adjacent the suction line accumulator (65) (see FIG. 4F). Depending upon the cooling duty of the compressor (i.e. available refrigeration capacity) and thus, the pressure measured from the pressure transducer, a feedback loop from the pressure transducer can be fed to the controller to vary the setting of the choke valve and thereby, change the mass flow rate of the refrigerant to the compressor. If the pressure as measured from the pressure transducer drops too far below a predetermined value, then the controller can operate the bypass valve to open further so as to increase the mass flow rate of the refrigerant and thereby, increase the pressure on the low pressure side of the evaporator until it reaches a predetermined value. Conversely, if the pressure on the low pressure side increases too far beyond a predetermined value, then the controller can operate the bypass valve to constrict the flow of refrigerant further and thereby, drop the pressure on the low pressure side. This dynamic control of the bypass valve ensures that the pressure on the low pressure side of the evaporator is within a predetermined range so as to ensure adequate cooling to the compartments but yet not overburden the compressor.

Thus, following bypassing the refrigerant to the compressor and as there is refrigeration capacity, there is opportunity for an available compartment to be operational (i.e. call for cooling). As C1 is available, the cooling cycle is started 190q for C1. If, on the other hand, one compartment is already operational (under a cooling cycle), then the system makes sure that the bypass valve is shut 190k, freeing up refrigeration capacity so as to allow another compartment to be operational for cooling (note: that only two compartments are operational at any one time). In this example, C1 is checked for availability.

The system then decides 190l whether C1 has the largest temperature differential (ΔT) between the actual measured temperature of the compartment to the desired set point temperature in comparison to the other available compartments in the locker module. This is to make that the compartment with the largest temperature differential takes priority in the queue. For example, if C1 has a large temperature differential (ΔT), then C1 has an immediate requirement for cooling than the rest of the available compartments and the system stops and resets the timer 190r for the next available compartment and starts the cooling process of C1. If, on the other hand, C1 has the same 190m differential temperature to the rest of the compartments, then the system checks 190p whether C1 has been waiting the longest (i.e. having the highest Call For Cooling CFC value/time). If C1 has been waiting the longest, then C1 is prepped up for cooling by stopping and resetting the timer 190r. If, on the other hand, C1 does not have the same differential temperature (ΔT) as the rest of the available compartments nor does it have the longest waiting time, then the system moves to see if Compartment 2 (C2) is operational (i.e. cooling) and so on with the rest of the compartments in a given locker module.

Once a compartment has reached its desired set point temperature, the cooling demand on that compartment is significantly reduced since the compressor is only needed to maintain or regulate the temperature of that compartment at its desired set point temperature. More specifically, so as to make sure that the temperature of the compartment and any goods within the compartment does not vary significantly and compromise food safety as governed by the Food Safety Standards. Although the above system prioritises the cooling and thus, the distribution of the refrigeration capacity to the compartments when preparing available compartments to store goods (chilled or frozen) in a given locker module in anticipation of demand, the same logic system applies to prioritising the distribution of the refrigeration capacity to maintain or regulate the temperature of the occupied compartments. Depending upon the cooling duty of the refrigeration system, the controller of the present invention can share a portion of the refrigeration capacity to regulate the temperature of the occupied compartments so as to keep the occupied goods fresh for pick-up. When one or more occupied compartments that have been previously cooled to its desired set point temperature begins to call for cooling because the inside air temperature of the one or more compartments have risen above its desired set point temperature, then the controller diverts some of the refrigeration capacity to the occupied compartments by opening their corresponding valves to allow the flow of refrigerant. This does not affect the cooling of the other compartments in the preparation phase in anticipation of demand, if there is sufficient refrigeration capacity in the system. However, if the refrigeration capacity is already being over utilised and therefore, has reached its limit by the unoccupied compartments being prepared for cooling, any further opening of valves to cool the occupied compartments would result in an increase in pressure on the low pressure side of the evaporator and therefore, a drop in cooling efficiency of the refrigeration system. To mitigate this, the controller diverts the cooling from one or more of the unoccupied (in preparation phase) compartments by closing its corresponding valves and opening the valves to the occupied compartments in order so as to maintain the refrigerant pressure on the low pressure within acceptable limits and ultimately preserve food safety. For example, if the goods inside the occupied compartments are ice cream, the temperature inside the occupied compartments must be regulated very close to the desired set point temperature to prevent the melting of the ice cream. Depending upon the refrigeration capacity and whether this is any surplus refrigeration capacity, this could be either by supplying the surplus refrigeration capacity to the occupied compartment or diverting some of the cooling from the unoccupied compartments in the preparation phase to the occupied compartments. Thus, the controller balances the refrigeration capacity between preparing one or more available compartment that are being prepared for cooling for a delivery of goods based on consumer demand and regulating or maintaining the temperature of the occupied compartments.

If there are more than one occupied compartments calling for cooling at any one time, choosing which of the occupied compartments to divert the cooling can be based on the same prioritising principle discussed above with the available, unoccupied compartments. For example, as the compressor in the particular embodiment has capacity to cool two compartments at any one time, then if there are more than two occupied compartments that are calling for cooling in a given time, then the controller diverts the cooling to the occupied compartments and prioritises the cooling of the occupied compartments based on their:

i) differential temperature between the actual temperature of the compartment and the desired set point temperature; or ii) timer value based on the counting clock that is initialised when the "call for cooling" for the occupied compartment is initiated.

The controller diverts the cooling by closing the valve to the unoccupied compartments so as to free up refrigeration capacity to the occupied compartments. Depending upon the degree of the diversion of the refrigeration capacity to the occupied compartments, the diversion will manifest in a delay for cooling of one or more of the unoccupied compartments that are calling for cooling in preparation for a delivery. In the scheme of things, this sharing of the refrigeration capacity to maintain the temperature of the occupied compartments is very small and will not significantly affect the cooling regime of the available, unoccupied compartments. However, in another extreme example, if the temperature of one or more occupied compartments fluctuates significantly, e.g. the door to the occupied compartments is inadvertently opened and closed after realising that the compartment is occupied causing the inside air temperature of the compartment to rise significantly beyond its desired set point temperature. In this case, the controller would prioritise the cooling to this compartment since this compartment would exhibit a greater temperature differential from the desired set point temperature. This may cause an additional delay or disrupt the cooling pattern of the unoccupied compartments that are being prepared for a delivery of goods. To mitigate this, the refrigeration capacity can be shared amongst several compartments from neighbouring locker modules, i.e. from the refrigeration unit in each of the bank of locker modules is shared amongst several compartments from neighbouring locker modules via a common distribution system. Thus, if any one refrigerant unit in a given locker module is working at full capacity and additional cooling is required, then the controller can tap into the refrigeration unit from neighbouring locker modules that has excess refrigeration capacity. In this case, the controller would seek any spare refrigeration capacity from neighbouring locker modules so as to divert the spare refrigeration capacity to those compartments that are calling for cooling.

The controller periodically checks the temperature of the occupied compartments so as to make sure that the inside air temperature is maintained or regulated at its desired set point temperature and decides whether cooling of the unoccupied compartments that are calling for cooling can be diverted for a period of time to regulate the temperature of the occupied compartments. Prioritising and sharing the refrigerant amongst several compartments depending upon the available refrigeration capacity from one or more locker modules can be controlled by fuzzy logic. For example, instead of closing the valve to the refrigerant when the temperature of the compartment has reached its desired set point temperature, fuzzy logic can be used to close the valve to the compartment if the refrigeration capacity becomes too low. Once refrigeration capacity becomes available, the controller opens the valve to the refrigerant to continue the cooling. The pressure on the low pressure of the evaporator can be used as a measure of the availability of refrigeration capacity. A too low pressure on the low pressure side could indicate that there is refrigeration capacity available. Thus, instead of diverting the flow of refrigerant to a bypass valve to maintain a balance refrigerant pressure, the refrigerant can be diverted to a compartment that is calling for cooling. For the purpose of understanding of this aspect of the present invention, a similar analogy can be made to spinning plates on poles where each spinning plate can be analogous to a compartment calling for cooling. Take the hypothetical example of spinning a group of six plates by two hands. The number of plates can be taken to be analogous to the number of compartments in a locker module and the number of hands is analogous to the refrigeration capacity. Only a sub group of two plates can be spun at any one time before moving onto the next set of plates. This is repeated until all of the plates are spinning. After two plates are spun, the previously spun plates are continuously or periodically checked to see if any one of the plates are about to fall off their pole and given an extra spin if they are about to fall off their corresponding pole. This cycle is continuously or periodically repeated to maintain the spinning of the plates on their corresponding poles. In the case of the refrigeration system of the present invention, the controller cools a predetermined number of compartments in a given locker module for a period of time even though the temperature of each of the compartments has not reached its desired set point temperature and then moves onto the next set compartments that are calling for cooling. This is repeated until all of the compartments calling for cooling have reached its desired set point temperature. The controller continuously or periodically checks the temperature of each of the compartments to make sure that each of their temperatures are within their desired set point temperature and if the temperature of anyone of the compartments increases, then the controller via the refrigeration system gives that compartment a burst of cooling by opening its corresponding valve to the refrigerant. As with the spinning plates, this cycle is continuously or periodically repeated in conjunction to the bypass valve so as to maintain that the temperature of the compartments are within their desired set point temperature range. The bypass valve takes up any surplus refrigeration capacity.

Although FIGS. 11D-1 through 11D-4 show that the temperature differential of C1 takes priority over the length of time of wait in terms as to whether C1 is prepped for cooling, the converse is equally applicable whereby the length of time of wait takes priority over the temperature differential. In respect to FIGS. 11D-1 through 11D-4 the steps 190*l* and 190*p* are reversed. Each time the temperature of C1 is greater than the desired set point temperature 190*f*, the system checks the temperature of C2 and asks the same questions and so on with the rest of the available compartments in the locker module until the temperature of a compartment is less than or equal to the desired set point temperature and the whole step process discussed above is repeated. Likewise, if the temperature of C1 has reached its desired set point temperature or the periodic cooling time period has elapsed, cooling is stopped 190*e* for C1 and the system moves onto check the cooling of C2 and so on with the rest of the available compartments. Equally, if there are no compartments cooling 190*j*, following cooling C1 190*q*, as there free capacity, the system moves onto to check whether C2 is cooling and so on with the rest of the available compartments.

FIGS. 11D-1 through 11D-4 depict a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., access control module 40 or another device hosting the control unit 300) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. The instructions, when executed, transform the special purpose hardware into a tool for computing, controlling and/or tracking [compartment temperature, prioritizing compartments based on the availability, condition etc.]. As such, the tool may provide a controller to prioritize the availability of compartment depending on the refrigeration capacity in a given locker module.

For efficiency of operation and convenience of storage, the compressor is sized to provide refrigerant capacity to a limited number of compartments. However, to cool multiple compartments in a given time, the system needs to prioritise the refrigerant to those compartments that have an immediate requirement for cooling as discussed above. The refrigerant capacity is related to the cooling duty of the refrigeration system, i.e. the temperature requirement of one or more compartments and the demand for cooling goods at chilled temperature and/or frozen temperature from a delivery centre (the logistics in the delivery of goods, e.g. grocery, to customers is discussed further below). A requirement to cool one or more compartments to store frozen goods and depending on their starting temperature, places more of a demand on the cooling duty of the refrigeration system than where there is a requirement to cool the compartment to store goods at chilled temperature. The refrigerant capacity will depend on other variables such as the starting temperature of the compartment and the thermal mass of the compartment (the thermal mass of the goods). As the compressor is sized to cool a predetermined number of compartments at any one time and therefore, maintain a balanced refrigerant pressure, the system of the present invention can determine the number of compartments in a locker module that can be prepared for storage of grocery by determining the refrigerant capacity in a quantitative manner.

In another embodiment of the present invention, the refrigerant capacity can be controlled by monitoring the refrigerant pressure from the Low Pressure (LP) Switch. For example, when there is excess capacity in the refrigeration system because not so much demand is being placed on the refrigeration system, e.g. only a few compartments are calling for cooling, then the refrigerant pressure, $P_1$, measured by the LP Switch would be less than if there was a greater amount of demand being placed on the refrigeration system. In the latter case, the refrigerant pressure, $P_2$, as measured by the LP switch would be greater than $P_1$. If the refrigerant pressure, $P_1$, drops below a predetermined amount then this will trigger the bypass valve to allow some of the refrigerant to bypass through the bypass valve so as to maintain a balanced refrigerant pressure as discussed above. Thus, by determining the refrigerant pressure as measured from the LP switch, a controller can determine the extent or the availability of refrigerant capacity. Knowing the refrigerant pressure, $P_{max}$, when the refrigeration system is at full capacity, which is substantially constant for a fixed speed compressor, each time a compartment is calling for cooling, the system via the controller can determine the availability of refrigerant capacity by determining present refrigerant pressure and correlating this pressure value to P. In all cases, the system aims to maintain a balanced refrigerant pressure.

Prioritising the refrigerant to a predetermined number of compartments at any one time is predominately suited to a fixed speed compressor. Alternatively, the refrigeration system can be based on a variable speed compressor system whereby the refrigeration capacity of the refrigeration system can be adjusted by varying the speed of the compressor. Thus, in an event where only a limited number of compartments are calling for cooling, i.e. when the cooling demand is relatively small, the variable speed compressor can be 'throttled back' to meet the reduced cooling demand of the limited number of compartments. Conversely, when the number of compartments that are calling for cooling increases, the variable speed compressor can speed up to meet the increased cooling demand. The variable speed compressor can be sized to have a suitable capacity range in order to meet the cooling demand for a predetermined number of compartments, or all of the compartments in any given locker module. As with the fixed speed compressor, the size of the variable speed compressor would need to be balanced between the substantial cost and physical size of the variable speed compressor and the likelihood that all of the compartments in a locker module will be calling for cooling at the same time leading to over capacity. As the footprint occupied by a locker module has to be relatively small, the available space, particularly at the top of the locker module is relatively small. To conserve space, a small compressor would be ideal to accommodate the other components of the refrigeration system such has the condenser and the control system etc.

In an alternative embodiment of the present invention, a balance is made between the maximum capacity of the compressor so as to meet the cooling demand for a predetermined number of compartments in a locker module and the physical size of the variable speed compressor. Preferably, the variable speed compressor is sized to meet the cooling demand to a predetermined number of compartments in a locker module (e.g. three compartments) and the cooling sequence utilizes a combination of prioritizing the distribution of the refrigeration capacity to the compartments when there is an increased demand for cooling as discussed above to varying the speed of the compressor to meet the cooling demand for the predetermined number of compartments.

Once a compartment has reached its desired set point temperature, the cooling demand on that compartment is significantly reduced since the compressor is only needed to maintain or regulate the temperature of that compartment at its desired set point temperature. More specifically, to make sure that the temperature of the compartment and any goods within the compartment does not vary significantly so as to compromise food safety as governed by the Food Safety Standards. Although the above system prioritises the cooling and thus, the distribution of the refrigerant capacity to the compartments when preparing available compartments to store goods (chilled or frozen) in a given locker module, the same logic system applies to prioritising the distribution of the refrigerant capacity to maintain or regulate the temperature of the occupied compartments. The controller of the present invention shares a portion of the refrigerant capacity to regulate the temperature of the occupied compartments so as to keep the occupied goods fresh for pick-up. When one or more occupied compartments that have been previously cooled to its desired set point temperature begins to call for cooling because the inside air temperature of the one or more compartments have risen above its desired set point temperature, then the controller diverts some of the refrigerant capacity to the occupied compartments by opening their corresponding valves to allow the flow of refrigerant. This does not affect the cooling of the other compartments in the locker module, if there is sufficient refrigerant capacity in the system, e.g. only a limited number of unoccupied compartments are being prepared for cooling. However, if the refrigerant capacity is already being over utilised and therefore, reached its limit by the unoccupied compartments being prepared for cooling, then the controller diverts the cooling from one or more of the unoccupied (preparation) compartments by closing its corresponding valves and opening the valves to the occupied compartments in order to maintain refrigerant capacity to the occupied compartments and ultimately preserve food safety. For example, if the goods inside the occupied compartments are ice cream, the temperature inside the occupied compartments must be regulated very close to the desired set point temperature to prevent the ice cream melting. Depending upon the refrigerant capacity and whether this is any surplus refrigerant capacity, this could be either by supplying the surplus refrigerant capacity to the occupied compartment or diverting some of the cooling from the unoccupied compartments in the preparation phase to the occupied compartments. Thus, the controller balances the refrigerant capacity between preparing one or more available compartment that are being prepared for cooling for a delivery of goods based on consumer demand and regulating or maintaining the temperature of the occupied compartments.

If there are more than one occupied compartments calling for cooling at any one time, choosing which of the occupied compartments to divert the cooling can be based on the prioritising principle discussed above with the available, unoccupied compartments. For example, as the compressor in the particular embodiment has capacity to cool two compartments at any one time, then if there are more than two occupied compartments that are calling for cooling in a given time, then the controller diverts the cooling to the occupied compartments and prioritises the cooling of the occupied compartments based on their:

i) differential temperature between the actual temperature of the compartment and the desired set point temperature; or ii) timer value based on the counting clock that is initialised when the "call for cooling" for the occupied compartment is initiated. The controller diverts the cooling by closing the valve to the unoccupied compartments so as to free up refrigerant capacity to the occupied compartments. Depending upon the degree of the diversion of the refrigerant capacity to the occupied compartments, the diversion will manifest in a delay for cooling of one or more of the unoccupied compartments that are calling for cooling in preparation for a delivery. In the scheme of things, this sharing of the refrigerant capacity to maintain the temperature of the occupied compartments is very small and will not significantly affect the cooling regime of the available, unoccupied compartments. However, in another extreme, the temperature of one or more occupied compartments can fluctuate significantly, e.g. the door to the occupied compartments is inadvertently opened and closed after realising that the compartment is occupied causing the inside air temperature of the compartment to rise significantly beyond its desired set point temperature. In this case, the controller would prioritise the cooling to this compartment since this compartment would exhibits a greater temperature differential from the desired set point temperature. This may cause an additional delay or disrupt the cooling regime pattern of the unoccupied compartments that are being prepared for a delivery of goods. To mitigate this, the refrigerant capacity can be shared amongst several compartments from neighbouring locker modules, i.e. the refrigeration unit in each of the bank of locker modules is shared amongst several compartments from neighbouring locker modules via a common distribution system. Thus, if any one refrigerant unit in a given locker module is working at full capacity and additional cooling is required, then the controller can tap into the refrigeration unit from neighbouring locker modules that has excess refrigerant capacity. In this case, the controller would seek any spare refrigerant capacity from neighbouring locker modules so as to divert the spare refrigerant capacity to those compartments that are calling for cooling.

The controller periodically checks the temperature of the occupied compartments so as to make sure that the inside air temperature is maintained or regulated at its desired set point temperature and decides whether cooling of the unoccupied compartments that are calling for cooling can be diverted for a period of time to regulate the temperature of the occupied compartments. Prioritising and sharing the refrigerant amongst several compartments depending upon the available refrigerant capacity from one or more locker modules can be controlled by fuzzy logic. For example, instead of closing the valve to the refrigerant when the temperature of the compartment has reached its desired set point temperature, fuzzy logic can be used to close the valve to the compartment if the refrigerant capacity becomes too low. Once refrigerant capacity becomes available, the controller opens the valve to the refrigerant to continue the cooling.

Access Control

Figure 12A:
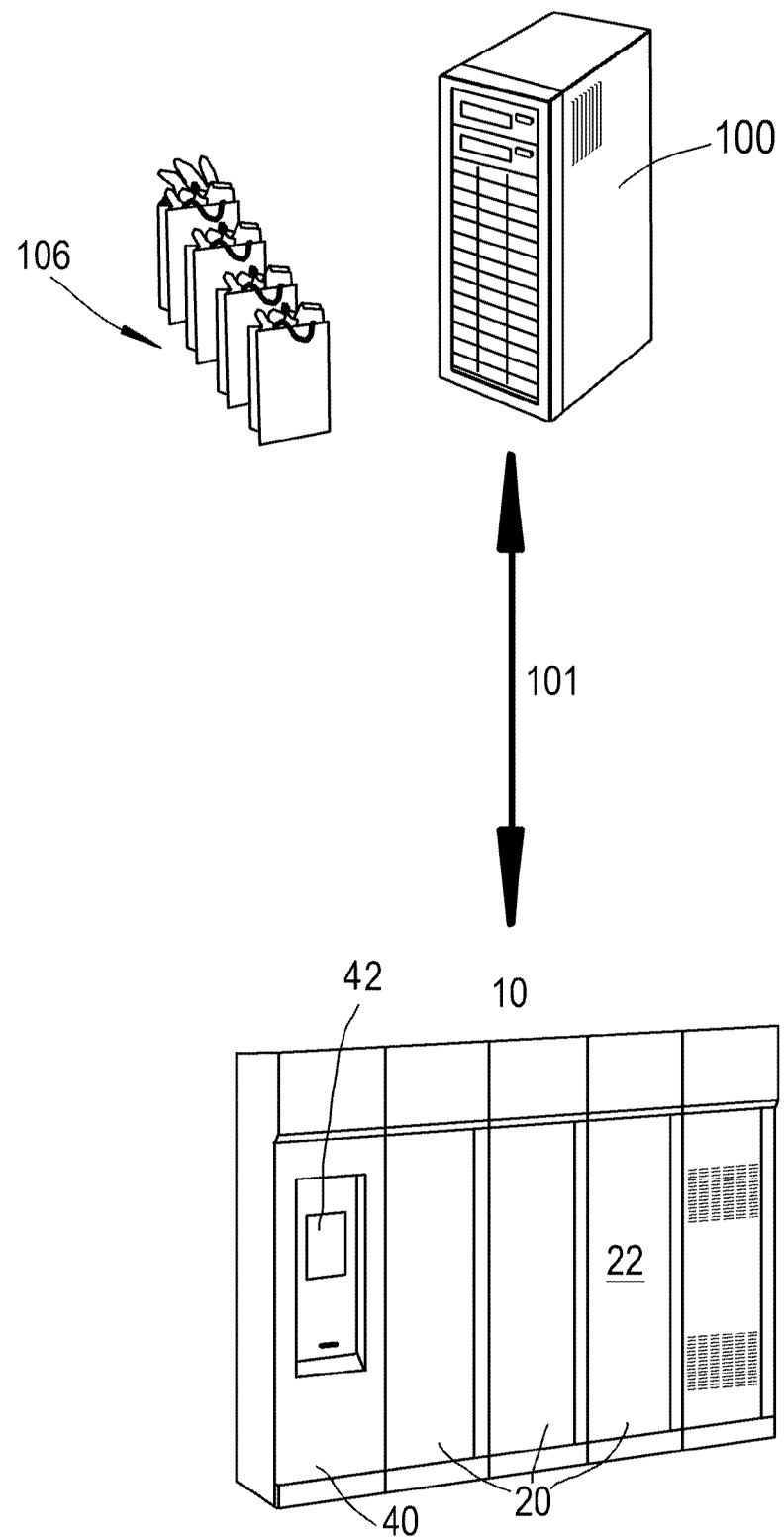
Figure 12B:
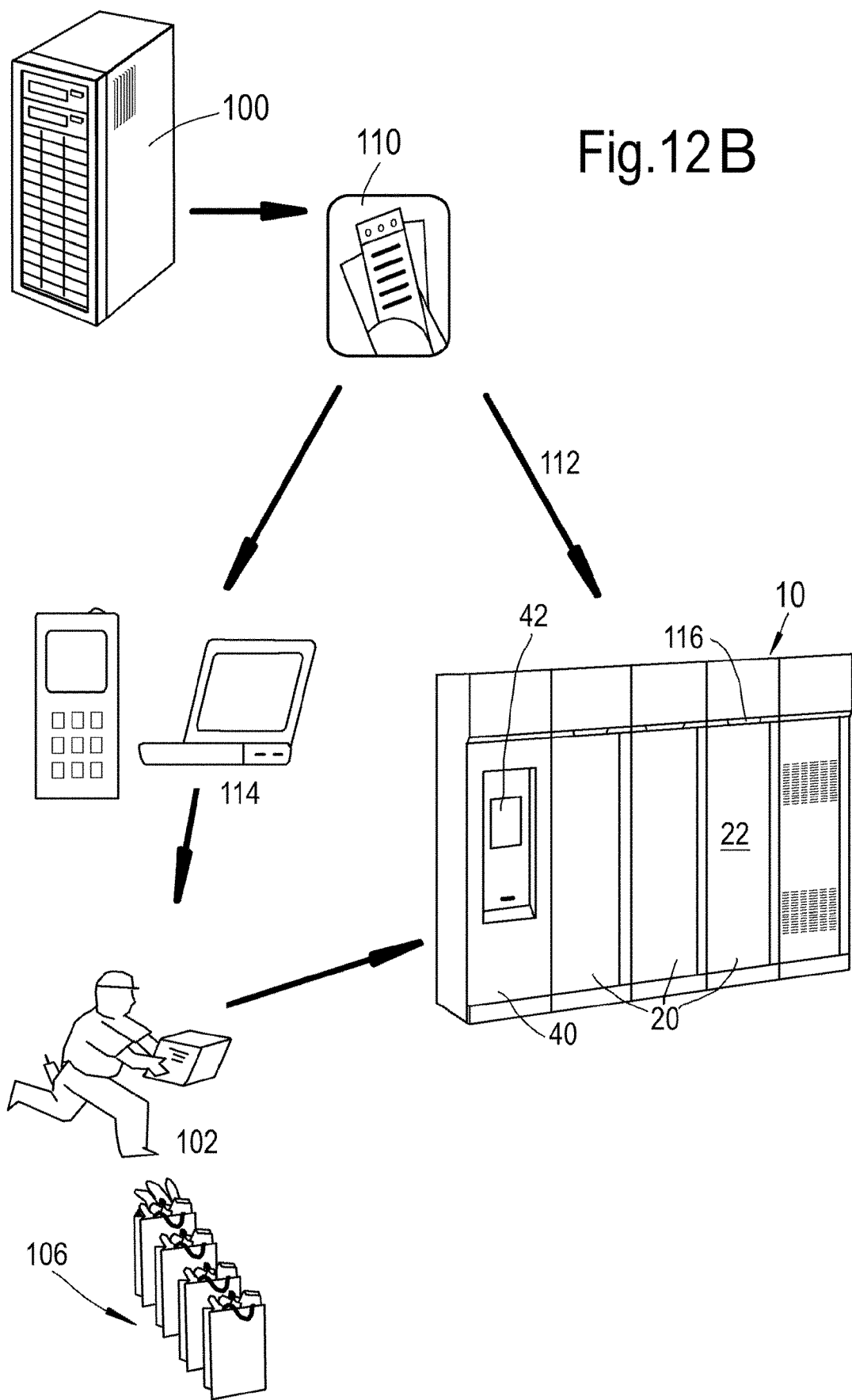

Access to the lockable storage space is controlled or governed by an access control module. FIGS. 12A-12C illustrate the operation of the access control module. The access control module 40 communicates with the central control system 100 at a delivery centre (e.g. supermarket or hypermarket) via communication module 101 and grants access to the lockable storage spaces 22 for authorized users, i.e. courier 102 and customer 104. In addition to the access control, each of the locker modules comprise a controller (e.g. PCB controller) for controlling the operation of the valves and thus, the flow of refrigerant to one or more compartments that are calling for cooling as well as prioritising the cooling of the occupied or unoccupied compartments depending on the availability of refrigeration capacity, i.e. whether a predetermined number of compartments are already calling for cooling. Based on instructions from the central control system, the access control module communicates with the controller located at the locker module to operate the valves according to the temperature requirements of one or more compartments in anticipation of demand from the delivery centre. Depending upon the number of compartments that are already calling for cooling and the demand from the delivery centre, the access control module and/or the controller can place one or more compartments in a locker module in a queueing system in preparation for when one or more compartments have reached their desired set point temperature freeing up refrigeration capacity.

Access to each lockable storage space 22 is governed electronically by locking and unlocking the lockable storage space, upon verification of a user identity at a local user interface or graphical user interface 42 located at the access control module 40. The digital locking mechanism can be any mechanism known to the person skilled in the art, for example solenoid operated deadbolts or electromagnetic locks. The access control module 40 also monitors the status of each compartment 24 and feeds the status information to the central control system 100. Examples of status information include but are not limited to temperature, valve operation, alarm condition of the compartments, occupancy or size of each compartment 24 etc. However, it is also permissible in the present invention that some of the status information can be determined or controlled by the central control system 100, e.g. occupancy of the compartment 24. For example, a record of such status may be maintained at the central control system without such monitoring. As such the information regarding storage space vacancy and compartment temperature are used in assigning compartments for subsequent deliveries.

The central control system 100, located remotely from the storage apparatus 10, is responsible for allocating the lockable storage spaces 22 for receiving goods 106 in anticipation of demand from the delivery centre, as illustrated in FIG. 12A. Based on the status information of the lockable storage spaces 22, the central control system 100 is able to allocate vacant or available compartments 24 to a number of grocery deliveries or consignments 106 according to their size and storage temperature requirement and demand, and consequently produce a schedule. In an event that the lockable storage spaces 22 at a particular temperature are fully occupied, the schedule can favourably select one or more compartments 24 which offers the least switch over temperature change and if necessary, places that compartment in a queue. For example when selecting a compartment 24 for storage of frozen goods, the schedule will identify the compartment which offers the smallest change in temperature. In this case, the schedule will opt for a compartment 24 that was previously used to store goods at a chilled temperature as opposed at an ambient temperature. This has the advantage of not only saving energy but also reduces switchover time and also prolongs equipment longevity. The central control system 100 can also instruct the heating system 240 discussed above to defrost a compartment 24, e.g. in an event where the schedule requires a changeover from a compartment 24 that was previously used to store frozen goods to a compartment 24 that requires a chilled or ambient temperature or simply to defrost a compartment 24, i.e. to remove the excessive build-up of ice on the internal walls of the compartment.

Figure 13A:
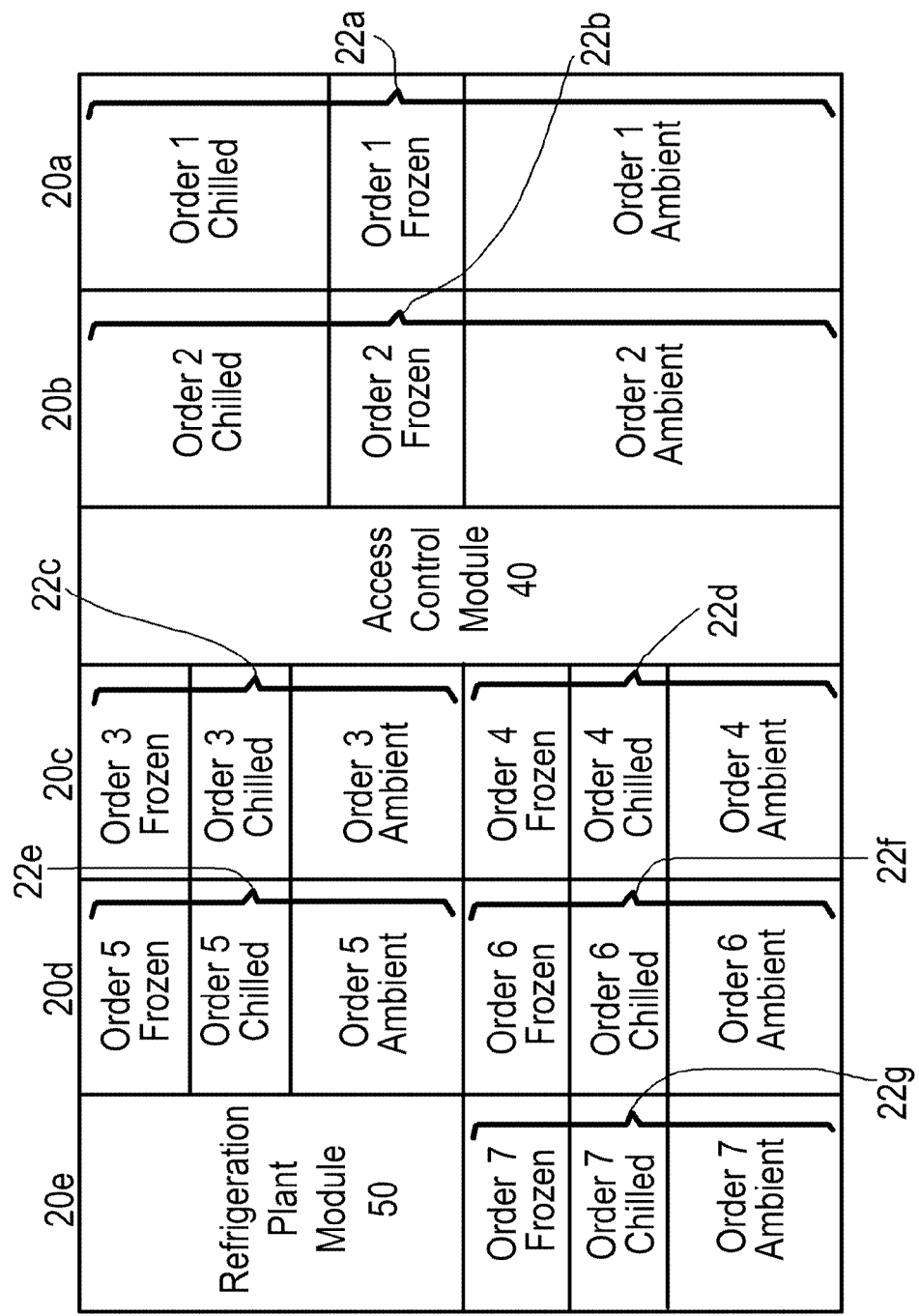
FIG. 13A shows an example of a layout of the arrangement of the compartments in the system.
Figure 14A:
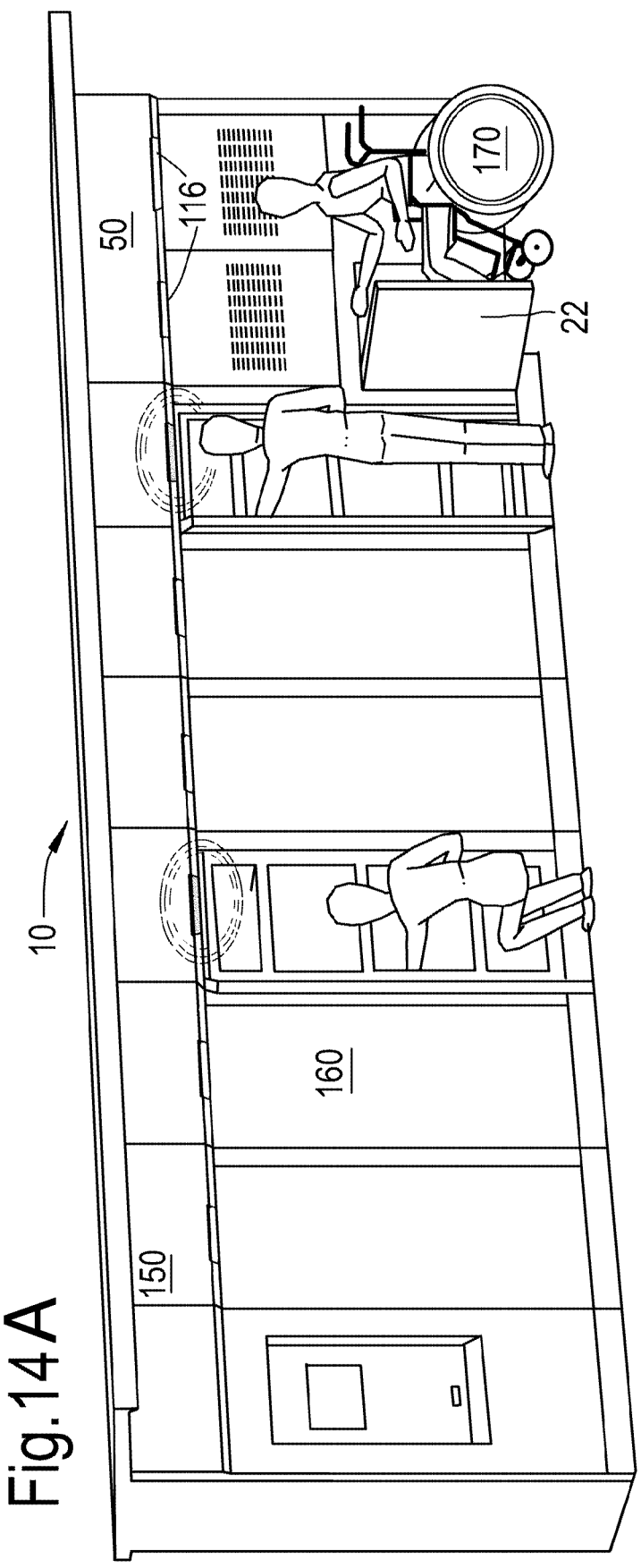
FIG. 14A is a perspective view of the locker modules equipped with an overhead gantry according to an embodiment of the present invention.
Figure 14C:
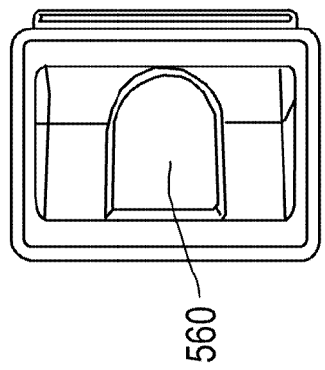
FIGS. 14B and 14C show the door handle having a recess to accept a unique identification label according to one embodiment of the present invention.
Figure 14B:
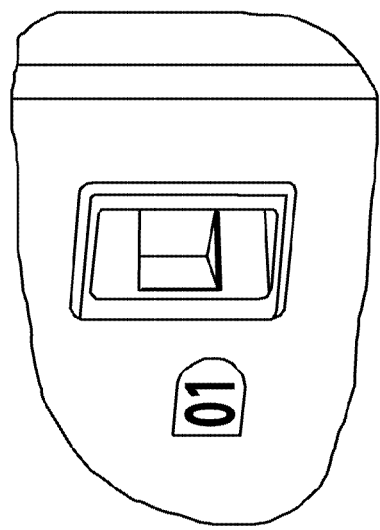
Figure 14E:
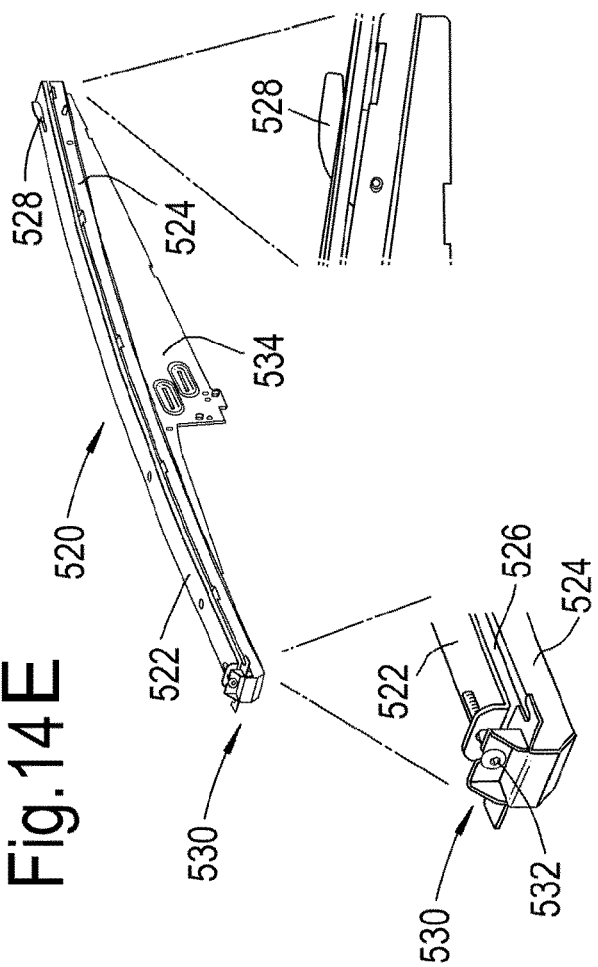
FIG. 14E is an exploded view of the canopy strut according to one embodiment of the present invention.
Figure 14F:
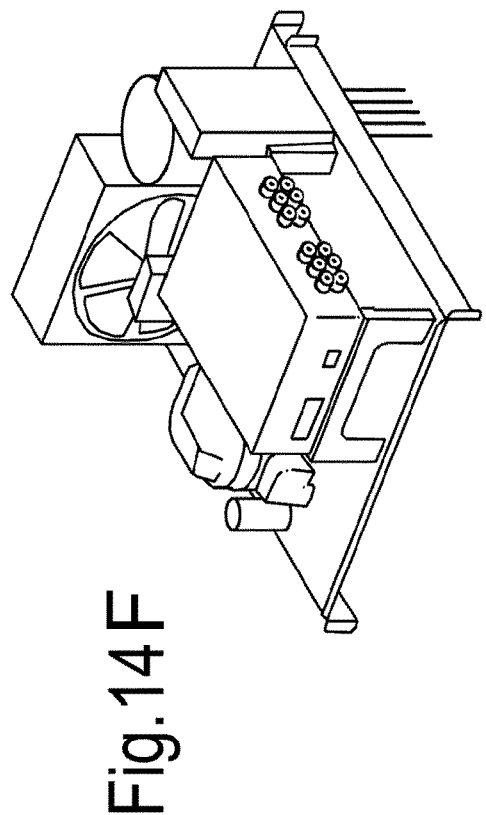
FIG. 14F is a perspective view showing a refrigeration unit that is mounted on top of a locker module according to an embodiment of the present invention.

FIG. 13A illustrates a typical layout of the compartments in any one day. The system consists of an access control module 40 and refrigeration plant module 50. The access control module is conveniently located at the centre of the system. The controller for controlling the operation of the valves can be conveniently located at the top of the locker module, i.e. in the same location as the refrigeration unit as shown in FIG. 14F. Each compartment is represented by a rectangular box and is capable of switching between ambient, chilled and frozen storage temperature. Typically a storage space accessed via a given remotely programmable insulated lockable door 18 consists of three compartments each operating at a distinct storage temperature (ambient, chilled and frozen temperature). FIG. 13A shows seven purchase orders (Orders 1 to 7). Order 1 and 2 each occupies the storage space (22a and 22b) of the entire locker module (20a and 20b) having compartments for storage of chilled, frozen and ambient goods. On the other hand, locker modules 20c and 20d each comprise two storage spaces (22c, 22d for locker module 20c; 22e and 22f for locker module 20d). Each of the storage spaces (22c to 22f) in locker modules 20c and 20d consists of three smaller compartments for storage of chilled, frozen and ambient goods. The refrigeration plant module 50 is combined with a storage space 22g having compartments for storage of chilled, frozen and ambient goods in the locker module 20e.

A relatively large customer order (Order 1 & 2) may occupy the entire locker module 22a, 22b. Alternatively the central control module may assign smaller orders (Order 3-7) to the smaller storage spaces (22c to 22g). In summary, based on order demand which can vary from day to day or even within a day, the central control system maps the availability of vacant compartments or storage spaces to the order demand. This can also take into consideration allocating the appropriate compartments based on temperature storage requirements and whether, there is enough capacity in a particular locker module. If no compartments at the right temperature are available, the central control system can remotely control the temperature of the chosen compartment via a communication link to the appropriate temperature control module or places the order in a queue until a compartment becomes available. When loading any given compartment with goods for collection, in order to prevent the heavy goods such as milk containers from damaging the more delicate goods such as soft vegetables or fruit or even eggs, particularly when stacked, it is desirable to separate the goods in the compartment. As the grocer will try and maximise the space available in any given compartment so as to maximise sale of goods, any shelving used to separate the goods in a compartment should not occupy too much space. Equally, the shelving should be easy to clean, hygienic, allows access to the interior of the compartment without obstruction, is secure to prevent the shelf being dislodged or inadvertently removed and finally, easily adjustable to allow larger items or items of varying sizes to be stored in the compartmental space. FIG. 13B shows a shelving unit according to an embodiment of the present invention. The shelving unit 140 comprises a moveable shelf 142 contained and supported by a frame 144. To conserve space in the compartment, the shelving unit 140 is fabricated from bent wire (e.g. metal or plastic). To prevent corrosion from liquids and to preserve hygiene, the shelf 142 is fabricated from coated steel wire (e.g. Rilsan coated mild steel). The corner of the shelf is adapted with slideable fixing points 146 for containing and securing the shelf 142 to each leg of the frame. To permit the shelf 142 to travel vertically along the frame 144, the fixing points 146 are bent to form corner rings so as to permit the corner rings to slide along each leg of the frame 144. A portion of each leg of the frame along its length is bent to form resting points or "joggles" 144b for the shelf 142. This is created by inwardly bending a portion of the length of each leg of the frame so as to create an inward upper portion 146b for the shelf to travel vertically and an outward lower portion 146c that is offset the upper portion. The upper portion 146b and the lower portion 146c meet at the "joggle" points 144b for resting the shelf. The length of the upper and lower portion and thus, the height of the "joggle" points from the foot of the frame dictate the vertical resting point of the shelf. The lower portion is sufficiently offset the upper portion to butt up against the walls of the compartment and thus, conserve space within a given compartmental space. To secure the shelving unit 140 to the compartment, the frame is formed with securing points 148, preferably to the legs of the frame as shown in FIG. 13B. In the particular embodiment, the securing points are formed as eyelets to allow the frame to be securely fixed to at least one wall of the compartment. To raise and maintain the shelf in a raised position for storing larger sized goods or for cleaning purposes, the shelf is removably attached to a cross member 146b formed in the uppermost portion of the frame. In the particular embodiment, the shelf or equally the cross member 146b comprises one or more magnets to maintain the shelf in the raised position.

In an alternative embodiment of the present invention, instead of supporting the moveable shelf 142 by a frame as shown in FIG. 13B, the front end of the shelf is supported by dowels 602 located on opposing sidewalls of the compartment and the rear end of the shelf is supported by at least one support rod 604 fixed to at least one inner wall of the compartment. In the particular embodiment shown in FIG. 13C, one end 606 of the support rod 604 is fixed to the roof of the compartment and the other end 608 is fixed to the inner wall of the compartment. The support rod 604 extends through the shelf 142 so as to permit the shelf to be moveable along the support rod. The shelf is grated or fabricated as a wire mesh or wire grille so as to enable the support rod to extend through or thread the shelf (see FIG. 13E). By fixing both ends of the support rod to at least one wall of the compartment prevents theft or inadvertent removal of the shelf from the compartment. The height or level of the shelf in the compartment is thus determined by the location of the support dowels 602 and the length of the support rod. In the particular embodiment shown in FIGS. 13C and 13D, the support rod extends substantially half way along the height of the compartment so as to support the shelf substantially half way of the height of the compartment.

Alternatively and an extension of the above embodiment, as the support rod extends through the shelf to prevent removal of the shelf, both ends of the support rod can be fixed to the top and bottom wall of the compartment respectively so that the support rod extends along the full height of the compartment. The shelf and/or support rod comprises indexing means to support the shelf at different heights along the support rod. The shelf is prevented from being removed since the support rod extends through the shelf. The indexing means can comprise a pivotable toggle plate fixed to the shelf and the support rod passes through a hole in the pivotable toggle plate. The toggle plate is held in place along the support rod by being gripped by an edge of the toggle hole. To provide the friction grip, the toggle plate is pivotally connected at one end of the shelf and is urged at an angle against a toggle spring so that the toggle hole grips the support rod. To release the toggle plate, the user presses on the toggle plate against the toggle spring so releasing the frictional grip of the edge of the toggle hole with the support rod. In use, the toggle plate is indexed along the support rod thus allowing the user to adjust the height of the shelf. Equally, instead of a frictional grip, the indexing means comprises serrations on the support rod so as to enable the toggle plate to index past successive ratchet serrations. Again, the toggle plate is pivotable against a toggle spring to hold the toggle plate and thus, the shelf against a serration. To release the toggle plate, the user presses on the toggle plate against the toggle spring allowing the toggle plate to index part the serrations. To support the front of the shelf, each of the opposing walls comprises a plurality of dowels along the height of the compartments that are spaced apart that corresponds to the different indexing along the support rod and so provides different height adjustments of the shelf.

As with the moveable shelf described with reference to FIG. 13B, the shelf and/or the top wall of the compartment comprises means to retain (e.g. magnet) the shelf to the top wall of the compartment for storing larger sized goods or for cleaning purposes. FIG. 13D shows the shelf being stowed away to the top wall of the compartment by being attracted to magnets 610 fixed to the shelf and/or the top wall of the compartment.

To obtain access to a lockable storage space 22, the central control system 100 generates and communicates a unique collection code 110 to both the access control module 40 and the users. For example, when an order for a delivery of goods 106 is made online, this is communicated to the central control system 100. The central control system 100 allocates the delivery of the goods 106 to a schedule. By means of a collection code generator, the central control system 100 generates and assigns a unique collection code 110 to the goods 106 and then communicates the unique collection code 110 to the access control module 40 via a collection code communication means 112. The unique collection code is also sent to the courier via another data communication means 114 (e.g. via wireless means such as mobile devices or personal computers) as shown in FIG. 12B and FIG. 12C.

The courier inputs the collection code 110 at the local user interface 42 to be validated by the access control module 40, which then unlocks the allocated lockable storage space 22. In this particular case the courier 102 is required to scan the consignments 106 at a consignment recognition device, before depositing it into the correct compartment 24 as indicated by access control module 40. This serves to minimise the risk of the courier 102 misplacing the goods in a compartment 24 conditioned at a wrong storage temperature. The consignment recognition device can be any device known to those skilled in the art, for example bar code or RFID tag scanners. The delivery process finishes when the courier 102 closes the door, and the lockable storage space is locked securing the consignment 106. The lockable storage space may be configured to lock automatically when the door is closed. Once that particular lockable storage space 22 is locked, the access control module 40 then communicates to the central control system 100 that the item is ready for collection. This in turn notifies the same to the customer 104 via data communication means 114 e.g. comprising email or SMS and provides the customer with either the previously generated unique collection code 110 used by the courier delivery or generates another unique collection code 110 for increased security.

The collection process used by the customer 104 is similar to the delivery procedure discussed above with respect to the courier 102. The customer 104 inputs the collection code 110 at the local user interface 42 and upon verification by the access control module 40, the allocated lockable storage space 22 is unlocked. To aid the addressee to identify his/her allocated lockable storage space 22, each of the lockable storage spaces 22 can be equipped with an externally visible or audible identification means. For example, the identification means can be provided by a light 116 mounted adjacent to each of the lockable storage spaces 22 which illuminates once the addresses has entered the correct code into the access control module. As another possibility, each locker may be identified by a unique label affixed to or otherwise physically associated with it; such as a number, letter, geometric shape, personal name or the like. For example, instead of labelling the door with a unique compartment identification label as shown in FIG. 14B, the door handle to each compartment may comprise a recess 560 that this shaped to accept a self-adhesive label with a unique identification number and/or letter. Upon the customer entering the correct unlock code, the relevant storage space is unlocked and a copy of the corresponding unique label is displayed on the user interface, together with any other relevant messages, e.g.: "Hi John Doe, your order is ready for collection from locker no. 8, bottom row, to your left. This has earned you 46 club card points. For more great offers and rewards, visit our website, www . . . . Thank you for your custom and have a nice day." Other examples, include the use of sound, and tactile identifiers on the lockers to assist the visually impaired. Once the door is closed the lockable storage space automatically locks and the access control module 40 updates the current status of that particular storage space with the central control system 100.

If the goods are not retrieved within the assigned time slot the central control system 100 will produce an alternative storage schedule or instruct the courier 102 to retrieve the uncollected goods 106.

In some cases the supplier cannot fully satisfy a customer's online order, for example if a particular item is out of stock, the supplier can opt to deliver a like for like alternative to the system. The addressee may either accept the alternative goods along with other grocery goods, or he/she may choose to leave the alternative goods in the locker to be collected by a courier later. The courier will then notify the central control system of any uncollected goods, to ensure refund is given accordingly. Likewise, if the addresses decided not to accept a particular item in the grocery order for any reason, for example damaged goods or wrong items, he/she may leave the item in the locker to be collected by a courier for a refund.

In some embodiments the compartments includes a passive infrared (PIR) sensor (not shown) as a safety mechanism. For example if small children or animals are trapped inside a locked compartment 24, its PIR sensor detects their movement and overrides the locking mechanism to grant an escape route. PIR sensor also detects goods collection and aids the central control system 100 in confirming item collection. Other safety mechanisms known to the person skilled in the art may also be used, for example load sensors and emergency releases.

The doors securing the storage spaces may be biased closed or motorised and programmed to close automatically. For example if a courier/customer forgets to close the door after grocery deliver/collection, the biasing will do so, or the access control module may instruct the door to close automatically after a predetermined period. This feature helps to enhance locker security and minimises unwanted heat exchange to the environment.

The system may further comprise auxiliary equipment to improve accessibility and security. As shown in FIG. 14A, a roof or overhead gantry 150 along the whole width of the system 10 helps to shelter a user from rain and snow during delivery or collection of the goods in the storage space. The overhead gantry 150 also blocks out direct sunlight that could otherwise warm up the lockable storage spaces 22 or cause glare on the display of the local user interface 42. In this example, lighting 160 is installed underneath the overhead gantry 150 to provide illumination for the user during night time and also serves as a crime deterrent. The well-lit area may be under constant CCTV surveillance (not shown).

Figure 14D:
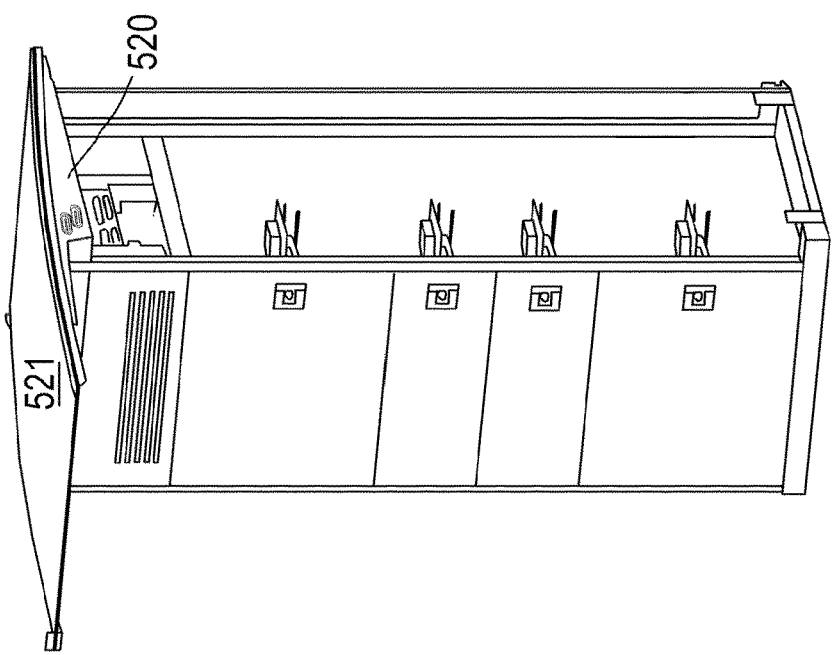
FIG. 14D is a perspective view of locker module with an overhead canopy according to one embodiment of the present invention.
Figure 14:
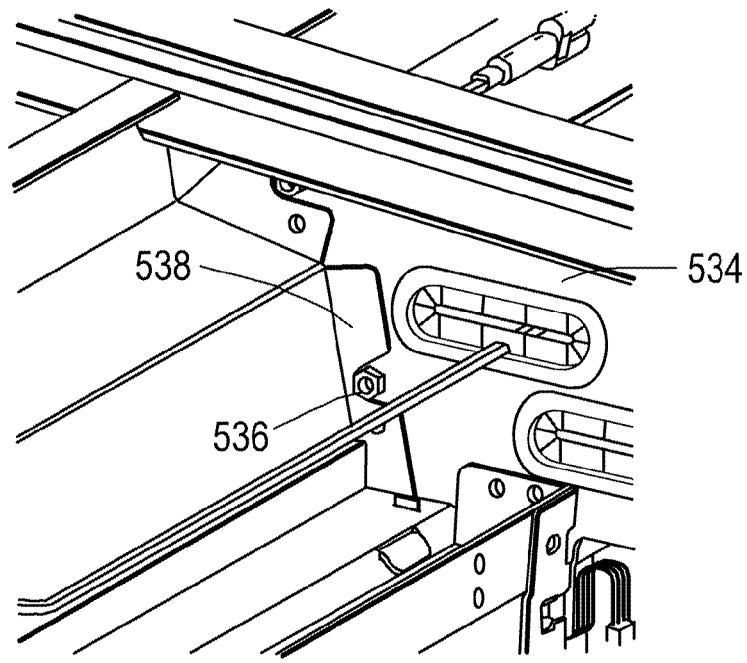
FIGS. 14G and 14H show an exploded view showing the engagement of the locker module to the canopy strut according to one embodiment of the present invention.
FIG. 14I is a perspective view of an assembly of locker modules adopting a substantially "U" shaped configuration.
FIG. 14J is a perspective view of the canopy struts of the present invention assembled together to form a corner junction at an assembly of the locker modules shown in FIG. 14I.
FIG. 14K is an exploded view of the front end of a canopy strut of the assembly shown in FIG. 14J.
FIG. 14L is an exploded view of the rear end of the canopy of the assembly shown in FIG. 14J.
Figure 14:
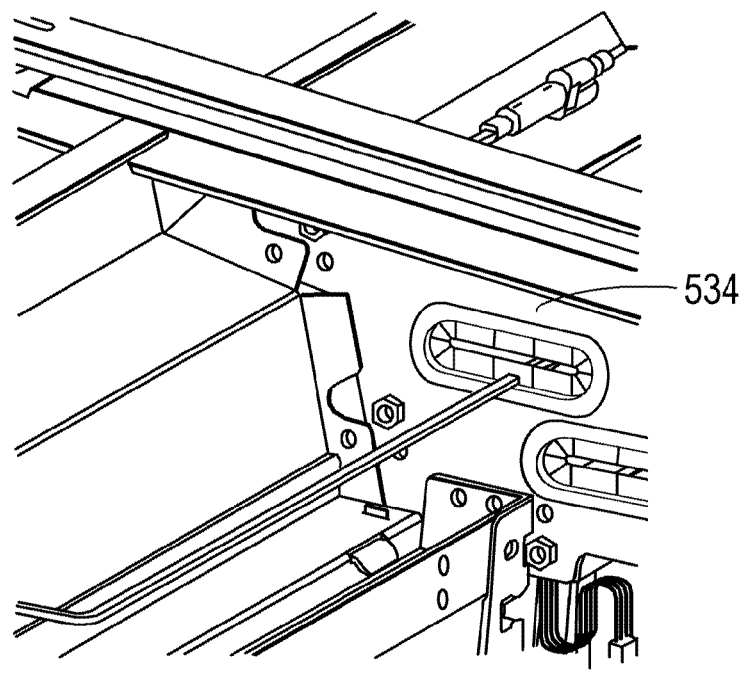

In the particular embodiment shown in FIG. 14D, each locker module is provided with a roof or canopy 150 that extends along the whole width of the locker module and overhangs to the front of the locker module. The roof of apparatus 10 or canopy is slightly sloped toward the rear to aid rain water removal into a rear mounted gutter, so as to protect users from a curtain of rainwater as they enter or emerge from the apparatus 10. The canopy is a plastic sheeting material, e.g. polycarbonate sheeting material that extends and is clamped between canopy struts 520 secured to each end of the locker module. The canopy strut 520 comprises a top clamping 522 member that cooperates with the body 524 of the canopy strut 520 to form a clamp. In use, the canopy sheet is clamped between mating surfaces of the top clamping member 522 and the body 524 of the canopy strut 520. In the particular embodiment shown in FIG. 14E, the top clamping member 522 is a substantially elongated, flat metallic plate that is bent to match the curved or sloped profile over the body 524 of the canopy strut 520. When held taught between the canopy struts 520, the canopy sheet 521 adopts the same sloped profile of the top clamping member and the body of the canopy strut so as to aid the flow of rain water into a mounted gutter.

The canopy sheet 521 can be sized to extend over one or multiple locker modules and clamped in place using the canopy struts located at either end of the canopy sheet so that the canopy sheet extends between at least two canopy struts or extends between multiple canopy struts located at multiple locker modules in order to provide additional stability of the canopy sheet 521 against sagging or strong winds. The clamp comprises a gasket 526, e.g. an elastomer material, to seal two adjacent canopy sheets together, i.e. in an overlaying fashion. To provide the necessary tensioning so that the canopy material remains taut over the locker module, the top clamping member 522 is adjustably fixed 528 at one end of the canopy strut body and the clamping force is adjusted by a front adjustable fastener 530 located at the other end of the canopy strut. In the particular embodiment shown in FIG. 14E, the top clamping member 522 is releasably fixed 528 at rear end of the canopy strut by a hook and slot relationship. For example and as shown in FIG. 14E, the rear end of the canopy strut body is formed with a hook that is received in an orifice or slot at one end of the top clamping member. The front of the canopy strut is formed with an adjustable fastener 530 for adjusting the clamping force applied onto the canopy sheet. In the particular embodiment shown in FIG. 14E, the front adjustable fastener 530 is an adjustable tensioning buckle. Having an adjustable tensioning buckle located at the front of the canopy permits easy access to the adjustable tensioning buckle from the front of the canopy. The adjustable tensioning buckle at the other end of the top clamping member comprises an upwardly extending bent portion that cooperates with an upwardly extending member of the body of the canopy strut. By reducing or increasing the spacing between the upwardly extending portion and the upwardly extending member of the body of the canopy strut, the tension and thus, the clamping force applied to the canopy sheet can thus be increased or reduced respectively. An adjustable screw 532 is fed through and threadingly engages with the upwardly bent portion and the upwardly extending member to adjust the spacing between both upwardly extending members and thereby, adjust the tension applied to the canopy sheet.

In an event of a breakdown or servicing of the locker modules, the exterior shell of the locker modules are provided with access points to enable easy access to the interior components of the locker module, more particularly the refrigeration unit (see FIG. 4F) and/or the controller unit located on top of each locker module (see FIG. 14F). In the present invention, the canopy strut 520 permits easy access to the refrigeration unit and/or the controller unit located on top of each locker module simply by undoing the front tensioning buckle (releasing the tightening screw) so as to release the canopy sheet covering from up top of the locker module and thereby, expose the refrigeration unit and/or the controller unit underneath (see FIG. 14F). For example, by undoing the front tensioning buckle releases the canopy sheet from the clamp, thereby allowing the canopy sheet to be slid back away from the front of the canopy to expose the refrigeration unit below. Locating the front tensioning buckle 530 at the front of the canopy strut, allow easy access to the tensioning buckle from the front of the locker module so allowing easy removal of the canopy sheet covering. The canopy sheet can be incorporated with concertina folds to permit the canopy to be slid away from the top of the locker module so exposing the refrigeration unit below.

One of the main problems of stacking multiple locker modules side by side or adjacent to each other, is that when one of the middle compartments is removed for repair or replaced, the space left behind causes one or more adjacent locker modules that have been resting on the removed locker module to move or lean slightly sideways from a substantially vertical orientation and occupy some of the free space left by the removed locker module, i.e. creates a "domino effect". This "domino effect" is particularly exacerbated when the underlying floor surface is uneven or not perfectly flat causing some of the adjacent locker modules to slightly tilt or lean when installed and therefore, is prevented from falling by resting on neighbouring locker modules, i.e. bunch up against each other. As a result, the allocated space or slot, in particular its width, to reinstall a repaired or replacement locker module becomes too small and any attempt to reinstall a replacement locker module becomes very cumbersome. To mitigate this problem, the canopy strut 520 of the present invention also doubles up as a spacer and connector to ensure each of the locker modules are held in their allocated slot. In the particular embodiment shown in FIG. 14E, the canopy strut comprises a downwardly extending support spacer or panel 534 that has means to link or connect the locker modules to each other in an assembly and therefore, ensures that the locker modules are held in a substantially vertical orientation. As a result, the weight as a result of one or more tiling locker modules are distributed among multiple locker modules rather than any one locker module. Thus, if one of the locker modules are removed for repair or replaced, the adjacent locker module is prevented from leaning by being connected or linked to other neighbouring locker modules in the assembly. The canopy struts are secured to the top end side wall of each of the locker module in an assembly so that their downwardly extending retainers or spacers 534 are spaced apart having a width that is substantially the same or slightly bigger than that exterior width of each locker module and thereby, providing a substantially close sliding fit of each locker module with little wasted space. To permit easy removal and replacement of the locker module, the downwardly extending spacers 534 of the canopy strut and the at least one side wall of the locker module are removeably engageable. FIG. 14G shows the condition when the locker module is engaged with the downwardly extending retainer 534 and FIG. 14H shows the condition when the locker module is disengaged with the downwardly extending retainer 534. As shown in FIGS. 14G and 14H, the locker module is removeably engageable with the canopy strut through a slot and bolt 536, 538 arrangement but other removeable engaging means known in the art are permissible in the present invention.

Alternatively or in combination to linking the locker together, the canopy struts can be fixed to an exterior wall or frame so providing adequate opposing reactive force when one or more locker modules leans against the downwardly extending spacer of the canopy strut. In an event where the underlying floor surface is uneven, the locker modules in an assembly can rest against the downwardly extending spacer so that when one of the locker modules is removed for repair or replacement, neighbouring locker modules are prevented from tilting excessively and therefore, prevented from encroaching on the allocated space for reinstalling a repaired or replacement locker module. In the particular embodiment, the downwardly extending spacer is integrated into the body of the canopy strut as a single body.

The canopy strut of the present invention is flexible to accommodate different shaped configurations of an assembly of locker modules depending upon user preferences and/or availability of floor space. FIG. 14I shows an assembly locker modules accommodating a substantially "U" shaped configuration. FIG. 14J shows the individual canopy struts of the present invention assembled to form a canopy framework 539 at a corner junction of an assembly of locker modules shown in FIG. 14I. The rear profile end of the canopy struts fan out from a corner pillar or post 540 and are connected to each other by a rear connection or linkage arm 544. The middle portion of the canopy strut is assembled and secured to the front of the locker module framework 543. The front profile end of the canopy struts are connected or linked together by a front connection or linkage arm 542. The canopy struts are slotted onto the frame of the locker modules and held together by a pin and slot arrangement. FIG. 14K shows an exploded view of the linkage 542 of a front portion of the canopy strut. The upwardly extending bent portion 549 of the front tensioning buckle 530 comprises side wings or flanges 546 either side of the front tensioning buckle. At least one of the wings or flanges 546 comprises a slot for receiving a pin 548 of the linkage arm 542. The upwardly extending bent portion 549 of the front tensioning buckle 530 is assembled onto the front end of the canopy strut body by a socket and plug arrangement. The slots in the side wings 546 are orientated such that tightening the adjustable screw 532 not only increases the clamping force between the elongated top clamping member 522 and the canopy strut body 524 but also moves the slots in the side wings 546 (forwards) tighter against the pins 548 of the front linkage arm 542 so providing a more sturdier connection between the front of the canopy strut and the linkage arms 542. A similar slot and pin arrangement is used to link the rear ends of the canopy struts as shown in FIG. 14L. In the particular embodiment shown in FIG. 14L, at least one end of the rear connection arm 544 comprises a side bracket or plate 550 having a slot 552 for receiving a pin 554 formed in the side of the canopy strut body 524.

The unit comprising the refrigeration plant module 50 may be combined with a lockable storage space 22 beneath, e.g. enable wheelchair access 170, as shown in FIG. 14A.

In some embodiments, various aspects related to the control and operation of the apparatus 10 may be accomplished via or in connection with the execution of programs and/or algorithms configured to perform the respective control and operations aspects. In such cases, the programs and/or algorithms may be executed via the operation of a control unit that has been configured accordingly. The control unit may be located locally at the apparatus 10 (e.g., in the access control module 40), remotely at the central control module 100, or may be distributed in some form between the apparatus 10 and the central control module 100. Thus, for example, the control unit could be embodied at the central control module 100 (or in the "cloud") and the access control module 40 could be a thin client. Alternatively, the control unit could be embodied at the access control module 40. In still other cases, some aspects of the control unit could be distributed between the central control module 100 and the access control module 40 (or multiple access control modules). Whether embodied at the access control module 40, the central control module 100, or distributed therebetween, the control unit may interface with components of the system described above via wired and/or wireless connections to facilitate the control and operation functions described above. FIG. 15 illustrates an example of a control unit that may be employed in an example embodiment.

In this regard, FIG. 15 illustrates a control unit 300 that may interface with various system components to receive information and provide control instructions that may be communicated to electrical, mechanical or electromechanical components of the apparatus 10. However, the control unit 300 may also provide a mechanism by which to conduct network communications with communications nodes (e.g., smart phones, laptops, computer terminals, servers, etc.) in a network similar to that of FIGS. 12A-12C.

As shown in FIG. 15, the control unit 300 may include processing circuitry 310 configured to perform data processing, control function execution and/or other processing and management services according to an example embodiment of the present invention. In some embodiments, the processing circuitry 310 may be embodied as a chip or chip set (e.g., PCB 89). In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. As will be seen below, the processing circuitry 310 may be configured to interface with various modules, units and/or the like, and each such module or unit may be associated with corresponding functionality executable by the control unit 300.

The user interface 330 (if implemented) may be in communication with the processing circuitry 310 to receive an indication of a user input at the user interface 330 and/or to provide an audible, visual, mechanical or other output to the user. As such, the user interface 330 may include, for example, a keypad, a mouse, a display, a touch screen, one or more levers, switches, indicator lights, speakers, microphones, buttons or keys (e.g., function buttons), and/or other input/output mechanisms. The user interface 330 may be located remotely relative to other portions of the control unit 300 in some cases. Thus, for example, if the access control module 40 is a thin client, the user interface 330 may be located at the apparatus 10 (e.g., as the graphical user interface 42), but the control unit 300 may be substantially located at the central control module 100.

The device interface 320 may include one or more interface mechanisms for enabling communication with other devices (e.g., sensors, communication nodes, locks, valves and/or other accessories or functional units such as servos, solenoids, switches or other operational control devices for providing control functions). In some cases, the device interface 320 may be any means such as a device or circuitry embodied in either hardware, or a combination of hardware and software that is configured to receive and/or transmit data from/to sensors, modules and/or other components in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein. Thus, the processor 312 may be transformed into a functional actor that is specifically configured in accordance with the instructions, algorithms and/or the like, to perform various operations described herein.

In an example embodiment, the processor 312 (or the processing circuitry 310) may be embodied as, include or otherwise control the operation of the control unit 300 based on inputs received by the processing circuitry 310 responsive to various operating conditions or component status indicators associated with the apparatus 10. As such, in some embodiments, the processor 312 (or the processing circuitry 310) may be said to cause each of the operations described in connection with the control unit 300 in relation to adjustments to be made to the components of the apparatus 10 to undertake the corresponding functionalities responsive to execution of instructions or algorithms configuring the processor 312 (or processing circuitry 310) accordingly. In particular, the instructions may include instructions for operation of the system based on operating conditions and component status as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input from the sensors and/or other components. Among the contents of the memory 314, applications and/or instructions may be stored for execution by the processor 312 in order to carry out the functionality associated with each respective application/instruction. In some cases, the applications may include instructions for processing inputs and/or providing outputs to control operation of the apparatus 10 as described herein.

In an example embodiment in which various functions described herein (and other functions) are performed in connection with the operation of configured processing circuitry, the processing circuitry 310 may be configured to interface with modules, units and/or the like that include instructions for performing the corresponding function. Thus, for example, the control unit 300 may include one or more of an access control management module 350, temperature control module 352, and a refrigeration capacity control module 354. Each of the access control management module 350, temperature control module 352, and the refrigeration capacity control module 354 may be configured to interface with components as described above to perform the corresponding functionalities described above. As such, each respective module may define algorithms to configure the control unit 300 for such interface. The control unit 300 may interface with a sensor network 360 to receive inputs used in connection with making various determinations and triggering operation of the modules or of particular functionalities associated with the modules.

In some embodiments, the control unit 300 may further include modules for executing certain functions based on operator or customer input. Thus, for example, the control unit 300 may include a scheduling module 370, ordering module 372, interface module 374, and/or other functional modules. Each module may be any means such as software, hardware and/or combinations of software and hardware configured to perform the corresponding functionality of each respective module. In some cases, any or all of the modules may be received and/or modified via interaction with other network components. Thus, for example, modules (or apps) may be provided to the access control module 40 and/or user equipment from the central control system 100 or from other repositories associated with a communication network supporting the apparatus 10.

The scheduling module 370 may include algorithms and/or instructions for determining optimal stocking of compartments 24 based on the content and/or timing of orders received relative to current and/or future compartment temperature conditions or other factors. The scheduling module 370 may also or alternatively be configured to provide tools for managing maintenance schedules, software updates, security upgrades and/or the like. The ordering module 372 may provide information on inventory, product data, pricing, sales and/or the like, and may be employed to place orders for deposit at the apparatus 10 as described above. The ordering module 372 may interface with the grocer and/or with supply chain, transportation, delivery, security and/or other entities to manage the ordering, stocking, delivery and/or replenishment of the products associated with the orders that serviced with the apparatus. The interface module 374 may provide control consoles, forms, reports and/or the like for configuring devices or user interface components to provide the interface paradigm that the user experiences when ordering, controlling or otherwise interfacing with the control unit 300. Various other modules, applications and/or downloadable component may also be provided to provide a comprehensive biome with various configurable functions and/or interaction mechanisms that may be desirable based on consumer demand and on the information provided by grocers. Moreover, the number and functionality of the modules may be determined based on the amount of information that grocers are capable of providing. As such, the capabilities of the control unit 300 may be scalable and upgradeable on a routine or periodic basis.

The storage apparatus of the present invention may advantageously be used at a centralised location, e.g., train stations and office clusters. However it is equally applicable in secure delivery or collection of goods for individual customers or companies. For example, an individual or a company may install the system outside their home or workplace. This enables groceries and other perishable items to be securely delivered and stored at the correct temperature, even when the recipient is not present.

Further features of the present invention include:

Feature A—Features Incorporated with Reference to Prior Patent Application GB1401539.0

A1. System for secure delivery or collection of goods requiring refrigeration or heating, comprising at least one lockable storage space, in which the temperature of said at least one storage space is independently controllable to provide any one of:—
 ambient temperature; or
 chilled temperature; or
 frozen temperature;
 and wherein access to the storage space is remotely programmable.

A2 System as defined in Feature A1, further comprising;
 a) an access control module for controlling the locking and/or unlocking of the at least one lockable storage space to enable access to the interior of the at least one lockable storage space;
 b) a local user interface cooperating with the access control module;
 c) a central control system comprising a collection code generation means and a collection code communication means for generating and communicating a unique collection code to the access control module associated with an individual delivery to the at least one lockable storage space;
 d) data communication means in cooperation with the central control system; said data communication means is adapted to receive the unique collection code from the central control system such that when the unique collection code is subsequently entered into the local user interface, the at least one lockable storage space is unlocked.

A3. System as defined in Feature A2, wherein the data communication means is wireless transmitter/receiver means.

A4. System as defined in Feature A3, wherein the data communication means is a mobile device or a personal computer.

A5. System as defined in Features A2 to A4, wherein the central control system communicates with the access control module with the use of a communication module, wherein the communication module transmit information via wireless or TCP/IP.

A6. System as defined in Feature A5, wherein the access control module monitors the status of the at least one lockable storage space, and to transmit information derived from such monitoring to the central control system.

A7. System as defined in any of the preceding Features A1 to A6, wherein the at least one lockable storage space comprises at least one compartment and wherein the temperature of said at least one compartment is independently controllable to provide any one of:—
 ambient temperature; or
 chilled temperature; or
 frozen temperature.

A8. System as defined in Feature A7, comprising:
 a) a primary system comprising a refrigeration system; and
 b) a secondary system comprising a heat transfer fluid that is in cooperation with the primary system;
 in which:
 c) the secondary system comprises a distribution system for distributing the heat transfer fluid to exchange heat with the at least one compartment;
 d) the temperature of said at least one compartment is independently controllable by controlling the circulation of the heat transfer fluid in the secondary system.

A9. System for secure delivery or collection of goods requiring refrigeration or heating, comprising at least one lockable storage space, wherein each of the lockable storage space comprises two or more compartments, in which the temperature of each of the compartments is independently controllable to provide any one of:—
 ambient temperature; or
 chilled temperature; or
 frozen temperature;
 characterised in that the system further comprises,
 a) a primary system comprising a refrigeration system; and
 b) a secondary system comprising a heat transfer fluid that is in cooperation with the primary system;
 in which:
 c) the secondary system comprises a distribution system for distributing the heat transfer fluid to exchange heat with each of the compartments; and
 d) the temperature of each of the compartments is independently controllable by controlling the circulation of the heat transfer fluid in the secondary system.

A10. System as defined in Feature A9, wherein each of the compartments has an interior volume and wherein the interior volume of each of the compartments is adjustable.

A11. System as defined in Feature A9 or A10, wherein each of the compartments are formed by partitioning the at least one lockable storage space and wherein the partition is moveable so as to adjust the interior volume of each of the compartments.

A12. System as defined in any of the Features A9 to Feature A11, wherein the two or more compartments are vertically stacked to form a bottom compartment and a top compartment, and wherein at least one wall of the bottom compartment is stepped so as to offer an elevated shelf for storage of goods.

A13. System as defined in any of the Features A8 to A12, wherein the primary system further comprises a heating system.

A14. System as defined in Feature A13, wherein the heat transfer fluid comprises a first heat transfer fluid in cooperation with the refrigeration system and a second heat transfer fluid in cooperation with the heating system.

A15. System as defined in Feature A14, wherein the temperature of the at least one lockable storage space or the at least one compartment or each of the compartments is independently controllable to provide significantly above ambient temperature.

A16. System as defined in Feature A15, wherein the distribution system comprises a first distribution system for distributing the first heat transfer fluid and a second heat transfer fluid for distributing the second heat transfer fluid.

A17. System as defined in any of the Features A8 to A16, wherein the distribution system comprises at least one manifold to distribute the heat transfer fluid to the at least one compartment or each of the compartments.

A18. System as defined in Feature A17, wherein the distribution system comprises at least one control valve to control the circulation of the heat transfer fluid to the at least one compartment or each of the compartments.

A19. System as defined in Feature A18, wherein the temperature of at the least one compartment or each of the compartments is controlled by a secondary heat exchanger in fluid communication with the heat transfer fluid in the distribution system.

A20. System as defined in Feature A19, wherein the secondary heat exchanger comprises a network of channels to conduct heat to the at least one wall of the at least one compartment or to at least one wall of each of the compartments such that the temperature of the at least one compartment or each of the compartments is controlled by the circulation of the heat transfer fluid within the channels.

A21. System as defined in Feature A19 or Feature A20, wherein the at least one compartment or each of the compartments comprises a fan for circulating cool or hot air from the secondary heat exchanger into the at least one compartment or into each of the compartments.

A22. System as defined in Feature A21, wherein the secondary heat exchanger comprises a conduit housed exterior of the at least one compartment or each of the compartments so as to circulate cool or hot air from within the housing into the at least one compartment or each of the compartments.

A23. System as defined in Feature A21 or A22, wherein the temperature of the at least one compartment or each of compartments is controlled by controlling the speed of the fan.

A24. System as defined in any of the Features A8 to Feature A23, wherein the system further comprises a temperature control module so as to control the temperature of the at least one compartment or each of the compartments.

A25. System as defined in Feature A24, wherein the temperature of the at least one compartment or each of the compartments is independently controllable by controlling any one of the following alone or in combination of; i) controlling the speed of the fan; and/or ii) controlling the circulation of the first and/or second heat transfer fluid in the distribution system.

A26. System as defined in any of the Features A7 to A25, wherein the at least one compartment or each of the compartments comprises a drain for drainage of liquid accumulated in the least one compartment or each of the compartments.

A27. System as defined in Feature A26, wherein the least one compartment or each of the compartments comprises sidewalls and a base, and wherein the base is sloped towards the drain.

A28. System as defined in any of the Features A9 to A27, further comprising;
a) an access control module for controlling the locking and/or unlocking of the at least one lockable storage space to enable access to the interior of the at least one lockable storage space;
b) a local user interface cooperating with the access control module;
c) a central control system comprising a collection code generation means and a collection code communication means for generating and communicating a unique collection code to the access control module associated with an individual delivery to the at least one lockable storage space;
d) data communication means in cooperation with the central control system; said data communication means is adapted to receive the unique collection code from the central control system such that when the unique collection code is subsequently entered into the local user interface, the at least one lockable storage space is unlocked.

A29. System as defined in Feature A28, wherein the data communication means is wireless transmitter/receiver means.

A30. System as defined in Feature A29, wherein the data communication means is a mobile device or a personal computer.

A31. System as defined in Features A28 to A30, wherein the central control system communicates with the access control module with the use of a communication module wherein the communication module transmit information via wireless or TCP/IP.

A32. System as defined in Feature A31, wherein the access control module monitors the status of the at least one lockable storage space, and to transmit information derived from such monitoring to the central control system.

A33. System as defined in any of the preceding features comprising modular units, wherein each of the modular units comprising at least one or more of the following:
 i) the at least one lockable storage space as defined in any of the preceding features; and/or
 ii) the refrigeration system as defined in any of features A8 to A32; and/or
 iii) the distribution system as defined in any of the features A8 to A32; and/or
 iv) the heating system as defined in Feature A13 to A32; and/or
 v) the access control module as defined in Feature A2 or Feature A8.

Feature B—Features Incorporated with Reference to Prior Patent Application GB1401910.3

B1. System for secure delivery or collection of goods, comprising at least one lockable storage space, in which the temperature of said at least one storage space is independently controllable to provide any one of:—
 ambient temperature; or
 chilled temperature; or
 frozen temperature;
 and wherein access to the storage space is remotely programmable.

B2. System as defined in Feature B1, further comprising;
a) an access control module for controlling the locking and/or unlocking of the at least one lockable storage space to enable access to the interior of the at least one lockable storage space;
b) a local user interface cooperating with the access control module;
c) a central control system comprising a collection code generation means and a collection code communication means for generating and communicating a unique collection code to the access control module associated with an individual delivery to the at least one lockable storage space;
d) data communication means in cooperation with the central control system; said data communication means is adapted to receive the unique collection code from the central control system such that when the unique collection code is subsequently entered into the local user interface, the at least one lockable storage space is unlocked.

B3. System as defined in Feature B2, wherein the data communication means is wireless transmitter/receiver means.

B4. System as defined in Feature B3, wherein the data communication means is a mobile device or a personal computer.

B5. System as defined in Features B2 to B4, wherein the central control system communicates with the access control module with the use of a communication module, wherein the communication module transmit information via wireless or TCP/IP.

B6. System as defined in Feature B5, wherein the access control module monitors the status of the at least one lockable storage space, and to transmit information derived from such monitoring to the central control system.

B7. System as defined in any of the preceding Features B1 to B6, wherein the at least one lockable storage space comprises at least one compartment and wherein the temperature of said at least one compartment is independently controllable to provide any one of:—
ambient temperature; or
chilled temperature; or
frozen temperature.

B8. System as defined in Feature B7, comprising:
a) a primary system comprising a refrigeration system; and
b) a secondary system comprising a heat transfer fluid that is in cooperation with the primary system;
in which:
c) the secondary system comprises a distribution system for distributing the heat transfer fluid to exchange heat with the at least one compartment;
d) the temperature of said at least one compartment is independently controllable by controlling the circulation of the heat transfer fluid in the secondary system.

B9. System for secure delivery or collection of goods requiring refrigeration or heating, comprising at least one lockable storage space, wherein each of the lockable storage space comprises two or more compartments, in which the temperature of each of the compartments is independently controllable to provide any one of:—
ambient temperature; or
chilled temperature; or
frozen temperature;
characterised in that the system further comprises,
a) a primary system comprising a refrigeration system; and
b) a secondary system comprising a heat transfer fluid that is in cooperation with the primary system;
in which:
c) the secondary system comprises a distribution system for distributing the heat transfer fluid to exchange heat with each of the compartments; and
d) the temperature of each of the compartments is independently controllable by controlling the circulation of the heat transfer fluid in the secondary system.

B10. System as defined in Feature B9, wherein each of the compartments has an interior volume and wherein the interior volume of each of the compartments is adjustable.

B11. System as defined in Feature B9 or B10, wherein each of the compartments are formed by partitioning the at least one lockable storage space and wherein the partition is moveable so as to adjust the interior volume of each of the compartments.

B12. System as defined in any of the Features B9 to Feature B11, wherein the two or more compartments are vertically stacked to form a bottom compartment and a top compartment, and wherein at least one wall of the bottom compartment is stepped so as to offer an elevated shelf for storage of goods.

B13. System as defined in any of the Features B8 to B12, wherein the primary system further comprises a heating system.

B14. System as defined in Feature B13, wherein the heat transfer fluid comprises a first heat transfer fluid in cooperation with the refrigeration system and a second heat transfer fluid in cooperation with the heating system.

B15. System as defined in Feature B14, wherein the temperature of the at least one lockable storage space or the at least one compartment or each of the compartments is independently controllable to provide significantly above ambient temperature.

B16. System as defined in Feature B15, wherein the distribution system comprises a first distribution system for distributing the first heat transfer fluid and a second heat transfer fluid for distributing the second heat transfer fluid.

B17. System as defined in any of the Features B8 to B16, wherein the distribution system comprises at least one manifold to distribute the heat transfer fluid to the at least one compartment or each of the compartments.

B18. System as defined in Feature B17, wherein the distribution system comprises at least one control valve to control the circulation of the heat transfer fluid to the at least one compartment or each of the compartments.

B19. System as defined in Feature B18, wherein the temperature of at the least one compartment or each of the compartments is controlled by a secondary heat exchanger in fluid communication with the heat transfer fluid in the distribution system.

B20. System as defined in Feature B19, wherein the secondary heat exchanger comprises a network of channels to conduct heat to the at least one wall of the at least one compartment or to at least one wall of each of the compartments such that the temperature of the at least one compartment or each of the compartments is controlled by the circulation of the heat transfer fluid within the channels.

B21. System as defined in Feature B19 or Feature B20, wherein the at least one compartment or each of the compartments comprises a fan for circulating cool or hot air from the secondary heat exchanger into the at least one compartment or into each of the compartments.

B22. System as defined in Feature B21, wherein the secondary heat exchanger comprises a conduit housed exterior of the at least one compartment or each of the compartments so as to circulate cool or hot air from within the housing into the at least one compartment or each of the compartments.

B23. System as defined in Feature B21 or B22, wherein the temperature of the at least one compartment or each of compartments is controlled by controlling the speed of the fan.

B24. System as defined in any of the Features B8 to Feature B23, wherein the system further comprises a temperature control module so as to control the temperature of the at least one compartment or each of the compartments.

B25. System as defined in Feature B24, wherein the temperature of the at least one compartment or each of the compartments is independently controllable by controlling any one of the following alone or in combination of; i) controlling the speed of the fan; and/or ii) controlling the circulation of the first and/or second heat transfer fluid in the distribution system.

B26. System as defined in any of the Features B7 to B25, wherein the at least one compartment or each of the compartments comprises a drain for drainage of liquid accumulated in the least one compartment or each of the compartments.

B27. System as defined in Feature B26, wherein the least one compartment or each of the compartments comprises sidewalls and a base, and wherein the base is sloped towards the drain.

B28. System as defined in any of the Features B9 to B27, further comprising;
  a) an access control module for controlling the locking and/or unlocking of the at least one lockable storage space to enable access to the interior of the at least one lockable storage space;
  b) a local user interface cooperating with the access control module;
  c) a central control system comprising a collection code generation means and a collection code communication means for generating and communicating a unique collection code to the access control module associated with an individual delivery to the at least one lockable storage space;
  d) data communication means in cooperation with the central control system; said data communication means is adapted to receive the unique collection code from the central control system such that when the unique collection code is subsequently entered into the local user interface, the at least one lockable storage space is unlocked.

B29. System as defined in Feature B28, wherein the data communication means is wireless transmitter/receiver means.

B30. System as defined in Feature B29, wherein the data communication means is a mobile device or a personal computer.

B31. System as defined in Features B28 to B30, wherein the central control system communicates with the access control module with the use of a communication module wherein the communication module transmit information via wireless or TCP/IP.

B32. System as defined in Feature B31, wherein the access control module monitors the status of the at least one lockable storage space, and to transmit information derived from such monitoring to the central control system.

B33. System as defined in any of the preceding features comprising modular units, wherein each of the modular units comprising at least one or more of the following:
  i) the at least one lockable storage space as defined in any of the preceding features; and/or
  ii) the refrigeration system as defined in any of features B8 to B32; and/or
  iii) the distribution system as defined in any of the features B8 to B32; and/or
  iv) the heating system as defined in Features B13 to B32; and/or
  v) the access control module as defined in Feature B2 or Feature B8.

B34. A compartment for use in the system as defined in any of the features B1 to B33 comprising;
  a) a cavity;
  b) an insulating layer exterior of the cavity;
  c) at least one heat exchanger mounted to at least one exterior wall of the cavity and partially embedded within the insulation layer.

B35. The compartment as defined in Feature B34, further comprising an electric heating element mounted to at least one wall of the cavity and partially embedded within the insulation.

B36. A stack of compartments, each compartment is the compartment as defined in Feature B34 or B35, B37. The stack of feature B36, wherein each compartment is mounted within a frame or support structure, each compartment having an open end, and at least one lockable door mounted to the frame for closing one or more open ends of each of the compartments.

B38. The stack of feature B36 or B37, wherein each compartment has an interior volume and wherein the interior volume of one compartment in the stack is different to the interior volume of another compartment in the stack.

B39. A method for producing a compartment as defined in feature B34 or B35 comprising:
  i) forming the cavity from a mould;
  ii) mounting the heat exchanger to the exterior sidewall of the cavity to form an assembly;
  iii) partially moulding insulation around the assembly such that the heat exchanger is partially embedded within the insulation.

B40. The method of feature B39, wherein step (iii) further comprises the steps of:
  i) placing the assembly within an outer mould so as to form a gap between the wall of the cavity and the outer mould;
  ii) injection moulding insulation in the gap.

Feature C—Features Incorporated with Reference to Prior Patent Application GB1405566.9

C1. A lockable temperature controlled storage apparatus, comprising
  a. two or more compartments controllable to have different temperatures; and
  b. a remotely programmable insulated lockable door closable to seal the two or more compartments from each other.

C2. The lockable temperature controlled storage apparatus of feature C1, wherein each compartment is a temperature controlled compartment.

C3. The lockable temperature controlled storage apparatus of feature C1 or C2, wherein one or more sealing members are provided to effect sealing of the compartments from each other by the remotely programmable insulated lockable door.

C4. The lockable temperature controlled storage apparatus of feature C3, wherein the sealing members are provided on the door, in or adjacent the compartments or both on the door and in or adjacent the compartments.

C5. The lockable temperature controlled storage apparatus of any of the features C1 to C4, wherein the insulated lockable door comprises a master door and at least one insulating panel detachable from the master door.

C6. The lockable temperature controlled storage apparatus of feature C5, wherein the at least one insulating panel is secured to the master door by means of a snap-on fixture or magnetic means.

C7. The lockable temperature controlled storage apparatus of feature C5 or C6, wherein each of the two or more compartments is provided with a respective said insulating panel.

C8. A door for closing a temperature controlled apparatus comprising a master door, said master door comprising fixing points for detachably securing at least one insulating panel to the master door.

C9. The door of feature C8, wherein the insulating panel is detachably secured to the master door by means of a snap-on fixture or magnetic means.

C10. The door of feature C8 or C9, wherein the door is for closing an oven or a refrigerator.

C11. An oven or a refrigerator comprising a door of any of the features C8 to C10.

C12. An assembly of storage spaces, comprising:
a) three or more storage spaces, each of the three or more storage spaces comprising one or more compartments;
b) at least one common distribution system comprising a heat transfer fluid that is arranged to be in cooperation with a refrigeration system, said at least one common distribution system distributing the heat transfer fluid to exchange heat with the one or more compartments in the each of the three or more storage spaces;
wherein the three or more storage spaces each comprises a remotely programmable insulated lockable door.

C13. The assembly of feature C12, wherein each of the compartments comprises;
a) a cavity;
b) an insulating layer exterior of the cavity;
c) at least one heat exchanger for cooperation with the refrigeration system, said at least one heat exchanger being mounted to at least one wall of the cavity and partially embedded within the insulation layer.

C14. An assembly of storage spaces each of the storage spaces comprising a plurality of compartments;
a) at least one common distribution system for distributing a heat transfer fluid to and from the plurality of compartments;
b) means for separately varying the quantity of heat transferred to the heat transfer fluid to the plurality of compartments.

C15. An assembly of storage spaces, wherein each of the assembly of storage spaces comprising:
a) one or more compartments;
b) a housing having a cavity with internal frontal dimensions to accommodate the plurality of storage spaces;
wherein the one or more compartments have external dimensions in substantially integral ratios such that different combinations of the one or more compartments substantially fills the cavity.

C16. The assembly of feature C15, wherein the height of the one or more compartments are in substantially integral ratios.

C17. The assembly of feature C16, wherein the width of the one or more compartments are in substantially integral ratios.

C18. The assembly of feature C17, wherein the depth of the one or more compartments are in substantially integral ratios.

C19. The assembly of any of the features C15 to C18, wherein the integral ratios is x:y:z, where x or y or z has any value of 1 or 2 or 3 or 4 or 5.

C20. The assembly of any of the features C15 to C19, further comprising:
a) at least one common distribution system for distributing a heat transfer fluid to and from each of the one or more compartments; and
b) means for separately varying the quantity of heat transferred to the heat fluid to each of the one or more compartments.

C21. The assembly of any of the features C5 to C13, wherein the refrigeration system is located remotely to the assembly of storage spaces; and wherein the refrigeration system is in cooperation with the at least one common distribution system.

C22. The assembly of any of the features C11 to C21, wherein each of the compartments comprises a heat exchanger and wherein the quantity of heat transferred to the heat transfer fluid is separately varied through the heat exchangers.

C23. The assembly of feature C22, wherein the quantity of heat transferred is varied by varying the duration of time the heat transfer fluid passes to the compartments or through the heat exchanger.

C24. The assembly of feature C22 or C23, wherein the quantity of heat transferred is varied by varying the quantity of heat transfer fluid to the compartments.

C25. The assembly of any of features C22 to C24, further comprising at least one valve for varying the quantity of heat transfer fluid to the compartments.

C26. The assembly of any of features C20 to C25, wherein the quantity of heat transferred is varied to each of the one or more compartments by varying the temperature difference between the heat transfer fluid to the each of the one or more compartments and the temperature of their corresponding compartments.

C27. The assembly of any of the features C22 to C19, wherein the heat transfer fluid is a liquid or a gas.

C28. The assembly of feature C27, wherein the heat transfer fluid is a refrigerant such that the refrigerant in the at least one common distribution is arranged to be in fluid communication with the heat exchanger in each of the compartments.

C29. An assembly of storage spaces, each of the storage spaces comprising one or more compartments; said assembly comprising;
a) a primary refrigeration unit comprising a refrigerant to exchange heat with the one or more compartments in the each of the storage spaces;
b) a chiller unit in cooperation with the primary refrigeration unit so as to dissipate heat from the refrigerant.

C30. The assembly of storage spaces of feature C29, further comprising at least one common distribution system that is arranged to be in cooperation with the primary refrigeration unit so as to distribute the refrigerant to exchange heat with the one or more compartments in the each of the storage spaces C31. The assembly of storage spaces of feature C29 or C30, wherein the chiller unit is a separate chiller refrigeration unit, said chiller unit is in cooperation with the primary refrigeration system by a separate distribution system distributing a heat transfer fluid to exchange heat with the refrigerant in the primary refrigeration unit.

C32. The assembly of storage spaces of feature C31, wherein said separate distribution system distributes the heat transfer fluid to a plurality of said primary refrigeration units.

C33. The assembly of storage spaces of feature C31 or C32, wherein the heat transfer fluid is a liquid, preferably comprising glycol.

C32. The assembly of storage space of any of the features C29 to C31, wherein each of the storage spaces each comprises a remotely programmable insulated lockable door.

C33. The assembly of any of the features C22 to C32, wherein the each of the compartments comprises at least one fan for varying the quantity of heat transferred from the heat exchanger to the compartments.

C34. The assembly of any of the features C12 to C33, wherein the each of the compartments are modular.

C35. The assembly of features C34, wherein the each of the compartments are removable.

C36. The assembly of any of the features C12 to C35, wherein the storage spaces are arranged in a substantially vertical or horizontal stack.

C37. The assembly of any of the features C12 to C36, wherein each of the one or more compartments or each of the plurality of compartments is a temperature controlled compartment.

C38. A method for preparing temperature sensitive items for delivery to a remotely lockable temperature controlled storage device comprising one or more compartments, the method comprising the steps of:—
  i) receiving a user request for delivery of one or more temperature sensitive items;
  ii) determining the required temperature of the one or more temperature sensitive items;
  iii) placing the one or more temperature sensitive items in one or more containers of selected size such that the items in any one container may be exposed to a common temperature range without adverse effect;
  iv) before or after placing the one or more temperature sensitive items in one or more containers of selected size, determining availability at the remotely lockable temperature controlled storage device of one or more compartments:—
    a) at or controllable to a temperature or temperatures to receive the containers
    b) of suitable dimensions to receive the containers.

C39. The method of feature C38, in which the compartments are of different size and the containers are of selected size to closely fit the width and/or depth of the compartments so as to enable easy removal of the containers.

C40. The method of feature C38 or C39, in which the containers are of selected size to closely fit in the height of the containers so as to enable easy removal of the containers.

C41. The method of any of the features C38 to C40, in which the containers are stackable such that two or more containers adapted to fit in a small compartment can be stacked to fit in a larger compartment while protecting the goods from crushing.

C42. A lockable temperature controlled storage apparatus comprising:—
  i) an assembly of compartments as defined in any of the features C12 to C37; and
  ii) a plurality of containers dimensioned to closely fit the dimensions of the compartments.

C43. The lockable temperature controlled storage apparatus of feature C42, wherein the one or more compartments are insulated.

Feature D—Features Incorporated with Reference to Prior Patent Application GB1411043.1

D1. An assembly of storage spaces, comprising:
  a) three or more storage spaces, each of the three or more storage spaces comprising one or more compartments;
  b) at least one common distribution system comprising a heat transfer fluid that is arranged to be in cooperation with a refrigeration system, said at least one common distribution system distributing the heat transfer fluid to exchange heat with the one or more compartments in the each of the three or more storage spaces;
  wherein the three or more storage spaces each comprises a remotely programmable insulated lockable door.

D2. The assembly of feature D1, wherein each of the three of more storage spaces comprising a plurality of compartments.

D3. The assembly of any of the preceding features, wherein each of the compartments comprises;
  a) a cavity;
  b) an insulating layer exterior of the cavity;
  c) at least one heat exchanger for cooperation with the refrigeration system, said at least one heat exchanger being mounted to at least one wall of the cavity and partially embedded within the insulation layer.

D4. The assembly of feature D3, wherein the cavity has an internal volume of substantially 65 litres or 145 litres or 226 litres.

D5. The assembly of feature D4, wherein the cavity has an internal length of substantially 620 mm and a width of substantially 420 mm and wherein the height is substantially 250 mm or 560 mm or 870 mm.

D6. The assembly of any of the preceding features, wherein each of the assembly of storage spaces comprising a housing having a cavity with internal frontal dimensions to accommodate the three or more storage spaces.

D7. The assembly of feature D6, wherein the one or more compartments have external dimensions in substantially integral ratios such that different combinations of the one or more compartments substantially fills the cavity.

D8. The assembly of feature D7, wherein the height of the one or more compartments are in substantially integral ratios.

D9. The assembly of feature D8, wherein the width of the one or more compartments are in substantially integral ratios.

D0. The assembly of feature D9, wherein the depth of the one or more compartments are in substantially integral ratios.

D11. The assembly of any of the features D8 to D10, wherein the integral ratios is x:y:z, where x or y or z has any value of 1 or 2 or 3 or 4 or 5.

D12. The assembly of any of the preceding features, wherein the refrigeration system is located remotely to the assembly of storage spaces; and wherein the refrigeration system is in cooperation with the at least one common distribution system.

D13. The assembly of any of the preceding features, wherein said one or more compartments are controllable to have different temperatures by separately varying the quantity of heat transferred to the heat transfer fluid to the one or more compartments.

D14. The assembly of feature D13, wherein the quantity of heat transferred to the heat transfer fluid is separately varied through the heat exchangers.

D15. The assembly of feature D14, wherein the quantity of heat transferred is varied by varying the duration of time the heat transfer fluid passes to the compartments or through the heat exchanger.

D16. The assembly of feature D14 or D15, wherein the quantity of heat transferred is varied by varying the quantity of heat transfer fluid to the compartments.

D17. The assembly of any of features D14 to D16, further comprising at least one valve for varying the quantity of heat transfer fluid to the compartments.

D18. The assembly of any of features D14 to D17, wherein the quantity of heat transferred is varied to each of the one or more compartments by varying the temperature difference between the heat transfer fluid to the each of the one or more compartments and the temperature of their corresponding compartments.

D19. The assembly of any of the features D14 to D18, wherein the heat transfer fluid is a liquid or a gas.

D20. The assembly of feature D19, wherein the heat transfer fluid is a refrigerant such that the refrigerant in the at least one common distribution is arranged to be in fluid communication with the heat exchanger in each of the compartments.

D21. The assembly of feature D20, wherein the assembly comprising a chiller unit in cooperation with the primary refrigeration unit so as to dissipate heat from the refrigerant.

D22. The assembly of storage spaces of feature D21, wherein the chiller unit is a separate chiller refrigeration unit, said chiller unit is in cooperation with the primary refrigeration system by a separate distribution system distributing a heat transfer fluid to exchange heat with the refrigerant in the primary refrigeration unit.

D23. The assembly of storage spaces of feature D22, wherein said separate distribution system distributes the heat transfer fluid to a plurality of said primary refrigeration units.

D24. The assembly of storage spaces of feature D22 or D24, wherein the heat transfer fluid is a liquid, preferably comprising glycol.

D25. The assembly of any of the features D13 to D24, wherein the temperature of each of the one or more compartments is remotely controllable.

D26. The assembly of any of the preceding features, wherein the each of the compartments comprises at least one fan for varying the quantity of heat transferred from the heat exchanger to the compartments.

D27. The assembly of any of the preceding features, wherein the each of the compartments are modular.

D28. The assembly of features D27, wherein the each of the compartments are removable.

D29. The assembly of any of the preceding features, wherein the storage spaces are arranged in a substantially vertical or horizontal stack.

D30. The assembly of any of the preceding features, wherein one or more sealing members are provided to effect sealing each of the compartments from the atmosphere.

D31. The assembly of feature D30, wherein the sealing members are provided on the remotely programmable insulated lockable door, in or adjacent the compartments or both on the remotely programmable insulated lockable door and in or adjacent the compartments.

D32. The assembly of any of the preceding features, wherein the remotely programmable insulated lockable door comprising a master door, said master door comprising fixing points for detachably securing at least one insulating panel to the master door.

D33. The assembly of feature D32, wherein the insulating panel is detachably secured to the master door by means of a snap-on fixture or magnetic means.

Feature E—Features Incorporated with Reference to Prior Patent Application GB1416641.7

E1. A lockable temperature controlled storage apparatus, comprising:

a) two or more remotely lockable storage spaces, wherein each of two or more remotely lockable storage space comprises at least one compartment;

b) at least one common distribution system comprising a heat transfer fluid that is arranged to be in cooperation with a refrigeration system, said at least one common distribution system distributing the heat transfer fluid at a supplied pressure to exchange heat with the at least one compartment;

characterised in that the heat transfer fluid is distributed to said one or more compartments sequentially.

E2. A lockable temperature controlled storage apparatus, comprising:

a) two or more remotely lockable storage spaces, wherein each of two or more remotely lockable storage space comprises at least one compartment;

b) at least one common distribution system comprising a heat transfer fluid that is arranged to be in cooperation with a refrigeration system, said at least one common distribution system distributing the heat transfer fluid at a supplied pressure to exchange heat with the at least one compartment;

c) a controller arranged to prioritise the distribution of heat transfer fluid to each of the compartments.

E3. The lockable temperature controlled storage apparatus of feature E1 or E2, comprising at least one valve for varying the quantity of heat transfer fluid to the at least one compartment in each of the two or more storage spaces and wherein said valves are arranged to distribute the heat transfer fluid to said compartments sequentially.

E4. The lockable temperature controlled storage apparatus of any of the preceding features, wherein the heat transfer fluid is a refrigerant.

E5. The lockable temperature controlled storage apparatus of any of the preceding features, wherein the heat transfer fluid is distributed sequentially to each said two or more compartments for a predetermined amount of time.

E6. The lockable temperature controlled storage apparatus of any of the preceding features, wherein the refrigeration system has a cooling capacity for exchanging heat with a predetermined number of compartments in a given time.

E7. The lockable temperature controlled storage apparatus of feature E6 or E7, wherein the predetermined number of compartments is two compartments.

E8. The lockable temperature controlled storage apparatus as defined in feature E7, wherein the lockable temperature controlled storage apparatus is arranged to determine the status of the cooling capacity of the refrigeration system and if the cooling capacity has been exceeded determines the availability of one or more compartments.

E10. The lockable temperature controlled storage apparatus as defined in feature E8 and feature E3, wherein the lockable temperature controlled storage apparatus is arranged to determine the cooling capacity of the refrigeration system by determining the status of said valves.

E11. The lockable temperature controlled storage apparatus as defined in feature E10, wherein the lockable temperature controlled storage apparatus is arranged to determine the status of said valves by determining whether one or more valves have been actuated.

E12. The lockable temperature controlled storage apparatus as defined in any of the preceding features, wherein said one or more compartments are placed in a queue, E13. The lockable temperature controlled storage apparatus as defined in Feature E12, wherein said one or more compartments are prioritised in the queue based on their waiting time and/or their differential temperature.

E14. The lockable temperature controlled storage apparatus of feature E13 and feature E3, comprising a timer for determining the waiting time of each compartment in the queue and wherein actuation of said valve to each of said one or more compartments is prioritised based on their corresponding waiting time.

E15. The lockable temperature controlled storage apparatus of feature E14, wherein said compartment having the longest waiting time is prioritised in the queue.

E16. The lockable temperature controlled storage apparatus as defined in any of the features E13 to E15, wherein actuation of said corresponding valve to each of said one or more compartments in the queue is prioritised having to the compartment with the largest temperature differential.

E17. The lockable temperature controlled storage apparatus as defined in any of the features E3 to E16, comprising a controller for controlling the actuation of said valves sequentially.

E18. The lockable temperature controlled storage apparatus as defined in feature E17, wherein the controller places the compartments in a queue and prioritises the compartments in the queue.

E19. The lockable temperature controlled storage apparatus as defined in any of the preceding features and feature E3, wherein the controller is arranged to prioritise the one or more compartments in the queue by prioritising their corresponding valves.

E20. The lockable temperature controlled storage apparatus as defined in any of the features E17 to E20, wherein the controller is arranged to monitor the status of the valves.

E21. The lockable temperature controlled storage apparatus as defined in feature E20, wherein the controller is arranged to place the one or more compartments in the queue in an event that a predetermined number of valves are occupied.

E22. The lockable temperature controlled storage apparatus as defined in any of the preceding features E1 TO E21, comprising
  i) a first compartment at a first temperature and a second compartment at a second temperature, said first compartment is set to a first set point temperature and said second compartment is set to a second set point temperature, and
  ii) a controller arranged to prioritise the transfer of heat transfer fluid to said first compartment or the second compartment in response to the compartment temperature differential between first temperature and the first set point temperature and between the second temperature and the second set point temperature.

E23. The lockable temperature controlled storage apparatus as defined in any of the preceding features, comprising
  i) a first compartment and a second compartment, said first compartment has a first waiting time and said second compartment has a second waiting time, and
  ii) a controller arranged to prioritise the transfer of heat transfer fluid to said first compartment or the second compartment in response to the waiting time of the first compartment and the second compartment.

E24. A method of distributing heat transfer fluid to two or more compartments of a lockable temperature controlled storage apparatus, said lockable temperature controlled storage apparatus comprising;
  a) two or more remotely lockable storage spaces, wherein each of two or more remotely lockable storage space comprises at least one compartment; and
  b) at least one common distribution system comprising a heat transfer fluid that is arranged to be in cooperation with a refrigeration system, said at least one common distribution system distributing the heat transfer fluid at a supplied pressure to exchange heat with the at least one compartment;
  said method comprising the step of distributing the heat transfer fluid sequentially to each of said two or more compartments.

E25. A method of distributing heat transfer fluid to two or more compartments of a lockable temperature controlled storage apparatus, said lockable temperature controlled storage apparatus comprising;
  a) two or more remotely lockable storage spaces, wherein each of two or more remotely lockable storage space comprises at least one compartment; and
  b) at least one common distribution system comprising a heat transfer fluid that is arranged to be in cooperation with a refrigeration system, said at least one common distribution system distributing the heat transfer fluid at a supplied pressure to exchange heat with the at least one compartment;
  said method comprises the step of prioritising the distribution of the heat transfer fluid to each of said two or more compartments.

E26. The method of feature E25, wherein the step of prioritising the distribution of the heat transfer fluid to each of said one or more compartments comprises the step of;
  i) placing each of said two or more compartments in a queue;
  ii) determining the waiting time of each of said two or more compartments in the queue;
  iii) prioritising the distribution of the heat transfer fluid to each of said two or more compartments based on their corresponding waiting times.

E27. The method of feature E25 or E26, wherein the step of prioritising the distribution of the heat transfer fluid to each of said two or more compartments comprises the step of;
  i) placing each of said two or more compartments in a queue;
  ii) determining the temperature of each of said two or more compartments in the queue;
  iii) determining the set point temperature of each of said two or more compartments in the queue;
  iv) prioritising the distribution of the heat transfer fluid to each of said two or more compartments based on their corresponding temperature differential between the temperature of the first compartment and the set point temperature of the first compartment; and between the temperature of the second compartment and the set point temperature of the second compartment.

E28. The method of any of the features E24 to E27, wherein said lockable temperature controlled apparatus comprise at least one valve for varying the quantity of heat transfer fluid to the at least one compartment in each of the two or more storage spaces and wherein the heat transfer fluid is distributed sequentially to said compartments by actuating said valves sequentially.

E29. The method of any of the features E24 to E28, wherein said refrigeration system has a cooling capacity for exchanging heat with a predetermined number of compartments in a given time.

E30. A lockable temperature controlled storage apparatus comprising;
  a) two or more remotely lockable storage spaces, wherein each of two or more remotely lockable storage space comprises at least one compartment; each of said compartments comprising a first temperature sensing device and a second temperature device;
  b) at least one common distribution system comprising a heat transfer fluid that is arranged to be in cooperation with a refrigeration system, said at least one common distribution system distributing the heat transfer fluid at a supplied pressure to exchange heat with the at least one compartment;
  c) a controller arranged to:—
  i) interrupt the flow of heat transfer fluid to at least one compartment when the temperature from the second temperature device reaches a lower limit and re-establish the flow of heat transfer fluid to exchange heat with said at least one compartment when the temperature from the second temperature device reaches an upper limit;
  ii) repeat step (i) until the temperature from the first temperature sensing device reaches a predetermined set point temperature.

E31. The lockable temperature controlled storage apparatus of feature E30, wherein the temperature measurement from the first temperature sensing device is an indication of the air temperature inside said at least one compartment.

E32. The lockable temperature controlled storage apparatus of feature E30 or E31, wherein the first temperature sensing device is fixed to at least one wall of the compartment.

E33. The lockable temperature controlled storage apparatus of any of features E30 to E32, wherein said at least one compartment comprises a heat exchanger or an evaporator in fluid communication with the heat transfer and wherein the second temperature sensing device is located adjacent the heat exchanger or the evaporator.

E34. The lockable temperature controlled storage apparatus of any of the features E30 to E33, comprising at least one valve for varying the quantity of heat transfer fluid to the at least one compartment in each of the two or more storage spaces and wherein said controller is arranged to control the actuation of the valves for interrupting and re-establishing the flow of the heat transfer fluid between the lower limit and the upper limit of the temperature from the second temperature sensing device respectively to at least one compartment.

E35. The lockable temperature controlled storage apparatus of any of the features E30 to E34, wherein said upper limit is substantially −7° C. and said lower limit is substantially −10° C.

E36. A method of controlling the temperature of at least one compartment in a lockable temperature controlled storage apparatus, said lockable temperature controlled storage apparatus comprising;
a) two or more remotely lockable storage spaces, wherein each of two or more remotely lockable storage space comprises at least one compartment; each of said compartments comprising a first temperature sensing device and a second temperature device;
b) at least one common distribution system comprising a heat transfer fluid that is arranged to be in cooperation with a refrigeration system, said at least one common distribution system distributing the heat transfer fluid at a supplied pressure to exchange heat with the at least one compartment;
comprising the steps of;
i) interrupting the flow of heat transfer fluid to at least one compartment when the temperature from the second temperature device reaches a lower limit and re-establishing the flow of heat transfer fluid to exchange heat with said at least one compartment when the temperature from the second temperature device reaches an upper limit;
ii) repeating step (i) until the temperature from the first temperature sensing device reaches a predetermined set point temperature.

E37. The method of feature E36, comprising at least one valve for varying the quantity of heat transfer fluid to the at least one compartment in each of the two or more storage spaces and wherein said controller is arranged to control the actuation of the valves for interrupting and re-establishing the flow of the heat transfer fluid between a lower limit and an upper limit respectively.

E38. A shelving unit for a lockable temperature controlled storage apparatus as defined in any of the features 1 to 23 or feature 30 to 35 comprising a moveable shelf supported by a frame.

E39. The shelving unit of feature E38, wherein the frame is a bent wire frame.

E40. The shelving unit of feature E38 or E39, wherein the frame comprises at least two or more legs and wherein the shelf is supported to the at least two or more legs by slideable fixing points to permit the shelf to be move along the at least two or more legs of the frame.

E41. The shelving unit of any of the features E38 to E40, wherein the frame comprises an inward upper portion and an outward lower portion, said inward upper portion and said outward lower portion meet to define a resting point for the shelf.

E42. The shelving unit of feature E41, wherein the resting point is a joggle.

E43. The shelving unit of feature E41 or E42, wherein the lower portion is outwardly offset of the upper portion.

E44. The shelving unit of any of the features E41 to E42, wherein the lower portion is sized to butt up against opposing walls of a compartment.

E45. The shelving unit of any of the features E41 to E44, wherein the shelf is moveable along the upper portion.

E46. The shelving unit of any of the features E38 to E45, wherein the shelf and/or the frame comprises fixing points to securing the shelf in a raised position.

E47. A compartment for a lockable temperature controlled storage apparatus as defined in any of the features E1 to E23 or feature E30 to E35 comprising a shelving unit as defined in any of the features E38 to E48 secured to the compartment.

Feature F—Features Incorporated with Reference to Prior Patent Application GB1416742.3

F1. A lockable temperature controlled storage apparatus, comprising:
a) two or more remotely lockable storage spaces, wherein each of two or more remotely lockable storage space comprises at least one compartment;
b) at least one common distribution system comprising a heat transfer fluid that is arranged to be in cooperation with a refrigeration system, said at least one common distribution system distributing the heat transfer fluid at a supplied pressure to exchange heat with the at least one compartment;
characterised in that the heat transfer fluid is distributed to said one or more compartments sequentially.

F2. A lockable temperature controlled storage apparatus, comprising:
a) two or more remotely lockable storage spaces, wherein each of two or more remotely lockable storage space comprises at least one compartment;
b) at least one common distribution system comprising a heat transfer fluid that is arranged to be in cooperation with a refrigeration system, said at least one common distribution system distributing the heat transfer fluid at a supplied pressure to exchange heat with the at least one compartment;
c) a controller arranged to prioritise the distribution of heat transfer fluid to each of the compartments.

F3. The lockable temperature controlled storage apparatus of feature F1 or F2, comprising at least one valve for varying the quantity of heat transfer fluid to the at least one compartment in each of the two or more storage spaces and wherein said valves are arranged to distribute the heat transfer fluid to said compartments sequentially.

F4. The lockable temperature controlled storage apparatus of any of the preceding features, wherein the heat transfer fluid is a refrigerant.

F5. The lockable temperature controlled storage apparatus of any of the preceding features, wherein the heat transfer fluid is distributed sequentially to each said two or more compartments for a predetermined amount of time.

F6. The lockable temperature controlled storage apparatus of any of the preceding features, wherein the refrigeration system has a cooling capacity for exchanging heat with a predetermined number of compartments in a given time.

F7. The lockable temperature controlled storage apparatus of feature F6, wherein the predetermined number of compartments is two compartments.

F8. The lockable temperature controlled storage apparatus as defined in feature F7, wherein the lockable temperature controlled storage apparatus is arranged to determine the status of the cooling capacity of the refrigeration system and if the cooling capacity has been exceeded determines the availability of one or more compartments.

F9. The lockable temperature controlled storage apparatus as defined in feature F8 and feature F3, wherein the lockable temperature controlled storage apparatus is arranged to determine the cooling capacity of the refrigeration system by determining the status of said valves.

F10. The lockable temperature controlled storage apparatus as defined in feature F9, wherein the lockable temperature controlled storage apparatus is arranged to determine the status of said valves by determining whether one or more valves have been actuated.

F11. The lockable temperature controlled storage apparatus as defined in any of the preceding features, wherein said one or more compartments are placed in a queue.

F12. The lockable temperature controlled storage apparatus as defined in Feature F11, wherein said one or more compartments are prioritised in the queue based on their waiting time and/or their differential temperature.

F13. The lockable temperature controlled storage apparatus of feature F12 and feature F3, comprising a timer for determining the waiting time of each compartment in the queue and wherein actuation of said valve to each of said one or more compartments is prioritised based on their corresponding waiting time.

F14. The lockable temperature controlled storage apparatus of feature F13, wherein said compartment having the longest waiting time is prioritised in the queue.

F15. The lockable temperature controlled storage apparatus as defined in any of the features F12 to F14, wherein actuation of said valve to each of said one or more corresponding compartments in the queue is prioritised to the compartment with the largest temperature differential.

F16. The lockable temperature controlled storage apparatus as defined in any of the features F3 to F15, comprising a controller for controlling the actuation of said valves sequentially.

F17. The lockable temperature controlled storage apparatus as defined in feature F16, wherein the controller places the compartments in a queue and prioritises the compartments in the queue.

F18. The lockable temperature controlled storage apparatus as defined in any of the preceding features and feature F3, wherein the controller is arranged to prioritise the one or more compartments in the queue by prioritising actuation of their corresponding valves.

F19. The lockable temperature controlled storage apparatus as defined in any of the features F16 to F18, wherein the controller is arranged to monitor the status of the valves.

F20. The lockable temperature controlled storage apparatus as defined in feature F19, wherein the controller is arranged to place the one or more compartments in the queue in an event that a predetermined number of valves are actuated.

F21. The lockable temperature controlled storage apparatus as defined in any of the preceding features, comprising
i) a first compartment at a first temperature and a second compartment at a second temperature, said first compartment is set to a first set point temperature and said second compartment is set to a second set point temperature, and
ii) a controller arranged to prioritise the transfer of heat transfer fluid to said first compartment or the second compartment in response to the compartment temperature differential between first temperature and the first set point temperature and between the second temperature and the second set point temperature.

F22. The lockable temperature controlled storage apparatus as defined in any of the preceding features, comprising
i) a first compartment and a second compartment, said first compartment has a first waiting time and said second compartment has a second waiting time, and
ii) a controller arranged to prioritise the transfer of heat transfer fluid to said first compartment or the second compartment in response to the waiting time of the first compartment and the second compartment.

F23. A method of distributing heat transfer fluid to two or more compartments of a lockable temperature controlled storage apparatus, said lockable temperature controlled storage apparatus comprising;
a) two or more remotely lockable storage spaces, wherein each of two or more remotely lockable storage space comprises at least one compartment; and
b) at least one common distribution system comprising a heat transfer fluid that is arranged to be in cooperation with a refrigeration system, said at least one common distribution system distributing the heat transfer fluid at a supplied pressure to exchange heat with the at least one compartment;
said method comprising the step of distributing the heat transfer fluid sequentially to each of said two or more compartments.

F24. A method of distributing heat transfer fluid to two or more compartments of a lockable temperature controlled storage apparatus, said lockable temperature controlled storage apparatus comprising;
a) two or more remotely lockable storage spaces, wherein each of two or more remotely lockable storage space comprises at least one compartment; and
b) at least one common distribution system comprising a heat transfer fluid that is arranged to be in cooperation with a refrigeration system, said at least one common distribution system distributing the heat transfer fluid at a supplied pressure to exchange heat with the at least one compartment;
said method comprises the step of prioritising the distribution of the heat transfer fluid to each of said two or more compartments.

F25. The method of feature F24, wherein the step of prioritising the distribution of the heat transfer fluid to each of said one or more compartments comprises the step of;
i) placing each of said two or more compartments in a queue;
ii) determining the waiting time of each of said two or more compartments in the queue;
ii) prioritising the distribution of the heat transfer fluid to each of said two or more compartments based on their corresponding waiting times.

F26. The method of feature F24 or F25, wherein the step of prioritising the distribution of the heat transfer fluid to each of said two or more compartments comprises the step of;
i) placing each of said two or more compartments in a queue;
ii) determining the temperature of each of said two or more compartments in the queue;
iii) determining the set point temperature of each of said two or more compartments in the queue;
iv) prioritising the distribution of the heat transfer fluid to each of said two or more compartments based on their corresponding temperature differential between the temperature of the first compartment and the set point temperature of the first compartment; and between the temperature of the second compartment and the set point temperature of the second compartment.

F27. The method of any of the features F23 to F26, wherein said lockable temperature controlled apparatus comprise at least one valve for varying the quantity of heat transfer fluid to the at least one compartment in each of the two or more storage spaces and wherein the heat transfer fluid is distributed sequentially to said compartments by actuating said valves sequentially.

F28. The method of any of the features F23 to F27, wherein said refrigeration system has a cooling capacity for exchanging heat with a predetermined number of compartments in a given time.

F29. A lockable temperature controlled storage apparatus comprising;
 a) two or more remotely lockable storage spaces, wherein each of two or more remotely lockable storage space comprises at least one compartment; each of said compartments comprising a first temperature sensing device and a second temperature device;
 b) at least one common distribution system comprising a heat transfer fluid that is arranged to be in cooperation with a refrigeration system, said at least one common distribution system distributing the heat transfer fluid at a supplied pressure to exchange heat with the at least one compartment;
 c) a controller arranged to:—
 i) interrupt the flow of heat transfer fluid to at least one compartment when the temperature from the second temperature device reaches a lower limit and re-establish the flow of heat transfer fluid to exchange heat with said at least one compartment when the temperature from the second temperature device reaches an upper limit;
 ii) repeat step (i) until the temperature from the first temperature sensing device reaches a predetermined set point temperature.

F30. The lockable temperature controlled storage apparatus of feature F29, wherein the temperature measurement from the first temperature sensing device is an indication of the air temperature inside said at least one compartment.

F31. The lockable temperature controlled storage apparatus of feature F29 or F30, wherein the first temperature sensing device is fixed to at least one wall of the compartment.

F32. The lockable temperature controlled storage apparatus of any of features F29 to F31, wherein said at least one compartment comprises a heat exchanger or an evaporator in fluid communication with the heat transfer and wherein the second temperature sensing device is located adjacent the heat exchanger or the evaporator.

F33. The lockable temperature controlled storage apparatus of any of the features F29 to F32, comprising at least one valve for varying the quantity of heat transfer fluid to the at least one compartment in each of the two or more storage spaces and wherein said controller is arranged to control the actuation of the valves for interrupting and re-establishing the flow of the heat transfer fluid between the lower limit and the upper limit of the temperature from the second temperature sensing device respectively to at least one compartment.

F34. The lockable temperature controlled storage apparatus of any of the features F29 to F33, wherein said upper limit is substantially −7° C. and said lower limit is substantially −10° C.

F35. A method of controlling the temperature of at least one compartment in a lockable temperature controlled storage apparatus, said lockable temperature controlled storage apparatus comprising;
 a) two or more remotely lockable storage spaces, wherein each of two or more remotely lockable storage space comprises at least one compartment; each of said compartments comprising a first temperature sensing device and a second temperature device;
 b) at least one common distribution system comprising a heat transfer fluid that is arranged to be in cooperation with a refrigeration system, said at least one common distribution system distributing the heat transfer fluid at a supplied pressure to exchange heat with the at least one compartment;
 comprising the steps of;
 i) interrupting the flow of heat transfer fluid to at least one compartment when the temperature from the second temperature device reaches a lower limit and re-establishing the flow of heat transfer fluid to exchange heat with said at least one compartment when the temperature from the second temperature device reaches an upper limit;
 ii) repeating step (i) until the temperature from the first temperature sensing device reaches the predetermined set point temperature.

F36. The method of feature F35, comprising at least one valve for varying the quantity of heat transfer fluid to the at least one compartment in each of the two or more storage spaces and wherein said controller is arranged to control the actuation of the valves for interrupting and re-establishing the flow of the heat transfer fluid between a lower limit and an upper limit respectively.

F37. A shelving unit for a lockable temperature controlled storage apparatus as defined in any of the features F1 to F22 or feature F29 to F34 comprising a moveable shelf supported by a frame.

F38. The shelving unit of feature F37, wherein the frame is a bent wire frame.

F39. The shelving unit of feature F37 or F38, wherein the frame comprises at least two or more legs and wherein the shelf is supported to the at least two or more legs by slideable fixing points to permit the shelf to be move along the at least two or more legs of the frame.

F40. The shelving unit of any of the features F37 to F39, wherein the frame comprises an inward upper portion and an outward lower portion, said inward upper portion and said outward lower portion meet to define a resting point for the shelf.

F41. The shelving unit of feature F40, wherein the resting point is a joggle.

F42. The shelving unit of feature F40 or F41, wherein the lower portion is outwardly offset of the upper portion.

F43. The shelving unit of any of the claims F40 to F41, wherein the lower portion is sized to butt up against opposing walls of a compartment.

F44. The shelving unit of any of the features F40 to F3, wherein the shelf is moveable along the upper portion.

F45. The shelving unit of any of the features F37 to F44, wherein the shelf and/or the frame comprises fixing points to securing the shelf in a raised position.

F46. A compartment for a lockable temperature controlled storage apparatus as defined in any of the features F1 to F22 or feature F29 to F34 comprising a shelving unit as defined in any of the features 38 to 48 secured to the compartment.

Feature G—Features Incorporated with Reference to Prior Patent Application GB1423158.3

G1. A canopy strut comprising;
 a) a top member;
 b) a canopy strut body, said canopy strut body cooperates with the top member to form a clamp for clamping sheet material;

wherein the clamp comprises a front end and a rear end and wherein the clamp is adjustable at the front end of the clamp so as to provide different clamping force between the top member and the canopy strut body.

G2. The canopy strut of feature G1, wherein the front end of the clamp comprises an adjustable tensioning buckle and the top member is releasably fixed to the canopy strut body at the rear end of the clamp.

G3. The canopy strut of feature G2, wherein one end of the top member comprises a upwardly bent portion that cooperates with an upwardly extending portion of the canopy strut body to form the adjustable tensioning buckle.

G4. The canopy strut of feature G3, wherein the upwardly bent portion of the top member is spaced apart from the upwardly extending portion of the canopy strut body.

G5. The canopy strut of feature G4, wherein the clamping force is varied by adjusting the spacing between the upwardly bent portion of the top member and the upwardly extending portion of the canopy strut body.

G6. The canopy strut of feature G5, wherein a screw threadingly engages the upwardly bent portion of the member and the upwardly extending portion of the canopy strut body so as to vary the spacing there between.

G7. The canopy strut of any of the features G2 to G6, wherein the top member is hooked to the canopy strut body at the rear end of the clamp.

G8. The canopy strut of any of the preceding features, wherein the canopy strut body comprises a downwardly extending spacer.

G9. The canopy strut of feature G8, wherein the downwardly extending spacer comprising a connector for connecting locker modules together.

G10. The canopy strut of feature G8 or G9, wherein the canopy strut body is fabricated as a single body.

G11. A canopy comprising sheet material extends between two or more canopy struts as defined in any of the features G1 to G10.

G12. The canopy of feature G11, wherein the sheet material is a polycarbonate sheet material.

G13. A locker module comprising one or more lockable storage spaces, each of the lockable storage spaces comprising one or more compartments, wherein the locker module comprises a canopy as defined in feature G11 or G12.

G14. The locker module of feature G13, wherein the canopy covers a refrigeration system mounted above the one or more locker modules.

G15. An assembly of locker modules, each of the locker modules comprising one or more lockable storage spaces, the assembly of locker modules comprises a canopy as defined in any of the Features G1 to G12, wherein the canopy extends across multiple locker modules.

G16. An assembly of locker modules, each of the locker modules comprising one or more lockable storage spaces, and wherein the locker modules are linked or connected to each other by the canopy strut as defined in Feature G8 or G9.

G17. The assembly of locker modules of Feature G16, wherein each of the locker modules in the assembly is removeably engageable with the downwardly extending spacer.

G18. An evaporator plate for a refrigeration system, comprising coolant channels which are arranged between two sheets of metal wherein the evaporator plate comprises at least one foldable portion delineated by a line of weakness.

G19. The evaporator plate of feature G18, wherein the evaporator plate comprises a middle portion and foldable side portions either side of the middle portion, said foldable side portions are delineated from the middle portion by the line of weakness.

G20. The evaporator of feature G19, wherein the line of weakness is a cut out portion of the evaporator plate.

G21. The evaporator plate of feature G20, wherein the evaporator plate comprises cut portion having a shape such that the junction between the middle portion and the foldable side portions is foldable to form a bend having a tapered or fluted shape across the evaporator plate from a substantially 90° bend at one end of the evaporator plate to a relatively rounded bend at the other end of the evaporator plate.

G22. The evaporator plate of feature G20 or G21, wherein the cut out portion is substantially trapezoidal.

G23. The evaporator plate as defined in any of the features G18 to G22, wherein the evaporator plate comprises heater elements.

G24. The evaporator plate of feature G23, wherein at least one wall of the evaporator plate comprises heater tracks to accommodate the heater elements.

G25. The evaporator plate of any of the features G18 to G24, wherein at least one wall of the evaporator plate comprises a layer of adhesive suitable for fixing the evaporator plate onto a compartment.

G26. A method of assembling an evaporator plate as defined any of the features G18 to G25 onto a compartment comprising the steps of;
  i) mounting the evaporator plate onto at least one wall of the compartment; and
  ii) folding the at least one foldable portion along the line of weakness onto an adjacent wall of the compartment.

G27. The method of feature G26, wherein the evaporator plate is mounted onto a top or bottom wall of the compartment and the at least one foldable portion is folded along the line of weakness onto a side wall of the compartment.

G28. The method of feature G27, wherein the evaporator plate is adhered to the compartment.

G29. A shelving unit for a compartment, said shelving unit comprising a shelf supported at one end by a support rod fixable to at least one wall of the compartment and the other end of the shelf is arranged to be supported on at least one dowel located to at least one adjacent wall of the compartment, the support rod extends through the shelf so as to permit the shelf to be moveable along the support rod.

G30. The shelving unit of feature G29, wherein the shelf comprises a retention member arranged to hold the shelf to a top wall of the compartment.

G31. The shelving unit of feature G30, wherein the retention member is a magnet.

G32. A compartment comprising a shelving unit as defined in any of the Feature G29 to G31, wherein one end of the support rod is fixed to a top wall of the compartment and the other end of the support rod is fixed to an adjacent rear wall of the compartment.

G33. The compartment of feature G32, wherein the shelving unit comprises indexing means arranged to support the shelf at different heights in the compartment.

G34. The compartment of G33, wherein the indexing means comprises a toggle or a ratchet.

G35. The compartment of feature G34, wherein the shelf comprises a toggle plate that cooperates with the support rod to index the shelf along the support rod.

G36. The compartment of feature G35, wherein the shelf is indexed along the support rod by frictional engagement.

G37. The compartment of feature G35 or G36, wherein the support rod comprises serrations.

G38. A compartment for a temperature controlled apparatus, comprising a cavity and a door pivotally connected to the compartment for closing the cavity by a hinge mechanism, the hinge mechanism comprises a torsion biasing mechanism comprising a torsion element supported on a hinge pin and held within a support bracket such that relative rotation of the hinge pin changes the strain in the torsion element to bias the door in a closed configuration.

G39. The compartment of feature 38, wherein the torsion element is axially engageable with the hinge pin on assembly.

G40. The compartment of feature G38 or G39, wherein the torsion element is a coiled spring.

G41. The compartment of feature G40, wherein the coiled spring has a diametrical formation engageable with a diametrical slot at one end of the hinge pin.

G42. A thermal break for a temperature controlled apparatus comprising one or more compartments and a door for closing the one or more compartments, the thermal break comprising;

an extrusion profile arranged for cooperating with the door to seal the one or more compartments from each other and engaging with at least one edge of the compartment, wherein the extrusion profile is arranged to accommodate a heater element.

G43. The thermal break of feature G42, comprising a sealing member having a front sealing face and a rear face;

at least one engaging portion at the rear face of the sealing member for engaging with the least one edge of the compartment, said engaging portion being resiliently pivotally connected to the rear face of the sealing member.

G44. The thermal break of feature G43, comprising first and second said engaging portions, said first and second engaging portions being arranged to engage with at least one edge of the compartment and the second engaging portion being arranged to engage with at least one edge of a door divider.

G45. The thermal break of feature G44, wherein the first and second engaging portions cooperate with the rear face of the sealing member to provide a receiving portion of a connector for connecting strips of said thermal break together and for locking the first and/or second engaging portions into engagement with the edge of the compartment and/or with the door divider.

G46. The thermal break of feature G44 or G45, wherein the first engagement portion has a curled cross-sectional profile defining an resiliently openable slit end for gripping onto an edge of the door divider.

G47. The thermal break of any of features G44 to G46, wherein the second engagement portion is pivotally connected to the rear face of the sealing member to define a resiliently openable slot for reception of the edge of the compartment.

G48. The thermal break of any of the feature G43 to G47, wherein the at least one engagement profile cooperates with the rear face of the sealing member to accommodate a heater element.

G49. A compartment for a temperature controlled storage apparatus, comprising an insulated lockable door closable to seal the compartment; wherein the insulated lockable door is closable to seal the compartment by a thermal break of any of the features G42 to G48.

G50. A temperature controlled apparatus comprising
a) one or more compartments of feature G49;
b) a controller for actuating the heater element when the temperature inside the compartment or the temperature of the thermal break is less than the dew point temperature of the air external of the temperature controlled apparatus.

G51. The temperature controlled apparatus of feature G50, wherein the dew point temperature is predetermined.

G52. A temperature controlled storage apparatus, comprising:—
a) a plurality of insulated compartments;
b) a refrigeration system adapted to selectively cool said compartments and having a defined maximum refrigeration capacity;
c) a controller receiving data indicating the temperature in the compartments and adapted to:—
compare the temperature in each compartment with a defined desired range of temperature for that compartment;
selectively allocate the available refrigeration capacity to all or a sub-group of compartments as appropriate on the basis of defined urgency criteria
such that those compartments in most need are prioritised and so that the refrigeration system is not called upon to exceed its defined maximum refrigeration capacity.

G53. The temperature controlled storage apparatus as defined in Feature G52, in which the urgency criteria prioritise compartments having a temperature outside said defined desired range of temperature.

G54. The temperature controlled storage apparatus as defined in Feature G52 or Feature G53, in which the urgency criteria prioritise compartments having temperature excursions outside the defined desired range of temperature for that compartment G55. The temperature controlled storage apparatus as defined in any of Features G52 to G54, in which the controller determines for each compartment a required refrigeration capacity to maintain or return the compartment to said defined desired range of temperature and the urgency criteria include said required refrigeration capacity.

G56. The temperature controlled storage apparatus as defined in any of Features G52 to G55, in which the controller ranks the compartments in an order of urgency and successively allocates refrigeration capacity to the compartments in order of urgency.

G57. The temperature controlled storage apparatus as defined in Feature G56, in which the controller ranks the compartments in an order of urgency and allocates refrigeration capacity to a group of compartments having a total required refrigeration capacity at or below the defined maximum refrigeration capacity.

G58. The temperature controlled storage apparatus as defined in any of Features G52 to G57, in which the defined desired range for each compartment is remotely programmable.

G59. The temperature controlled storage apparatus as defined in any of Features G52 to G58, in which the controller continuously makes the temperature comparison and adapts the selective allocation of available refrigeration capacity.

G60. The temperature controlled storage apparatus as defined in any of Features G52 to G59, in which the controller periodically makes the temperature comparison and adapts the selective allocation of available refrigeration capacity.

G61. The temperature controlled storage apparatus as defined in any of Features G52 to G60, in which the refrigeration system is adapted to cool a sub-group of two compartments.

G62. The temperature controlled storage apparatus as defined in any of Features G52 to G61, in which the controller relieves any surplus refrigeration capacity.

G63. The temperature controlled storage apparatus as defined in Feature G62, in which the controller bypasses surplus refrigeration capacity away from the compartments.

The invention claimed is:

1. A lockable temperature controlled storage apparatus, comprising:
   a) a group of compartments, each compartment closeable by a remotely programmable insulated lockable door;
   b) at least one common distribution system comprising a heat transfer fluid that is arranged to be in cooperation with a refrigeration system having a defined maximum refrigeration capacity, said at least one common distribution system comprising a plurality of valves for distributing the heat transfer fluid at a supplied pressure to exchange heat with the group of compartments, each valve of the plurality associated with a respective one of the compartments in the group of compartments;
   a controller for controlling actuation of the plurality of valves, wherein the controller is configured to assign a cooling sequence to a sub-group of the compartments, the sub-group of compartments comprising at least a first compartment of the group of compartments and a second compartment of the group of compartments, and less than all of the compartments in the group of compartments, wherein the heat transfer fluid is fed to the first compartment through a first valve of the plurality of valves and the heat transfer fluid is fed to the second compartment through a second valve of the plurality of valves, wherein the second valve is separate from the first valve, wherein the cooling sequence defines an order in which each compartment in the sub-group will receive heat transfer fluid such that the heat transfer fluid is periodically switched to each of the compartments in the sub-group in accordance with the cooling sequence by the controller actuating the first valve to be closed when the second valve is open and the second valve to be closed when the first valve is open so that less than all of the compartments in the sub-group of compartments receive heat transfer fluid at any given time and to vary the quantity of heat transfer fluid to each of the compartments in the sub-group.

2. A lockable temperature controlled storage apparatus, comprising:
   a) a group of compartments, each compartment closeable by a remotely programmable insulated lockable door;
   b) at least one common distribution system comprising a heat transfer fluid that is arranged to be in cooperation with a refrigeration system having a defined maximum refrigeration capacity, said at least one common distribution system comprising at least one valve for distributing the heat transfer fluid at a supplied pressure to exchange heat with the group of compartments;
   a controller for controlling actuation of the at least one valve, wherein the controller is configured to assign a cooling sequence to a sub-group of the compartments, the sub-group of compartments comprising two or more compartments and less than all of the compartments in the group of compartments, wherein the cooling sequence defines an order in which each compartment in the sub-group will receive heat transfer fluid such that the heat transfer fluid is periodically switched to each of the compartments in the sub-group in accordance with the cooling sequence by the controller actuating the at least one valve so that less than all of the compartments in the sub-group of compartments receive heat transfer fluid at any given time and to vary the quantity of heat transfer fluid to each of the compartments in the sub-group;
   wherein, when the temperature of one of the compartments in the sub-group has reached a defined desired range of temperature for the one compartment, a compartment that was previously not part of the sub-group is allocated into the sub-group.

3. A lockable temperature controlled storage apparatus, comprising:
   a) a group of compartments, each compartment closeable by a remotely programmable insulated lockable door;
   b) at least one common distribution system comprising a heat transfer fluid that is arranged to be in cooperation with a refrigeration system having a defined maximum refrigeration capacity, said at least one common distribution system comprising at least one valve for distributing the heat transfer fluid at a supplied pressure to exchange heat with the group of compartments;
   a controller for controlling actuation of the at least one valve, wherein the controller is configured to assign a cooling sequence to a sub-group of the compartments, the sub-group of compartments comprising two or more compartments and less than all of the compartments in the group of compartments, wherein the cooling sequence defines an order in which each compartment in the sub-group will receive heat transfer fluid such that the heat transfer fluid is periodically switched to each of the compartments in the sub-group in accordance with the cooling sequence by the controller actuating the at least one valve so that less than all of the compartments in the sub-group of compartments receive heat transfer fluid at any given time and to vary the quantity of heat transfer fluid to each of the compartments in the sub-group;
   wherein the selection of the compartments in the sub-group are prioritised according to criteria, in which the criteria prioritise compartments based on:
   i) having a temperature outside a defined desired range of temperature and/or
   ii) temperature requirements of the compartments; wherein the temperature requirement of a compartment is based on the compartment having one of the following
   (a) a controlled ambient temperature having a temperature range between substantially 4° C. to substantially 21° C.; or
   (b) a chilled temperature; or
   (c) a frozen temperature.

4. A lockable temperature controlled storage apparatus, comprising:
   a) a group of compartments, each compartment closeable by a remotely programmable insulated lockable door;
   b) at least one common distribution system comprising a heat transfer fluid that is arranged to be in cooperation with a refrigeration system having a defined maximum refrigeration capacity, said at least one common distribution system comprising at least one valve for distributing the heat transfer fluid at a supplied pressure to exchange heat with the group of compartments;
   a controller for controlling actuation of the at least one valve, wherein the controller is configured to assign a cooling sequence to a sub-group of the compartments, the sub-group of compartments comprising two or more compartments and less than all of the compartments in the group of compartments, wherein the cooling sequence defines an order in which each compartment in the sub-group will receive heat transfer fluid such that the heat transfer fluid is periodically switched to each of the compartments in the sub-group in accordance with the cooling sequence by the controller actuating the at least one valve so that less than all of the compartments in the sub-group of compartments receive heat transfer fluid at any given time and to vary the quantity of heat transfer fluid to each of the compartments in the sub-group;

wherein the controller is configured to determine, for each compartment, a required refrigeration capacity to maintain or return the compartment to a defined desired range of temperature associated with the compartment, and the controller allocates a number of compartments into the sub-group such that the maximum refrigeration capacity is not exceeded by a combined required refrigeration capacity of the number of compartments such that a refrigerant pressure for cooling is maintained for each compartment in the sub-group.

5. The lockable temperature controlled storage apparatus according to claim 4, wherein the controller is configured to place in a queue each compartment of the group that is (i) not allocated to the sub-group and (ii) has a temperature outside the defined desired range of temperature associated with the compartment, wherein each compartment in the queue is prioritised in the queue based on its waiting time in the queue and/or its differential temperature, wherein the differential temperature of each compartment is the temperature difference between the temperature of the compartment and the defined desired range of temperature for the compartment.

6. The lockable temperature controlled storage apparatus of claim 5, wherein said compartment having a longest waiting time in the queue is prioritised highest in the queue.

7. The lockable temperature controlled storage apparatus of claim 5, wherein said compartment having the temperature differential that is largest is prioritised highest in the queue.

8. The lockable temperature controlled storage apparatus of claim 4, wherein the at least one valve comprises multiple valves and the controller is arranged to determine the available refrigeration capacity of the refrigeration system by determining the status of said multiple valves.

9. The lockable temperature controlled storage apparatus of claim 8, wherein the controller is arranged to determine whether one or more said valves have been actuated.

10. The lockable temperature controlled storage apparatus of claim 1, comprising two or more lockable storage spaces, wherein each of the two or more lockable storage spaces comprises at least one compartment in the group of compartments.

11. A method of distributing heat transfer fluid to two or more compartments of a lockable temperature controlled storage apparatus that includes a group of compartments, each compartment closeable by a remotely programmable insulated lockable door, and at least one common distribution system comprising a heat transfer fluid that is arranged to be in cooperation with a refrigeration system having a defined maximum refrigeration capacity, said at least one common distribution system comprising at least a first valve and a second valve that is separate from the first valve for distributing the heat transfer fluid at a supplied pressure to exchange heat with the group of compartments, wherein the two or more compartments are included within the group of compartments; the method comprising the steps of:

a) selecting a sub-group of compartments, the sub-group of compartments comprising the two or more compartments and less than all of the compartments in the group of compartments, wherein each compartment in the sub-group is selected on the basis of the compartment having a temperature outside a defined desired range of temperature for that compartment;

b) distributing heat transfer fluid to flow to a first compartment in the sub-group of the compartments but not to a second compartment in the sub-group of compartments by causing the first valve to be open and the second valve to be closed, wherein step b) occurs for a predetermined time period;

c) switching the heat transfer fluid to flow to the second compartment in the sub-group of the compartments but not to the first compartment in the sub-group of compartments by causing the second valve to be open and the first valve to be closed, wherein step c) occurs for a predetermined time period;

d) repeating each of the steps (b) and (c) until one of the first compartment or the second compartment in the sub-group has reached its defined desired range of temperature and, thereafter, not repeating steps (b) and (c).

12. The method of claim 11 further comprising the step of allocating a compartment, having a temperature outside the defined desired range of temperature for that compartment, to the sub-group of compartments when any one of the compartments in the sub-group has reached its defined desired range of temperature.

* * * * *